Oct. 2, 1951 E. J. RABENDA 2,569,829

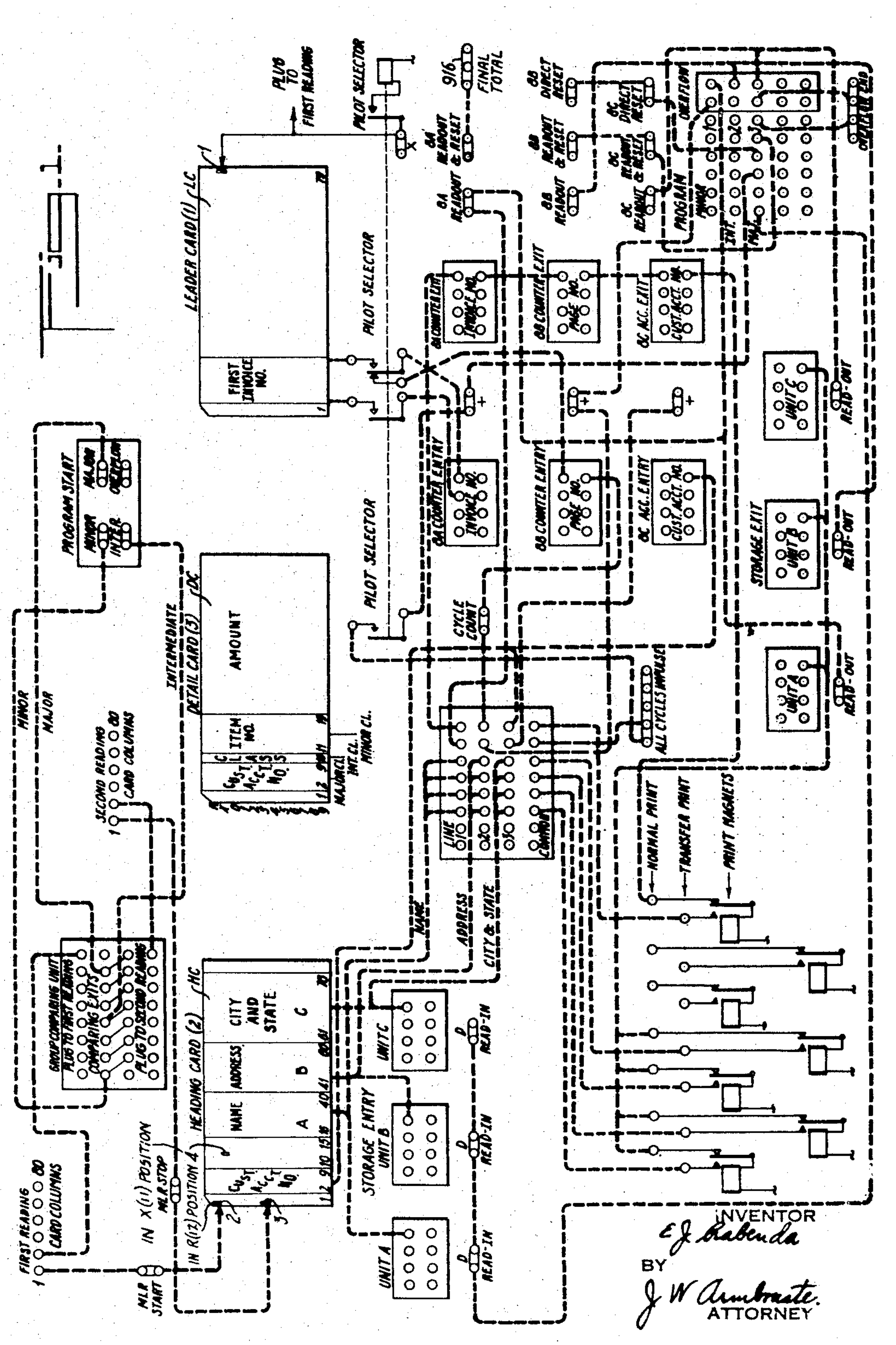
INVENTOR
E J Rabenda
BY
J W Armbruster
ATTORNEY

RECORD CONTROLLED PRINTING DEVICE
WITH FEED CONTROL TAPE

Filed May 3, 1949 51 Sheets-Sheet 2

INVENTOR
E. J. Rabenda

BY
J. W. Armbruster
ATTORNEY

INVENTOR
E J Rabenda
BY
J W Armbruster
ATTORNEY

Oct. 2, 1951 E. J. RABENDA 2,569,829

RECORD CONTROLLED PRINTING DEVICE WITH FEED CONTROL TAPE

Filed May 3, 1949 51 Sheets-Sheet 4

INVENTOR
E. J. Rabenda
BY
J. W. Armbruster
ATTORNEY

Oct. 2, 1951 E. J. RABENDA 2,569,829

RECORD CONTROLLED PRINTING DEVICE
WITH FEED CONTROL TAPE

Filed May 3, 1949 51 Sheets-Sheet 5

INVENTOR
E J Rabenda
BY
J W Armbruster
ATTORNEY

Oct. 2, 1951 E. J. RABENDA 2,569,829

RECORD CONTROLLED PRINTING DEVICE
WITH FEED CONTROL TAPE

Filed May 3, 1949 51 Sheets-Sheet 6

INVENTOR
E J Rabenda
BY
J W Armbruster
ATTORNEY

INVENTOR
E J Rabenda
BY
J W Armbruster
ATTORNEY

Oct. 2, 1951

E. J. RABENDA

RECORD CONTROLLED PRINTING DEVICE WITH FEED CONTROL TAPE 2,569,829

Filed May 3, 1949

51 Sheets-Sheet 8

INVENTOR

E J Rabenda

BY

J W. Armbruster

ATTORNEY

Oct. 2, 1951 E. J. RABENDA 2,569,829

RECORD CONTROLLED PRINTING DEVICE
WITH FEED CONTROL TAPE

Filed May 3, 1949 51 Sheets-Sheet 9

INVENTOR
E. J. Rabenda
BY
J. W. Armbruster
ATTORNEY

INVENTOR
E J Rabenda
BY
J W Armbruster
ATTORNEY

INVENTOR
E J Rabenda
BY
J W Armbruster
ATTORNEY

INVENTOR
E J Rabenda
BY
J W Armbruster
ATTORNEY

Oct. 2, 1951

E. J. RABENDA
RECORD CONTROLLED PRINTING DEVICE
WITH FEED CONTROL TAPE 2,569,829

Filed May 3, 1949

51 Sheets-Sheet 13

INVENTOR
E. J. Rabenda
BY
J. W. Armbruster
ATTORNEY

| DIGIT IMPULSE | ZONE IMPULSE | | | N PULSE |
|---|---|---|---|---|
| | 0 | X | R | |
| 1 | / | J | A | 1 |
| 2 | S | K | B | 2 |
| 3 | T | L | C | 3 |
| 4 | U | M | D | 4 |
| 5 | V | N | E | 5 |
| 6 | W | O | F | 6 |
| 7 | X | P | G | 7 |
| 8 | Y | Q | H | 8 |
| 9 | Z | R | I | 9 |
| 0 | | | | 0 |

INVENTOR
E J Rabenda
BY
J W Armbruster
ATTORNEY

INVENTOR
E J Rabenda
BY
J W Armbruster
ATTORNEY

Oct. 2, 1951 E. J. RABENDA 2,569,829

RECORD CONTROLLED PRINTING DEVICE WITH FEED CONTROL TAPE

Filed May 3, 1949 51 Sheets-Sheet 16

INVENTOR
E J Rabenda
BY
J W Armbraster
ATTORNEY

Oct. 2, 1951

E. J. RABENDA

RECORD CONTROLLED PRINTING DEVICE WITH FEED CONTROL TAPE 2,569,829

Filed May 3, 1949

51 Sheets-Sheet 17

INVENTOR
E J Rabenda

BY
J W Armbruster
ATTORNEY

Oct. 2, 1951 E. J. RABENDA 2,569,829

RECORD CONTROLLED PRINTING DEVICE
WITH FEED CONTROL TAPE

Filed May 3, 1949 51 Sheets-Sheet 18

INVENTOR
E J Rabenda
BY
J W Armbruster
ATTORNEY

INVENTOR
E J Rabenda
BY
J W Armbruster
ATTORNEY

Oct. 2, 1951 | E. J. RABENDA | 2,569,829

RECORD CONTROLLED PRINTING DEVICE
WITH FEED CONTROL TAPE

Filed May 3, 1949 | 51 Sheets-Sheet 20

INVENTOR
E J Rabenda
BY
J W Armbruster
ATTORNEY

INVENTOR.
E J Rabenda
BY
J W Armbruster
ATTORNEY

INVENTOR
E J Rabenda
BY
J W Armbruster
ATTORNEY

Oct. 2, 1951 E. J. RABENDA 2,569,829

RECORD CONTROLLED PRINTING DEVICE WITH FEED CONTROL TAPE

Filed May 3, 1949 51 Sheets-Sheet 23

INVENTOR
E J Rabenda
BY
J W Armbruster
ATTORNEY

INVENTOR
E J Rabenda
BY
J W Armbruster
ATTORNEY

Oct. 2, 1951

E. J. RABENDA

RECORD CONTROLLED PRINTING DEVICE
WITH FEED CONTROL TAPE 2,569,829

Filed May 3, 1949

51 Sheets-Sheet 25

INVENTOR
E J Rabenda

BY
J W Armbruster
ATTORNEY

INVENTOR
E J Rabenda
BY
J W Armbruster
ATTORNEY

INVENTOR
E J Rabenda
BY
J W Armbruster
ATTORNEY

INVENTOR
E J Rabenda
BY
J W Armbruster
ATTORNEY

INVENTOR
E J Rabenda
BY
J W Armbruster
ATTORNEY

Oct. 2, 1951 E. J. RABENDA 2,569,829

RECORD CONTROLLED PRINTING DEVICE
WITH FEED CONTROL TAPE

Filed May 3, 1949 51 Sheets-Sheet 30

INVENTOR
E J Rabenda
BY
J W Armbruster
ATTORNEY

Oct. 2, 1951 E. J. RABENDA 2,569,829

RECORD CONTROLLED PRINTING DEVICE WITH FEED CONTROL TAPE

Filed May 3, 1949 51 Sheets-Sheet 31

INVENTOR
E J Rabenda
BY
J W Armbruster
ATTORNEY

INVENTOR
E J Rabenda
BY
J W Armbruster
ATTORNEY

Oct. 2, 1951 E. J. RABENDA 2,569,829

RECORD CONTROLLED PRINTING DEVICE WITH FEED CONTROL TAPE

Filed May 3, 1949 51 Sheets-Sheet 33

INVENTOR
E J Rabenda
BY
J W Armbruster
ATTORNEY

INVENTOR
E J Rabenda
BY
J W Armbruster
ATTORNEY

Oct. 2, 1951 E. J. RABENDA 2,569,829

RECORD CONTROLLED PRINTING DEVICE WITH FEED CONTROL TAPE

Filed May 3, 1949 51 Sheets-Sheet 35

INVENTOR
E J Rabenda
BY
J W Armbruster
ATTORNEY

Oct. 2, 1951 E. J. RABENDA 2,569,829

RECORD CONTROLLED PRINTING DEVICE
WITH FEED CONTROL TAPE

Filed May 3, 1949 51 Sheets-Sheet 36

INVENTOR
E J Rabenda
BY
J W Armbruster
ATTORNEY

INVENTOR
E J Rabenda
BY
J W Armbruster
ATTORNEY

Oct. 2, 1951

E. J. RABENDA

RECORD CONTROLLED PRINTING DEVICE WITH FEED CONTROL TAPE 2,569,829

Filed May 3, 1949

51 Sheets-Sheet 38

INVENTOR
E J Rabenda
BY
J W Armbruster
ATTORNEY

INVENTOR
E J Rabenda
BY
J W Armbruster
ATTORNEY

INVENTOR
E J Rabenda
BY
J W Armbruster
ATTORNEY

Oct. 2, 1951 E. J. RABENDA 2,569,829

RECORD CONTROLLED PRINTING DEVICE
WITH FEED CONTROL TAPE

Filed May 3, 1949 51 Sheets-Sheet 41

INVENTOR
E. J. Rabenda
BY
J. W. Armbruster
ATTORNEY

INVENTOR
E J Rabenda
BY J W Armbruster
ATTORNEY

Oct. 2, 1951

E. J. RABENDA

RECORD CONTROLLED PRINTING DEVICE
WITH FEED CONTROL TAPE 2,569,829

Filed May 3, 1949

51 Sheets-Sheet 43

INVENTOR
E J Rabenda
BY
J W Armbruster
ATTORNEY

Oct. 2, 1951 E. J. RABENDA 2,569,829

RECORD CONTROLLED PRINTING DEVICE
WITH FEED CONTROL TAPE

Filed May 3, 1949 51 Sheets-Sheet 44

INVENTOR
E. J. Rabenda
BY J. W. Armbruster
ATTORNEY

C.F. CAMS

NOTE:
C.F. CAM CLUTCH
LATCHES AT 310°

INVENTOR
E. J. Rabenda
BY
J. W. Armbruster
ATTORNEY

INVENTOR
E. J. Rabenda
BY
J. W. Armbruster
ATTORNEY

Oct. 2, 1951 E. J. RABENDA 2,569,829

RECORD CONTROLLED PRINTING DEVICE
WITH FEED CONTROL TAPE

Filed May 3, 1949 51 Sheets-Sheet 47

C.R. CAMS

INVENTOR
E.J. Rabenda
BY
J.W. Armbruster
ATTORNEY

Oct. 2, 1951 E. J. RABENDA 2,569,829

RECORD CONTROLLED PRINTING DEVICE WITH FEED CONTROL TAPE

Filed May 3, 1949 51 Sheets-Sheet 48

C.R. CAMS

INVENTOR
E. J. Rabenda
BY J. W. Armbruster
ATTORNEY

Oct. 2, 1951 E. J. RABENDA 2,569,829

RECORD CONTROLLED PRINTING DEVICE WITH FEED CONTROL TAPE

Filed May 3, 1949 51 Sheets-Sheet 49

C.R. CAMS

INVENTOR
E J Rabenda
BY
J W Armbruster
ATTORNEY

Oct. 2, 1951 E. J. RABENDA 2,569,829

RECORD CONTROLLED PRINTING DEVICE
WITH FEED CONTROL TAPE

Filed May 3, 1949 51 Sheets-Sheet 50

C.R.CAMS

INVENTOR
E. J. Rabenda
BY
J. W. Armbruster
ATTORNEY

Oct. 2, 1951 E. J. RABENDA 2,569,829

RECORD CONTROLLED PRINTING DEVICE WITH FEED CONTROL TAPE

Filed May 3, 1949 51 Sheets-Sheet 51

INVENTOR
E J Rabenda
BY
J W Armbruster
ATTORNEY

Patented Oct. 2, 1951

2,569,829

UNITED STATES PATENT OFFICE 2,569,829

RECORD CONTROLLED PRINTING DEVICE WITH FEED CONTROL TAPE

Edward J. Rabenda, Poughkeepsie, N. Y., assignor to International Business Machines Corporation, New York, N. Y., a corporation of New York Application May 3, 1949, Serial No. 91,026

38 Claims. (Cl. 235—61.6)

This invention relates to improvements in accounting machines and more particularly to data storage means, printing devices and paper feeding means with novel controls and an advanced form of operation.

In record controlled machines for printing bills and other accounting lists on forms it is customary to print but one heading and to skip from form to form when overflow conditions are presented. In other words, when a large number of related items are to be recorded, the heading identification of such items is usually found on only the first of a series of separable forms and the heading areas of the second and following forms are skipped in listing items in the body areas. In card controlled machines the heading cards are usually at the head of related item cards and lead them in the sequential order of control of the machine. Thus, heading print control is lost after recording on the first of a series of related forms. Now it is shown desirable to store such heading data and when the paper feeding controls detect an overflow condition to control repetitive heading print control from storage. Therefore, the first, second and all successive related forms on a continuous strip will all have full heading data imprinted thereon and retain their identity when separated.

Another condition improved by the present invention is that concerning the space to be left at the bottom of each form. It was customary to leave three or more line spaces below the last body or item line, i. e., the overflow line presented itself before the end of the form was reached. That space was wasted in many instances and found use only when a group change coincided with appearance of the overflow position of the form; then it was possible to print the totals on the same form with the full list of items. Now it is proposed to retain the advantage of printing totals on the same form as related items wherever possible, and at the same time to utilize all the available space of the body area down to the last line in all instances of overflow. Two overflow detection controls are provided by the paper feed devices, the first one is preparatory and is encountered a few lines short of the end of the form. This first overflow control does not stop listing near the end of the form, but merely provides an end area control so that if a group change occurs while item printing is done within the end area, the record strip is advanced to the next heading area of the next form, the related heading is reprinted from storage, and the totals are recorded on the new form. At all other times, the items are listed to the very bottom of each form before the second overflow detection control calls for an advance to a second form. Thus there is no waste of recording area and in the majority of instances of overflow conditions all the record receiving space is utilized.

An object of the invention is the provision of means for repeating the recording of heading data such as address data on successive related forms.

Another object of the invention is the provision of dual overflow controls, one of which in combination with group change devices calls in form to form feeding and recording of heading data followed by recording of totals on a second form. A second overflow control permits printing of items to the very end of a form before advance of the record strip to the heading area of the next form.

Another object of the invention is the provision of an electromechanical form of storage means for receiving as many as four different portions of data from a single perforated control card.

Another object of the invention is the provision of two listing overflow detectors at positions between which the total impressions are selectively placed either at the end of one form or the middle of a following form. The two overflow detecting positions are spaced with relation to the end of a form so that the first is encountered while there is still room to place the totals under the items to which they relate; the second overflow detector is encountered when listing has progressed to the bottom of a form with no room for one or more totals. After the first overflow detector is activated, on a group change, total recording is suspended until the record strip is advanced to the top of a new form and name and address printing is repeated from storage before the totals are recorded.

A further object of the invention is the disclosure of an improved program control for governing the sequence of as many as five steps of operation. The program controls are available for seriatim consideration of different classes of totals as well as recording of different parts of an address in the usual order of name, street, city and State.

A still further object of the invention is the novel and useful coordination of the overflow detecting controls of a tape controlled feeding means with storage and program devices whereby address data or other numerical, chronological or alphabetic data may be stored and read out sequentially and printed line after line under control of the tape alone or the tape in cooperation with the group control devices.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a diagrammatic view of the control cards and connected machine units.

Fig. 1*a* shows samples of record forms and a related feed control tape.

Fig. 1*b* is a left outside elevational view of the card feeding unit and is taken on the line 1b—1b of Fig. 4.

Figure 9A:
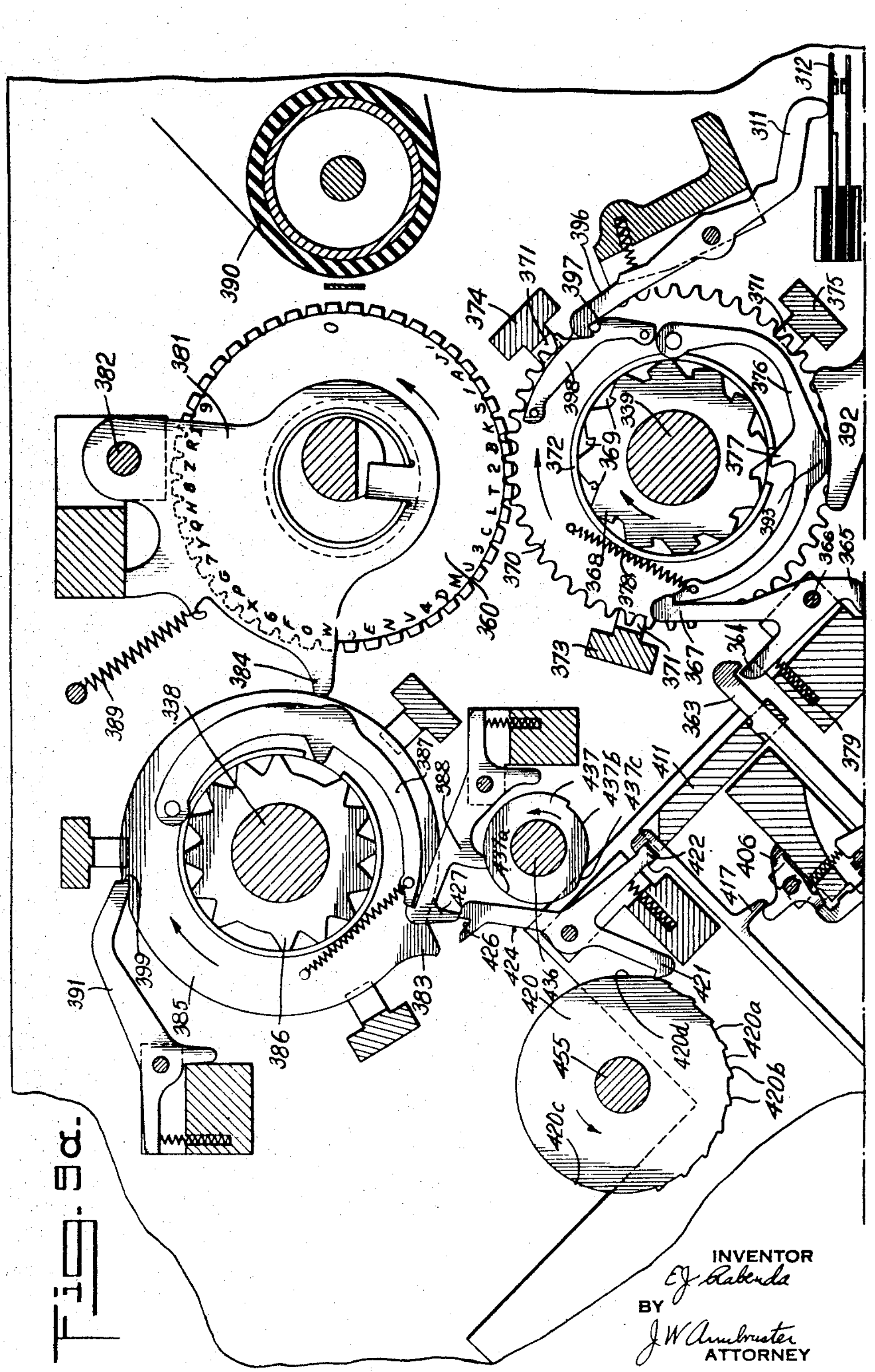
Figures 9B, 10:
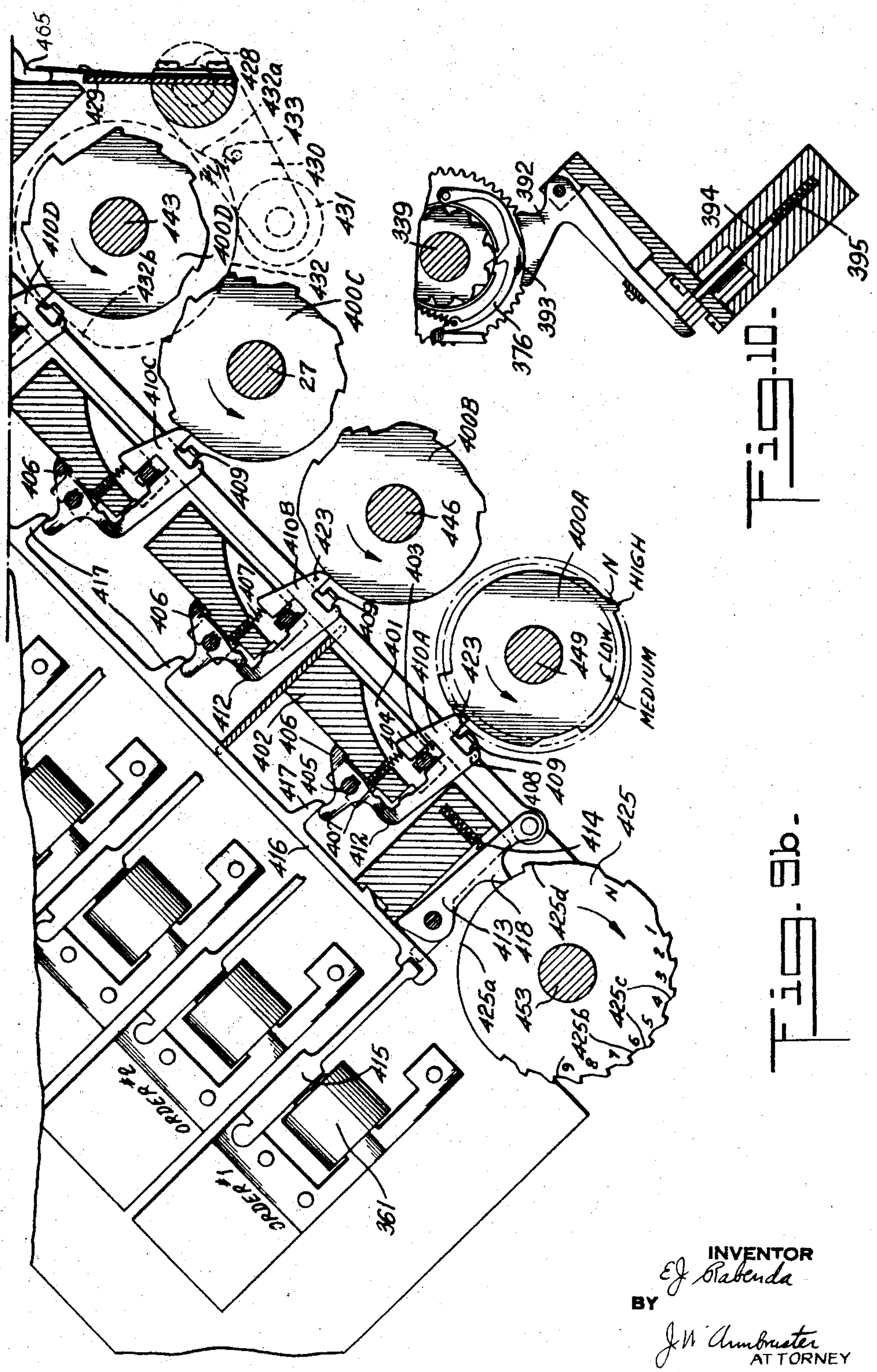

Figs. 9*a* and 9*b* when assembled with Fig. 9*a* on the top show the construction of the numeral and alphabet printing mechanism.

Fig. 10 is a detail of an overthrow preventing mechanism.

Figure 11:
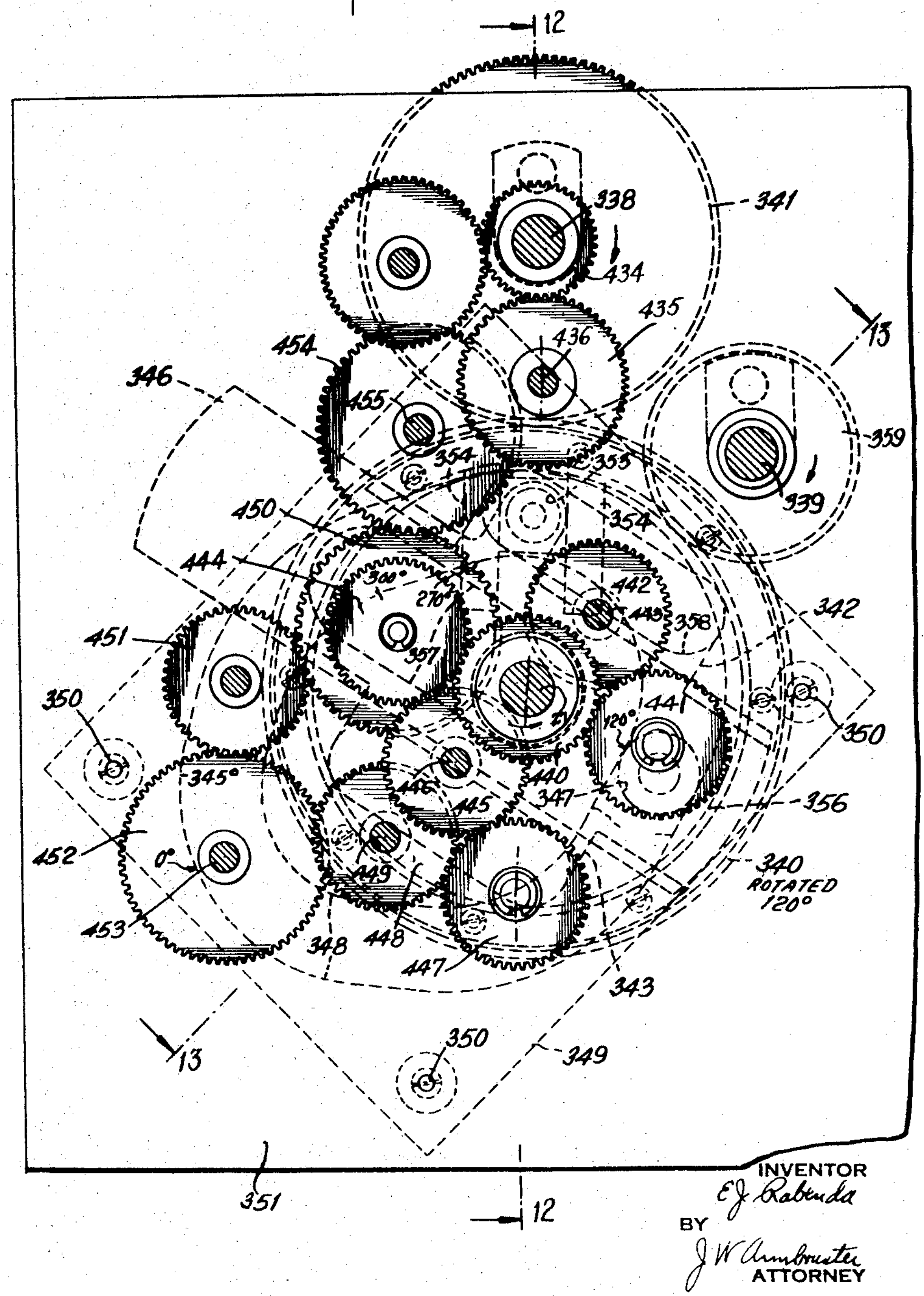

Fig. 11 is a view in side elevation showing the intergearing for driving the shafts of the printing mechanism in synchronism.

Figure 12:
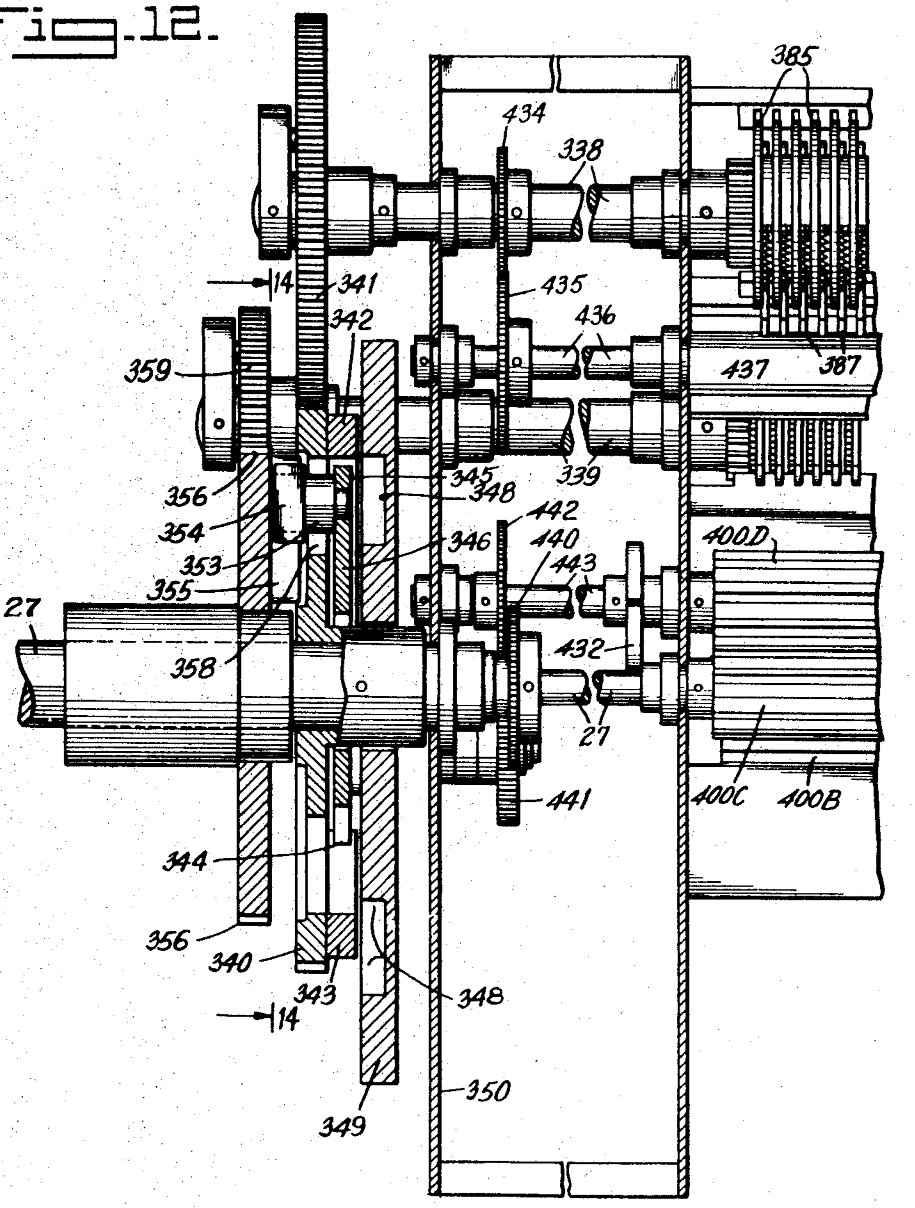

Fig. 12 is a sectional view taken on the line 12—12 of Fig. 11.

Figure 13:
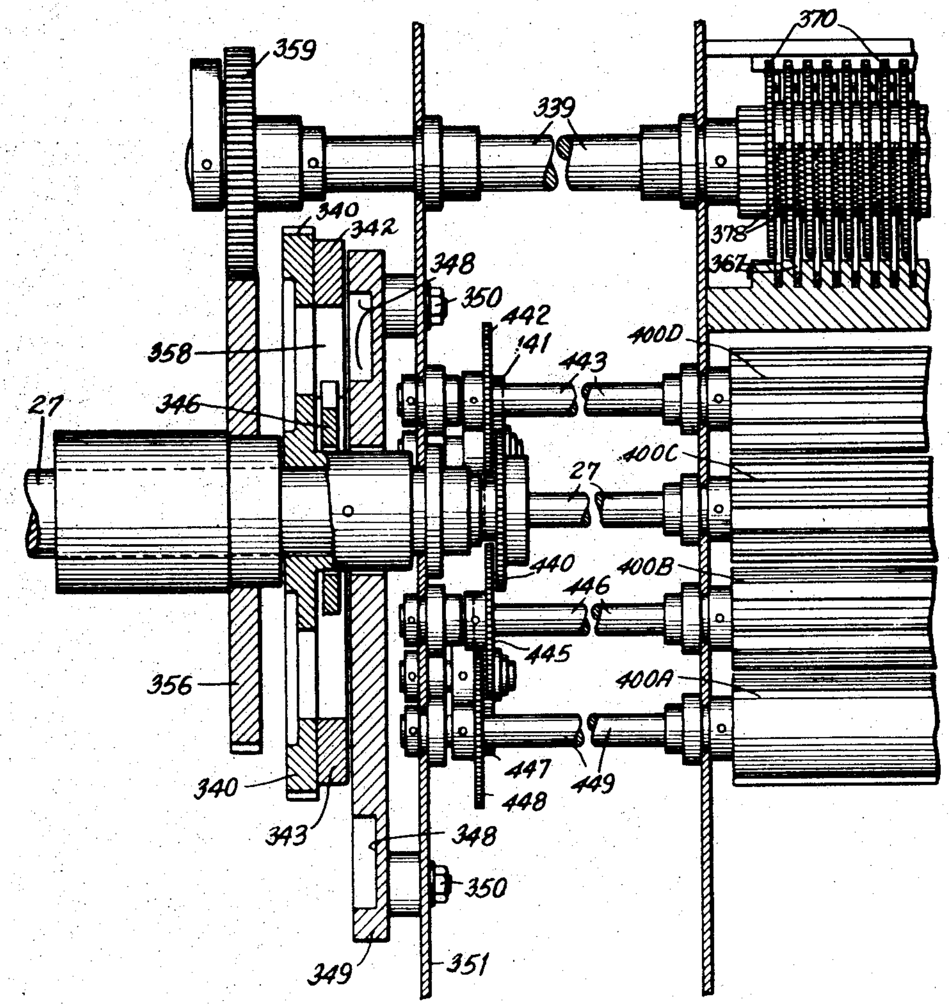

Fig. 13 is a sectional view taken on the line 13—13 of Fig. 11.

Figures 14, 15:
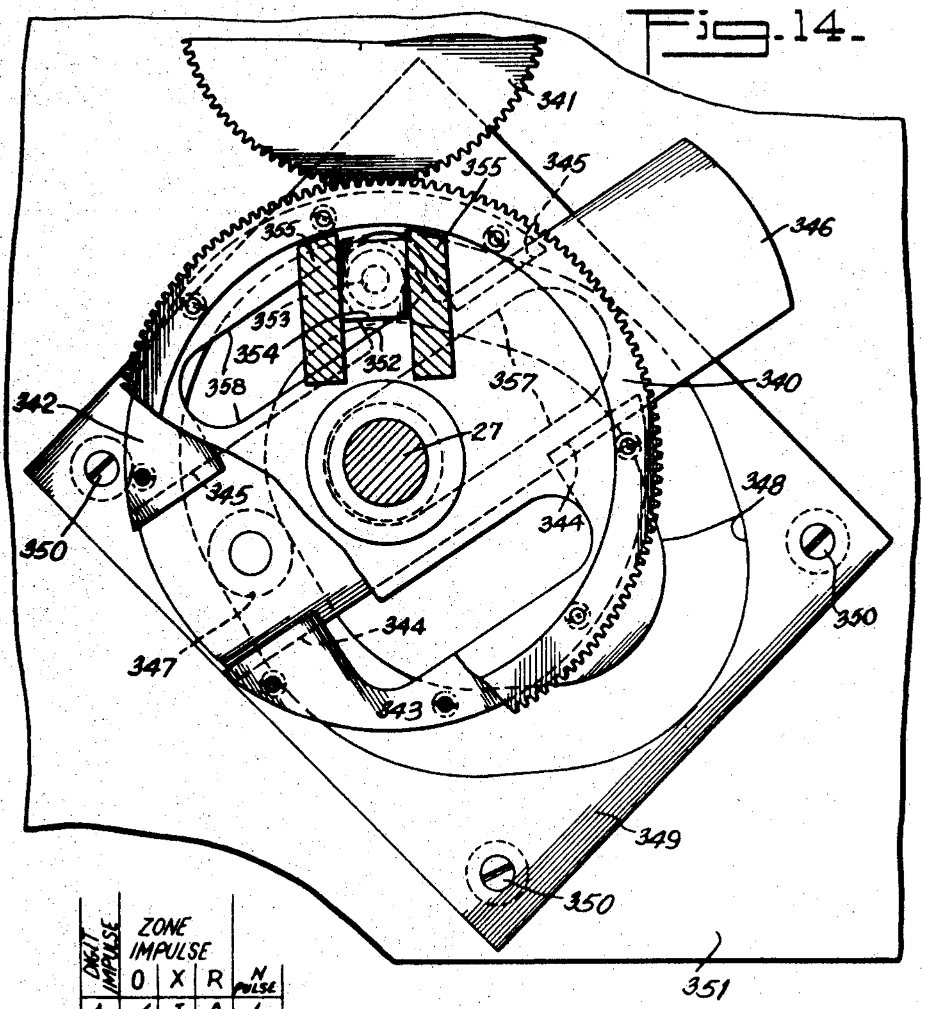

Fig. 14 is a sectional view taken on the line 14—14 of Fig. 12.

Fig. 15 represents the preferred code for selecting alphabet and numeral type.

Figure 16:
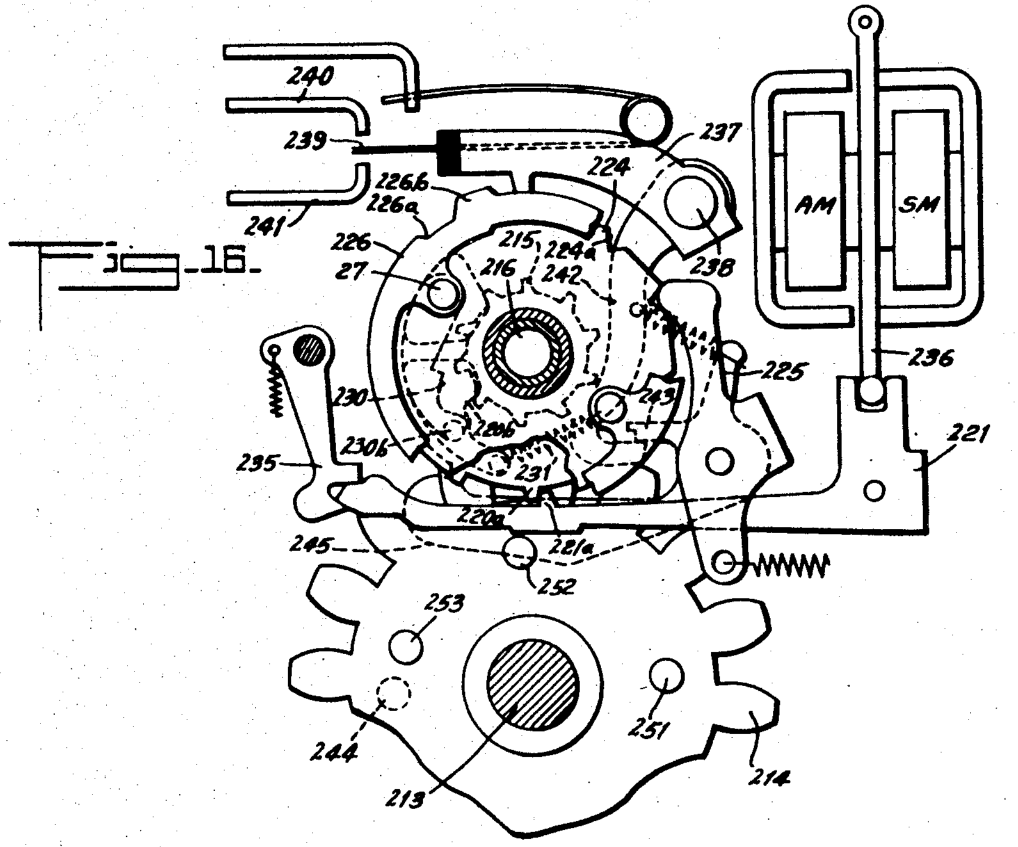

Fig. 16 is a view in side elevation of an order of an accumulator.

Figure 17:
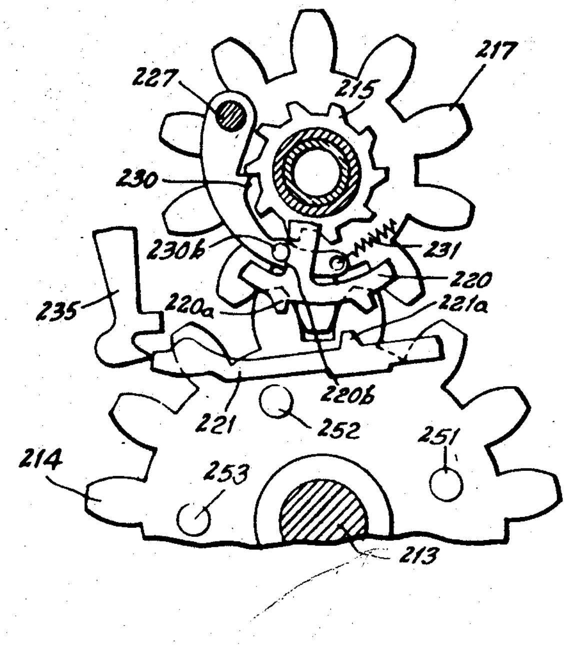

Fig. 17 is a view in side elevation of the accumulator shown in Fig. 16 but showing the parts in an operated position.

Figure 18:
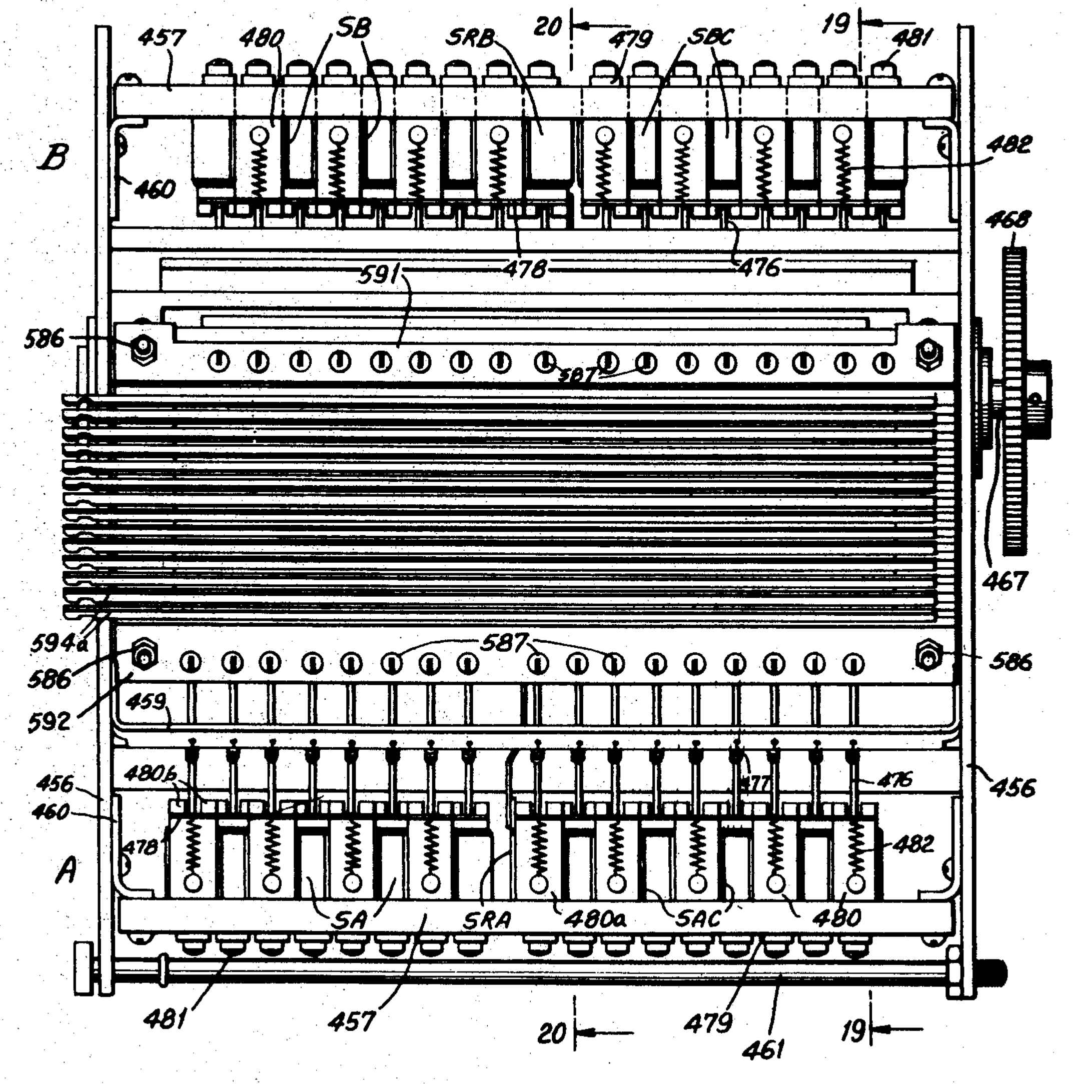

Fig. 18 is an elevation view of the storage unit as viewed from the rear.

Figure 19:
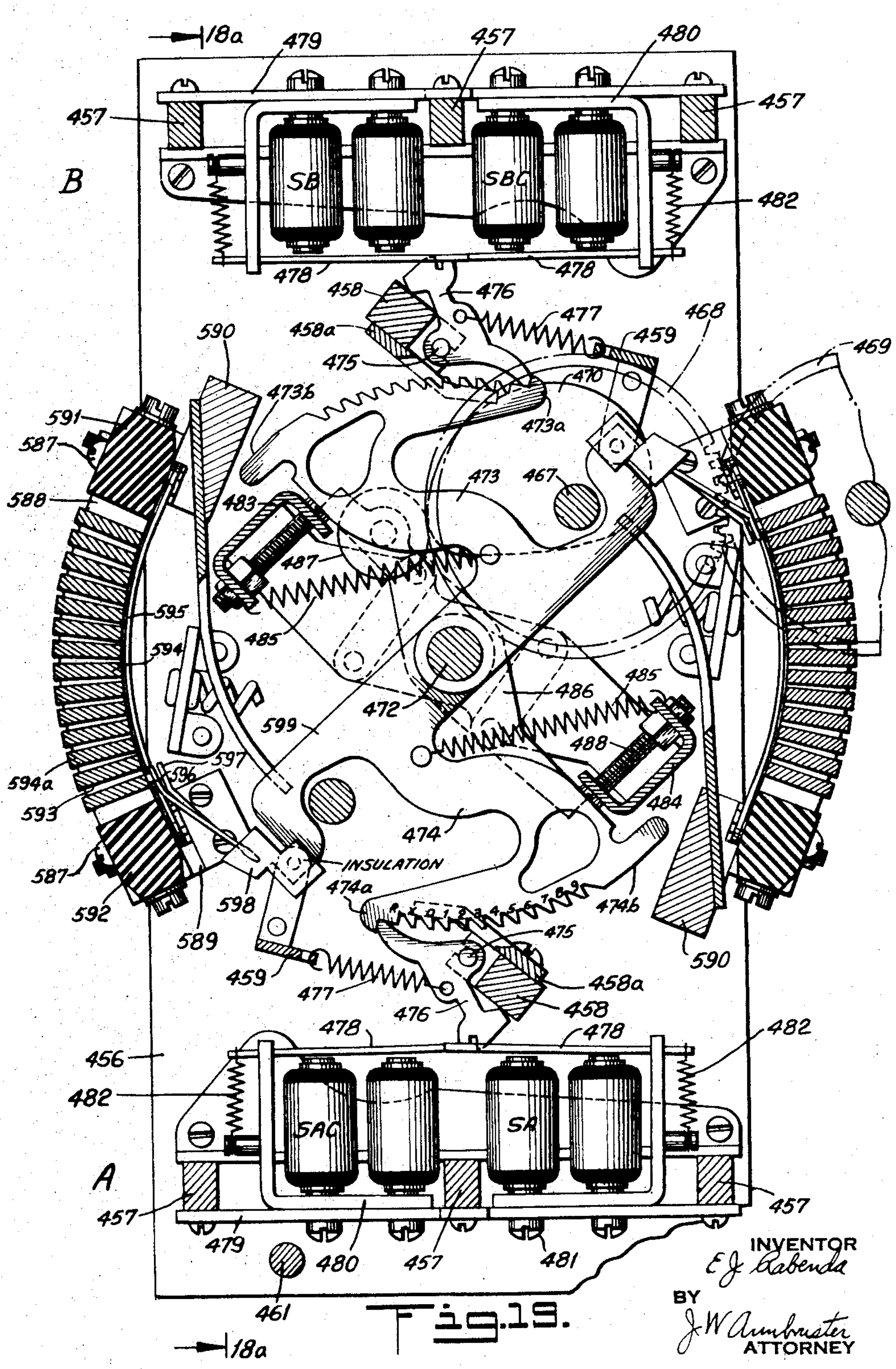

Fig. 19 is a sectional elevation view of the storage setting means taken on the line 19—19 in Fig. 18.

Figure 20:
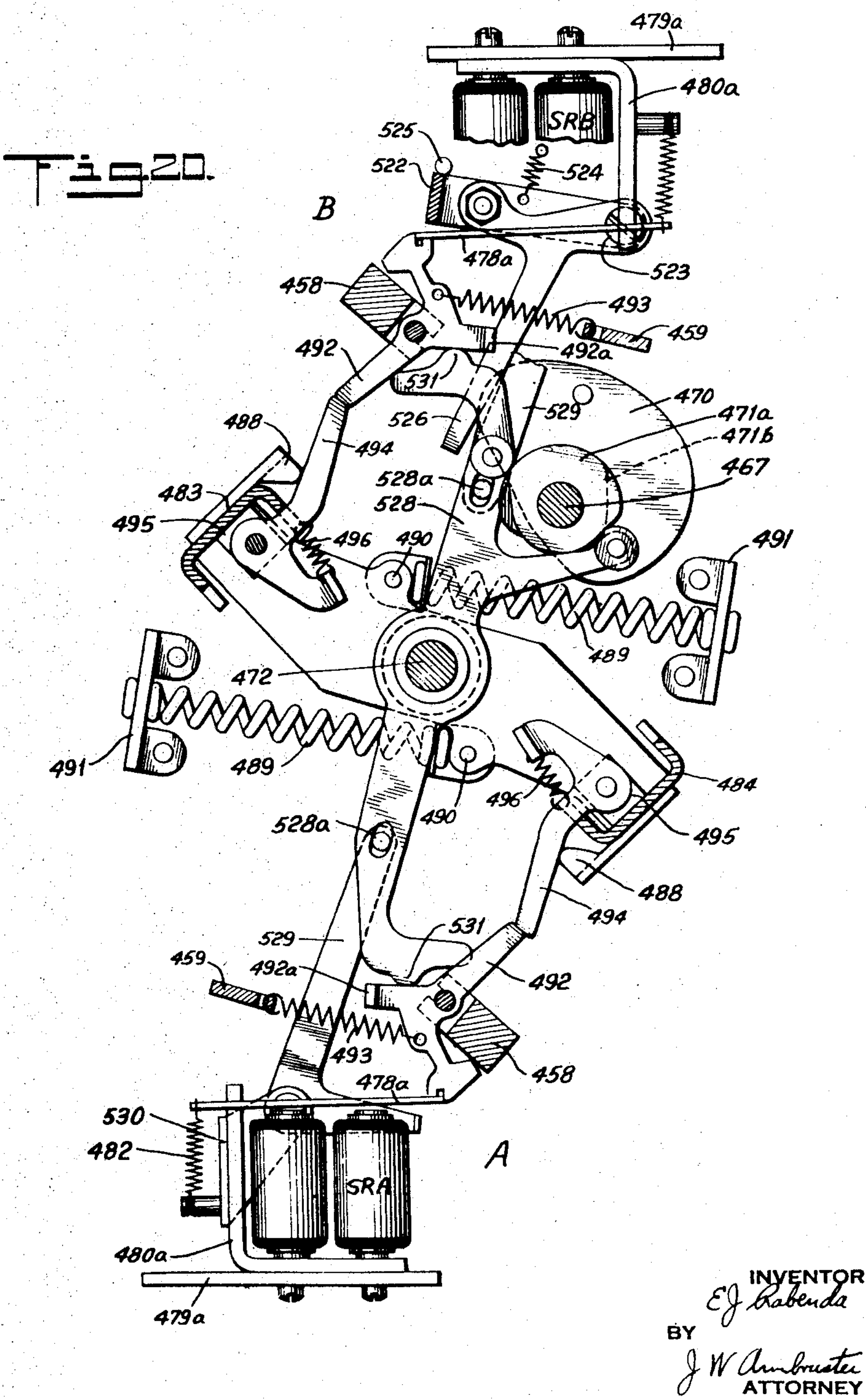

Fig. 20 is another sectional elevation view taken on the line 20—20 in Fig. 18 and showing the storage unit resetting means.

Figure 21:
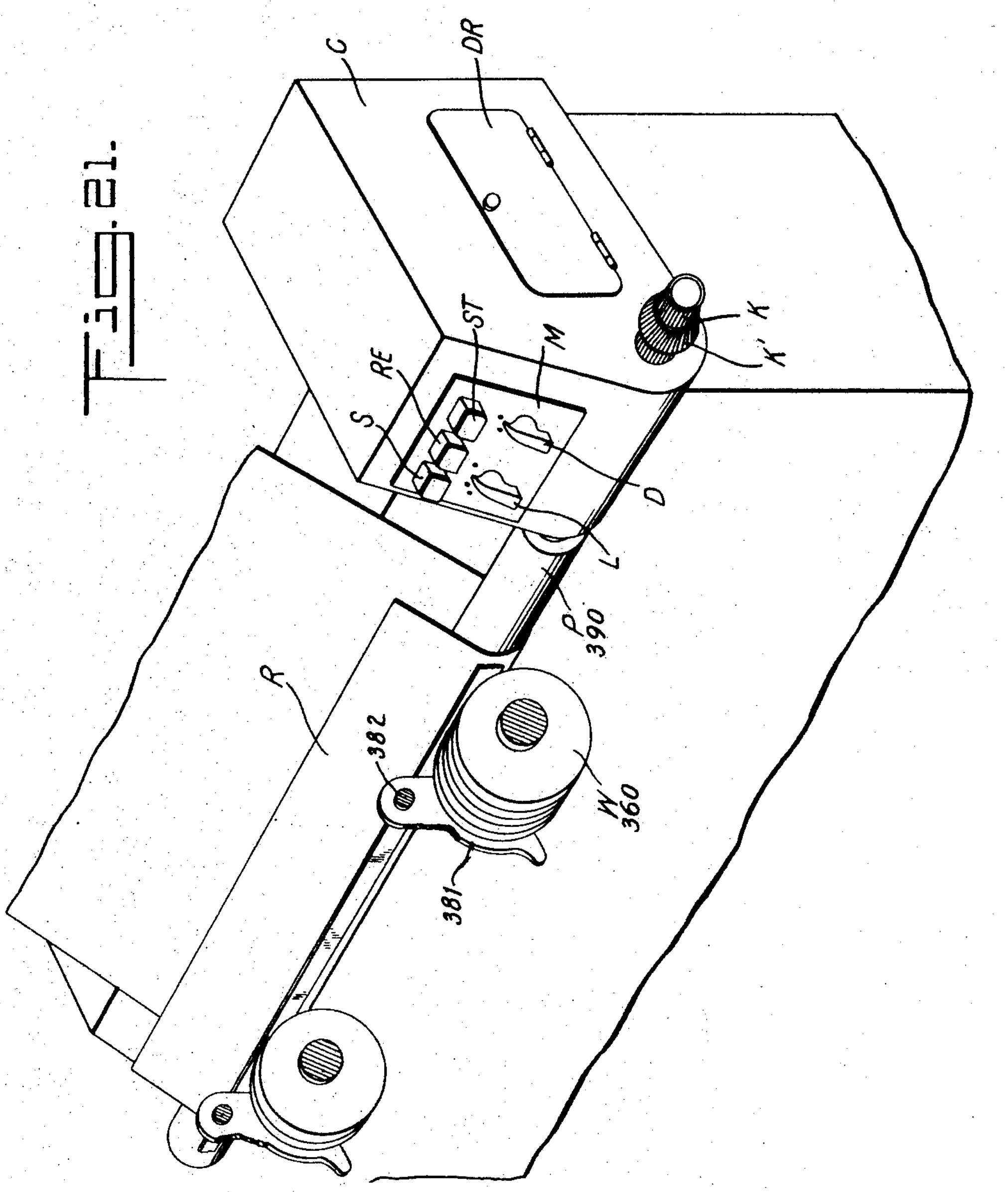

Fig. 21 is a perspective view showing the record feeding control mechanism attached to the right end of the platen.

Figure 22:
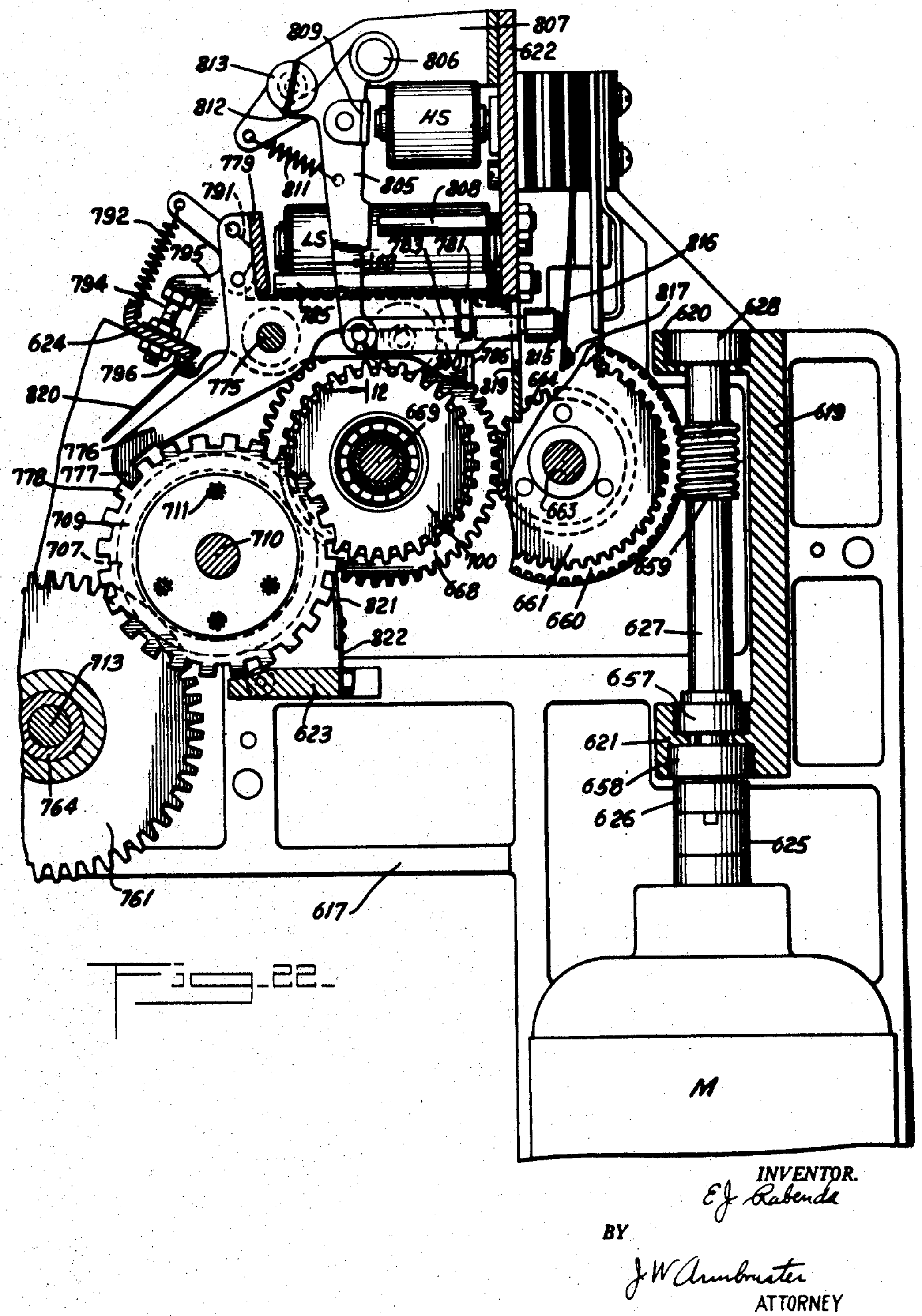

Fig. 22 is a sectional elevation view showing the driving connections for the sheet feeding devices.

Figure 23:
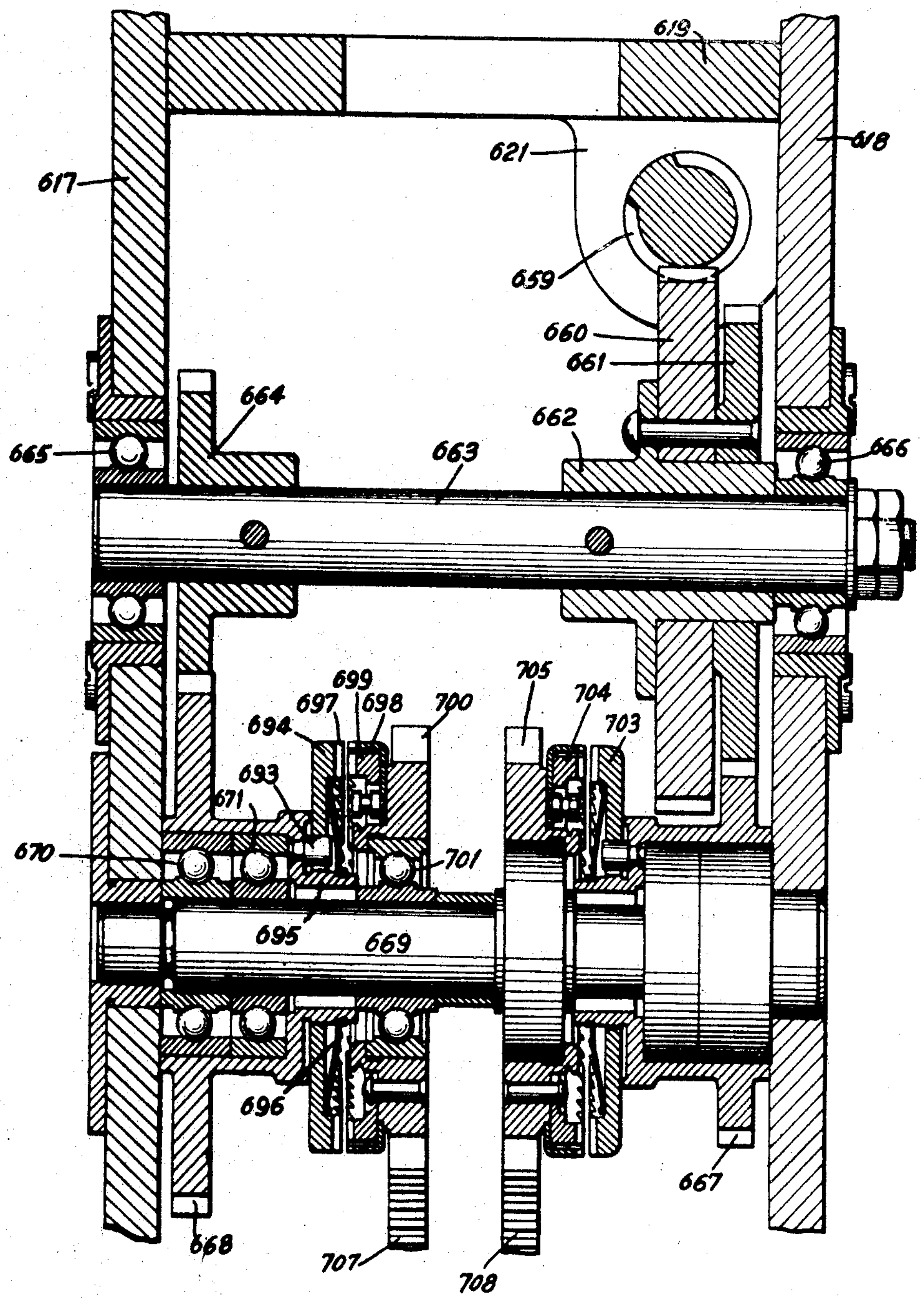

Fig. 23 is a sectional plan view showing the driving connections to a pair of clutches for governing the advancement of the record sheet at low and high speeds.

Figure 24:
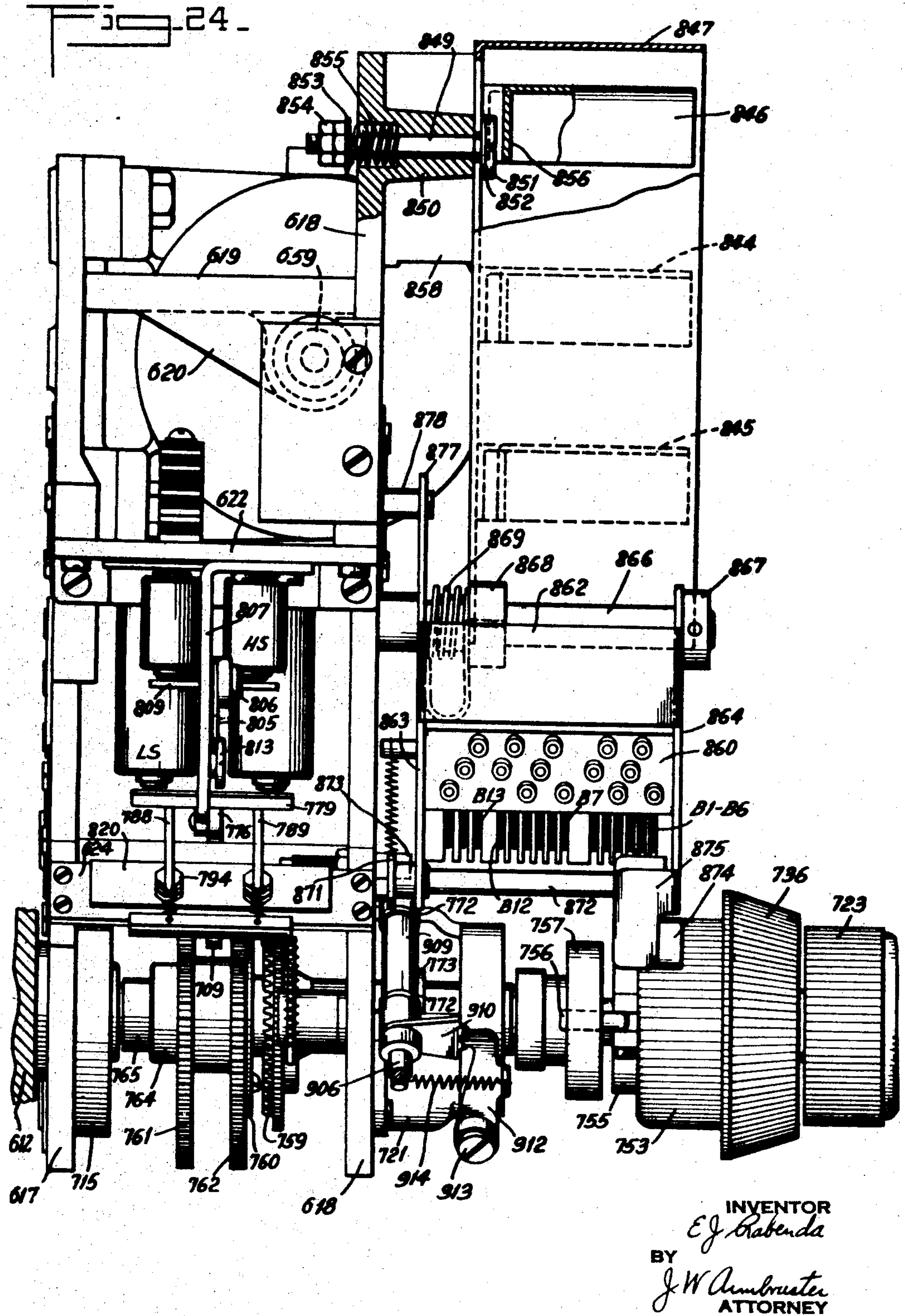

Fig. 24 is a plan view showing the entire tape control mechanism and the driving extension on the platen shaft.

Figures 25, 26, 27:
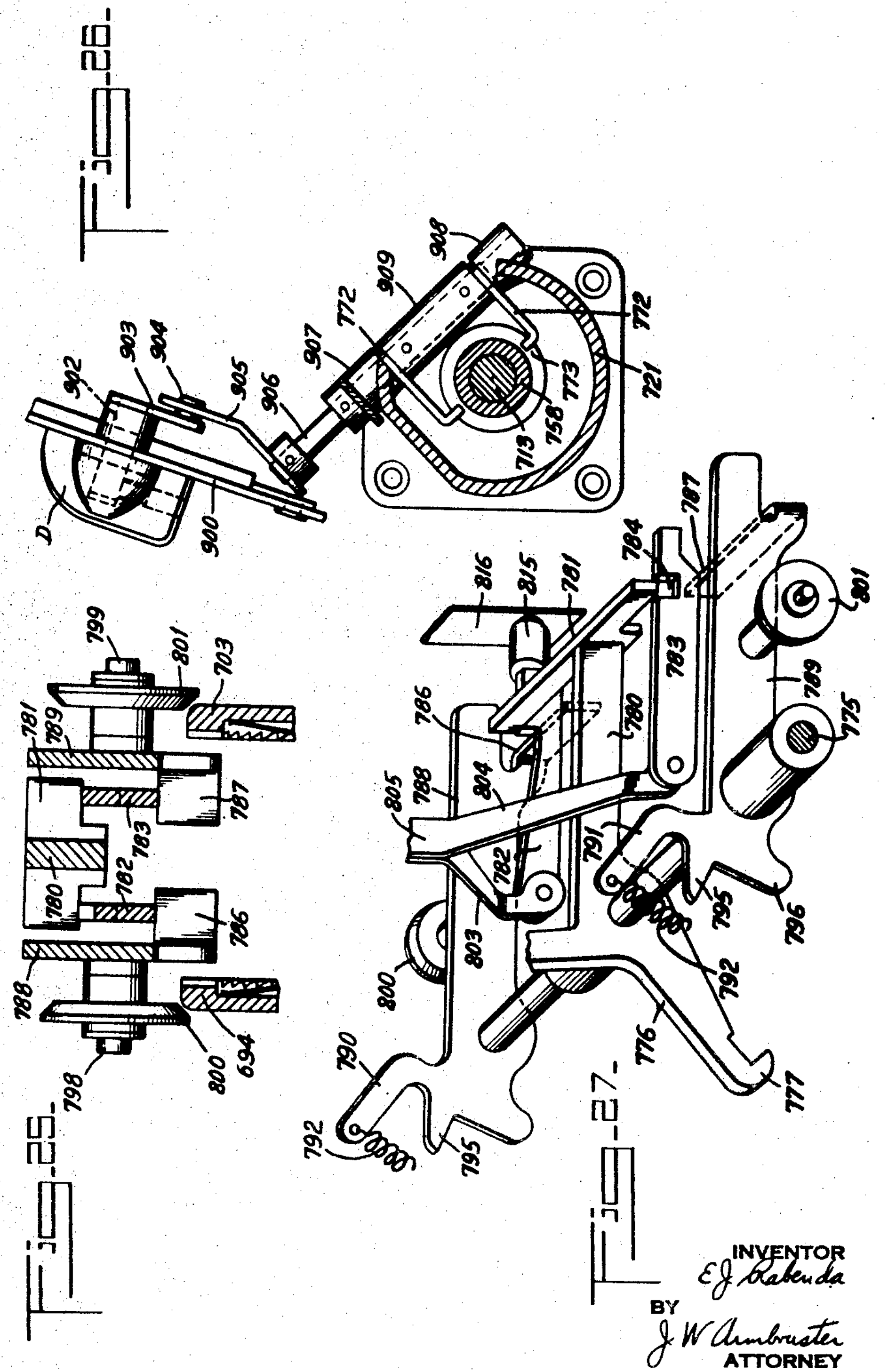

Fig. 25 is a detail sectional elevation view showing the clutch selection controls.

Fig. 26 is a side elevation view of the manipulative control for disconnecting the platen from the tape feed control mechanism.

Fig. 27 is a perspective view showing the mechanism for selecting one or the other of the two sheet advancing clutches.

Figure 28:
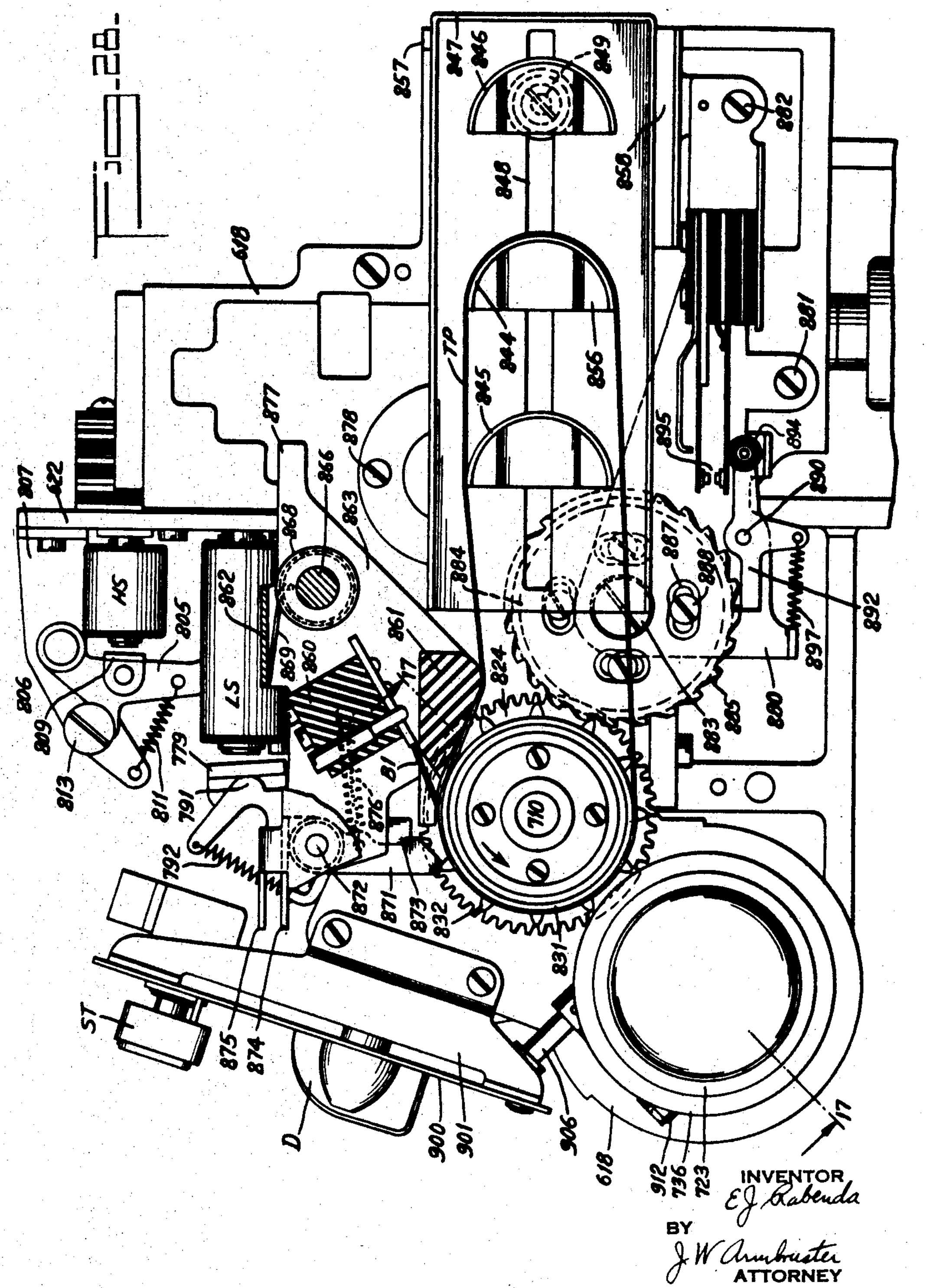

Fig. 28 is a side elevation view of the perforated tape controls with the cooperating brush holder partly in section.

Figure 29:
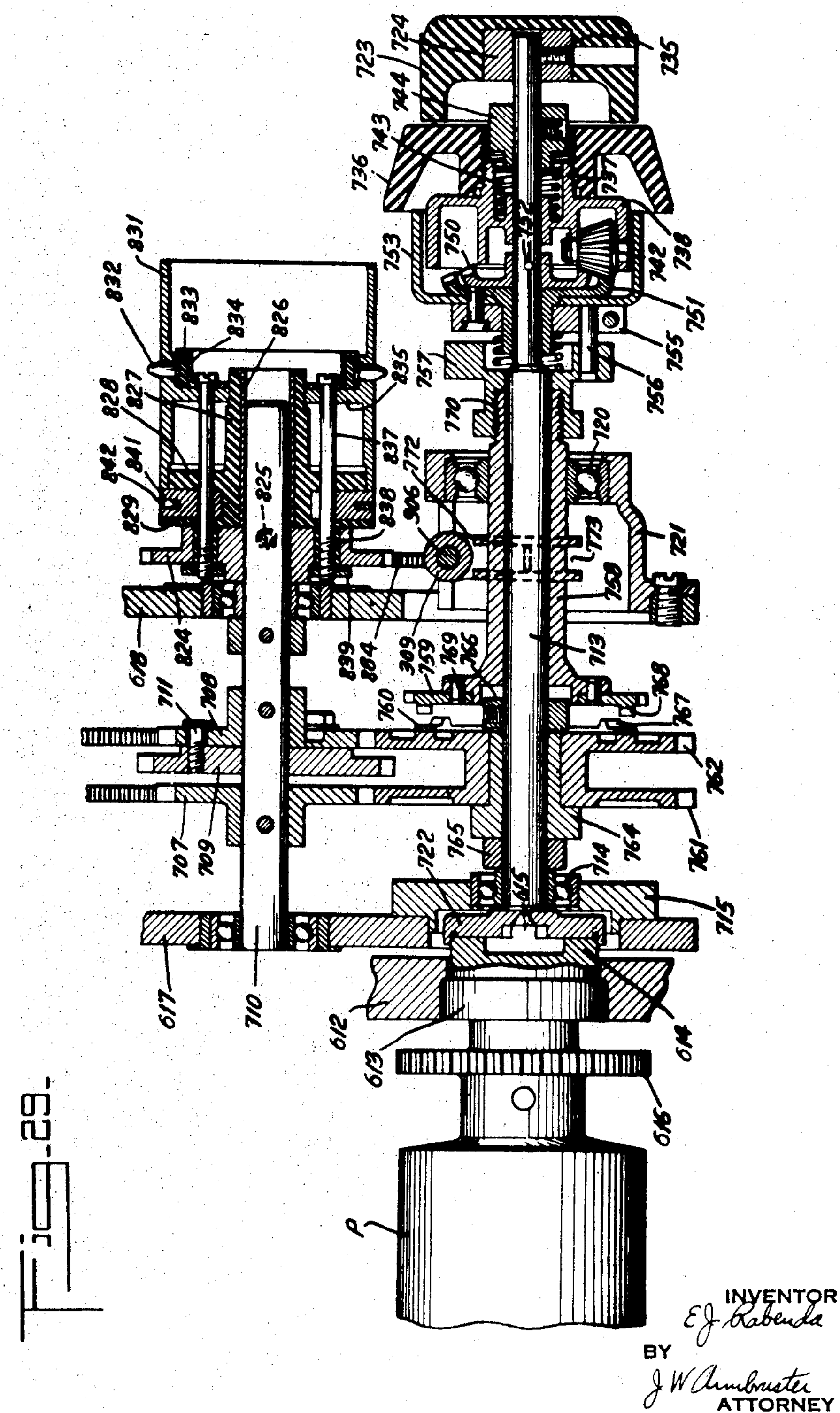

Fig. 29 is a sectional view showing the driving connections between the platen, the driving clutches and the pin wheel for advancing the control tape.

Figure 30:
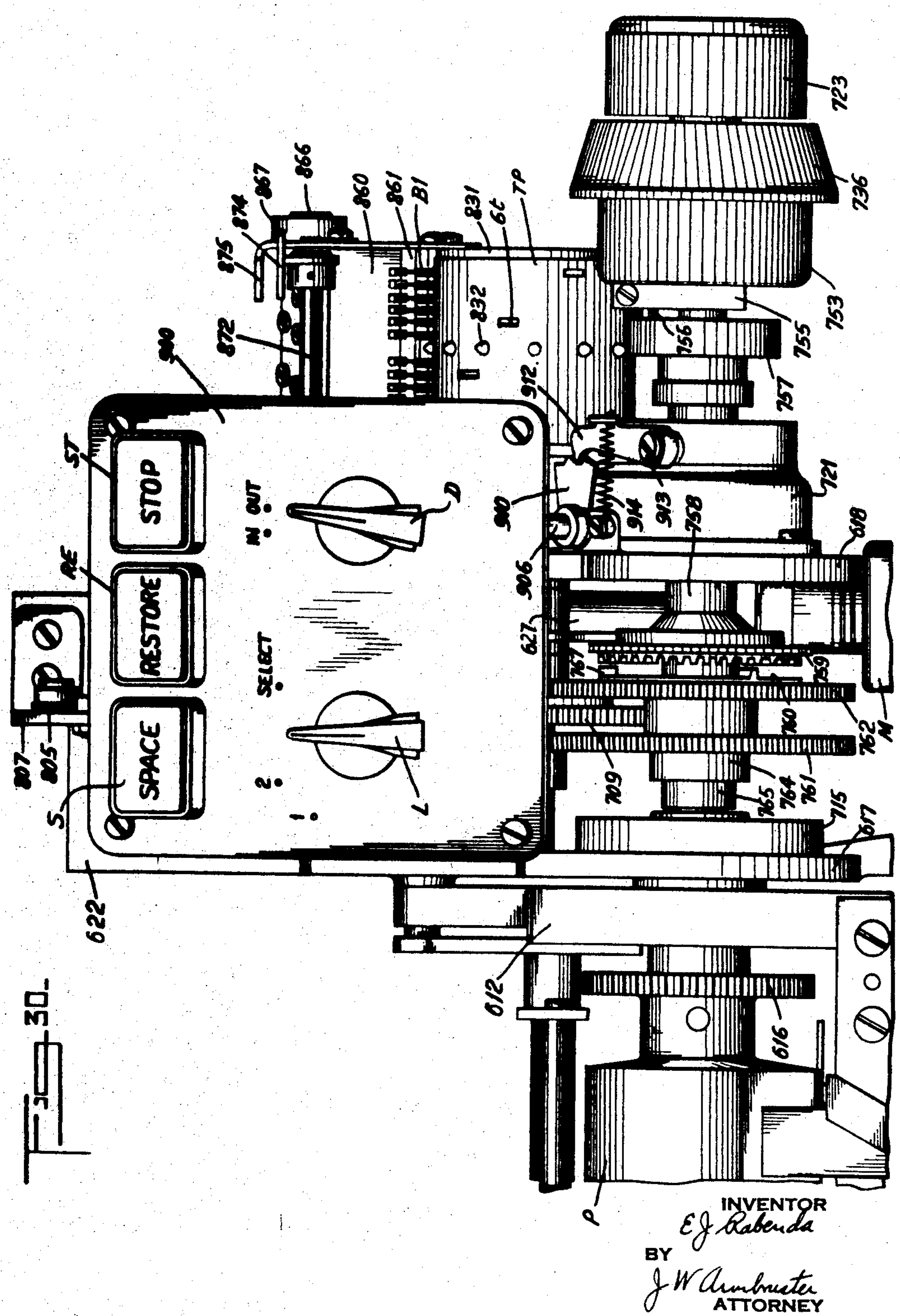

Fig. 30 is a front elevation view showing the platen extension shaft and the control panel supporting the manipulative elements for regulating the tape control line spacing and restoration of the feed controls.

Figure 31A:
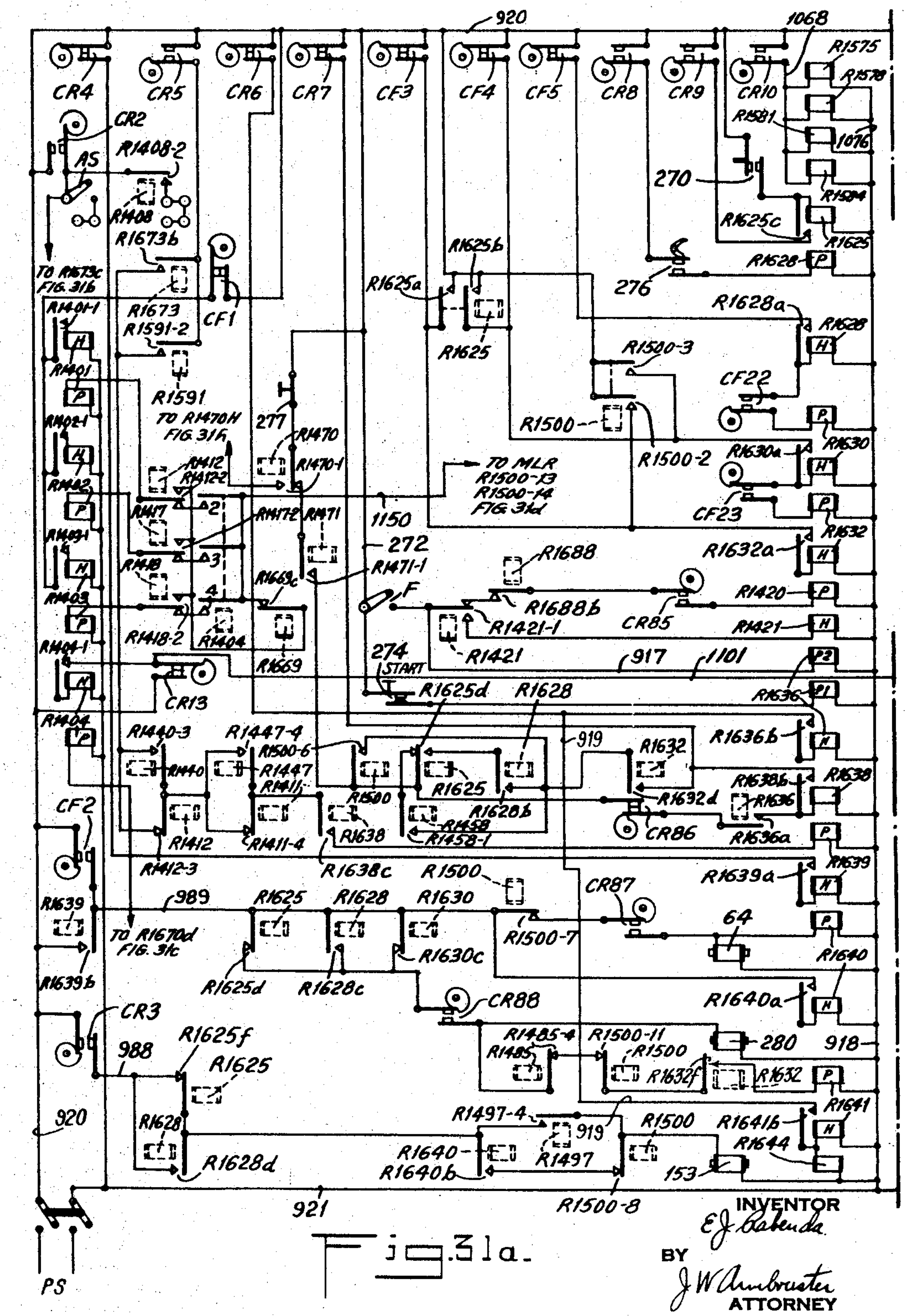

Figs. 31*a*—31 are a wiring diagram showing the electrical controls of the machine.

Figure 32A:
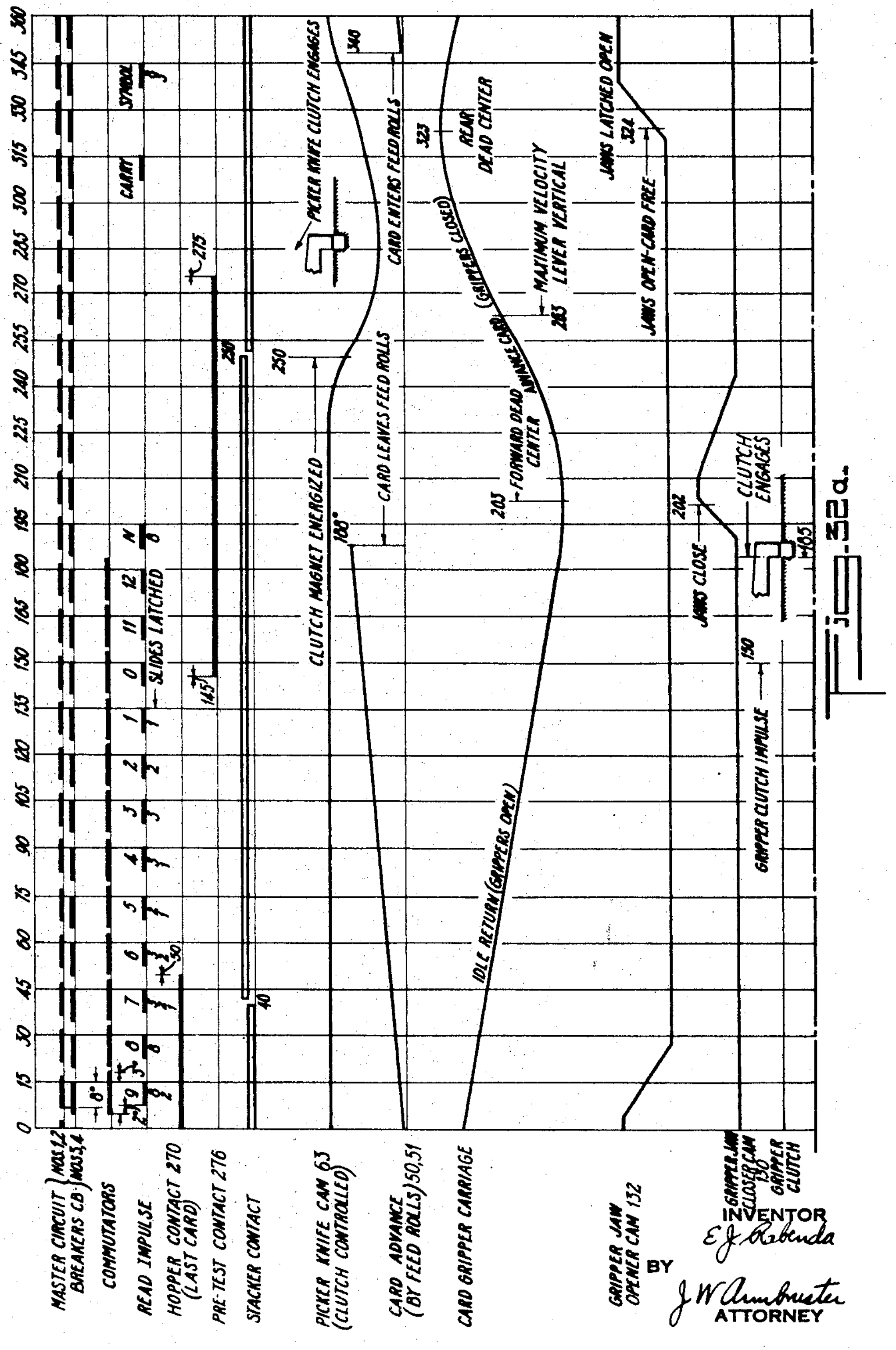
Figure 32B:
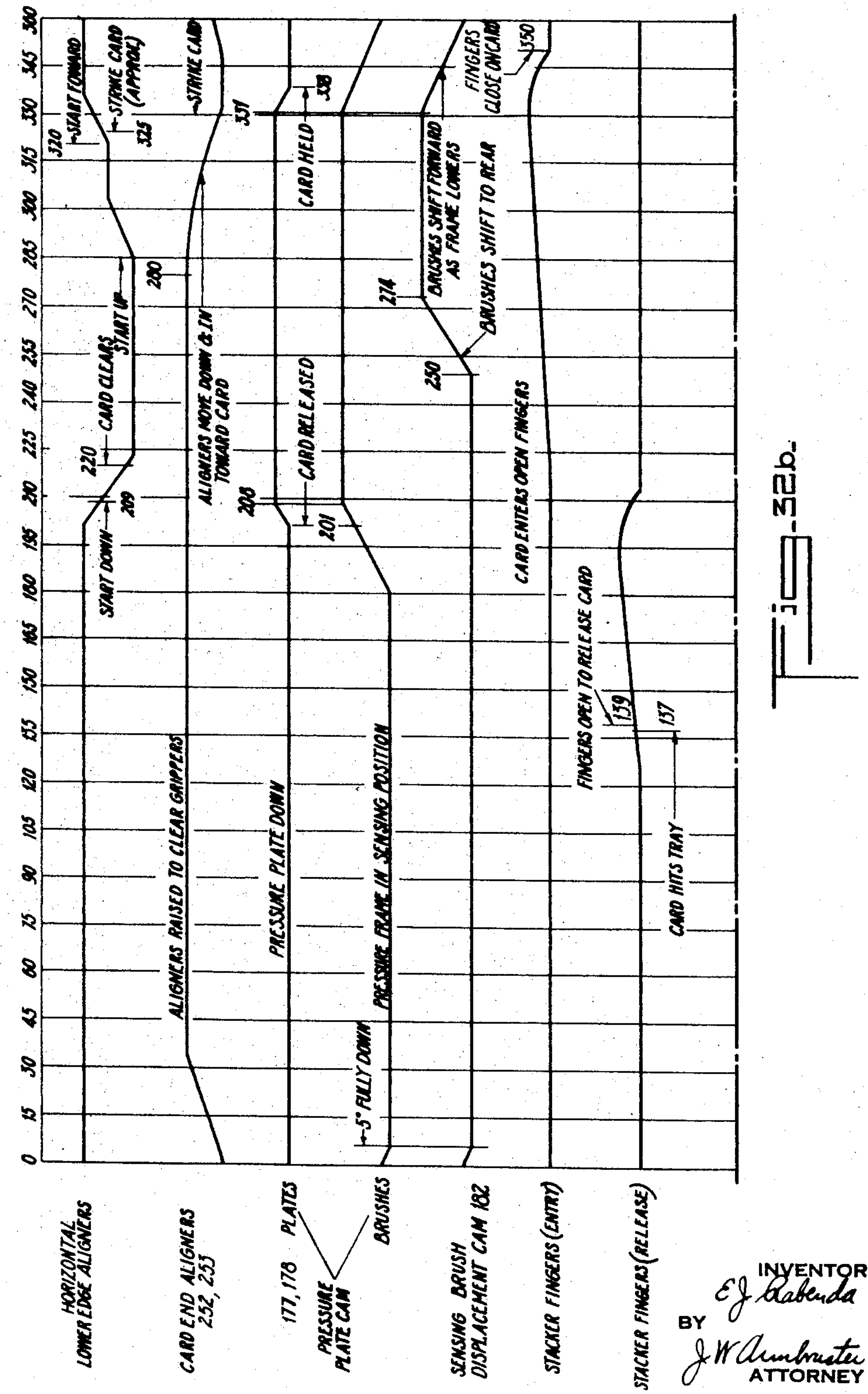
Figure 32C:
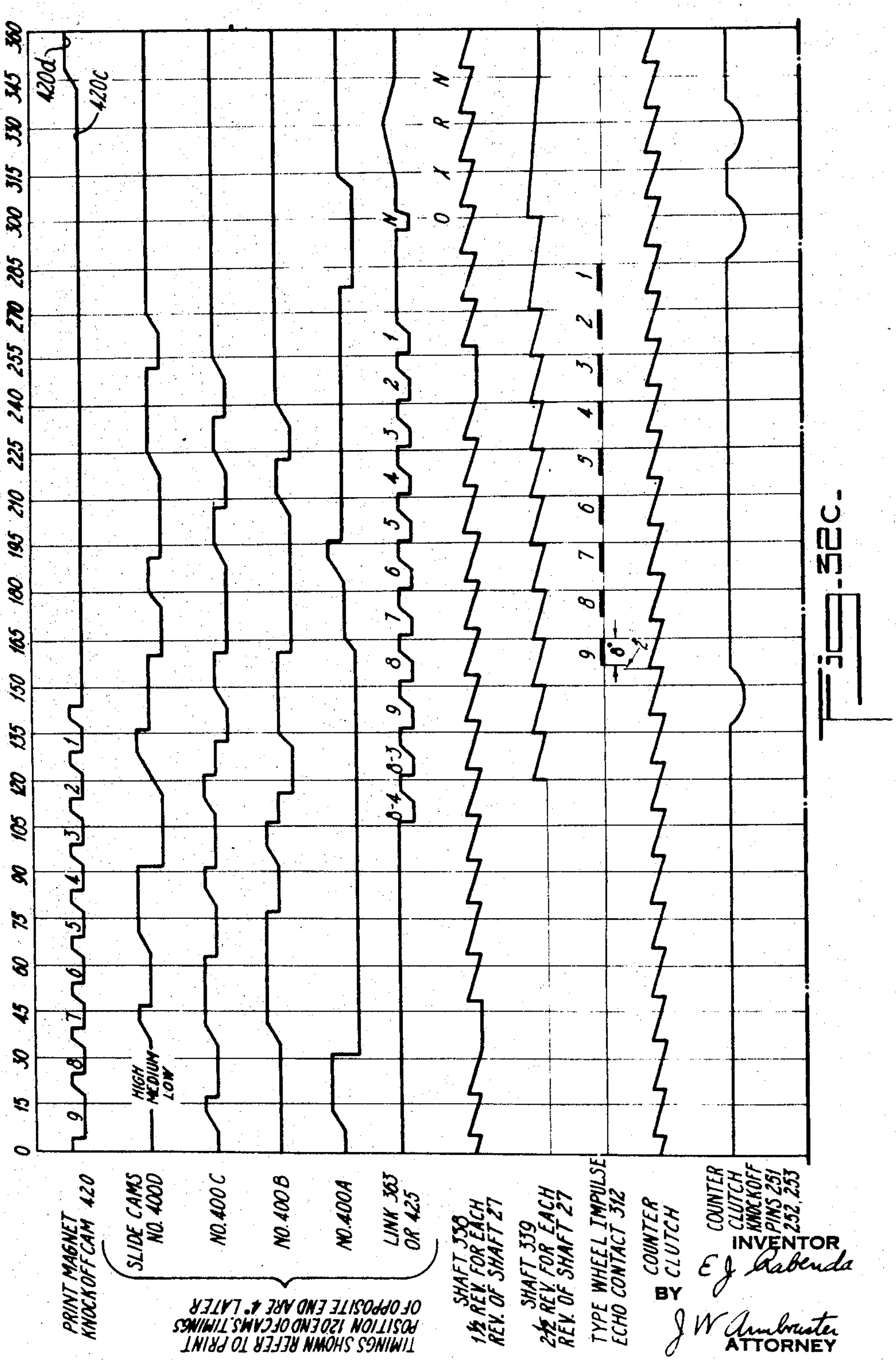
Figure 32D:
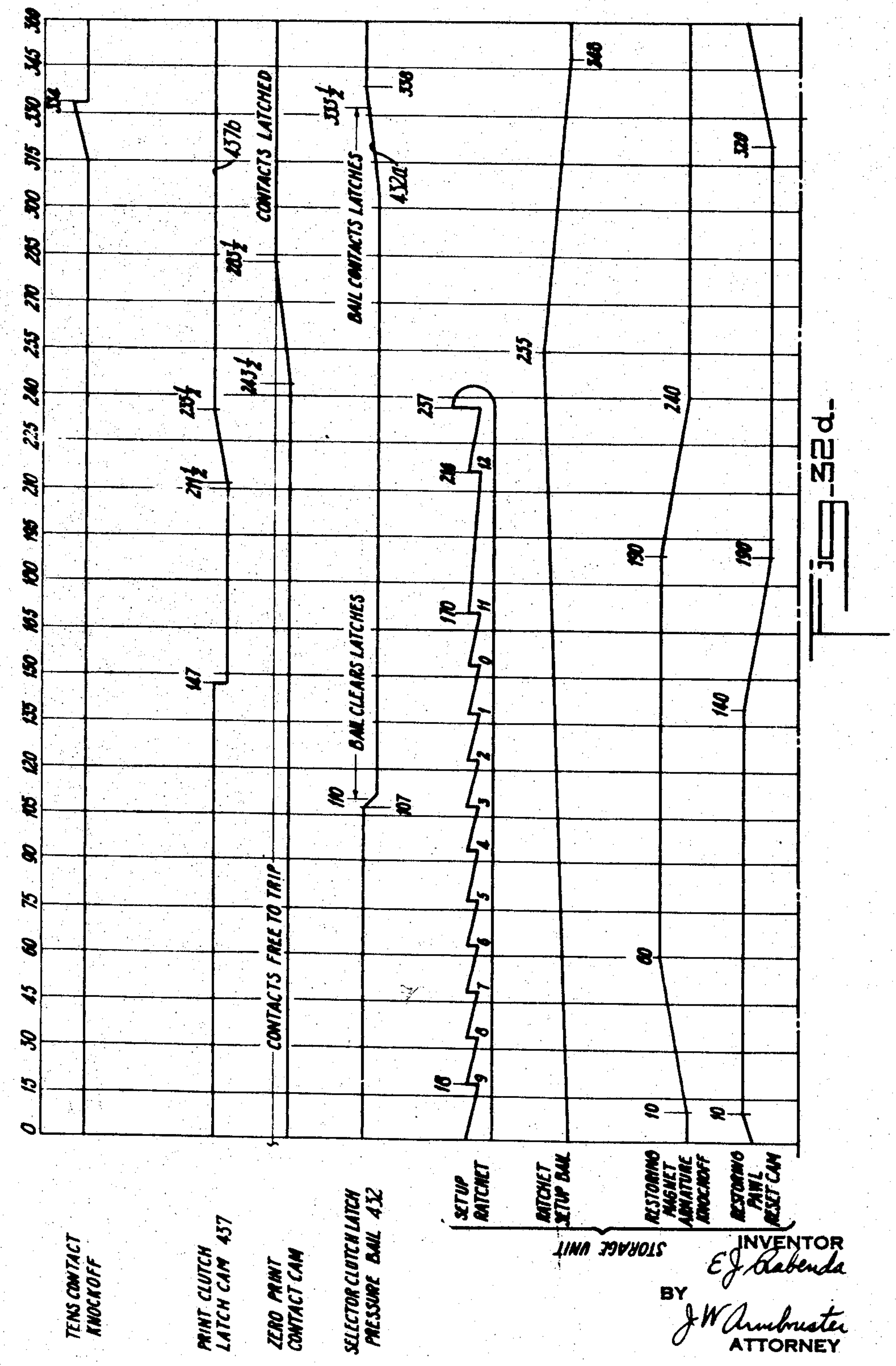
Figure 32E:
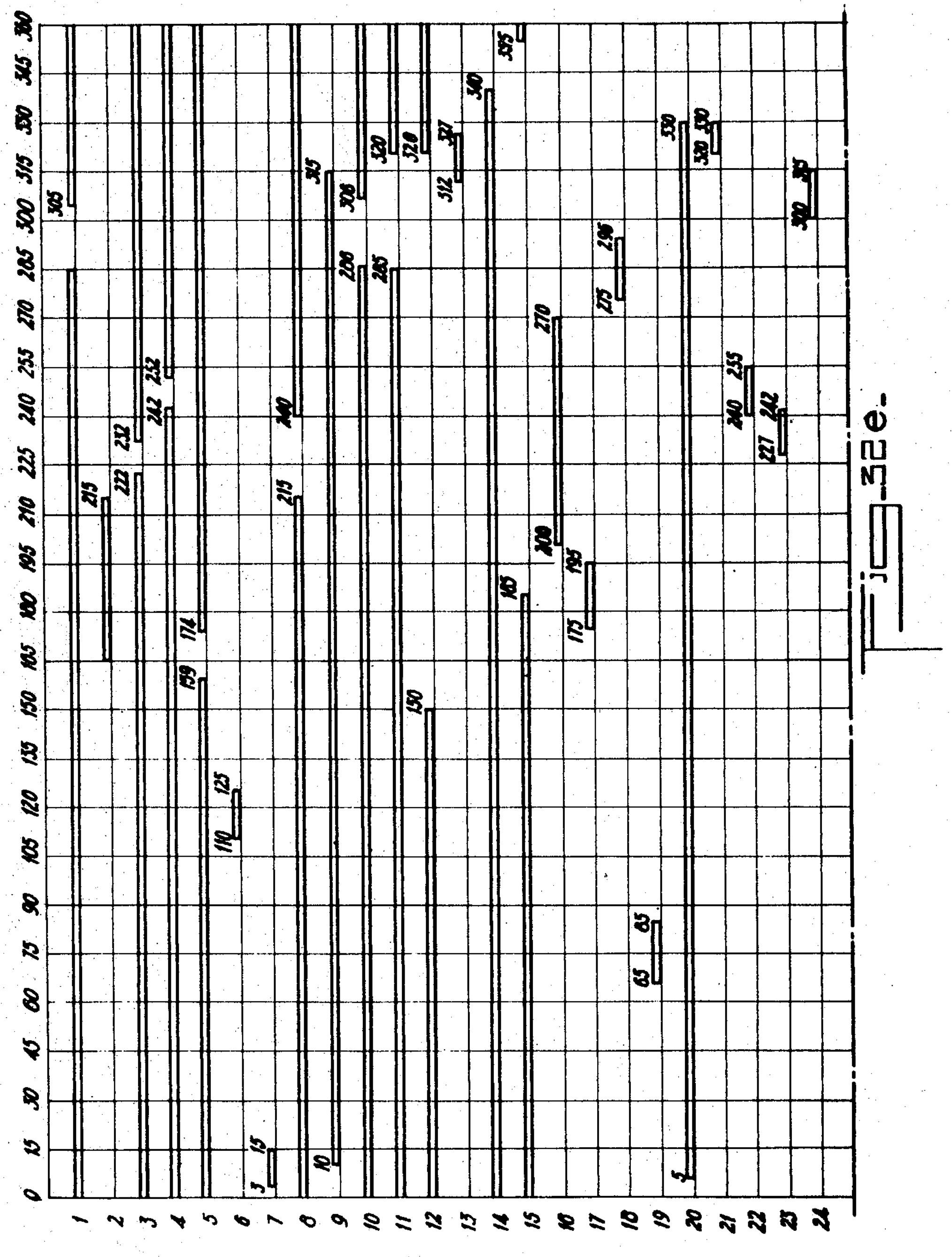
Figure 32F:
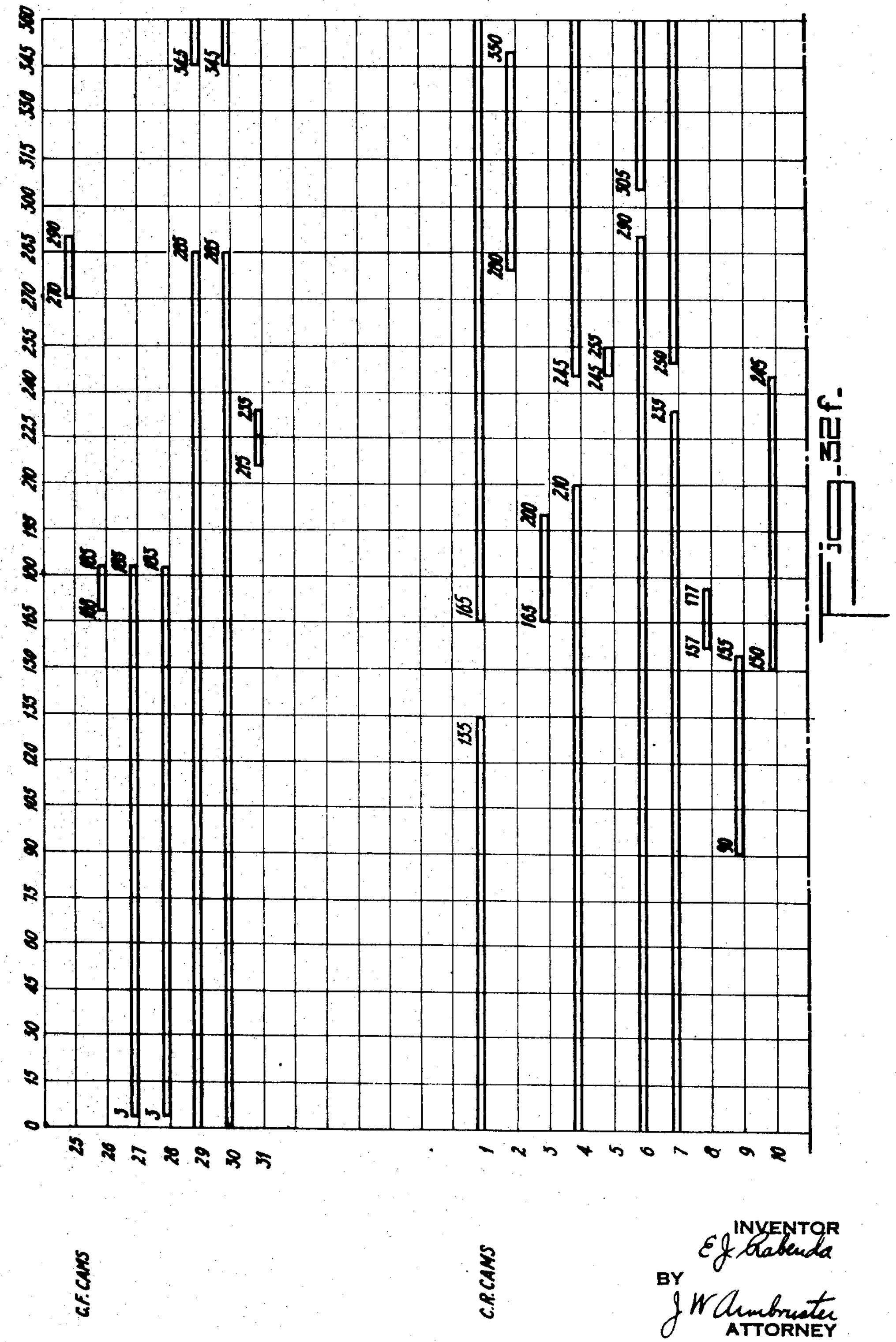
Figure 329:
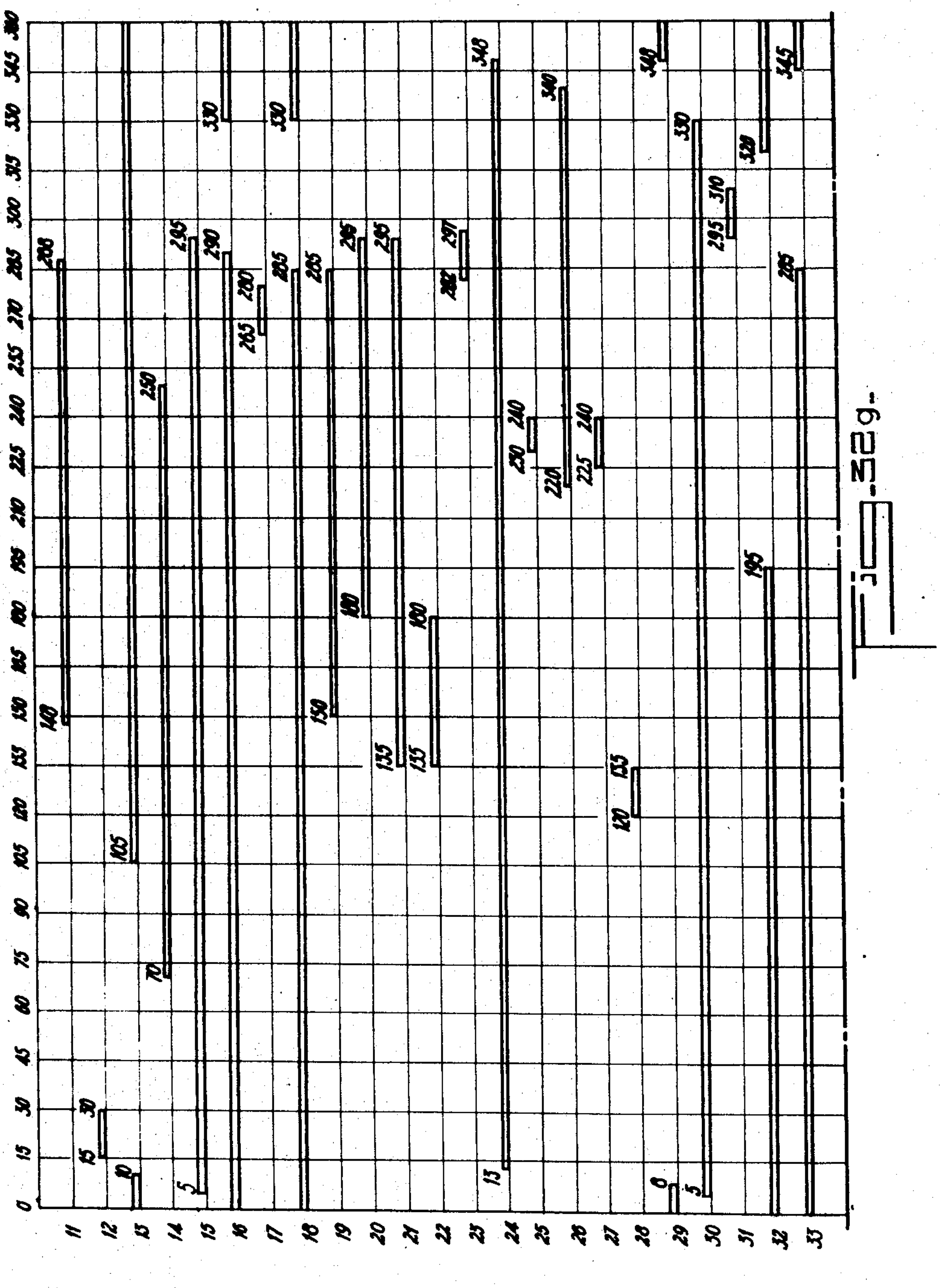
Figure 32H:
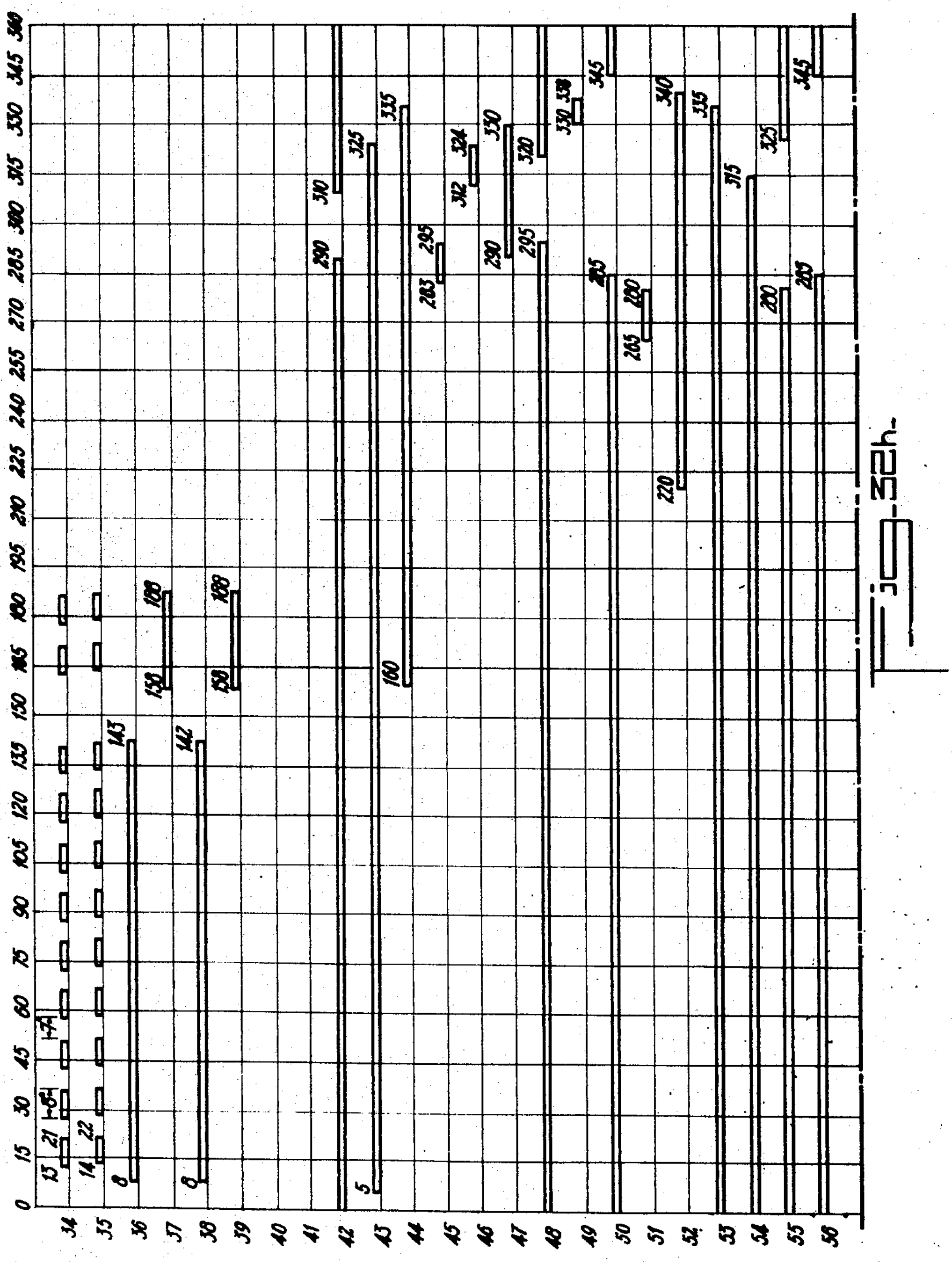
Figure 52:
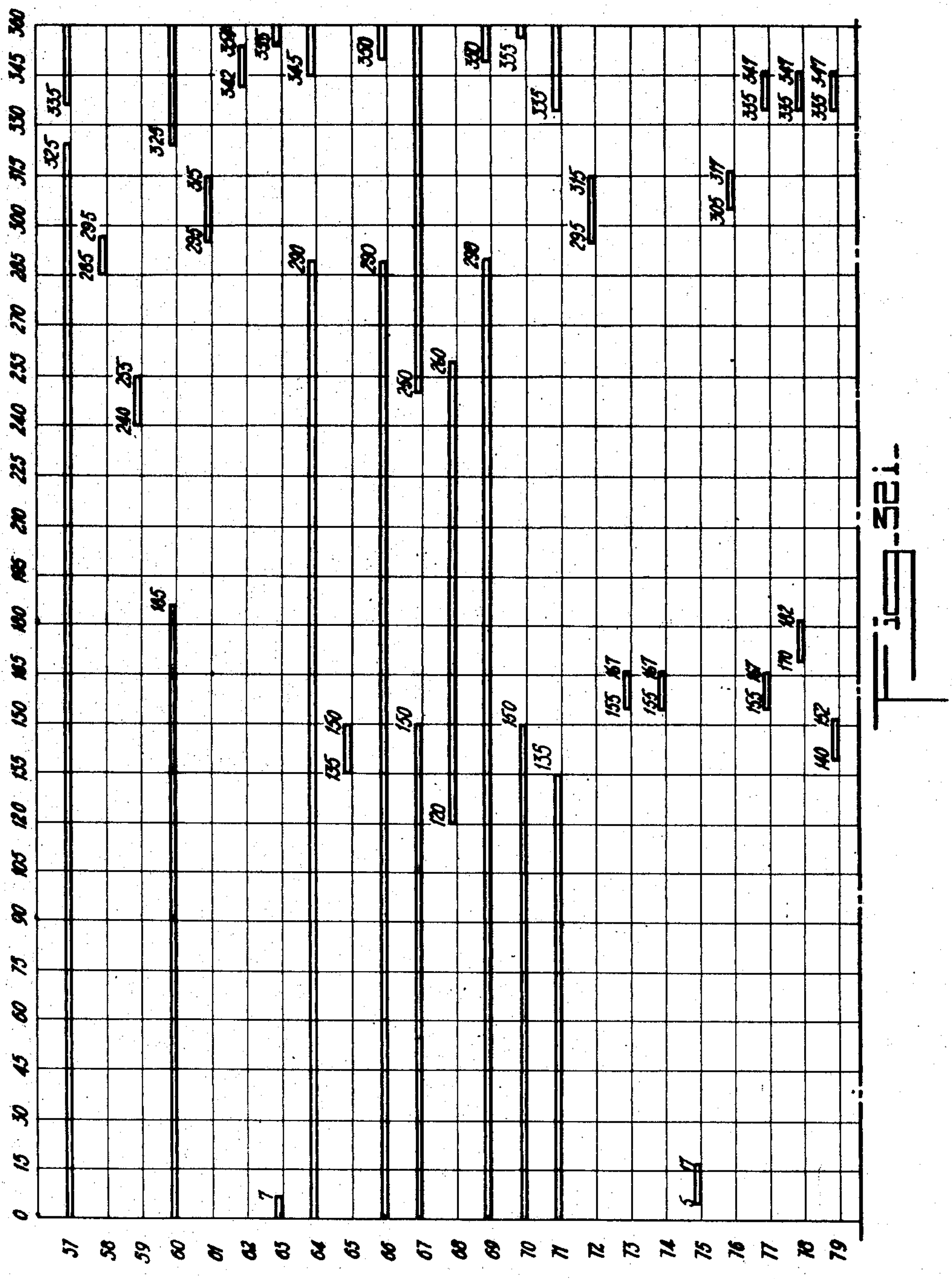
Figure 32J:
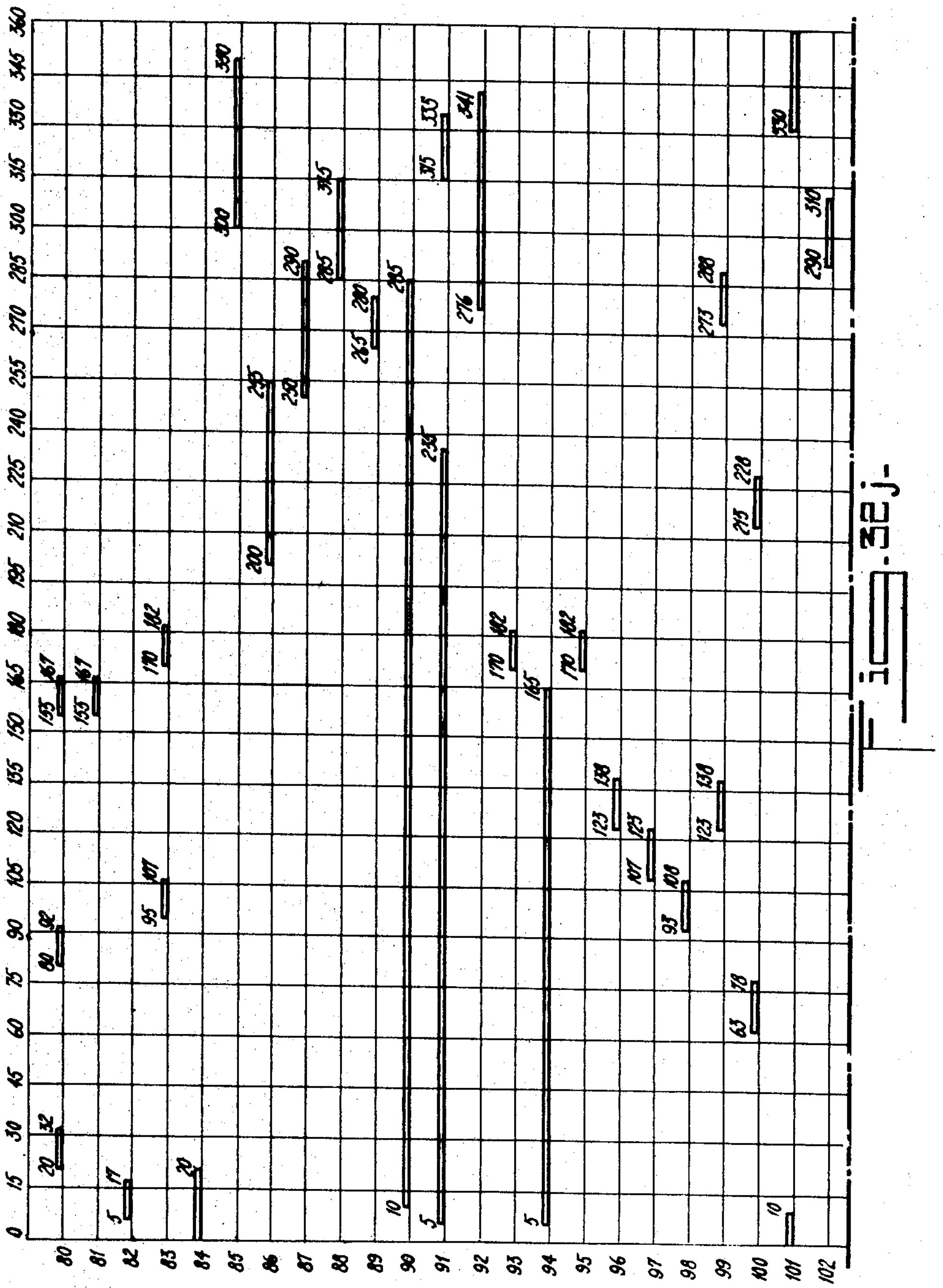
Figure 32K:
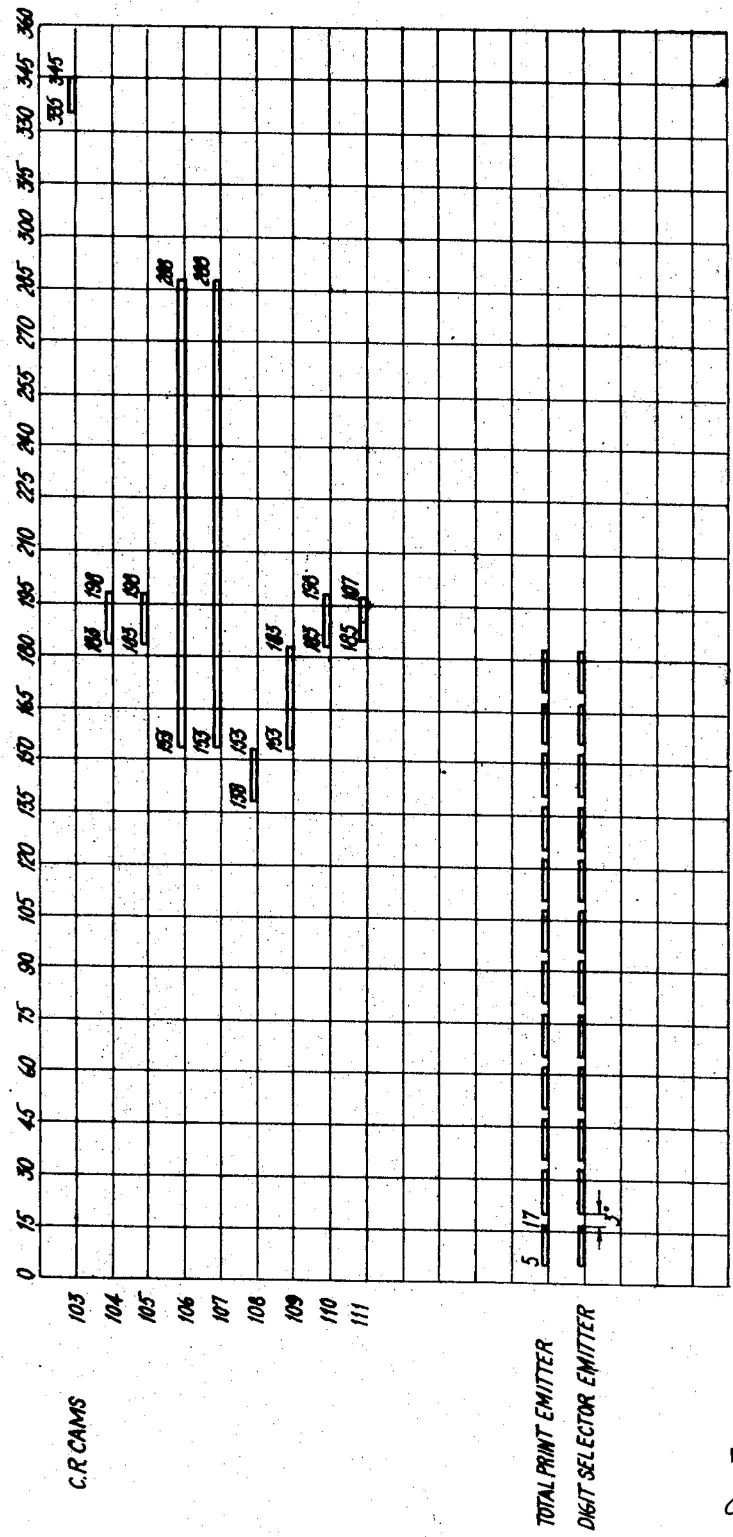

Figs. 32*a*—32 together comprise a timing chart of the cams and cam operated contacts in the machine.

*The machine in general*

The main purpose of this disclosure is to point out the control exercised by data storage, printing and form feed devices for producing printed record forms whereon the lines of print are repeated and placed to better advantage than those found in prior art structures.

This is especially true with regard to printing in connection with overflow conditions. The purpose is to further identify successive, separable record forms when such forms are related and bear items relating to the same account. To do this, identifications such as names, addresses, invoice numbers, page numbers and account numbers are stored and read out upon the occurrence of overflow conditions so that successive related forms bear agreeing identifications. The various components of the machine relating to such operation are shown in Fig. 1 in a diagrammatic fashion where the connections from one unit to the other are depicted as dotted lines somewhat in the same fashion as plug wires actually appear on the plugboard of the machine.

In Fig. 1, only three cards are illustrated. They are representative of many cards which are stacked together and advanced in succession through first and second card reading stations as pointed out hereinafter. There is only one card such as the card LC called a "Leader Card" which bears the first invoice number. The primary purpose of this initial control is to insert the first invoice number into an accumulator and thereafter a unit is automatically added therein for each different account. The accumulator is operated as a storage unit so that the invoice numbers may be called out to control printing whenever desired, usually along with the related address.

On this same Leader Card is a control perforation 1 in the X position and the 79th column which exercises control for calling into operation pilot selectors to direct the first invoice number into the proper accumulator and to cut off that accumulator from card readings on all cycles after the first cycle. The pilot selectors have other controls which are brought out hereinafter in connection with the wiring diagram.

The second kind of card is the "Heading Card" HC which bears the customer's account number, his name, address and city and state. These alphabetic notations of name and address are represented in the card by code perforations. The code used is the twelve hole code wherein the digit perforations 1 to 9 are differentiated further by 0, X and R perforations to get more than thirty-six different code representations in order to represent the digits, the twenty-six letters of the alphabet and special signs.

This Heading Card HC also contains perforations 2 and 3 in the first column provided for the purpose of reading different fields of the card in succession. They are known as multi-line reading controls. The first mentioned hole 2 being a start control in the "R" position and the other hole 3 being the control for stopping multi-line reading after the number of cycles denoted by one of five digital values which, in present instance, is indicated by its position in the third index point. The three cycle control is the usual thing in connection with Heading Cards because of the character of address representation with the name, street and city and State in the usual three line representation.

It is shown diagrammatically that the start control perforation 2 which is in the 12 or R code position and is sensed by the first reading station and the stopping control hole 3 is connected with the second reading station. At each of these two reading stations, there is a complete set of electrical contact fingers, one for each possible perforation position, i. e., 12 positions in each of the 80 columns of the card. In other words, 960 points of possible contact are provided. But other electrical controls as well as the imperforate positions of the card either abet or negative the contacts that are established, so that controls are selectively permitted by allowing impulses to move through certain connections and breaking the circuits to eliminate other connections. In the case of the heading card, the contacts established at the first reading station are in the main utilized only for group comparing and for initiating multi-line reading. At the second reading station is where there is a direct connection to the printer and it is at this reading station where the Heading Card is held for one or more cycles to use the same printing mechanism for printing multiple lines on a record from different fields on the card. Since there is provided only one line of printing wheels and since the lines of print to be made thereby are one beneath the other as in the ordinary address printing, it is necessary to operate the printer three or more times under control of the same card and therefore the card is held in a sensing position while the printer is operated successively under controls of different fields of the card such as the name field, street field and city and State field.

It is shown diagrammatically in Fig. 1 that the address data read for the Heading Card is directed into three different storage units identified as A, B and C. These units hold the representations of the heading data because once the Heading Card has been sensed at both stations, it is advanced and followed by related detail cards and the material thereon is lost as far as the single run of the cards is concerned. By putting the heading data in storage units, it is made possible to call them into operation to control the printer whenever desired. When called into operation, they are operated successively by means of a program control also shown diagrammatically and involving a unit for controlling five steps of successive sequential readings, three of which are used in connection with addresses.

This same program control unit is used in connection with the storage accumulators containing the invoice number, page number and customer's account number. They are read out in the order mentioned along with the three parts of the address. It is already noted how the starting invoice number is entered into the first accumulator, a page number is automatically added in another accumulator by successive unitary impulses to advance the page number accumulator as an item counter step by step in the units order. The third accumulator derives its setting from a field on the Heading Card devoted to customer account number perforations. This last accumulator is automatically re-set wherever there is a group change denoting the passage of the last detail card related to the account number which it contains and the appearance of a new Heading Card which contains the next account number which it is to receive.

The third form of card used to control the machine for purpose of the present embodiment is that known as a "Detail Card" DC. There are usually quite a number of these cards following each Heading Card. They also contain a customer account number in order to tie the transactions of the customer to the Heading Card bearing the identification of the customer. In addition to the account number, the Detail Card also bears a class number, an item number and amounts relating to the items. These numerical representations of the cards are usually printed in a listing formation on the record as the cards appear in the second reading station and there control the printer.

The different parts of the data on the Detail Card are associated with various classified operations of a group control mechanism. This is done to control the appearance of the listing on the record material by grouping related items, classes and account numbers as shown; the minor control is associated with the item number, the intermediate control is associated with the class number and the major group control is related to the customer's account number. In this way, the initiation of totals is subdivided so that a number of minor or intermediate changes may take place while recording on one form such as a single bill comprising items from different departments and the bill as a whole is summed up upon a change in the customer's account number so that a final major total represents a grand total of all department totals. As the detail cards pass in succession under the first and second reading stations, they are compared with respect to the minor, intermediate and major group representations. Upon a break in the similarity of numbers in any of the classes, the group control mechanism functions in the usual way to stop item printing and initiate total printing. When the change involves two or more classes of totals, the program device exercises control to read the totals out in sequential order with the minor first, intermediate second and major total last.

Ordinarily, the appearance of a group change occurs at a point where the totals may be represented near the middle of a bill form, but there are instances of more concern in a present instance where the occurrence of a group change coincides with the appearance of the overflow position on the record. In a present case, provision is made for recording a succession of totals at the very end of a form should the group change coincide with the first overflow position, said first overflow position providing room for three lines of total print after the last detail line in the overflow position. A secondary overflow control is provided which carries the detail lines to the last line at the very end of the record form and thus prohibits recording of totals on the same sheet with related items. However, should the group change appear in that end area between the first and second overflow positions, then the heading data is reprinted at the top of the second form and followed with the successive total impressions to tie the related identifications together. This is illustrated better in Fig. 1*a* where a succession of record forms is shown illustrating the various possibilities of detail items being carried down to one or the other of the overflow positions with or without occurrence of a group change at or between the overflow positions.

*Record material and control tape*

Figure 1A:
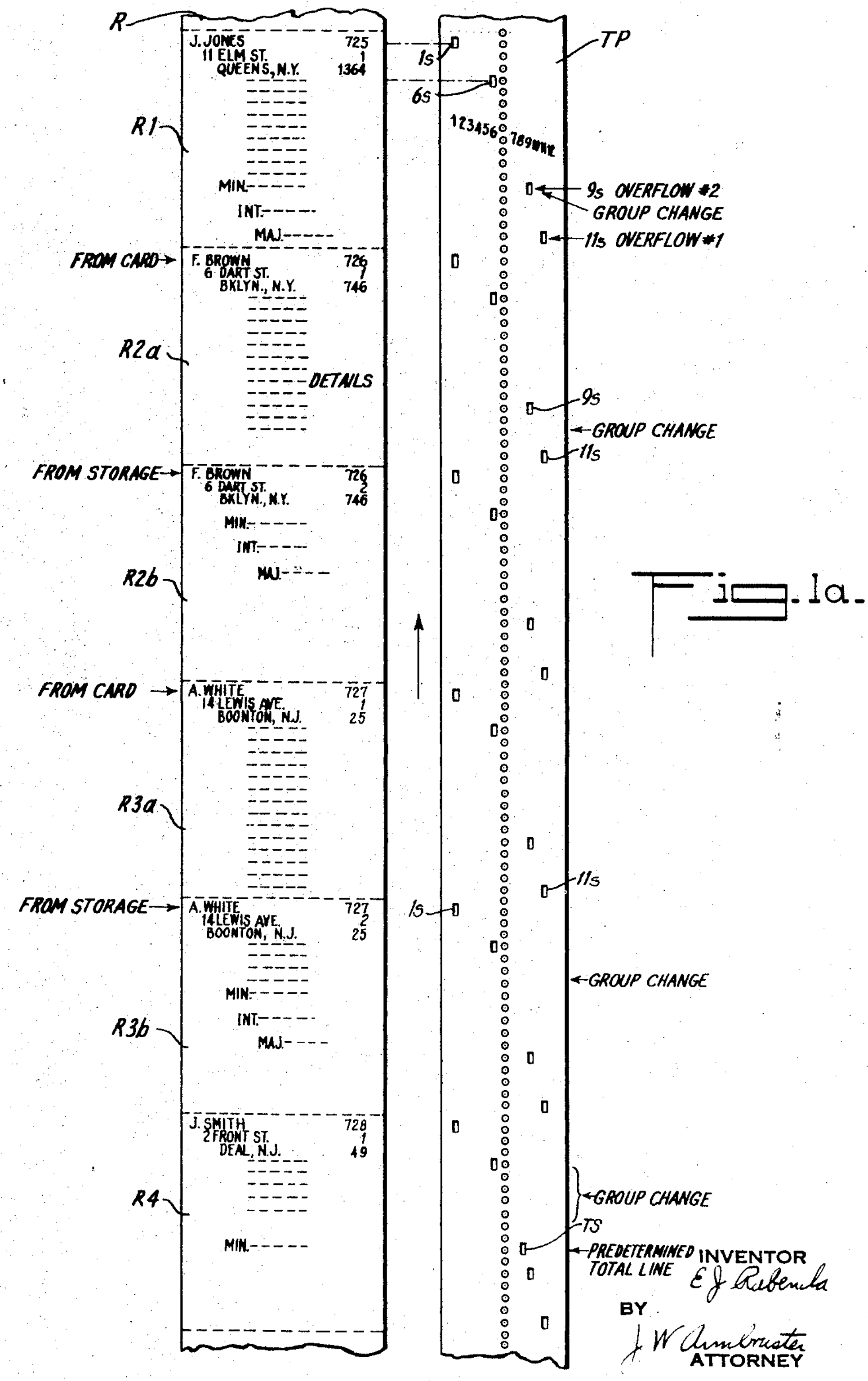

The record R, Fig. 1*a*, is a continuous strip subdivided into forms for receiving heading and detail data related to different accounts. Along side the record R is shown a Feed Control Tape TP with perforations for controlling the position of the record during the printing of the heading lines, items and totals. The tape TP and the feed control mechanism associated therewith is of the form shown in the copending Mills et al. application, Serial No. 609,854, filed August 9, 1945, now Patent No. 2,531,885. The record forms are of a uniform length and are subdivided into heading and detail receiving areas, said areas being defined by feed control perforations in the tape TP. For example, the first heading line is defined by perforation 1*s* and the position for receiving the first detail line is denoted by the tape perforation 6*s*. Near the bottom of the first form R1, it is seen that in line therewith are two overflow control perforations in the tape. The first perforation in the ninth column of the tape is identified as 9*s* and the following control perforation at the very end of the form is identified as perforation 11*s*. The first form R1 illustrates the example wherein the group change coincides with the listing of a detail line at a position near the end of the form coinciding with the sensing of the first overflow perforation 9*s*. Then the machine is controlled to suspend ejection of the form and initiate total printing so that the minor, intermediate and major totals may be recorded at the end of the form R1.

The second and third forms R2*a* and R2*b* are related and are printed to show the example wherein the group change occurs after the passage of the position related to the first overflow control perforation 9*s*, and there is not enough room to receive the total impressions at the end of one form, therefore the printing of them is postponed until there is an advance of the record strip to the second form. This form of operation also calls for a repetition of the heading data from storage and the heading identifications are reprinted at the top of the form R2*b* and then the minor, intermediate and major totals are printed directly thereafter. Such totals could be placed as desired at predetermined total positions under control of the tape.

The third form of overflow control is shown in connection with the forms R3*a* and R3*b*. There the number of items is so large that the first form R3*a* is filled completely before the second overflow control perforation 9*s* comes into play to bring a second form into printing position and call from storage the heading data before item printing is resumed under control of additional detail cards of the same account. Then, upon the occurrence of a group change, the three totals are recorded in the middle of the second form in the usual way.

The last form R4 illustrates the possibility of selecting a predetermined total line under control of a perforation 8*s* in the control tape TP. Then, as in the case of form R2*b*, or upon the appearance of a group change while printing in the body of the form before the appearance of the predetermined total line, the tape and accompanying record is advanced to the selected line position before the total is recorded.

Although in Fig. 1*a* the tape TP is shown for purposes of illustration as a long continuous tape extending over the length of six successive forms, it will be realized that the tape is ordinarily of a length equal to one or two multiples of a form length and the perforations thereon appear but once or twice to effect the controls as explained in connection with the extended diagrammatic showing. It is also optional whether either overflow perforation 9*s* or 11*s* is present singly on the tape or both appear together for joint control.

*Order of presentation*

Before describing the details of the overflow control for repetitive printing from storage, it is believed advisable to consider first the various units of mechanism or components of the machine which make the novel kind of automatic form printing possible. The various units to be considered include the card feeding and sensing means, the data accumulating and printing means, the address storage means and the tape controlled record feeding means. These electromechanical parts are described first, and then the electrical controls for them and between them are taken up with reference to the wiring diagram. It is in the latter portion of this specification that most of the description about repetitive printing of stored data is to be found.

*Framework of card feed unit*

The card feeding unit is preferably of the construction fully described in the application of G. F. Daly, Serial No. 629,576, filed November 19, 1945, now Patent No. 2,510,559. The unit has a lower or bottom section mounted upon a base of the card controlled machine and an upper hinged section which also carries certain parts of the card feeding unit.

The framework for the bottom or lower section of the unit consists of a pair of spaced side frames 10 and 11 (Figs. 1*b*, 2 and 4) which carry, among other parts, the bearings in which operating shafts to be subsequently described are journaled. Rigidity of the lower section of the unit is provided by cross members 12 and 13 (Fig. 3). The transverse operating shafts to be subsequently described also comprise cross members which aid in securing a rigid framework.

The framework of the upper section consists of side frames 14 and 15 (Figs. 1*b* and 2) and such side frames are suitably spaced by cross members which include a plate 16 (see Fig. 3). The upper framework is hinged to the lower section or portion of the unit on a pair of studs 17. Preferably, this pivotal mounting is provided by having cam plates 18 and 19 (Figs. 1b and 2) attached by rivets 20 to the side frames 15 and 14, respectively, said cam plates thus providing extensions of the side frames 14 and 15 to receive the hinge studs 17.

The card stacking magazine 23 comprises a base plate 21 and two side plates 22, each of which is pivoted on a stacker drum shaft 47 and the magazine is thus pivoted about the lower section. A catch 23*a* (Fig. 3) latches the card storage magazine in normal position. The magazine receives cards fed by the stacker mechanism after such cards have passed through the machine to control functions in the card controlled machine.

Suitable side plates 24 (Figs. 1b and 2) together with the cross plate 16 provide a card supply magazine 25 from which magazines, cards are fed singly for their presentation to analyzing stations to be subsequently described. Plate 16 is carried by the upper section and is the rear wall of the magazine. The side plates 24 are split as shown in Fig. 3 so that the upper part can be carried by the side plates 14 and 15 and the complementary portions can be carried by the lower section of the unit. This enables the upper portion of the card supply magazine to rock about studs 17 when the upper section is rocked.

All of the gear drives and rotating shafts of the card feed unit are carried by the lower portion of the unit. The power for driving the card feeding unit is derived from a continuously operating main drive shaft 27 from which there are gear connections having a 2–1 gear ratio so that for one revolution of the main shaft, shaft 30 is rotated clockwise as viewed in Fig. 2 and counterclockwise as viewed in Fig. 3, one-half revolution per machine cycle.

Shaft 30 has secured to it a gear 31 (Figs. 2 and 4) which drives a train of intermeshing gears 32, 33 and 34 which are mounted outside of the main side frame 11 and by suitable compounding drives gears 35, 36 and 37.

Figure 3:
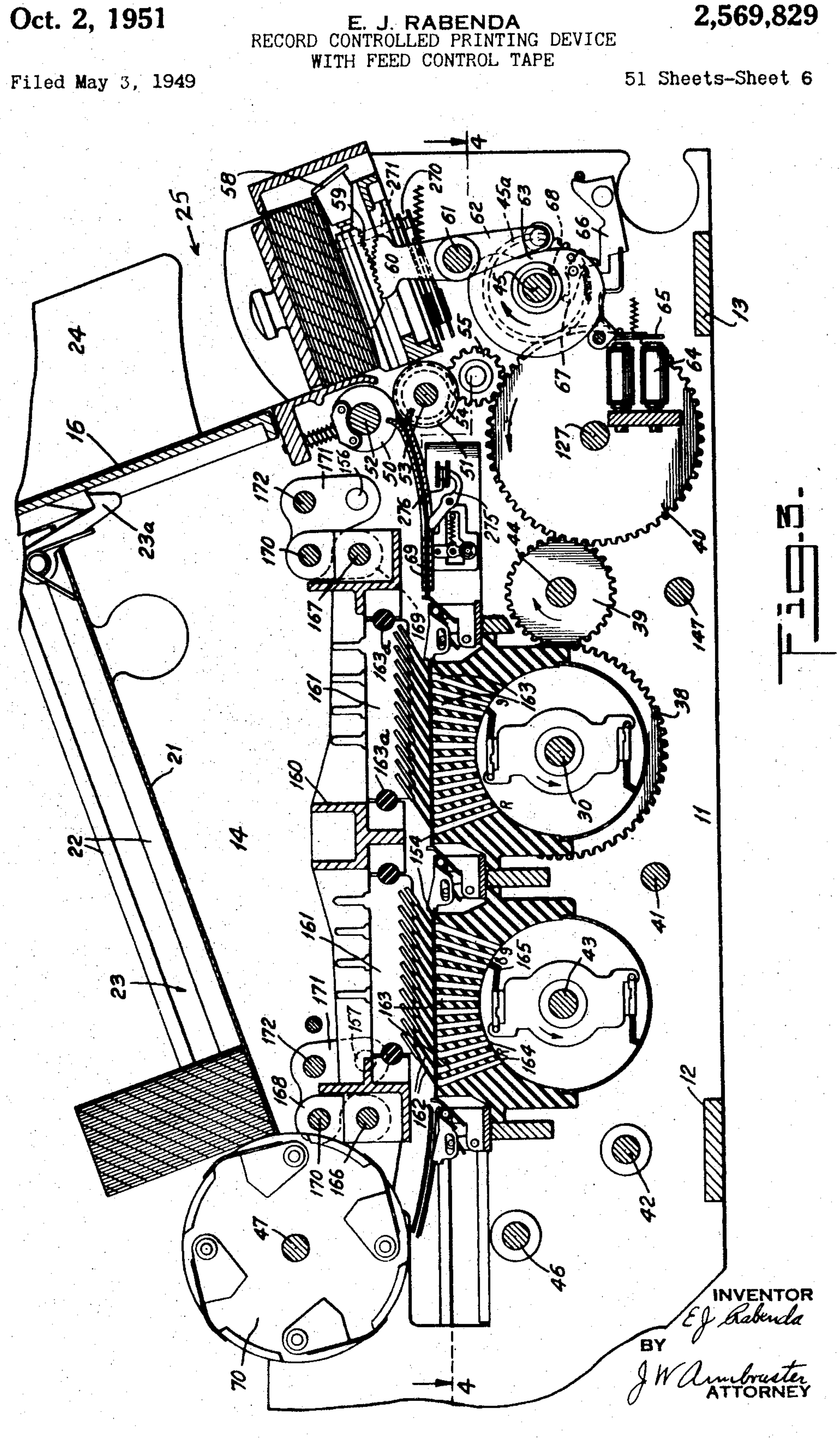
Fig. 3 is a longitudinal sectional view taken on the line 3—3 of Fig. 4.
Figure 4:
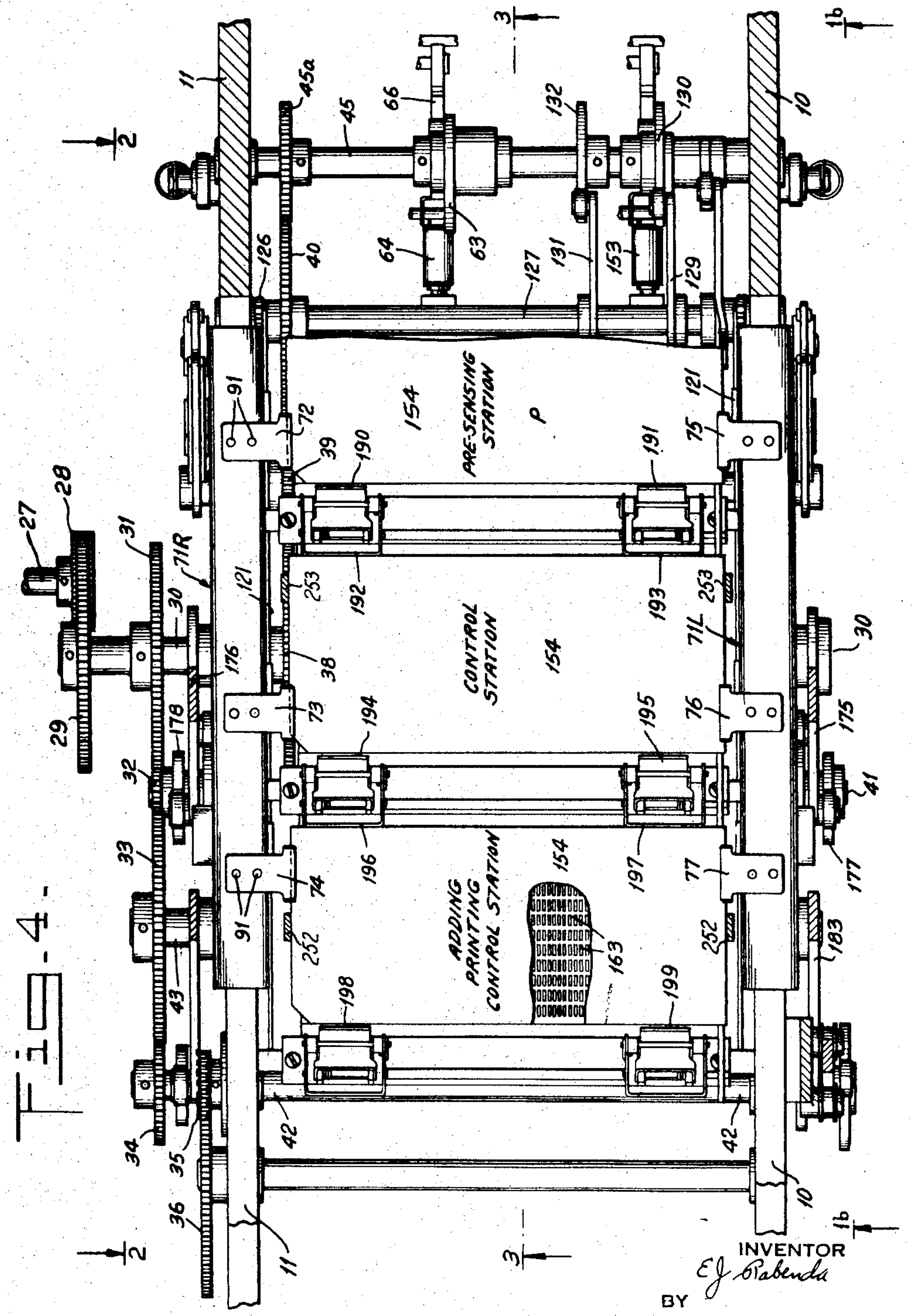
Fig. 4 is a plan view with the upper hinged section of the unit removed and fragmentary in portions to show more clearly the parts which would be concealed.

Inside of the side frame 11, referring to Figs. 3 and 4, a gear 38 secured to the main drive shaft 30 drives a train of gears 39 and 40.

Figure 2:
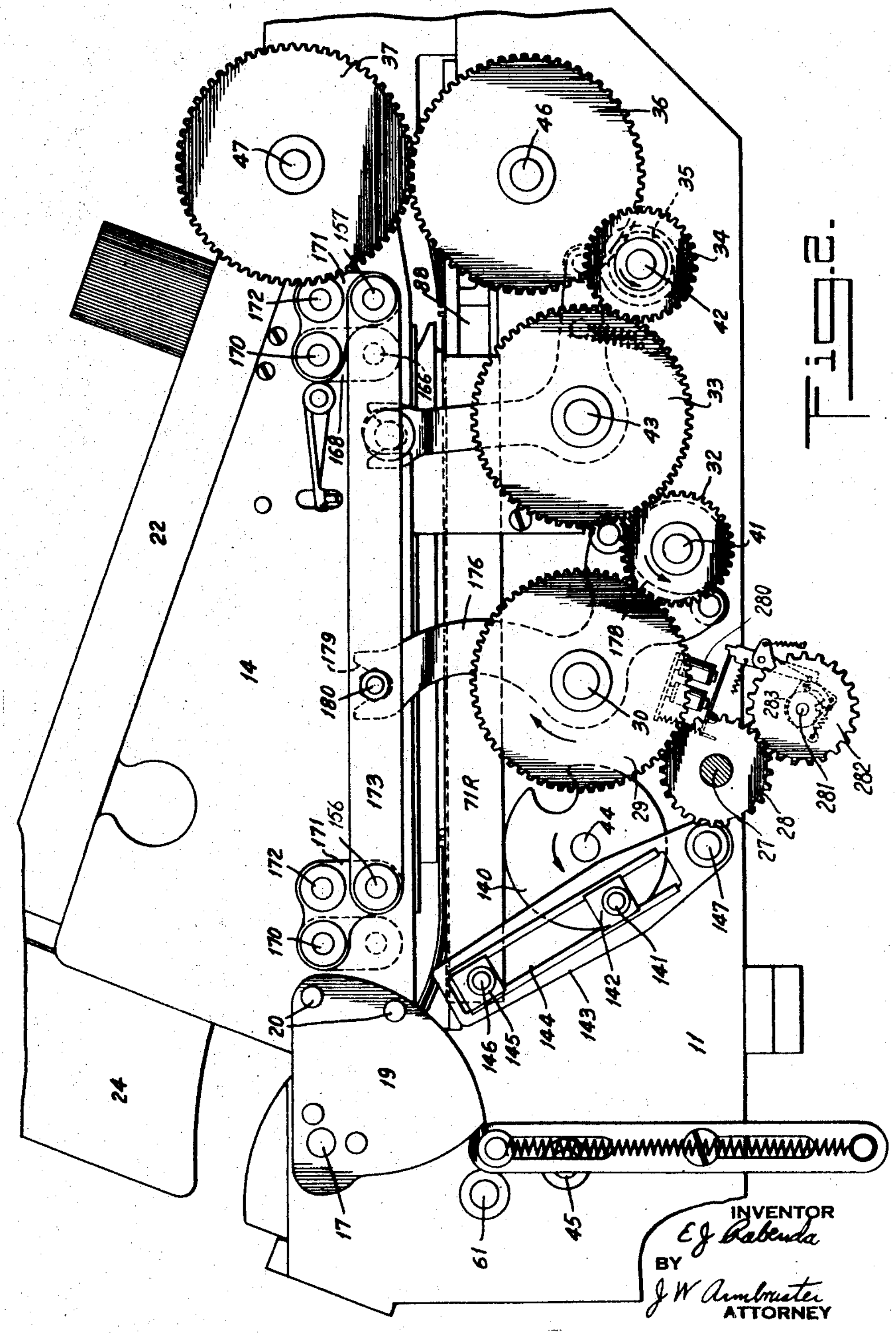
Fig. 2 is a view similar to Fig. 1 but is an outside elevational view of the right side of the unit and is taken on the line 2—2 of Fig. 4.

Gear 32 is secured to a cam shaft 41 (Figs. 2 and 4) and gears 34 and 35 are secured to a cam shaft 42, both cam shafts being driven counterclockwise, as viewed in Fig. 2, one revolution per machine cycle. The gear 33 is secured to a commutator drive shaft 43 and likewise the main drive shaft 30 is utilized as a commutator drive shaft.

Gear 39 (Fig. 3) is secured to a crank shaft 44 and gear 45*a* to a clutch drive shaft 45, both shafts 44 and 45 being driven clockwise (Fig. 3) one revolution per machine cycle. Gear 36 (Fig. 2) is an idler gear which drives the stacker drum assembly through gear 37 and is loosely supported on a stud 46. Gear 40 (Fig. 3) is loosely mounted on a rocker shaft 127. The gear 37 (Fig. 2) is secured to the stacker drum driving shaft 47.

For feeding the cards which emerge from the card supply magazine, top edge foremost and printed face down, there is provided cooperating feeding rollers 50 and 51 (see Fig. 3) mounted on the respective shafts 52 and 53 carried by the lower portion of the card feeding unit. Lower feeding roller 51 has secured thereto a gear 54 meshing with an idler gear 55 which is driven by the gear 40.

*Card feed from supply magazine*

A conventional card picker is provided to feed cards singly from the supply magazine and includes a card picker 58 (Fig. 3) having a swivel mounting on a slidably mounted rack 59, all of which parts are carried by the lower portion of the card feeding unit. Said rack 59 is operated by a segment arm 60 secured to a rocker shaft 61 to which latter there is secured a follower arm 62 operated by a cam 63.

To effect selective card feed operations there is provided the usual one revolution clutch which includes a card feed control magnet 64. As in the well known construction, the armature 65 thereof rocks a clutch release arm 66 which enables a pawl 67 pivoted on the cam 63 to engage a notch 68 formed in a disk secured to the one-revolution drive shaft 45. When such clutch engagement is effected, shaft 45 will drive the cam 63 a complete revolution at which time the clutch release arm 66 will be in a position to disengage the pawl 67 from notch 68.

By electrical circuits to be subsequently described an impulse is transmitted to the clutch control magnet 64 to feed the lowermost card to the now rotating feeding rollers 50, 51. From Fig. 32 it will be noted that such rollers feed the card from the beginning of the cycle up to 200° of the machine cycle to feed the card to the first sensing station, known herein as a "presensing station." As the card emerges from the feeding rollers 50, 51, it is guided by spaced plates 69 (Fig. 3) which are carried by the lower portion of the card feeding unit and are located at the so-called presensing station P (Fig. 4).

*Stacker Drum*

After the card has been twice analyzed and it emerges from the second analyzing station it is engaged and received by a stacker drum 70 (Fig. 3) of a conventional construction and since its construction and operation is well known it will only be generally stated that such stacker drum receives a card, turns it over and deposits it in the card storage magazine 23 and in the same order as the cards are originally stacked in the supply magazine 25.

*Card gripper feeding devices*

It is preferable to positively grip the cards to feed them from station to station without resorting to the expedient of card feeding rollers, because when such cards are released by the grippers they are free to be repositioned by the aligning devices, if disaligned. As will appear later, the presence of a card in the presensing station enables the release of the grippers to seize each card and reciprocate the gripper frames to feed the card from the station in which it is located to the next station. These stations are indicated in Fig. 4 as the "Presensing Station," the second or "Control Station" which is used for control purposes in the customary card controlled accounting machine and the third station designated as "Adding-Printing Control Station" having the functions of this legend.

In general there is provided at the right side of the card feeding unit at the lower portion thereof a reciprocable gripper frame 71R (Fig. 4) carrying card grippers 72, 73 and 74. At the other side of the machine the companionate reciprocable gripper frame 71L carries grippers 75, 76 and 77. Obviously, grippers 72 and 75 feed the card from the Presensing Station to the Control Station and simultaneously grippers 73 and 76 move a card from the latter designated station to the Adding-Printing Control Station and grippers 74 and 77 feed a card from the Adding-Printing Control Station to the stacker drum assembly 70. When three cards are at their respective stations the concomitant movement of gripper frames 71R and 71L will feed three cards during the same machine cycle.

In view of the similarity in construction of both reciprocating gripper frames 71R and 71L the detailed description of the gripper frame assembly will be confined to the construction and operation of gripper frame 71R only.

The gripper assembly is carried by an inverted U-shaped frame comprising a cross plate 80 (Figs. 6 and 7) and integral dependently hung side plates 81 and 82, plate 81 being outside of the side frame 11, and side plate 82 being at the inside of the side frame 11. The side plate 81 carries two stud shafts 83 (see Fig. 5) which provide the bearings for respective ball bearing mounted wheels 84 and 85, which wheels roll over a lower track 86 and underneath an upper guide track 87 during the reciprocation of the gripper frame. The upper edge of the side frame 11 has a rectangular longitudinal open notch 88 (Fig. 1b) and on the bottom of this notch the track 86 is fastened, and extending over this notch the track 87 is attached. Rotatable on the stud shafts 83 (Fig. 7) and at each side of the wheels 84 or 85 are washers 90 enlarged with respect to the diameter of the wheels and they are so confined on the guide shafts 83 as to bear against the sides of the tracks 86 and 87 to preserve the sidewise alignment of the gripper frames during their reciprocation.

Reference numerals 72, 73 and 74 refer to the stationary plates of the grippers since they are affixed by rivets 91 to the top of the cross plate 80 and as shown in Fig. 4 extend laterally inwardly over the side marginal edges of the cards. The companion movable gripper plate 93 extends inwardly similar to the stationary gripper plate and is slidably mounted so that when free to move upwardly it will positively grip the marginal edge of the card which is between it and the companion fixed gripper plate. Movable gripper plate 93 is guided in its vertical movement by a pin 94 secured thereto, cooperating with a hole in the related fixed gripper plate. At the lower part said gripper plate has a square notch 95 cooperating with the rounded end of a toggle lever 97 which is pivoted on a guide stud or pin 96 carried by the side plate 82. In this manner the movable gripper plate is guided in its vertical movement.

To bring the movable gripper plate 93 into gripping relationship with the related fixed gripper plate, any suitable means may be provided but is preferably performed by a toggle lever system which acts quickly to enable the grippers to seize the card edge. This system comprises the lower toggle lever 97 pivoted on said stud 96 and an upper toggle lever 98 pivoted on a pin 99 carried by the movable gripper plate 93. The connecting pin 99 at the midpoint of the toggle lever connects said toggle levers and passes through a notch in the side plate 82 and is received by a hole 110 (Fig. 6) in a toggle control link 100. The toggle link 100 is mounted inside of the side plate 82 and is guided for reciprocating movement by studs 101 (Fig. 5) carried by the side plate 82 cooperating with guide slots 102 formed in the toggle control link 100. The toggle control link is normally latched by a latch lever 103 pivoted on a stud 104 carried by side plate 82, said latch being urged by a spring 105 extended from said latch lever to a stud 112 carried by toggle control link 100 to engage a notch 106 in the toggle control link 100. Thus, during the time that the three grippers are to be opened so as to be free of the marginal edges of the card, the toggle control link 100 is normally latched by the latch lever 103. At the instant when the cards are to be engaged by the respective grippers, by means to be presently described, latch lever 103 will be rocked to disengage it from the shouldered notch 106, and in so doing it tensions spring 105. This will release the toggle control link 100 and said link will be instantly moved towards the right as viewed in Fig. 5, partly by the tension of spring 105 so that by shifting each pin 99 to the right the respective toggle lever system will be straightened, elevating the lower movable gripper plate 93 and closing the gripper jaws upon the marginal edge of the card. The movement of the toggle control link 100 to the right is effected by the action of spring 105, as just stated, and three springs 107, 108 and 109, each of which is connected to the midpoint connecting pin 99 and to a respective stud 111 carried by the side plate 82. It is preferable to enable each movable gripper plate to move independently of the toggle control link 100, especially at the time that the toggle lever system is straight so that under action of the respective spring 107, 108 and 109 the movable plate will be moved upwardly freely. This is effected by enabling toggle control link 100 to move slightly farther than connecting pin 99 of any of the individual toggle links so that the toggle lever system is under control of its respective spring 107, 108, 109. This preferred action can be effected by having each of the pins 99 operate in the hole 110 (Fig. 6) in the toggle control link 100 which is slightly larger than the diameter of the connecting pin 99.

Figures 5, 6, 7, 8:
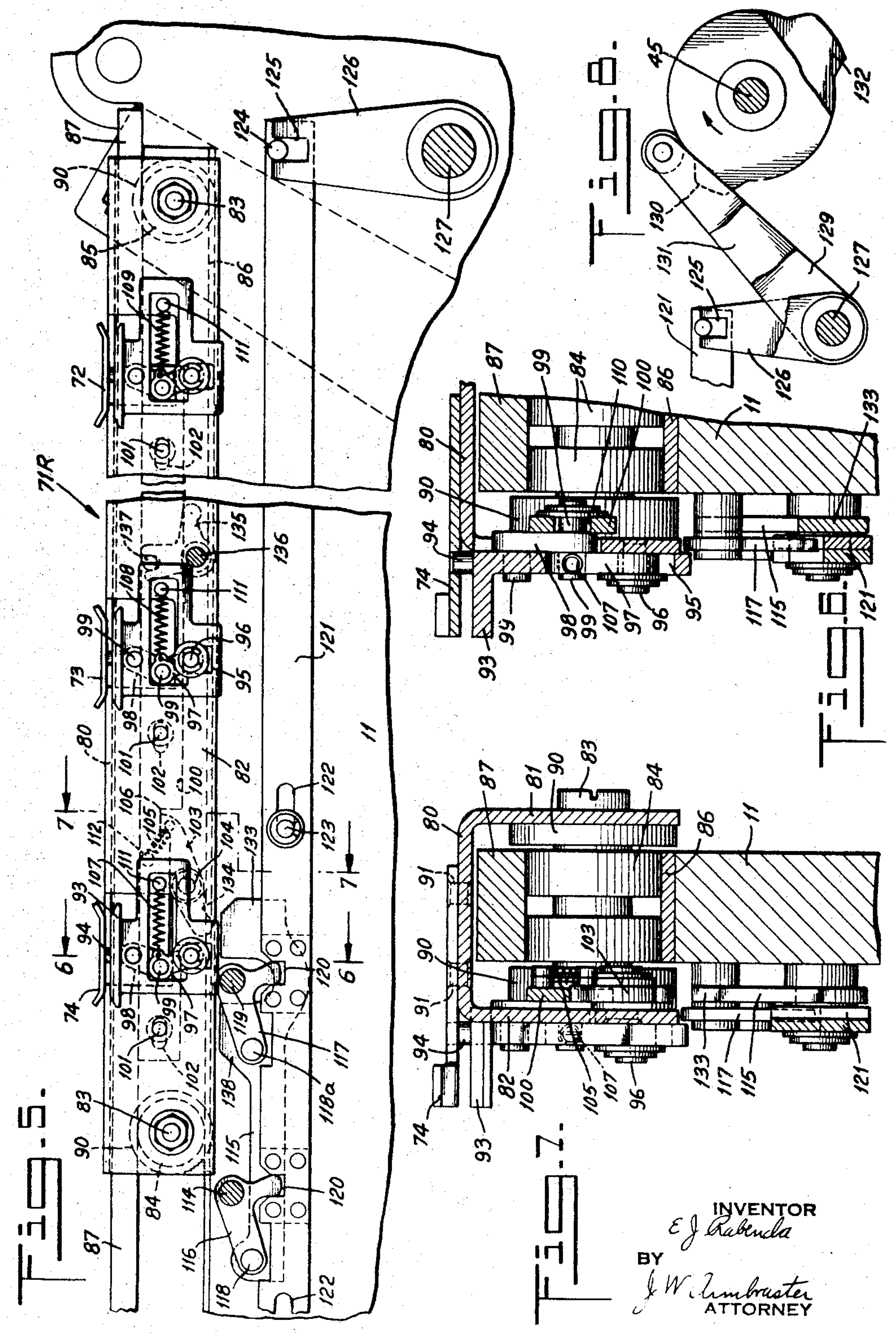
Fig. 5 is a view in side elevation showing the gripper frame assembly and associated cam operated linkage for closing and reopening the card grippers.
Fig. 6 is a transverse sectional view taken on the line 6—6 of Fig. 5.
Fig. 7 is a transverse sectional view taken on the line 7—7 of Fig. 5.
Fig. 8 is a detail view showing a portion of a cam operated linkage for operating the gripper closing mechanism.

Closing and reopening of the three grippers carried by the reciprocating gripper frame 71R is effected under control of a swinging plate 115 (Figs. 5, 6 and 7). The swinging plate 115 is carried at one end by a bell crank lever 116 pivoted on a fixed rod 114 carried by the side frame 11 and also to a stud 118 carried by said plate 115. A similar bell crank 117 is pivoted on a fixed rod 119 carried by the said frame 11 and also to a pivot stud 118a carried by the plate 115. The lower arm of each of the bell cranks 116 and 117 projects into a respective slot 120 in a gripper operating link 121. The gripper operating link 121 is slidably mounted on the side frame 11 by having its notches 122 cooperate with guide studs 123 carried by said side frame. One end of the gripper operating link carries a stud 124 fitting in a bifurcation 125 of an arm 126 secured to the rock shaft 127, which latter as shown in Fig. 4 is journaled in the side frames 10 and 11. To the rock shaft 127 is secured a follower arm 129 cooperating with a cam 130 and a supplemental follower arm 131 cooperating with a cam 132. A cam 130 is selectively connected by a clutch to the drive shaft 45 as will be presently described, whereas cam 132 is permanently fixed to drive shaft 45, as shown in Fig. 4.

Assuming, as previously stated, that the grippers are to be closed and the gripper frame is to be moved to the left in a card carrying stroke from the Fig. 5 position; at this time the high portion of cam 130 will rock arm 129 and shaft 127 counterclockwise and through the pin and notch connection 124—125 the gripper operating link 121 is moved to the left as viewed in Fig. 5; rocking both bell cranks 116 and 117 clockwise to elevate plate 115, thus causing the operating portion 133 thereof to engage the lower lever 134 of latch 103, thus rocking the latch and releasing the toggle control link 100 and in the manner previously described enable the three grippers to concurrently close upon the card. After said grippers have been released to card gripping position the reciprocating gripper frame is then moved to the left in a card feeding stroke from the Fig. 5 position by means to be presently described.

After the grippers have carried the cards to the successive analyzing station the grippers, of course, should be reopened prior to their return movement, or to the right as viewed in Fig. 5, free of said cards and this function is effected by again elevating swinging plate 115 when the reciprocating frame is in such position that another operating portion 138 of swinging plate 115 is coordinated with the lower arm of a bell crank 135. The second elevation of plate 115 when the above correlation is obtained is performed by the cam 132 which, at the proper time in the operating cycle, rocks the respective follower arm 131 and shaft 127 so as to again shift the gripper operating link 121 to the left (Fig. 5). This, as previously described, will elevate plate 115 so that said operating portion 138 rocks bell crank lever 135 which is pivoted on a stud 136 carried by the side frame 11. The upper arm of the bell crank has an open notch engaging a pin 137 carried by the toggle control link 100. Rocking of the bell crank lever 135 in a counterclockwise direction will shift link 100 to the left so as to be relatched by latch lever 103 and at the same time rocking all of the toggle levers from their straight line position to the position shown in Fig. 5, to reopen the grippers.

Reference has been made to the reciprocation of the gripper carrying frame 71R and such reciprocation is effected by means of a crank disk 140 (Fig. 2) rotatable counterclockwise by the constantly rotating shaft 44 to which said crank disk is secured. Crank disk 140 carries a pin 141 which supports a rectangular driving shoe 142 which is guided in a crank arm 143 so as to ride in a slot 144 therein. Also slidable in slot 144 is a similar shoe 145 supported by a pin 146 carried by the gripper frame 71R. Arm 143 is fixed to a rock shaft 147.

Fig. 2 shows the parts just described in the position they occupy at the start of a card transporting operation, that is, at 210° of the timing diagram (Fig. 32). Just prior to this, assuming that a card has been received in the presensing station, a clutch connection will be made as previously described to rotate cam 130 (Fig. 8) to cause the rocking of the latch lever 103 (Fig. 5) to close the grippers. With all the grippers closed, rotation of crank disk 140 through 120° will rock arm 143 sixty degrees, moving gripper frame 71R from the left to the right with a harmonic motion to effect a quick feeding stroke and thereafter a slow return of the gripper frame while said grippers are opened. At the termination of the quick feeding stroke, at about 323°, arm 135 (Fig. 5) is rocked to cause the opening of the grippers, the slow return of the gripper frame then moving the opened grippers from the right as viewed in Fig. 2 to the left with a slow return.

Figure 1B:
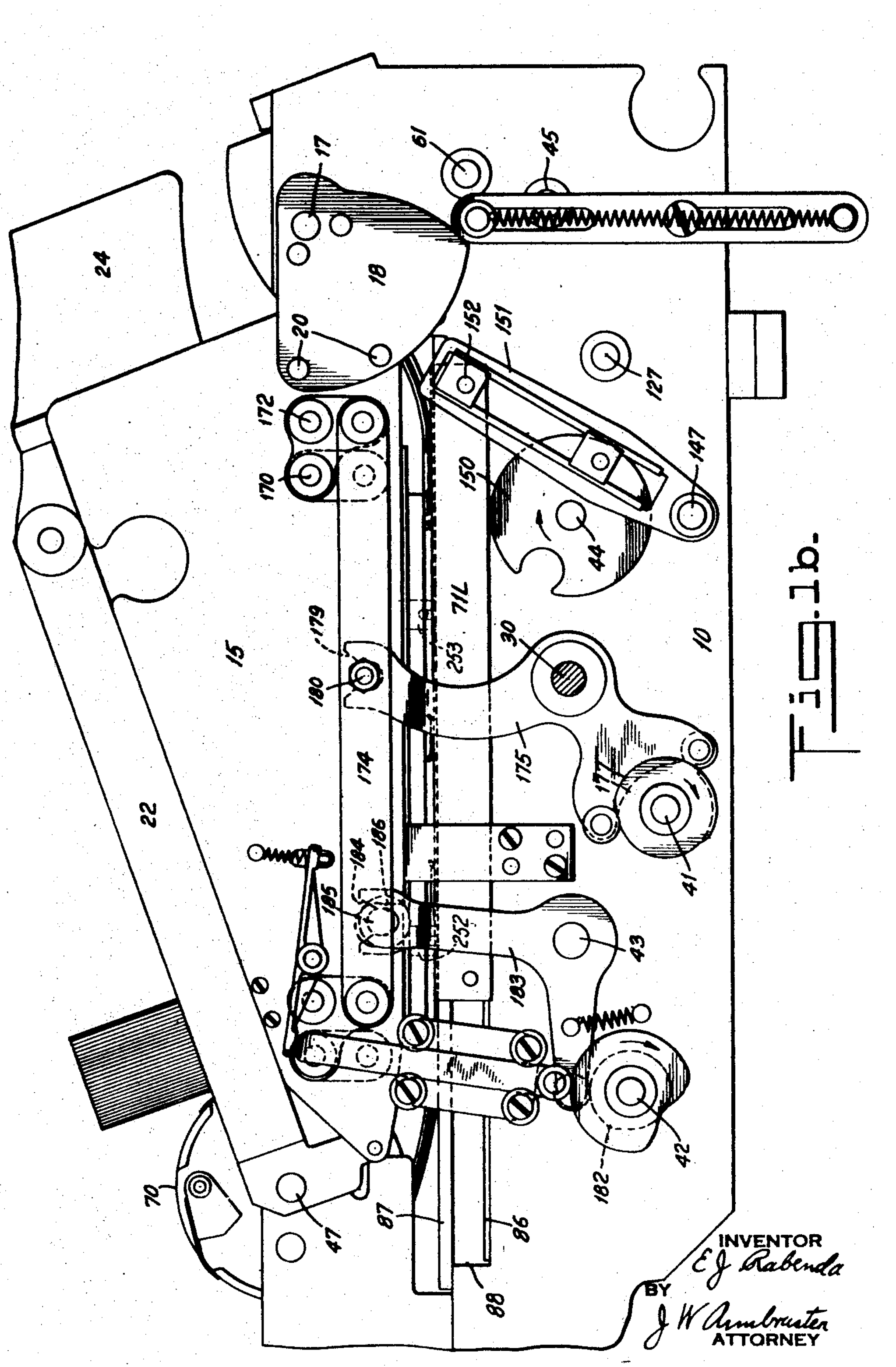

While the detailed construction of the means for effecting the reciprocation of the gripper frame 71R has been described, it is to be understood that referring to Fig. 1b a similar means is provided to reciprocate the other gripper frame 71L concomitantly and comprises a crank disk 150 which operates in a similar manner a crank arm 151 which has a slidable shoe connection 152 to the reciprocating gripper frame 71L.

Obviously, if three cards have been previously fed to the three different stations, movement of the gripper frames 71L and 71R to the left as viewed in Fig. 4 will enable the closed grippers carried thereby to transport the card to the next station or from the Adding-Printing Control Station to the stacker drum assembly. It is explained that when a card has been fed to the Presensing Station P, Fig. 3, it is completely free of the feeding rollers 50 and 51 so that seizure by the grippers 72 and 75 will convey the card to the Control Station. Furthermore, during the time that the grippers are returned while open, the feeding rollers 50 and 51 are feeding a card to the Presensing Station since it is then empty.

During the operation of the machine, the gripper frames constantly reciprocate once for each machine cycle, since drive shaft 44 is constantly rotating. Since cam 132 (Fig. 4) is also secured to the constantly rotating shaft 45, bell crank 135 (Fig. 5) is rocked once for each machine cycle whether or not the grippers have previously been closed. The closure of the grippers, however, is an independent selective operation. By an electrical impulse circuit to be subsequently described, a clutch control magnet 153 is energized (see Fig. 4). This magnet is similar to clutch control magnet 64 and causes the clutch engagement of a similar type of clutch so as to effect a driving engagement between cam 130 and the drive shaft 45. This clutch connection will then enable elevation of swinging arm 115 to cause the closure of the grippers in the manner previously described.

*Card analyzing mechanism*

The analyzing mechanism has been devised for analysis while at rest of a card of the type shown in the patent to C. D. Lake, No. 1,772,492, granted August 12, 1930. In general, the card 154 (Fig. 4) has perforations (not shown) which are arranged in vertical columns and in horizontal rows, through which perforations electrical circuits are made to control functions of the machine. The general outline of three such cards 154 is shown in Fig. 4.

A frame 160 (Fig. 3) carries for each analyzing station a plurality of current carrying members 161, one for each card column and each carrying a plurality of angularly positioned analyzing brushes 162 which encounter the perforations and pass through to complete the electrical circuit. Plates 161 are insulated from each other and are attached to the frame 160 by insulating rods 163. By an electrical connection to each plate 161, current is supplied to the electrical analyzing brushes 162. For each card column a set of brushes 162 makes selective contact through the perforations in the column to extensions 163 of emitter contact points 164. A brush readout 165 driven by the shaft 43 or 30 counterclockwise makes successive contact with the contact points 164 to transmit impulses in the order 9 to R at differential times, dependent upon the location of the perforation.

The above described arrangement of analyzing brushes and readout commutator is duplicated for each card column and the assembled arrangement is duplicated for the Adding-Printing Control Station and the Control Station, the commutator readouts being driven by the shafts 30 and 43.

The analyzing brush carrying frame 160 is carried by the upper portion of the card feeding unit and is mounted between the side plates 14 and 15 in the following manner: At the ends of the frame 160 (Figs. 2, 3) studs 166 and 167 carried thereby are the pivotal connections of links 168 and 169 each of which is also connected by a stud 170 to a related bell crank 171 which is pivoted upon a rod 172 carried by the side frames 14 and 15. A link 173 (Fig. 2) is connected by studs 156 and 157 to the bell cranks 171 at the same side of the frame 160. Link 173 is the controlling member of a parallelogram linkage by means of which the analyzing frame 160 is dependently hung so that by movement of said link 173 the analyzing frame 160 may be elevated and lowered insuring the passage of the analyzing brushes through the correlated perforations. While the specific description has been confined to the supporting structure for one side of the analyzing support frame, shown in Figs. 2 and 3, the same type of support is provided for the other side of said frame as is shown in Fig. 1*b*, wherein controlling link 174 designates the controlling member for the parallelogram linkage. Shifting of the links 173, 174 in one direction or the other to elevate or depress the analyzing frame is effected by follower arms 175 and 176 (Figs. 1*b* and 2) which are operated by respective complementary cams 177 and 178 secured to the drive shaft 41. The connection between the follower arm 176 or 175 and the respective controlling member link 173 or 174 consists of an open notch 179 on the follower arm receiving a stud 180 carried by the related link 173 or 174.

In Fig. 3 the analyzing frame is shown in depressed position with the readout commutators in the rotated position they occupy shortly after the emitter impulses are initiated.

During the time that the emitter impulses are being transmitted the card gripper frames with opened grippers are returned with a slow return stroke, thus enabling the cards to be held in analyzing position. After the analysis of all index point positions by the sensing or readout commutators which occurs by about 183°, and prior to the movement of the gripper frames to feed the cards to the next station, the complementary cams 177 and 178 are effective to rock the controlling link 174 to the left (Fig. 1*b*) and the link 173 to the right (Fig. 2), rocking the bell cranks 171 to elevate links 168 and 169 to raise the analyzing frame 160, positioning all the analyzing brushes out of contact with the cards in the analyzing stations.

Near the end of the machine cycle, or at about 330° (see Fig. 32), cams 177 and 178 are then effective to reverse the movements of links 173 and 174 which results in the depression of the analyzing frame and maintenance of the frame in lowered position during the time of emission of the impulses by the readout commutators.

While the movement of the frame downwardly exerts pressure on the flexible brushes 162 to cause them to project through the perforations and make firm electrical contact, it is desirable to effect a slight lateral movement of the frame 160 so as to wipe the brushes over the card and if in contact with a commutator contact point 164 to wipe the brush thereover to make an efficient electrical contact. This is preferably effected by displacement of the frame 160, Fig. 3, slightly to the right when the brushes are in contact with the card to be analyzed. To effectuate this there is secured to drive shaft 42, Fig. 1*b*, a cam 182 which operates a bell crank follower arm 183 loosely pivoted on the shaft 43. The upper arm of said bell crank has an open notch 184 which receives a stud 185 carried by the frame 160 and which projects through a clearance notch 186 in the side frame 15.

Assuming that the analyzing frame 160 is in the raised position, cam 182 will be effective at about 251° of the machine cycle (see Fig. 32) to shift frame 160 slightly to the left (Fig. 3), thus restoring frame 160 from its previously displaced position to the right. Near the end of the machine cycle or at about 330° the sensing frame is in lowered position and at about the time the analyzing brushes come in contact with the card cam 182 will rock the follower arm 183 to displace the frame 160 to the right, thus wiping the analyzing brushes, either over the surface of the card or over the tops 163 of the contact points 164 where perforations are encountered.

*Card stops and aligners for horizontal edges of cards*

The card feeding unit now being described and employed in connection with the present invention is provided with card stops and aligners which align the card along the horizontal edges to accurately correlate the horizontal rows of index points of the card with the related rows of analyzing brushes. The horizontal edges of the cards define the longer edges thereof because as the card is ordinarily held up for view by an operator the longer edges are horizontal and the shorter (left and right marginal edges) are the vertical edges. All of the horizontal edge aligners and card stops are carried by the lower portion of the card feed unit and are visible as shown in Fig. 4 when the upper section has been elevated or removed.

Since the card stops and aligners form no part of the present invention and are fully shown and described in the aforementioned patent application of G. F. Daly, Serial No. 629,576, filed November 19, 1945, they are not shown and described in detail herein.

In general, referring to Fig. 4, the feed rollers 50 and 51 project the leading edge of the card at the Presensing Station against two aligners, 190 and 191. The card at the Control Station is aligned between card stops 192, 193 and aligners 194, 195, and the card at the Adding-Printing Control Station is aligned between card stops 196, 197 and aligners 198, 199. The card stops and aligners function in the manner fully described in the Daly application, Serial No. 629,576 to accurately align the cards which are analyzed.

*Vertical card edge aligners*

Also as more fully shown and described in the application to G. F. Daly, Serial No. 629,576, filed November 19, 1945, provision is also made in the card feeding unit to align the cards at the vertical edges. Since such aligners, their construction, and the means for operating them are fully described in the already identified Daly application they need not be described in detail herein. In general, they comprise vertical aligners 252 and 253, a pair being disposed at the Control Station and the Adding-Printing Control Station and are preferably disposed only at these stations since any possible irregularity or deviation of the card from its proper line or direction of feed as it is fed to the Presensing Station is not of any consequence. If it occurs, it is corrected at each of the analyzing stations to accurately correlate the vertical columns of index point positions with the correlating columns of the analyzing brushes 162.

In Fig. 4 there is shown in dotted lines the relative position of each pair of vertical card edge aligners 252 and 253 and are shown in this manner because they are actually carried by the upper section of the card feed unit, as will be seen in Fig. 1.

By the operating means shown and described in the aforementioned application of G. F. Daly, Serial No. 629,576, the aligners are operated to shift a card endwise, either to the left or right as the lower ends of both aligners move downwardly and inwardly during the aligning operation.

An adjustable means is also provided to initially adjust the vertical card aligners so that as a result of the analyzing operation the card will be in the proper analyzing position with respect to its vertical columns.

*Amount and number entering mechanism*

As already noted, the present invention is preferably embodied in a machine of the record controlled type wherein amounts and other numbers such as page, invoice and account numbers are entered into an accumulator or accumulators according to the digit representations on perforated records which are passed successively through the machine.

Some of such entered numbers are merely stored as in the case of an account number, other numbers have a unit added thereto regularly as in the case of page and invoice numbers, still other numbers such as amounts are added to each other in a plurality of denominational orders.

Therefore, it is intended that the amounts be selectively entered under control of some form of digit entering and controlling devices and entered into an accumulator to be added to arrive at totals.

*The accumulators*

In Figs. 16 and 17 the driving shaft 213 is driven by main drive shaft 27 in any suitable manner so as to make one revolution for each cycle of operation. For each denominational order of the total accumulator, shaft 213 has a gear 214 secured thereto which drives the accumulator wheel clutch mechanism. The accumulator and clutch driving mechanism are preferably of the same construction as shown in Lake et al., Patent No. 2,328,653 and includes a ratchet 215 which is free on post 216 and integral with a gear 217 driven by gear 214 (Fig. 16). Rotatably carried by post 216 is a disk 220 having ten teeth 220*a* adapted to be engaged by a tooth 221*a* on the long arm of a clutch lever 221 to hold the disk against rotation in a counterclockwise direction.

At the side of disk 220 is an accumulator wheel 224 rotatable on post 216 and provided with ten peripheral notches 224*a*. Wheel 224 may take any of ten rotative positions with the values 0, 1 . . . 9. A spring-pressed lever 225 engages with a notch 224*a* of wheel 224 to hold the wheel impositively and to center it in the value position into which it has been rotated. A transfer cam 226 is fixed to the side of wheel 224 and a stud 227 in wheel 224 extends through an opening in disk 220 to pivotally carry a clutch dog 230. A spring 231 urges the tooth of dog 230 to engage ratchet 215. In the positions shown in Fig. 16 the clutch lever 221 is in declutching position, its tooth 221*a* is restraining rotation of disk 220 counterclockwise and dog 230 is clear of ratchet 215. The dog 230 is being held clear of the ratchet by coaction of a pin 230*b* on the dog with a cam edge 220*b* of disk 220.

When the clutch lever 221 is dropped to cause its tooth 221*a* to release the disk 220 for counterclockwise movement, the spring 231 is effective to rock the dog 230 into engagement with ratchet 215. During this movement of the dog 230 its pin 230*b* rides along the cam edge 220*b* and cams the disk counterclockwise until its tooth 220*a* previously engaged by tooth 221*a* is to the right of the latter tooth. The parts are then in the clutching position shown in Fig. 17, and the wheel 224 is coupled to the driving device 215, 217 for rotation. Through engagement of the pin 230*b* of the dog 230 with cam edge 220*b*, the disk 220 is forced to rotate counterclockwise together with the register wheel.

When the clutch lever 221 is returned to the upper declutching position, its tooth 221*a* intercepts a tooth 220*a* of disk 220 and stops the disk. Accumulator wheel 224 and dog 230 continue rotating while cam edge 220*b* of disk 220 cams the pin 230*b* outwardly until it is again in its outer position. As the pin 230*b* is cammed outwardly clutch dog 230 moves clear of ratchet 215 and declutches the accumulator wheel from the driving means. The accumulator wheel is then held and centered in its new value position by lever 225. A spring-urged latch 235 serves to hold lever 221 in either clutching or declutching position.

The clutch lever 221 has a short arm swiveled to the lower end of an armature 236 which is disposed between an advance magnet AM and a stop magnet SM. Energization of magnet AM rocks armature 236 clockwise to lower lever 221, and energization of magnet SM rocks armature 236 counterclockwise to raise the lever 221.

When the wheel 224 is in its 0, 1 . . . 8 positions, the cam 226 holds a carry lever 237 pivoted at 238 in the position shown in Fig. 16, where a contact blade 239 (insulated from lever 237) takes a midposition between contact elements 240 and 241. When the wheel is in its 9 position a tooth on lever 237 is dropped into a cut 226*a* of cam 226 and blade 239 contacts element 241. When the wheel 224 passes from the 9 to 0 position, a rise 226*b* rocks lever 237 to cause blade 239 to engage element 240. When the lever is so rocked, an arm 242 integral therewith is engaged and held by a spring-urged latch 243 which maintains the contact engagement between 239 and 240 until a pin 244 in gear 214 strikes an arm 245 integral with the latch 243 to release lever 242. The point in the cycle at which such unlatching occurs is indicated in the time chart. The accumulator is also provided with a mechanical knockoff or declutching mechanism which comprises three pins 251, 252 and 253 secured to the side of gear 214 and adapted during rotation of gear 214 to ride in succession under an edge of clutch lever 221.

Assume the clutch lever to be in the lower position, when either pin 251, 252 or 253 engages lever 221, it cams it upwardly into the position of Fig. 16 to disengage the clutch. The knockoff pins 251, 252 and 253 are effective at fixed points of the cycle as indicated in the timing diagram of Fig. 32. Knockoff pin 251 is used when entries are made according to the combinational hole system, knockoff pin 252 is used for clutch disengagement at the end of an entry, and 253 at the termination of a unit carry.

*Total readout*

The accumulator shown herein is provided with an electrical total readout which may be of the form shown and described in the patents to C. D. Lake et al., No. 2,232,006 and No. 2,138,636. Since the construction of the electrical total readout is well known in the art it is only shown diagrammatically in the wiring diagram of Fig. 31*l*. As shown therein rotatable with an accumulator wheel of each order is a brush 1044 which makes contact with a common current conducting segment 1045 and with one or another of the digit points or segments 1046 according to the digit representation of the accumulator order. The same digit contact points 1046 are interconnected by wires marked 0–9, or they may be strips engaged by brushes 1044. The digit segments 1046 receive digit impulses transmitted by cam contacts and according to the digit positions of each readout order, selected impulses are transmitted to the printer control magnets.

The present machine is provided with a printing mechanism which is adapted to print items and as shown herein to also print the totals entered in an accumulator. As will be clearer later on, the accumulator values are read out from the readout as decimal representaions and the impulses are used to control the printer.

*Printing mechanism*

In Fig. 9*a*, reference numeral 338 designates the printing impression drive shaft which is driven with a uniform speed of rotation for each cycle of the operation of the machine. The main drive shaft 27 which rotates one revolution for each machine cycle has secured thereto a large gear 340 (Figs. 11 and 12) which drives a gear 341 secured to the printing impression drive shaft 338 to rotate the latter at a uniform speed of rotation one and a half revolutions for each revolution of drive shaft 27. Reference numeral 339 designates the type selecting drive shaft which rotates two and one-twelfth revolutions for each operating cycle. At times, shaft 339 is driven with a uniform speed of rotation substantially synchronous with the drive shaft 338, but at other times the speed of rotation given to shaft 339 is decreased or increased with respect to the drive shaft 338 for a purpose to be more clearly understood later on. The variable drive for driving shaft 339 at the desired speed will now be described in detail.

*Means to drive shaft 339 at variable speeds*

To the side of the gear 340 (Figs. 12 and 14) and at the periphery thereof there are secured segmental bearing plates 342, 343. The plate 343 is provided with bearing slots 344 and plate 342 with bearing slots 345. Slidably mounted in such bearing slots is a cam follower plate 346. Hence, plates 342, 343 provide the bearing or support for the slidably mounted cam follower plate 346. Obviously, since the gear 340 carries in this manner the cam follower plate 346, the latter rotates with the gear 340 about the shaft 27 in the same counterclockwise direction (Fig. 11).

Cam follower plate 346 carries a cam follower roller 347, fitting in a cam race 348 of a cam plate 349 which is fixed by studs 350 to a stationary frame plate 351. The cam follower plate 346 has an extension 352 (see Figs. 11 and 14) which carries a stud 353 (Fig. 12) and carried by the stud 353 is a square block 354 fitting between plates 355 secured to one side of a gear 356. So far it is obvious that drive shaft 27 drives the gear 340 and through the connecting cam follower plate 346 the gear 356 is driven. The cam race 348 is so designed that the cam follower plate 346 may be moved away from or towards the center of the shaft 27 and to do this without interference the plate 346 has a longitudinal slot 357 (Fig. 14) encircling the shaft 27. Also in view of the movement given to gear 356 at times resulting from the movement given to cam follower plate 346 by the cam race 348 and which movement is relative to the gear 340, the gear 340 has an elongated slot 358 (Fig. 14) through which the stud 353 passes.

The gear 356 (Figs. 11 and 13), through the gear 359, drives the type selecting drive shaft 339 and thus the latter through the variable gear drive just described is driven at a variable speed through the operating cycle of the printing mechanism. For the proper operation of the machine disclosed herein main drive shaft 27 is driven counterclockwise as viewed in Fig. 11.

A group of type consisting of three alphabet type and one numeral type is allocated for each impulse 1–9, as shown in the code of Fig. 15. Shaft 339 is driven at a uniform speed of rotation between 120° and 270° (Fig. 32) and for each 15° four printing type pass the printing line. At about 270° the speed of rotation of the shaft 339 starts to decrease so as to present four printing type past the printing line for 27°. Between 120° and 270° of the cycle of operation, the roller 347 will cooperate with a substantially concentric portion of the cam race 348, and, since there will be no movement of cam follower plate 346 during this period, gear 356 will be driven counterclockwise at the same speed of rotation as the gear 340. When the cam follower roller 347 enters an eccentric cam portion between 270°–300°, the speed of rotation of the shaft 339 is reduced so that four printing type are presented for 27°. Between 300°–345° the eccentric part of cam race 348 so reduces the speed of shaft 339 that for each 15° only one printing tooth will pass by the printing point. At 300° the alphabet type which would be selected by the 0 impulse will be adjacent the printing line. At 315° of the cycle of operation the alphabet type of the selected group selected by the X impulse will be in position for printing at 330° the alphabet type selected by the R impulse will be in a position to print and at 345° the numeral type of the selected group will be in position to effect an imprint therefrom. Therefore, the slowing down of the speed of the rotation of shaft 339 is provided to selectively effect printing from the selected alphabet or numeral type of the selected group.

During the time that the cam follower roller 347 enters the very eccentric cam portion of cam race 348 between 300°–345°, the cam follower plate 346 under control of the cam race 348 moves outwardly (Fig. 11) with respect to the center of the shaft 27, thus, rotating the gear 356 in a clockwise direction opposite to the counterclockwise direction of rotation of the gear 340. This will result in diminishing the speed of rotation of the gear 356 and shaft 339 during the transmission of the 0, X and R zone impulses as just described.

After this reduction in speed of gear 356 the follower roller 347 then enters the cam portion after 345° and the latter is so designed as to move plate 346 inwardly (Fig. 11) towards the center of shaft 27 to cause gear 356 to rotate counterclockwise at a speed increased with respect to the gear 340. This increase in speed is initiated at 345° of the operating cycle and continues on over to the next operating cycle to 120° thereof. This increase in speed during such portions of successive machine cycles ensues to make up for the previous relative displacement of gear 356 so that at 120° of the cycle the gears 340 and 356 and parts driven thereby are always at the same relative position.

*Alphabet printing mechanism*

The machine is preferably provided with alphabet type and the impulses transmitted by the commutators select such type so as to print, aside from numerals, letters making up words or abbreviations, for thus printing each line derived from the card analyzed.

The printing mechanism shown herein is of the kind shown and described in complete detail in the patent to R. E. Page and H. S. Beattie, No. 2,438,071, dated March 16, 1948.

The alphabet type are selected by impulses according to the code shown in Fig. 15. The particular 0, X and R impulse determines which of the several type of a group selected by an impulse 1–9 will be printed. For example, if the impulse is "2" and no pilot impulse is utilized, i. e., neither the 0, X or R impulse, the digit 2 will be printed. If an impulse is also at 0 such impulse will select the type S; if the X impulse, type K will be selected and if the R impulse, type B will be selected.

Each impulse 1–9 selects a group of three non-numeral type and also a numeral type. As will be later described, if a numeral type is to be selected for printing, the printing impression will be taken at the "N" point in the machine cycle, which point is after the R zone impulse (see Fig. 32, timing for "N impulse"). The alphabet type selection is provided for by taking printing impressions before the time a numeral type would have been printed and this is effected under control of the 0, X and R impulses.

If the impulse is 9 alone, a printing wheel 360 (Fig. 9*a*) will be rotated counterclockwise until the "9" type is at the printing line and then the printing wheel 360 will be rocked by the N pulse to effect the printing impression. It will be noted that if an additional impulse such as an R is delivered then, under control of this impulse, the printing wheel will be rocked earlier than for printing the digit 9 to take an imprint from the I type. The X zone impulse will rock the printing wheel 360 to take an imprint still earlier to print R and the impulse 0 even still earlier to print Z.

The same principle of operation is provided for selecting the type of the other groups of alphabet type and the operation of the printing mechanism for effecting type selection and printing impressions will now be described in detail.

The impulses are transmitted under control of each readout commutator in the order 9, 8, 7 . . . 1, 0, X and R.

When the 9–1 impulses are transmitted a circuit is closed to a printing control magnet 361 (Fig. 9*b*) and for each column there is a printing control magnet. In the present machine, by mechanisms to be subsequently described in detail, this initiation is effected by the actuation of an operating link 363 (Fig. 9*a*) at a diffential time. For selection of type groups determined by the impulses 9–1, such operating link 363 is shifted to the left at differential times between 135–270° of the operating cycle as is shown in the timing diagram (Fig. 32). It will also be recalled that during this time, shaft 339 is being rotated at a uniform speed of rotation. The shifting of the operating link 363 at differential times is provided herein to transmit a diffentially timed mechanical impulse to trip the type selecting clutch shown in Fig. 9*a*, and now to be described in detail.

For each printing order there is pivoted on a rod 366 a triple armed member consisting of arms 364, 365 and a clutch release arm 367.

Shaft 339 has secured thereto a tube 368 which is fluted transversely along its periphery to provide clutch notches 369. Tube 368 constitutes the driving clutch member. Encircling the clutch tube 368 is a plurality of gears 370, there being one gear for each order of the printing mechanism. For mounting the gears 370 on the clutch tube 368, each gear has integral therewith a flange 372. To provide for the lateral spacing between the gears 370, the gears are guided by guide slots 371 formed in guide blocks 373, 374, and 375. By such spacing members the gears 370 are separated to allow independent rotation and also to locate a clutch pawl 376 which is pivoted on the related gear to cooperate with the clutch release arm 367. The clutch release arm 367 normally holds the clutch pawl 376 in such position that its tooth 377 is out of engagement with any of the clutch notches 369 of the clutch tube 368. When the clutch release arm 367 is rocked as a result of the actuation of the operating link 363 at a differential time, the clutch is engaged because a spring 378 attached to clutch pawl 376 will rock the latter in order that the clutch tooth 377 will engage a clutch notch 369 determined by the differential time the operating link 363 is actuated. The above described clutch is the printing type selecting clutch and causes the differential rotation of the printing wheel 360, since the gear 370 and the printing teeth of the type carrying wheel 360 are intergeared.

Figs. 9*a* and 9*b* show the arrangement of the printing devices for a single order and the machine is preferably provided with a number of such devices for printing a plurality of characters.

If the operating link 363 was shifted at about 138° as a result of the 9 impulse, the clutch release arm 367 would be rocked at this time and pawl 376 would be released and rocked by spring 378 so that clutch tooth 377 engages a clutch notch 369 and printing wheel 360 will thereafter continue to rotate to such position as to successively present the characters Z, R, 1 and 9 of the group selected by the 9 impulse (see Fig. 15) to the printing line between 333°–345°. The differential time at which the operating link 363 is actuated determines the extent of counterclockwise rotation of the printing wheel 360 necessary to select a group of type for printing between 330°–345°. After the predetermined extent of rotation of the printing wheel 360 has been effected and the printing impression has been effected, with the type selecting clutch still engaged, the printing wheel 360 will continue to rotate until the free end of the clutch pawl 376 strikes the clutch release arm 367 which, in the meantime, has been brought to its normal position, by means of a compression spring 379 (Fig. 9*a*). When such disengagement is effected the printing wheel 360 is at the normal position shown in Fig. 9a.

Each printing wheel 360 is carried by an arm 381 loosely pivoted upon a rod 382 and provided with a rearwardly extending follower extension 384 which is operated by a cam projection 383 of a cam disk 385 which constitutes a driven member of a printing clutch.

Shaft 338 rotates a clutch tube 386 fixed thereto, and likewise encircling the clutch tube 386 is the driven clutch disk 385 upon which is pivotally mounted a clutch pawl 387. Clutch disc 385 and parts carried thereby are guided similarly to gear 370. Associated with the clutch pawl 387 is a clutch release arm 388. When the clutch engagement is effected between the clutch pawl 387 and one of the clutch notches of the clutch tube 386, the disk 385 will be rotated in a clockwise direction, whereby the cam projection 383 will cooperate with the follower extension 384 to rock arm 381 about the rod 382 against the action of a return spring 389. The engagement of the clutch now being described is effected at differential times when the printing control magnet 361 for each order is energized for the second time under control of one of the 0, X and R impulses.

At the present time it should be understood that while the 0, X and R impulses are being transmitted the clutch release arm 388 will be rocked to clutch release position. As a result of this clutch engagement, the cam extension 383 approaches the follower extension 384 at the time shaft 339 is rotating at a diminished speed between 330°–345°, to present the type of selected group successively to the printing line. Thus, the particular type which is to be selected from the selected group for printing will depend upon the differential time that the printing control magnet 361 receives a second impulse and, therefore, the time at which the printing clutch is engaged. If the 0 impulse is transmitted the printing clutch is engaged at the earliest time so as to select the first alphabet type of the selected group. If the impulse is X the printing clutch is engaged at a later time when the next alphabet type of the selected group is at the printing position and obviously when the impulse is R the printing clutch will be engaged at a still later time when the third successive alphabet type of the selected group is at the printing position. By the engagement of the printing clutch at a differential time the desired alphabet type and the numeral type of the selected group may be selected.

When the printing clutch engagement has been effected, each cam 385 will cooperate with the related follower extension 384 to rock the associated printing arm 381 to force the printing wheel 360 against the usual inking ribbon and platen 390 around which is positioned the paper strip to be imprinted. As each arm 381 is rocked against the action of the spring 389, the printing wheel 360 is being rotated counterclockwise but, since the printing wheel is now rolling over the gear 370, this rolling action will cause an equal and simultaneous rotation in a clockwise direction. Both of these opposite rotations will, in effect, cause the printing wheel to be immobile with respect to its rotation when it moves to the right to strike the platen 390, the type striking the platen squarely and firmly to cause a legible impression.

After the printing operation, when cam extension 383 of the cam disk 385 passes by the follower extension 384, spring 389 will now be effective to return the type wheel carrying arm 381 to normal position and the extension 384 now bears against the circular peripheral edge of the cam disk 385.

After the printing operation, since the type selecting clutch is still engaged, the printing wheel 360 continues to rotate as previously stated until the clutch pawl 376 strikes the clutch release arm 367 which, in the meantime, has been positioned to normal, thereby disengaging the type selecting clutch when the printing wheels are at normal position.

The printing clutch continues its engagement for a complete rotation of the cam 385 and clutch disengagement is effected by the engagement of the clutch pawl 387 with the clutch release arm 388.

It has been found in practice that when the disengagement of the pawl 376 for the type selecting clutch is effected by striking the clutch release arm 367, there is a tendency of the clutch pawl 376 to rock counterclockwise about its pivotal point, unduly stretching the spring 378. To prevent this action a cushioning arrangement is provided to hold the pawl 376 and is shown partly in the lower right-hand corner of Fig. 9a and more completely in Fig. 10. In a preferred arrangement this constitutes for each type selecting clutch a double arm 392. One arm cooperates with a cam portion 393 of the clutch pawl 376 and the other arm bears against a spring pressed plunger 394 inserted in an aperture 395 partly filled with oil. As the clutch pawl 376 comes around to its normal position, it will strike the clutch release arm 367, forcing its clutch tooth 377 out of the clutch notch 369 it previously engaged, and the cam portion 393 of the clutch pawl 376 will strike one arm of the double arm 392, forcing the opposite end downwardly to press the plunger 394. This will force the oil out of the bottom of the recess 395 and around the plunger 394, thus providing a cushioning action on the arm 392 to restrain the clutch pawl 376 so that it cannot move too far outward.

As the free end of the clutch pawl 376 strikes the clutch arm 367 there is a tendency to cause the gear 370 to rebound counterclockwise. This action is prevented by the cooperation of a spring-pressed detent 396 with a shoulder 397 of a plate 398 secured to each gear 370. When the normal position of the clutch is obtained, the detent 396 will engage the shoulder 397 to prevent such rebound and retain the clutch parts in their normal position.

A somewhat similar rebound preventing mechanism is also provided for the printing clutch which consists of a spring pressed detent 391 cooperating with the shoulder 399 of the cam disk 385.

*Translating and impulse converting arrangement*

The purpose of the above entitled arrangement herein is to translate and convert differentially timed electrical impulses to mechanical impulses and delay the transmission of each mechanical impulse to a later point in the cycle for the purpose of selecting a group of type corresponding to the differentially timed electrical impulse transmitted.

Herein the converted and delayed mechanical impulse is used for the purpose of type group selection. The arrangement for one denominational order is shown in Figs. 9a and 9b.

Cams 400A, 400B, 400C and 400D are driven by driving means to be subsequently described, one revolution for each cycle of operation of the machine. It will be noted that these cams differ in their cam contours and the particular cam portion which is effective in each point of the operating cycle is shown in the timing diagram of Fig. 32. Each of the cams is provided with cam heights which are identified by three dotted circles associated with the cam 400A (Fig. 9b), which circles are of three different diameters and represent the heights of the cam contours as "low," "medium" and "high." The corresponding designation is shown in the timing diagram of Fig. 32 for such cams to identify the particular cam portion effective in each point of the operating cycle. The cams 400A, 400B, 400C and 400D may for convenience in construction be extended longitudinally as shown in Figs. 12 and 13 to provide fluted cam rods having the configuration and outline shown in Fig. 9b to cooperate with a plurality of orders.

Each cam 400 cooperates with a related releasing and blocking member 410. The reason that the member 410 is called releasing member is that when elevated a predetermined distance by the "medium" or "high" cam portion of the related cam 400 it will release the operating link 363 for movement but when in its normal lower position (due to the "low" cam portion) it will block the link 363 against movement. Each member 410 is slidably mounted in a slot 401 of a guide block 402 and is further guided by a rod 404 which receives a guide slot 403 of the related member 410. Also pivoted on a rod 405 carried by the clock 402 is a latch pawl 406. Interposed between the pawl 406 and the associated member 410 is a compression spring 407, the spring 407 functioning to urge the member 410 downwardly so as to always press against and contact with the cam contour of the related cam 400. Each member 410 is provided with a shoulder 408 cooperating with a lug 409 formed as an integral part of the link 363.

The link 363, referring to Fig. 9a, is slidably mounted in guide slots formed in a support plate 411 to support the link 363 at one end and guide its movement, and referring to Fig. 9b the other end of the link 363 is dependently hung by arm 413, which arm has a cam follower extension 418. A compression spring 414 fitting in a spring support and guide block for arm 413 urges the link 363 to the left and when such spring is effective for action under control of a cam 425 it serves as the source of mechanical impulse transmitted to link 363 at a differential time to rock the clutch release arm 367 to initiate type group selection.

Recalling now that each cam 400 has cam contours of three different heights, it should be observed that when member 410 is at a position determined by the low portion of the cam 400, the shoulder 408 abuts lug 409 to block the link 363 from movement to the left, urged by expansion of the spring 414. In attempting to do so lug 409 will bear against the shoulder 408 and urge the member 410 clockwise, which movement is restrained by the cooperation of an upstanding hooked portion 412 of member 410 against the latching end of the pawl 406. Assuming now that a cam has been rotated so that the "medium" cam portion of the cam contour has raised the member 410, such difference in cam height with respect to the "low" cam height will elevate shoulder 408 slightly further above the related lug 409 and by the continued cooperation of the hooked extension 412 of the member 410 with the extremity of the pawl 406, clockwise movement of the pawl 410 will be still restrained.

Assuming now that the "high" cam portion has positioned the member 410 to its maximum height, the shoulder 408 will be still further above the lug 409 and the member 410 is now in such position that the compression spring 407 will be effective to rock the member 410 clockwise so that a hooked extension 412 will catch over the latch end of pawl 406, provided that at this time the pawl 406 is rocked counterclockwise due to the concurrent transmission of an impulse at the time the member 410 is in its highest position. If the pawl 406 is not rocked slightly counterclockwise, no latching of the member 410 will take place. Summarizing, whenever the "high" portion of a cam has elevated a member 410 to the highest position, such member will be latched if the related pawl 406 is concurrently rocked to latching position. If there is no rocking of the pawl 406 at this time, member 410 will not be latched, and will be subsequently free to move up and down in accordance with the successive cam contour as the related cam 400 rotates.

The above description has been confined to the operation of the parts under control of the cam 400A but it should be noted that identical operations are effected under control of the remaining cams 400B, 400C and 400D. For this reason, the description of operation need not be repeated for duplicate parts.

For the purpose of rocking the pawls 406 to latch those members 410 which are at their highest position at the time an impulse is transmitted, it will be seen that referring to Fig. 9b each magnet 361 when energized attracts an armature 415 and rocks the same so as to shift a related connected link 416 to the left. Depending from the link 416 are four integral extensions 417, each of which cooperates with the related pawl 406. The result of this construction is that the impulse directed to the magnet 361 will shift the link 416 and rock the four pawls 406 concurrently but only that pawl 406 is effective for latching the related member 410 if the associated member 410 has been elevated to its highest position. Therefore, one or more of the pawls 406 may be rocked idly at the same time without latching the related members 410.

To prevent the armature 415 from sticking to the core of the magnet 361 due to residual magnetism, it is desirable to provide means to positively restore the link 416 and armature 415 to normal by mechanical means timed with the rotation of the cams 400. To this end there is provided a magnet knockoff cam 420 (Fig. 9a) notched as shown. A follower arm 421 of a clutch release arm 424 cooperating with the cam 420 has a mechanical connection 422 with the link 416. At the time the magnet 361 is energized it will be observed that follower arm 421 cooperates with a notch 420a of the cam 420. Thereafter, such arm cooperates with the following cam portion 420b to rock arm 421, link 416 and armature 415, restoring the armature 415 to normal if it should remain attracted to the core under the above circumstances.

Referring now to Fig. 32, it is obvious that at the time the impulses 9–1 are transmitted under control of a readout commutator, one or more cams 400 will have their "high" portions in cooperation with the latching members 410. At the time the 9 impulse is transmitted the high portions of cams 400A and 400C will be effective. At the time the 8 impulse is transmitted only cam 400A will have a high portion effective at this time. For all of the impulses 9–1, this condition may be represented by the following table:

| Impulses | Members 410 Latched |
|---|---|
| 9 | 410A, 410C |
| 8 | 410A |
| 7 | 410B, 410C, 410D |
| 6 | 410B, 410C |
| 5 | 410B, 410D |
| 4 | 410D, 410C |
| 3 | 410B |
| 2 | 410C |
| 1 | 410D |

It is obvious from the above table that members 410 are latched singly or in predetermined combinations, so that at the termination of the transmission of the impulses 9–1, some of the members 410 will be latched and others will not be latched and therefore free to be positioned according to the contour of their cams during their subsequent rotation. It is explained that once a member 410 is latched it is not free to thereafter move upwardly and downwardly in accordance with the subsequent cam contour of the related cam, but remaining unlatched members can do so.

Cam 425 through driving means to be subsequently explained, is driven synchronously with the cams 400 and 420 and cooperates with the follower extension 418 of arm 413.

After latching of members 410 in predetermined combinations the contour of the cams 400A, 400B, 400C and 400D which are thereafter effective will determine the time in the operating cycle that the operating link 363 will be moved to the left in a manner now to be described in detail:

After one or more members 410 are latched in combination according to the impulses transmitted as indicated in the preceding table, the further rotations of the cams 400 will raise and lower the remaining unlatched members 410 according to the cam contours of the respective cams, but during said further rotation of the cams the link 363 will be restrained against movement by one or more of such unlatched members until a point is reached in the operating cycle when the cams related to the unlatched members concurrently present cam operations of "medium" height to the unlatched members. It will be recalled that since the latched members 410 are so positioned that they do not restrain the movement of the link 363 under the influence of the spring 414 and further the elevation of any unlatched member by a cam portion of "medium" height will also unlock the link 363, it is obvious that when both of these conditions exist for four of the latches 410, the link 363 is then free to move under the influence of the spring 414 and cam 425. This will be made clear by reference to a particular example.

If, for example, the 9 impulse is selected, members 410A and 410C are latched due to the "high" cam portion of their respective cams 400A and 400C and such latching of members 410A and 410C occurs about 7½° of the operating cycle when the 9 impulse is transmitted (see Fig. 32). At this time the members 410A and 410C are latched in the highest position so that they unlock the operating link 363 at such positions. However, cams 400B and 400D in their subsequent rotation continue to raise and lower the related unlatched members 410B and 410D and one or the other of such unlatched members 410B, 410D will restrain the operating link 363 from movement until about 138° of the operating cycle, at which time both cams 410B and 410D, through their "medium" high cam portions, shift related latching members 410B and 410D to unlock the link 363. At this time cam follower extension 418 of the arm 413 will cooperate with the notch 425*b* designated "9" in both Fig. 9*b* and the timing diagram of Fig. 32. Operating link 363 is now unlocked at four points and the movement of the link to the left is effected at about 138° by spring 414. The link will now operate the clutch release arm 367 and therefore engage the type selecting clutch to initiate the rotation of the printing wheel 360 to select the group of type, 9, Z, R and I.

The type selecting clutch will be engaged at about 150° of the operating cycle and from the timing diagram (Fig. 32) the type carrying wheel 360 will rotate 4, 4, 4, 4, 4, 4, 4, 4, 4, or thirty-six teeth, and at about 300° of the operating cycle the Z type will now be in position to print. At 300° of the operating cycle, the speed of rotation of the type wheel is decreased to successively present the type of selected group in the order Z, R, I, and such type are selected for printing in accordance whether the pilot impulse is 0, X or R.

Reverting now to Fig. 9*b*, when the operating link 363 is moved to the left to effect the engagement of the type selecting clutch, the cam follower extension 418 is in the bottom of the notch 425*b* of the cam disk 425 and further rotation of the cam 425 in a clockwise direction will, through the following inclined cam portion 425*c*, cooperate with the cam follower extension 418 to positively restore the operating link 363 to the right without, however, causing the unlatching of any latched member 410. At about 330° an extra high cam portion 425*d* will shift link 363 to the right beyond the Fig. 9*b* position, and in so doing, for those members 410 which have been latched, lug 409 will engage the shoulder 423 of the respective member 410 to rock the same counterclockwise to unlatching position, spring 407 being compressed during this operation to rock the pawl 406 to normal position shown in Fig. 9*b*. With respect to any unlatched member 410, movement of the operating link 363 to the right at this time may also effect movement of such members 410 but the operation of such is ineffective.

It is desirable to provide means in insure that the clutch release arms 367 are at their normal position and will remain so when engaged by the extremities of the clutch pawls 376 to unlatch the latter from the ratchet teeth 369. Such means now to be described is independent of the spring 379. Referring to Fig. 9*b* there is pivoted on a shaft 428 a plate which has fixed thereto a comb plate consisting of spring formed fingers 429 which bear against the lower extensions 365 of the clutch release arms 367. Attached to shaft 428 is a follower arm 430 carrying a roller 431, cooperating with a cam 432 secured to a drive shaft 443. From Fig. 32 it will be seen that a cam rise 432*a* operative at about 306° of the operating cycle is effective to cooperate with the follower roller 431 to rock the shaft 428 counterclockwise, pressing the spring fingers 429 against the related extensions 365 of the clutch release arms 367, positively retracting them to the normal position shown in Fig. 9*a*. Thus, it is insured that clutch release arms 367 will be in such position that they will be in the path of the free ends of the clutch pawls 376 to move them to unclutching positions.

A low portion 432*b* of such cam 432 is effective to enable the follower arm 430 to be rocked by a spring 433 to cooperate with such low portion 432*b* which releases the spring pressure on the clutch release arm 367 to free the latter for rocking to engage the type selecting clutch.

Upon transmission of such 0, X, R impulses through circuits to be described, the second energization of the magnet 361 again attracts its armature 415 and shifts link 416. The latter thereupon rocks the clutch release arm 424 to unlatch the clutch release arm 388 of the printing clutch. At this time a low portion 420*c* (see Figs. 9*a* and 32) of cam 420 cooperates with the cam follower extension 421 so as not to restrain the rocking of clutch release arm 424. When the clutch release arm 388 is unlatched a depending extension 427 moves in a clearance portion 426 of said arm 424. Cam disk 383 will now rotate clockwise and the cam extension 383 will strike the follower extension 384 at the time the selected type is at the printing line to effect the printing impression.

It is undesirable to have the clutch release arm 388 released whenever link 416 is rocked the first time to rock arm 424 and to this end a high portion 437*a* of cam 437 cooperates with arm 388 to block it against movement to release the printing clutch during transmission of impulses 1–9. When impulses 0, X and R are transmitted the low portion 437*b* of cam 437 (see Fig. 32) will cooperate with clutch release arm 388 to permit its rocking to engage the printing clutch. After the transmission of the 0, X, R impulses the cam rise 437*c* of cam 437 will function to positively retract the clutch release arm 388 to normal position to cause disengagement of the clutch release pawl 387 after a complete revolution of the printing clutch. At the termination of the operating cycle, a cam rise 420*d* of cam 420 functions to rock the clutch release arm 424 counterclockwise to again position it beneath the extension 427 of the clutch release arm 388, which previously has been elevated to the position shown in Fig. 9*a*. The cam rise 420*d* also shifts link 416 to restore armature 415 to normal if it should stick to the core of magnet 361.

While the operation of the machine has been described in connection with the selection of the group of type under control of the 9 impulse the same principle of operation for effecting the above results is involved for other impulses as is evident from the following table:

| Impulses | Members 410 Latched | Mechanical Impulse at | Cams 400 at Medium Cam Portion |
|---|---|---|---|
| | | *Degrees* | |
| 9 | 410A, 410C | 138 | 400B, 400D |
| 8 | 410A | 153 | 400B, 400C, 400D |
| 7 | 410B, 410C, 410D | 168 | 400A |
| 6 | 410B, 410C | 183 | 400A, 400D |
| 5 | 410B, 410D | 198 | 400A, 400C |
| 4 | 410C, 410D | 213 | 400B, 400A |
| 3 | 410B | 228 | 400A, 400C, 400D |
| 2 | 410C | 243 | 400A, 400B, 400D |
| 1 | 410D | 258 | 400A, 400B, 400C |

It will be recognized from this table that the concurrent position of cams 400 at a "medium" height cam portion for those cams which have not previously latched members 410 will determine the time the mechanical impulse is transmitted.

The machine includes a driving means driven by the shaft 27, Fig. 11, for rotating the cams 400A, 400B, 400C and 400D, 420, 425, 432, and 437 in synchronous relationship and such cams are driven one complete revolution for each operating cycle.

The driving means for driving cams 400A, 400B, 400C and 400D will now be described. Secured to shaft 27 is a gear 440 which, through a gear 441, drives a gear 442 secured to the drive shaft 443 for the cam 400D and cam 432. Shaft 27 is extended, as shown in Fig. 13, to directly drive the cam 400C. Referring to Fig. 11, gear 440, through a gear 444, drives a gear 445 secured to the drive shaft 446 for cam 400B. Gear 445 through an idler gear 447 drives a gear 448 secured to the drive shaft 449 for the cam 400A. By such driving means the cams 400A, 400B, 400C, 400D and 432 are driven synchronously.

Referring to Fig. 11, gear 444 has rotatable therewith a gear 450 which, through an idler gear 451, drives a gear 452 attached to the shaft 453 to which the cam 425 is secured.

Gear 450 also meshes with a gear 454 secured to a shaft 455 to which shaft the cam 420 is secured.

Also referring to Fig. 11, to shaft 338 driven by gear 341 there is secured a gear 456 which meshes with a larger gear 457 secured to a shaft 458 to which shaft the cam 437 is secured.

Thus, through the intergearing last described, the operating cams 420, 425 and 437 are driven synchronously with the operating cams 400A, 400B, 400C and 400D.

Other special signs may be printed under control of combinations of digit perforations, N, 8 and 3, or 8 and 4 with the code perforations 0, X or R as set forth in the patent to R. E. Page et al., 2,438,071, issued March 16, 1948, and copending H. S. Beattie et al. application, Serial No. 74,424, filed February 3, 1949.

Each detent lever 396 is shaped with a downwardly extending arm 311 for closing a pair of contacts 312, which is used to control accumulation and transfer of totals. The lever is cammed in a clockwise direction early in the cycle of movement of the printer clutch by a cam shape on the plate 398 fastened to the side of gear 370. Since the timing of the printer clutch release is digital, and proportional to the value of the digit to be printed, the release can cause closure of contacts 312 for control of accumulation.

Whenever the number entered in an accumulator is also listed, the impulse controlling the accumulator magnets is derived from closure of the contacts 312, Fig. 9*a*, in the printer. In other words, the record is sensed to control the printer, and then the printer in turn, while being adjusted to select a numeral type, also selects the addition of the identical number in the accumulator. In this way there is assurance that the number printed is the same as the number added.

When numbers are to be accumulated without being listed, then a direct connection may be made between the card sensing devices and the accumulator magnets.

*Storage mechanism*

The storage mechanism comprises two sections such as that of Fig. 18, each section having two groups or units of sixteen controlling magnets. Therefore there are four storage units designated A, B, C and D. Both the sections are nearly identical in construction so that a description of one pair of units applies as well to the other pair.

In Fig. 18, the two storage units A and B are shown with the sixteen entry control magnets SA and SAC for the unit A at the bottom and the control magnets SB and SBC for unit B at the top. For unit A there are eight magnets SA and eight magnets SAC, the former for storing the 9–1 or digital part of the alphabetic code data, and the latter for storing the 0, X and R code portions of the alphabet data. In the instances of storing numeric rather than alphabetic information, the magnets need not be paired and it is not necessary to cut the capacity of the storage unit in half, instead, all sixteen magnets of a storage unit may be used for separate numbers.

Since units B and C are also used herein for storing alphabetic address data, it will be understood that they also have paired control magnets SB, SBC and SC, SCC similar to those of units A and B. The mechanism for each unit is mounted between and on a pair of side plates 456 (Figs. 18, 18a and 19) secured together by six magnet support bars 457, two stop pawl support bars 458 and two spring anchoring bars 459. The magnet support bars 457 are secured to plates 456 by means of angle strips 460 secured to said plates.

The two rigid frames thus formed by plates 456 and the bars 457, 458, 459 are mounted on shafts 461 secured to the main framework of the machine.

There is provided a separate drive shaft 467 (Figs. 18 and 19) for each storage unit, which shafts are journaled in the frame plates 456. Secured to the shafts 467 are gears 468 which mesh with gears 469 secured to a main drive shaft. Each shaft 467 has secured thereto a pair of bail operating cams 470 each of which is located adjacent one of the side plates 456, and also a pair of restoring cams 471a, 471b (see Fig. 20) located close together on a common hub near the center of the shaft. Thus shaft 467 and cams 470, 471a, 471b are rotated continually by the main drive shaft.

Each of the storage units is provided with a main support rod 472 (Figs. 19 and 20) which is secured to the centers of the side plates 456 and the bulk of the moving parts of the units are supported by these rods. Rotatably mounted on rod 472 in interspersed relation are two series of settable sectors designated 473, 474 in Figs. 18 and 19. There may be sixteen sectors in each series to correspond with the number of magnets in the storage units. In the case of the upper storage unit B, each sector 473 is associated with one of the storage control magnets SB or SBC and is opposite one of the lower sectors 474 which sector, in turn, is associated with one of the magnets SA or SAC. There is a magnet like SA and a sector 474 for each denominational order of each storage unit. The sectors 473, 474 for each denominational order of opposite storage units are located side by side but are separated by certain parts which are mounted on rod 472 between the sectors. The pairs of sectors may be separated from each other by suitable spacing washers or by the hubs to which the sectors are secured.

The bars 458 (Figs. 18a, 19 and 20) are transversely slotted and are also longitudinally grooved to support pivot wires 475. The wires 475 act as pivots for stop pawls 476 located in and spaced by the transverse slots in the bars 458. There is a stop pawl 476 for each sector 473, 474 and each pawl is located in the plane of its cooperating sector so as to be capable of engaging ratchet teeth formed in the sector. Springs 477, anchored to the pawls and to the spring anchoring bars 459, tend to rock the pawls 476 into engagement with the ratchet teeth on the sectors 473, 474. Combs 458a secured to bars 458 hold the pawls 476 and sectors 473, 474 in alignment.

Normally the pawls are held out of engagement with the sectors by means of the armatures 478 of the magnets. The storage control magnets SA, SB, SC, etc. are mounted on narrow plates 479 (Figs. 18 and 19) each secured to the central bar 457 and to one of the outer bars. Since the coils of the magnets are larger in diameter than the width of the space allotted to each pair of sectors 473, 474 with their pawls and other parts comprising one denominational order, the magnets of each group of sixteen are arranged in two parallel rows of eight each, with the magnets in staggered relation. Thus the two pawls 476 associated with the two sectors 473, 474 shown in Fig. 19 are controlled by the left hand magnet SB and the right hand magnet SA, while the right hand magnet SBC and the left hand magnet SAC control the pawls associated with the pair of sectors 473, 474 immediately behind those shown in Fig. 19.

Normally the magnets SA and SB will be plugged to the "name" and "street" fields of card sensing contracts, respectively, to place magnets SA under control of the holes in the name field of heading card HC, Fig. 1, and magnets SB under control of the address field of the same card. Similarly, a third set of magnets SC will ordinarily be connected to the "city-state" field of sensing of card HC.

The magnets have L-shaped yokes 480 (Fig. 19) secured to the plates 419 by the same screws 481 as are used to secure the cores of the coils to the yokes. The vertical portions of the yokes are provided at their ends with rectangular slots (see Fig. 18) to form a pair of posts 480b which project through aligned slots located on opposite edges of the armatures 478. The horizontal portions of the slots in the yokes 480 and the sides of the slots in the armatures 478 are slightly beveled and these beveled portions coact to form pivots for the armatures. Springs 482 (Figs. 18 and 19), attached to the armatures 478 and to pins carried by yokes 480, tend to hold the armatures in engagement with the stop pawls 476.

The free ends of armatures 478 associated with the right hand row of magnets SBC (Fig. 19) and the left hand magnets SAC, rest on shoulders formed in the tails of the associated pawls 476 and abut the vertical walls of the shoulders. The armatures 478 for the left hand magnets SB and the right hand magnets SA have openings adapted to hook over the tooth formed by the shoulders in the pawls and rest on the shoulders. Thus the armatures 478 normally hold pawls 476 out of engagement with the sectors 473, 474.

Rotatably mounted on the rod 472 are two bails 483, 484 associated with the two series of sectors 473, 474, respectively. The bail 483 projects through the planes of all the sectors 473 and is connected to the sectors by means of springs 485 which tend to draw the sectors 473 into engagement with the bails so that oscillation of the bails will cause the sectors to follow the movements of the bails back and forth provided none of the pawls 476 has been released. Bail 484 is similarly associated with sectors 474.

Oscillation of the bails is controlled by the two cams 470. Rotatably mounted on rod 472 adjacent the side plates 456 are cam follower levers 486 (Fig. 19) having rollers 487 engaging the respective cams 470. The ends of the levers 486 engage the ends of screw studs 488 located at the ends of bails. Heavy coil springs 489 (Fig. 20), anchored to pins 490 carried by the arms of the bails and to brackets 491 secured to plates 456, have a tendency to rock the bails in a clockwise direction (Figs. 19 and 20) and thereby, through the screw studs 488, press the rollers 487 into contact with cams 470.

There are twelve ratchet teeth in each sector 473, 474 and also abutments 473*a*, 474*a* comprising stops projecting a greater distance radially of rod 472 than the ratchet teeth so as to arrest the sectors in an extreme position by engaging the ends of stop pawls 476 in every case where a stop pawl is not released by energization of a magnet. In other words, the sectors 473, 474 will always move to extreme positions unless stopped in other position by release of the stop pawls 476. The ratchet teeth have the code values shown in Fig. 19 by the small numerals and letters adjacent the teeth and the cams 470 are so shaped that, as the bails move in a counterclockwise direction, the ratchet teeth will pass the ends of pawls 476 in synchronism with the sensing of the corresponding index-point positions on the record cards. In other words, all of the "9" teeth will be approaching and close to the ends of pawls 476 when the brushes reach the "9" index point-position and so on for the other index-point positions.

Fig. 19 shows the positions the sectors 473, 474 for the tens order of the unit assume when in the restored condition and both bails 483, 484 have moved to their limit of travel in a clockwise direction. Other positions and dwells are reached and held as illustrated in the timing chart, Fig. 32.

Normally, movement of the bails 483, 484 is prevented by mechanisms controlled by certain restoring magnets designated SRA and SRB. The mechanism controlled by magnets SRA and SRB is shown in Fig. 20 which illustrates the bail control mechanism for the A and B storage units. Restoring magnets SRA and SRB are constructed like the comparing magnets SA, SB, etc. and are similarly mounted on the bars 457 by means of plates 479*a* like the plates 479. The armatures 478*a* of magnets SRA, SRB engage shoulders in stop pawls 492 actuated by springs 493 anchored to bar 459. The stop pawls project into the paths of stop arms 494 pivoted on slotted blocks 495 secured to the centers of bails 483, 484. Springs 496, anchored to bails 483, 484 and to ears formed in the stop arms 494 normally hold the stop arms against extensions 488 on the bails which act as stops to limit counterclockwise movement of the stop arms.

Knock-off mechanism is provided for the armatures of the storage magnets SA, SB, etc., and the restoring magnets SRA, SRB, etc. The knock-off mechanism for the magnets SA and SB is shown in Fig. 20. A separate knock-off bail 522 is provided for the armatures of each group of magnets SA, SB, SC and SD. Each bail is pivoted on a pair of screw studs 523 carried by side plates 456 and it extends transversely of the tips of armatures 478 on the same side thereof as the coils of the magnets. Springs 524 anchored to fixed studs, hold the knock-off bails against the pins 525 projecting from the side plates, and said pins act as stops for the knock-off bails. Secured to each bail is a pair of adjustable side arms 526 which extend into the paths of bails 483, 484. When the latter push the sectors 473, 474 back to their starting position by rotation in a clockwise direction, Fig. 19, the noses of pawls 476 wipe over the teeth in sectors 473, 474 and eventually ride up on the smooth portions 473*b*, 474*b* of the sectors which are made slightly higher than the teeth for the purpose of camming the pawls 476 slightly beyond the latching position At this point the bails 483, 484, Fig. 20, strike the arms 526 and rock bails 522 counterclockwise thereby forcing the armatures 478 into latching relation with the pawls 476 in the event the armatures should stick to the poles of the magnets.

Figure 18A:
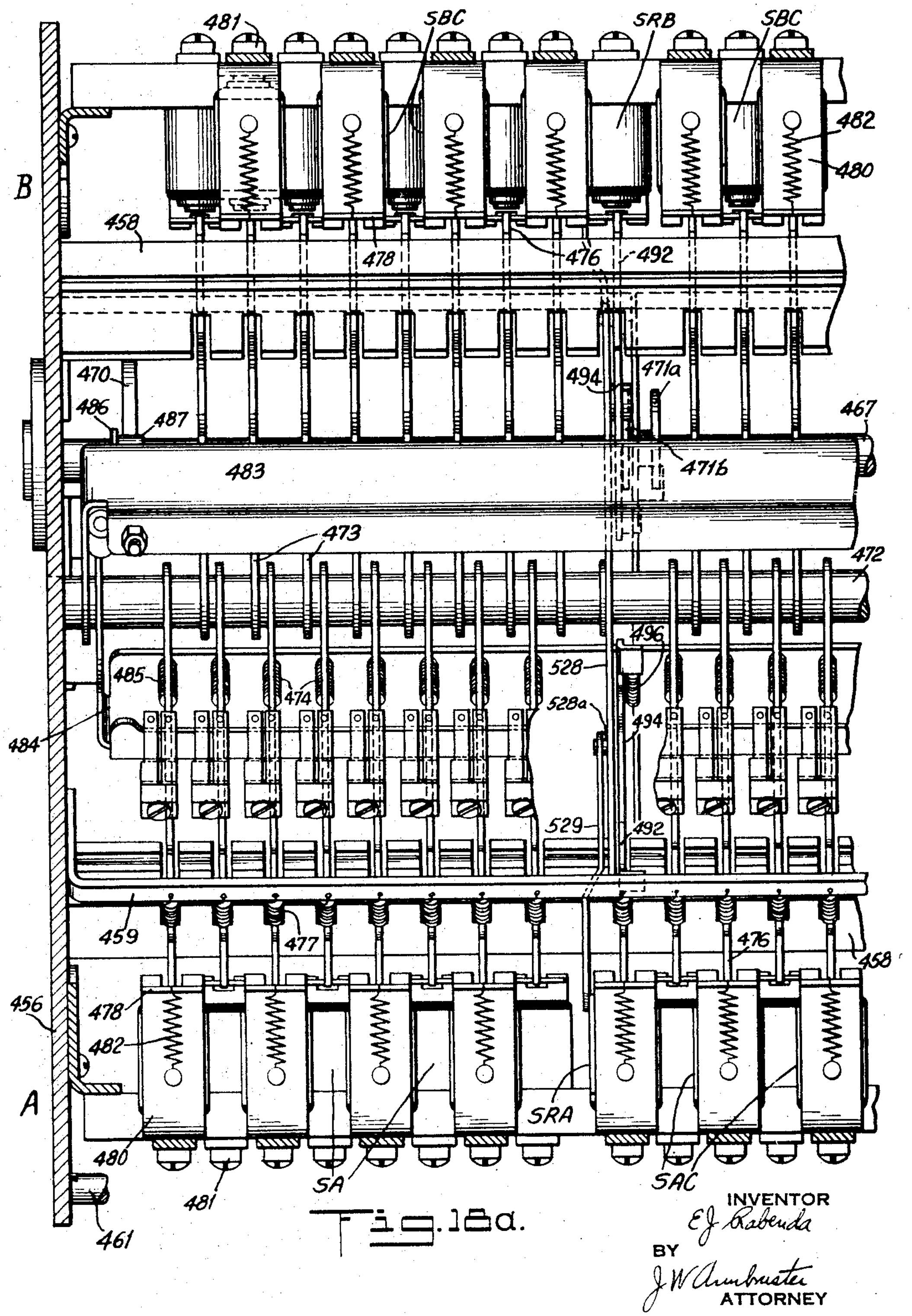

The knock-off mechanism for magnets SRA, SRB is illustrated in Figs. 18*a* and 20. Rockably mounted on rod 472 is a cam follower lever 528 having two rollers cooperating with the cams 471*a*, 471*b* whereby the lever is oscillated periodically when shaft 467 rotates.

Lever 528 has two pin and slot connections 528*a* to arms of two armature knock-off levers 529, each associated with one of the magnets SRA, SRB. The levers 529 are pivoted on brackets 530 secured to the L-shaped yokes 480*a* of the restoring magnets SRA, SRB and the other arms of levers 529 have bent-over lugs cooperating with the armatures 478*a* of the restoring magnets. It is apparent that once in each cycle of shaft 467 the lever 528 will be rocked clockwise, thereby operating the levers 529 to force the armatures 478*a* away from the poles of the magnets. Before this takes place, lever 528 rocks the pawls 492 slightly by engagement of cam shapes 531 formed in said lever with tabs 492*a* formed on pawls 492, said pawls are rocked counterclockwise slightly beyond their latching positions with armatures 478*a*. Thus both the pawls 492 and armatures 478*a* are positively restored whenever sticking thereof occurs. The other storage unit is similarly constructed.

The storage contact devices or impulse emitting controls are shown in Figs. 18, 18*a* and 19. They are provided as an electrical setting means whereby regularly timed impulses may be directed through to take off a reading of the data set up in storage.

Fastened across the unit between side plates 456 is a pair of heavy bars 590 from which extend guides for extending portions 599 of the sectors 473, 474. These bars 590 also provide the main fastening means for the commutator or contact means of the storage unit. The commutator for sectors 473 is mounted at the right and is the same as the commutator for sectors 474 which is mounted at the left and is to be described as typical of all four such devices.

The commutator is an arcuate frame with two end pieces 588 of insulation material having fastened thereto an upper bar 591 and a lower bar 592. The two bars 591 and 592 extend across the entire unit, and at the top, bar 591 is fastened by screws 587 to bar 590, and at the bottom, bar 592 is affixed to a pair of angles 589 fastened to the side plates. Embedded in the insulation 588 is a set of fourteen contact bars 594 with prongs 594*a* engaging in notches in end pieces 588. Each bar has a solid body portion 593 across the unit and is split into prongs at the ends for assembly purposes. However all fourteen contact bars are distinct and separate and remain insulated electrically one from the other. The inner surfaces of bars 594 provide means for contacting with the settable devices and the outer prongs 594*a* provide means for connecting to emitting devices for bringing the reading impulses to the storage unit.

Although fourteen contact bars are shown, the two end bars are only extreme position indicators and are not used in the present instance. The twelve sets of bars representative of the twelve index points on a card are of interest in the present case. The bars, 594, 594a are common to all sixteen sectors of a set such as that for storage unit A, but the sectors each have a separate contact wiper for individual order settings and readings.

The extension 599 of each sector 474 is formed with an overturned lug to which is fastened a piece or block of insulation 598. The lower part of block 598 is shaped to embrace the end and lug of extension 599 and it projects upwardly in a second block formation in which there is embedded one end of a contact wiper with two prongs 596 and 597. The prongs are joined at the lower end of the wiper where it is embedded in block 598, but they extend upward and have contact shoes or buttons which are pressed against bars 594 and a common arcuate contact strip 595. A button on prong 596 rides upward and slides over bars 594 until it is stopped to rest on one bar. The button on prong 597 is always in contact with strip 595 and rides up and down it as a means of communicating an impulse selected by the setting of sector 474 out of a particular bar 594 and into strip 595 which is insulated from all bars 594 and also insulated from the mounting bars 591 and 592 to which it is secured by a pair of insulated screws 587 available for connection to read out circuits.

*Tape control of sheet feed*

The feed controls for the record strip R is of the tape controlled variety such as that shown in greater detail in the copending application of G. W. Mill et al., Serial No. 609,854, filed on August 9, 1945.

Referring to Fig. 21, a tape control mechanism is shown in a general way as it appears attached near the right end of the platen P. Wrapped around the platen is a record sheet R before which the type wheels W are rotated into the printing positions. At the right end of the platen P, the shaft extends into the tape control casing C and ends with a pair of knobs K and K', the former having direct connections to the platen and the latter having gear connections arranged so that a vernier adjustment may be made to regulate the location of the printing line. Extending on the front of the casing C is a panel M holding the five manipulative controls for regulating the record sheet advancement. A knob L controls the line space movements for different extents of feed and for selective line spacing under control of the tape mechanism. A second knob D is provided for disabling the connections between the perforated tape unit and the platen.

The three keys extending across the top of the panel M are provided to control the operation of the tape feeding unit. The S key at the left is used to space the tape to bring it into a controlling position under manipulative control. The central key RE is a restoring control for governing the movement of the perforated tape to bring it around into the initial position. This corresponds with a prearranged normal position of the record form R, so that both the record and the tape are ready to be moved in synchronism. A key ST at the right is used for stopping the operation of the tape control mechanism whenever desired.

The mechanism case C is provided with a door DR which is used to conceal the part of the mechanism receiving the perforated tape.

The feeding controls are illustrated in coordination with a record controlled alphabet printing tabulator. In the printing of bills on a continuous strip, control is exercised by a sequence of record cards arranged to print alphabetic heading data such as names, addresses, dates, in combination with other detail cards perforated to represent items and amounts to be recorded, accumulated, totaled and charged to the various customers. Such types of cards are shown in Fig. 1a and the cards there represented are used to control printing on forms, such as form R.

Heading cards when found in a plurality of sets for one account group, may be distinguished by special heading group identifying perforations. These heading identifying perforations are used to select the various tape sensing brushes for determining the stopping position of the record R for locating the first line of each heading or detail group.

There is further record feeding control provided in the form of X detecting devices for sensing the change from cards having heading perforations to those following detail cards lacking such identification. Upon such a change of X to no X cards, the record form is advanced to the position designated to receive the first item impression. Thereafter, when the detail records are controlling for recording, the record form is advanced in line spacing under control of the usual circuit breaker and cam contacts.

There is a still further distinction between the various cards in a sequence related to more than one account. Group number perforations are used to distinguish between the cards relating to different customers. Therefore, upon the passage of the last detail card and advancement of the first heading card of the incoming group, there is detected a change in the group numbers and the machine is controlled to take a total and record the total on the predetermined total line selected by a tape perforation Ts (Fig. 1a). After the total is printed, skipping is again initiated and limited by a tape perforation and a cooperating brush which is selected to carry the record sheet over into position to record the first heading line on the second form.

*The sheet feeding control unit*

The platen P has the usual pressure rollers cooperating therewith to hold and advance the record sheet R as the platen is rotated.

As already noted, the feeding control unit is hung on the right side frame of the machine. In Fig. 29, it is seen that this main right side frame 612 carries a ball bearing 613 for supporting a shoulder of a clutch disk 614 fastened to the right end of the platen shaft. The disk is formed with a number of extensions 615 for providing clutch connections between the removable feeding unit and the stationary but rotatable platen mounting.

The feeding controls are supported in the main between a pair of frames 617 and 618, the former being fastened against the outside of the right machine frame 612, and the latter suspended further to the right to carry a platen shaft extension and a tape pin feed drum.

In Fig. 22, it is seen that a heavy vertical casting 619 is located near the rear of the unit and serves as a tie between the side frames. At the top of the mechanism another tie in the form of plate 622 is secured between the two frames. Near the center of the mechanism, a cross bar 623 serves to tie the two frames 617 and 618 together. A front tie plate 624 also extends across the upper center of the feed unit.

In Figs. 22 and 23, it is seen that the heavy bracing frame 619 is formed with a pair of ears 620 and 621 for guiding the main drive connections. A motor M (Fig. 22) is fastened to the outer frame 618 in a vertical position and the upper end of its shaft is attached to a flexible coupling 625. This coupling is engaged with a clutch disk 626 fastened to the lower end of a drive shaft 627. Cooperating with shaft 627 is a set of three bearings, one bearing 628 being located in the upper ear 620 and the two lower bearings 657 and 658 being mounted in the lower ear 621, the former being a thrust bearing to take up the pressure given by the driving worm 659 fastened near the upper end of shaft 627. The motor M and the connected worm drive mechanism is operated continuously and the drive connections therefrom to the clutches are available for instantaneous operation, which is terminated only by operation of a stop key ST (Fig. 21), or opening of the feed mechanism door DR to change the feed control.

Reference to Fig. 23 reveals that the vertical worm 659 is in mesh with a worm wheel 660 fastened along with a gear 661 to a hub 662 attached to a horizontal drive shaft 663. This shaft not only carries the high speed control gear 661 but also has attached thereto a smaller gear 664 for a driving connection to a clutch for low speed operation. A pair of ball bearings 665 and 666 are mounted in frames 617 and 618 respectively for guiding the ends of shaft 663.

Meshing with gears 661 and 664 are a pair of gears 667 and 668 freely mounted on a clutch shaft 669. The gear 668 is the larger of the two to cooperate with the small driving gear 664 for low speed operation. Each of the gears 667 and 668 is provided with a pair of ball bearings such as 670 and 671, for providing a wide bearing area and a free turning control on the stationary shaft 669. Extending from the outer wall of the hub of gear 668 is a driving pin 693 protruding into a slot cut in the annular clutch disk 694 assembled loosely on a cylindrical shoulder 695 extending from the hub of gear 668. Although this clutch disk 694 is loosely arranged on the end of the gear, it is held against the gear by a spider spring 696 fastened to the shoulder 695 and having spring fingers pressing disk 694 against the side of the gear hub. Disk 694 is formed with an annular ring of driving teeth 697 normally separated from matching teeth on a clutch shroud 698 which is loosely assembled over a toothed clutch ring 699. The teeth of shroud 698 are slightly longer and higher than teeth 699 so that, if the movable clutch member is located with the teeth abutting, then the shroud tooth causes the moving tooth 697 to ride down into the next stationary tooth 699. Disk 694 is mounted opposite shroud 698 and a driving ring 699 fastened to a driven gear 700 also loosely mounted on shaft 669 and supported thereon by a bearing 701. Gear 700 is normally held from rotation by a locking disk to be described hereinafter, and the driving connection is established by tipping disk 694 with reference to gear 668. When the upper end of disk 694 is tilted or tipped as already mentioned, the spider spring yields in that particular direction and the teeth on the opposing clutch members mesh to provide a driving connection.

The other gear 667 is also provided with a clutch driving disk 703 and a driven disk 704 attached to a gear 705. Since the constructional details of both clutches are similar, it is unnecessary to mention the details of the clutch at the right.

Cooperating with gears 700 and 705 are a pair of intermediate gears 707 and 708 (Fig. 29) mounted with a locking disk 709 on a shaft 710 which passes through bearings in both side frames and extends beyond the outer side frame 618 and there it supports the tape driving drum.

The two clutches shown in Fig. 23 are used for different kinds of control in advancing the record strip. The low speed clutch including driving disk 694 is used most of the time and is called into operation for line spacing and overflow skipping. The other clutch including disk 703 shown at the right and comprising high speed gearing is called into operation as an incident to the printing of totals and for other movements. A pair of magnets is used to operate camming mechanism for closing one or the other of the two clutches. But before describing the details of the means for operating the clutches, it is believed best to follow the driving connections from the clutches to the platen.

It is already mentioned that a locking disk 709 (Figs. 22 and 29) is mounted on shaft 710 and situated between the two intermediate drive gears 707 and 708. This locking disk is fastened to the gear 708 by means of a series of screws such as the screw 711.

*The platen shaft extension*

The driving connections are not direct from the clutches to the platen shaft. Instead, a platen shaft extension is provided to carry adjustment and vernier regulating knobs as platen controls removable along with the entire feed control unit. Not only is the entire platen extension removable, but within the unit is a clutch connection making it possible to disconnect the tape feed control so that the sheet feeding operation may revert directly to the ordinary manual operation of the platen knobs.

Referring to Fig. 29, it is seen that the extension shaft 713 extends to the right of the platen clutch 614 and is supported by bearing arrangements in the two feed unit frames 617 and 618. The left end of extension shaft 713 is supported by the ball bearing 714 centered in an annular ring or collar 715 fastened in a circular opening near the bottom of the frame 617. The middle of shaft 713 is supported by another ball bearing 720 fixed in a hollow bearing cup 721 fastened to the outer side of frame 618. Fixed to the left end of shaft 713 is a coupling disk 722 shaped with an annular flange which embraces the periphery of the locking disk 614 fastened to the stationary platen shaft. Coupling 722 is shaped with notches to coincide with the extensions 615 formed on the clutch member 614, thereby providing a driving connection between the stationary part of platen and the removable unit with extension shaft 713.

At the right end of extension shaft 713 is fastened the platen adjustment knob 723 formed with a metallic center 724 carrying a set screw 735 for securing the knob to the shaft. This knurled knob 723 is used for line space adjustment of the platen and long feed movement in graduations greater than line space movements. Alongside knob 723 is another knurled knob 736 provided to regulate adjustments to a fine degree through a vernier mechanism which is used to select the exact location of printed matter with respect to definite recording spaces on the record forms. A motion of vernier knob 736 is not communicated directly to the extension shaft but passes through bevel gearing, making possible a relatively fine movement of the shaft for a comparatively large movement of the knob.

The inside of vernier knob 736 is threaded to provide means for connecting it to the threaded shoulder 737 formed on the cup-shaped driving member 738 loosely mounted on shaft 713. Member 738 is formed with a pair of flanges or annular rings between which is loosely pivoted a bevel pinion 742. Member 738 is formed on the threaded side with an annular groove in which there is pressed a coil spring 743 tending to hold the bevel pinion in operation. As a means for backing up the spring 743, a collar 744 is fastened to shaft 713 by a set screw.

Cooperating with bevel pinion 742 is a pair of bevel gears 750 and 751, the former being pinned directly to shaft 713 by pin 752 and the latter attached to the inside of the cup-shaped shroud 753. Also attached to the shroud 753 and located on the outer surface thereof is a driving pin holder 755 carrying a pin 756 through which the driving force from the clutches mentioned hereinbefore is communicated to the platen. Pin 756 projects into an opening formed in the wall of a sliding bushing 757 threaded on one end of a long sleeve 758 carrying a clutch disk 759 cooperating with another clutch disk 760 fastened to the side of a unitary arrangement of a pair of gears 761 and 762 meshing with the intermediate gears 707 and 708 already described. It will be remembered that gears 707 and 708 communicate the driving action from the low speed and high speed feed control clutches. The operation of driving from either feed clutch is communicated down to the gears 761 and 762 and from that point on it is optional whether the drive is to be communicated to the platen, depending on the axial position of the sleeve 758 to engage or disengage clutch 759, 760.

Returning again to the explanation of how the vernier knob operates through the bevel gear, it is noted that when the sliding connection comprising pin 758 is fixed because of connection to the feed control clutches, then the outer bevel gear 751 is fixed relative to the inner bevel gear 750 which is fastened to the platen extension. With the outer gear fixed and the pinion rotated in a planetary fashion about the shaft center, then the inner gear with a smaller number of teeth is advanced slightly relative to the fixed parts and a fine adjustment of the platen is made possible.

When the driving action comes through the clutch sleeve 758 from the feed control clutches, then the outer bevel gear 751 becomes the driver and the bevel pinion 742 merely serves as a connection to the inner bevel gear 750 which connects directly to the extension shaft 713 and the platen P.

Returning to consideration of the drive from the feed control clutches, it is noted that the gear unit comprising gears 761 and 762 is fixed to a bushing 764 loosely mounted on shaft 713. The bushing is confined between a pair of fixed collars 765 and 766, the former taking up the thrust produced when the clutch connection 759, 760 is established. The stationary part of the clutch connection is the ring 760 fastened to the side of gear 762 and provided with a series of teeth 767 extending toward the teeth 768 formed on the side of the clutch disk 759 fastened to a flange on sleeve 758 by a series of rivets 769. At the right end of sleeve 758, the driving bushing 757 is attached to the sleeve by being screwed on the threads of a reduced extension 770.

The position of the connecting sleeve 758 is regulated by a manipulative control ending in an arm 772 having an extension fitted in a circular groove 773 between a pair of flanges formed on sleeve 758. However, before considering all details of the manipulative control, it is believed best to consider first the means for controlling the low speed and high speed clutches and effecting the driving motions already described.

Referring to Figs. 22, 25 and 27, it is seen that a pair of magnets HS and LS control a set of camming mechanisms for operating one or the other of the two clutches. If magnet LS (Fig. 22) is operated alone, it is a sign that the low speed clutch is to be operated to drive the platen connections to advance the record sheet for line spacing or overflow movements. When the other smaller magnet HS is energized slightly before the magnet LS, it is an indication that the connections are to be varied so that a high speed clutch is closed to advance the platen and the record strip as an incident to a total printing operation.

In Fig. 22, it is seen that the large magnet LS is mounted on the cross plate 622 and that the other magnet HS is also mounted thereon directly above it.

Extending across the unit between the side frames 617 and 618 is a shaft 775 which acts as a pivot for a locking lever 776 having a hooked end 777 for cooperating with the teeth 778 formed around the periphery of the locking disk 709. Lever 776 not only serves to perform the function of keeping the drive gearing locked in a normal condition, but it is also formed with two other extending arms, one of which carries the armature 779 located opposite the pole pieces of the low speed control magnet LS. The third arm 780 (Fig. 27) extends toward the rear of the machine and carries a cross bar 781 which is used to operate the camming mechanism for throwing one or the other of the two clutches into an operated condition. Cross bar 781 does not act directly on the clutch shifting parts but instead it works through a pair of interposer slides 782 and 783. In Fig. 27 it is seen that the left slide 782 is so shaped that the top surface thereon abuts against the under side of one end of bar 781 while, on the other hand, the notch 784 in the other slide 783 is normally presented under the opposite end of bar 781. Underlying the slides 782 and 783 are offset lugs 786 and 787, the former being part of an operating lever 788 for the low speed clutch and the latter being formed on a lever 789 which is provided to cam the clutch for the high speed train of connections. Both levers 788 and 789 are loosely pivoted on shaft 775 and extend forwardly and have raised elbows 790, 791 for abutting against the front face of the armature piece 779. A pair of springs 792 (Fig. 22) are connected between the extending ends of the levers and the cross bar 624. They tend to rock the levers 788 and 789 in a counterclockwise direction which is the opposite of the direction for producing a clutch closing motion. Extending upwardly from plate 624 is a pair of bolts 794, the heads of which serve as adjustable stops for extensions 795 formed on the front of the operating levers. In order to guide the front ends of the operating levers, the cross bar 624 is formed with notches for confining dependent extensions 796 formed on the lower part of the front ends.

In Figs. 25 and 27, it is seen that the operating levers 788 and 789 are provided with outwardly extending studs 798 and 799 for carrying camming disks 800 and 801. The cam disks are loosely mounted on the studs for rotatable movement, but they are closely confined to prevent end play. Disk 800 (Fig. 25) is situated so that the slanted cam surface thereon cooperates with the outer rounded periphery of the movable clutch disk 694 forming part of the low speed drive. The other cam disk 801 mounted on lever 789 is somewhat similarly located with respect to the other clutch connecting disk 703 which is part of the high speed drive. It is noted that the slanted cam surfaces of the two clutch disks face in opposite directions because the closing motion for the low speed clutch is toward the right while the closing motion needed for operating the high speed clutch is toward the left.

Before pointing out how the parts are operated to engage one or the other clutches, it is believed well to explain how the interposer slides 782 and 783 (Fig. 27) are shifted to set the mechanism in two different ways. In Fig. 27 it is seen that both arm 803, which is pivotally connected to slide 782, and arm 804, which is pivotally connected to slide 783, are slanted upward toward a common point and joined with an armature lever 805 pivoted at 806 (Fig. 22). This pivot is provided on a bracket 807 attached to the vertical plate 622 already mentioned as one of the connecting parts between the frames.

Extending from plate 622 is an adjustable pin 808 which serves as a stop for the armature lever 805. Attached to lever 805 is a cross piece 809 serving as an armature in cooperation with the pole pieces of the interposer magnet HS which is operated for high speed purposes. A spring 811 tends to draw the lever 805 in a clockwise direction so that an extension 812 thereon abuts against the stop stud 813. When lever 805 is in the normal position, the slides 782 and 783 are located as shown in Fig. 27 with the first mentioned slide in position to be operated and the second slide presenting the notch 784 which makes it free from operating control.

Extending from the left slide 782 is an insulated button 815 (Fig. 22) abutting against a flexible contact blade 816 forming one side of a pair of contacts 817. These contact blades are mounted between insulation blocks secured to the rear surface of cross plate 622. Attached to the bottom edge of the plate 622 is a notched comb 819 which acts as a guiding means and prevents side play of the interposer slides and the operating levers 788 and 789 which are formed with rearwardly extending portions.

Assuming that the parts are in the normal position and that the low speed magnet LS is the only one energized, then the armature 779 (Fig. 22) is attracted and the operating lever 776 is rocked in a clockwise direction until stopped by pin 785. This motion serves first to disengage the locking tooth 777 to permit free rotation of the gearing drive. At the same time, the cross bar 781 (Fig. 27) is lowered and carries down before it the cooperating interposer slide 782 and this in turn depresses the lug 786 on the left hand operating lever 788. Since this lever carries the camming disk 800, it operates to shift the clutch disk 694 (Fig. 25) toward the right and engage the low speed clutch with the constantly operating part of the gearing. In this way operation of the magnet LS alone causes advance of the record sheet as driven by the low speed gearing.

When lever 776 (Fig. 22) is rocked clockwise by energization of the magnet, it comes into contact with a leaf spring 820 fastened on bar 624. This spring tends to restore the lever to the normally disengaged position which is assumed when the magnet becomes deenergized. The hooked end 777 of lever 776 is tapered to find its way between teeth 778 so that the stopping wheel 709 can be brought to a definite locked position. Cooperating with the opposite side of the locking disk is a reverse lock overthrow preventer in the form of a blade 821 mounted on a spring 822 fastened to the rear of the cross bar 623. Upon the passage of each tooth 778 in a counterclockwise direction, blade 821 snaps in behind the tooth and prevents retrograde movement.

Assuming that the gearing is to be connected for a high speed operation, then the interposer magnet HS (Fig. 22) is energized first and serves to rock lever 805 in a counterclockwise direction and shift the two slides 782, 783 (Fig. 27) so that the former presents a relieved portion under the left end of cross bar 781 and the latter is shifted rearwardly so that the notch 784 is carried away from the under side of the right end of cross bar 781. With slide 783 in an abutting position between cross bar 781 and the lug 787 on lever 789, then upon energization of the other magnet LS and consequent clockwise operation of lever 776, downward movement of the connected bar 781 is communicated through slide 783 to lug 787 and serves to rock lever 789 in a clockwise direction. Since this operating lever 789 is the one carrying camming disk 801 associated with the high speed disk 703 (Fig. 25), the high speed clutch is closed and the driving connections are established from the motor through the high speed drive to the platen.

As an incident to the shifting of the interposer slide 782 (Fig. 22), contacts 817 are closed to provide circuit connections to call in magnet LS directly after energization of magnet HS as described in detail hereinafter. Provisions are made to advance the control tape TP (Fig. 30) in synchronism with the movement of the record strip R by means of gearing connections from the two clutches described hereinbefore. The point at which the two drives are connected is shown in Fig. 29, where it is seen that the intermediate gear shaft 710 extends to the right of the outer frame 618 and carries a tape feeding pin drum. This drum has pins cooperating with a central line of feed perforations shown in the tape TP (Fig. 30). When the tape is formed in a continuous band, it is placed on the pin feed wheel and aligned with the top of the record sheet and thereafter provides a control medium through the rectangular feed control perforations which are positioned with respect to places on the record sheet where recording is to be started.

Most of the perforations on the tape are concerned with stopping control for limiting the advance of the record sheet after feeding has been started by X hole control, digit sensing, group change, total recording, etc. However, there is one control provided by the tape for initiating feeding rather than terminating feeding, and that is the overflow control for limiting the extent of printing near the bottom of the form, so that skipping takes place to carry the record sheet over into a position for continuing recording at the first heading or detail line on the second form.

Considering now the actual mechanical arrangement of the pin feed wheel, it is noted in Fig. 29 that a gear 824 is secured to shaft 710 by a set screw 825 which fastens it alongside the frame 618. Alongside gear 824 is fitted a sleeve 826 carrying an insulation hub 827 formed with a pair of flanges 828, 829. Assembled on the insulation member 827 is a metallic drum 831 provided with a line or radial perforations through which project the feeding pins 832. Pins 832 are formed with an enlarged base and, after a series of them are assembled in the drum 831, an annular ring or washer 833 is inserted under the bases of the series of pins and held there by a flanged ring 834 assembled against a central wall 835 formed on the inside of drum 831.

All of the feed wheel parts are assembled by means of a series of stay rods or bolts 837 which project through insulation bushings 838 in gear 824 and are threaded in a retaining washer 839 placed alongside gear 824. When the bolts 837 are tightened, they not only draw together the ring 834, drum 831, insulation member 827, gear 824 and retainer 839, but they also hold the ring 833 under the pins 832 so that the pins are held in the extended position. The periphery of the metallic drum 831 is used as an electrical conductor for impulses through the brushes which cooperate with the tape and sense the perforations therein to determine the location and timing of the feed control impulses.

In the side elevation view, Fig. 28, it is seen that while the left loop end of tape TP is drawn around the feed drum 831, the right end of the tape is guided by a curved guide 844. There are two other such guides 845 and 846 fastened in a sliding box 847 fastened to spacers extending from the frame 618. According to the length of the tape TP, one or the other of the three curved guides is selected to support the right end of the tape. Box 847 is formed with a long slot 848 which makes it possible to vary horizontally the position of the box and the guides contained therein with respect to a securing bolt 849 best shown in the sectional view, Fig. 24. There it is seen that the frame 618 is formed with an extending boss 850 through which the bolt 849 projects. The bolt has an enlarged head 851 which cooperates with the inside wall of box 847 alongside the slot 848 through which the bolt projects. The washer 852 is also provided to enlarge the frictional area used to hold the box in an adjusted position. On the inner end of bolt 849 is assembled a washer 853 and locking bolts 854 for backing up a coil spring 855 assembled around the bolt and seated in a depression formed within boss 850. In Fig. 24 it is noted that all three guides 844, 845 and 846 are formed with a raised portion 856 for bridging over the bolt head 851, so that the box 847 is free to be moved with respect to the bolt from one end to the other.

*The tape sensing brushes*

It was noted in describing the tape TP (Fig. 1*a*) that provisions are made across the tape for twelve channels wherein appear the rectangular control perforation. These channels are evenly divided with six punch locations on each side of the circular pin feed openings. In Figs. 24 and 28, it is seen that a square insulation bar 860 carries a series of brushes B1—B13. The plan view, Fig. 24, shows that the first six brushes B1 to B6 are located on the right and then there is a second group of six brushes B7 to B12 in the center and a third group of brushes B13 at the left. The two groups of six brushes each are separated by the space required for the pin feed control. Brush B13 is a common contact brush cooperating with the metallic drum 831 outside the area of the tape, so that it is in continuous contact with the drum.

As a means for confining the ends of the brushes B1—B13, a slotted insulation bar 861 is extended across the tape and has a fork-shaped front and with insulation projections interspersed between the brushes.

Both insulation cross bars 860 and 861 are mounted in a rockable frame, so that the brushes may be lifted away from the tape when the tape is to be changed. The brush frame comprises a U-shaped member with a cross bar 862 and a pair of side pieces 863 and 864 between which the insulation bars are fixed. The entire brush unit is pivoted on a stud 866 extending from the frame 618 and carrying a fixed collar 867 for locating the frame and another collar 868 for confining a spring 869 which cooperates with the frame (Fig. 28) and tends to rock it in a clockwise direction.

As a means for locking the brush frame in the sensing position, the frame is provided with a latch 871 rotatably mounted on a rod 872 extending through the brush frame near the front of the unit. The hooked lower end of latch 871 cooperates with a square stud 873 extending from the main frame 618. Formed on the upper end of latch 871 is a horizontal finger piece 874 extending forwardly under a somewhat similar horizontal finger piece 875 formed as an extension of the right side wall 864 of the brush frame. A spring 876 is attached to latch 871 and tends to rock it in a counterclockwise direction to hold the frame latched and space apart the finger pieces 874 and 875. When it is desired to free the frame to be rocked clockwise under action of spring 869, the finger pieces 874 and 875 are pinched together and the latch is separated from stud 873 and the entire frame pivots about stud 866 in a clockwise direction. The motion of the frame is limited by the cooperation of an extension 877 with a stud 878 extending from the frame 618.

When the brush frame is rocked away from the tape, the tape is free to be removed and then, when the new tape is assembled and the brush frame is lowered, it will be noted that the lower end of insulation bar 861 is extended and rounded to push down on the tape and draw it taut at the point where it approaches the pin feed drum and is about to pass under the sensing brushes.

In order to prevent sparking of the brushes at the tape and to properly time and limit the length of the impulses directed through the tape, a circuit breaker ratchet is provided and geared to the pin feed drum to rotate in synchronism therewith. In Fig. 28 it is seen that a small triangular frame 880 is secured at 881 and 882 to the outside of frame 618. Extending outwardly on this small frame 880 is a stud 883 acting as a pivot for a gear 884 in mesh with the gear 824 already mentioned as secured to the pin feed drum 831. Adjustably secured to the side of gear 884 is a ratchet wheel 885 formed with a series of arcuate slots 887, through which pass the adjustment screws 888 for fastening the wheel with respect to the driven gear 884.

Pivoted at 890 on the outside of frame 880 is a contact operating lever. The lever has a lug cooperating with the teeth on ratchet wheel 885 and the lever extends rearwardly to carry an insulation roller 894 underlying a pair of normally open contacts 895. A spring 897 (Fig. 28) tends to rock the lever in a clockwise direction and hold it in cooperation with the circuit breaker wheel. As the wheel rotates in synchronism with the pin wheel, and upon the passage of a feed control perforation position, the rear lever arm is rocked upward by one of the teeth, and the contacts 895 are closed after the presentation of a perforation.

*The record feed control panel*

The feed control unit is provided with its own set of operating control keys and levers for setting the device for desired line spacing and operating control. Referring to Fig. 30, it is seen that a control panel 900 is the mounting for the three control keys, i. e., space key S, restore key RE and stop key ST. Also mounted on the panel are the line space control lever L and the declutching lever D. The space key S is provided for selecting hand operated line spacing control and also for advancing the record and the control tape in long feeding when it is desired to advance a record independent of the tape control. The restore key RE is provided to close circuit connections for energizing the tape control magnets, so that the tape is advanced to the normal or home position, which is aligned so as to coincide with the presentation of the top of the record form at the printing line on the platen. The stop key ST is provided to open circuit connections to disable the tape control magnets when there is need for an emergency stop.

The line space control lever L is settable to one of three positions, the first two making circuit connections for selection of a succession of progressively greater line space movement for one or two steps. The third position is one making the line spacing movement independent of any prearranged number of steps other than the degree of motion selected by the perforations cut in the twelfth channel of the control tape. In other words, this "select" line space control is tape control of line spacing.

Before describing the mode of operation of the declutching lever D, it may be noted that the panel 900 (Fig. 28) is supported at a slight angle by a pair of brackets 901, one of which is shown attached to the outer frame 618 and the other being similarly secured to the frame 617.

In Fig. 26, it is seen that the lever D is provided with a projecting shaft 902 to which is secured an arm 903 having a hub abutting against the inner surface of the panel 900. Extending from arm 903 is a stud 904 projecting in a notched opening in the end of a lever 905 secured to a slanted shaft 906 carried in bearings 907 and 908 formed on the bearing block 721 described earlier in this specification. Also secured to shaft 906 is a long hub 909 carrying a pair of bent arms 772 for engaging in the grooved section 773 (Fig. 29) formed on the clutching sleeve 758 already described.

It is noted from the position of the lever D (Fig. 30) that, when it is rocked counterclockwise to the "in" position, pin 904 (Fig. 26) is lifted toward the observer and arms 772 are depressed and rocked in the direction observed as clockwise in Fig. 29. This movement tends to shove the sleeve 758 toward the left and engage the clutch disk 759 with the driving ring 760.

When lever D (Fig. 30) is rocked clockwise to the "out" position, the train of connections is moved in the opposite direction and shaft 906 (Fig. 29) is rocked counterclockwise to push the sleeve 758 toward the right and disconnect the connections between the feed control clutches and the platen.

In order to maintain the position in which the declutching lever D is set (Fig. 30), a detenting device is provided. Attached to shaft 903 is an arm 910 formed with a pair of notches. Cooperating with the notched surfaces is a pointed detent 912 pivoted on a stud 913 extending from the side of the bearing frame 721. A spring 914 is connected to the detent and tends to rock it counterclockwise to hold the pointed end in engagement with the notched surface of arm 910 and thereby hold the declutching lever in one of the two possible selection positions.

*CF and CR cam contacts*

As will be referred to in the description of the electrical circuits, the machine is provided with a series of cam contacts which are well known in construction and operation and are designated as CR cam contacts which are continually opening and closing during each cycle of operation of the machine and CF cam contacts which open and close during card reading operations of the machine, accompanied or not by a card feed operation.

The cams which operate the CR contacts may be driven by any suitable shaft and herein may comprise the shaft 27 which, it will be recalled, is rotated one revolution for each operation of the machine.

The CF cam contacts are operated during each card reading operation of the machine by the arrangement shown in Fig. 2. The gear 28 secured to shaft 27 which is rotated one revolution for each machine cycle drives a gear 282 to which is attached the clutch disk 283 of said clutch to drive a shaft 281 one revolution for each clutch engagement. The one-revolution clutch is not described in detail since it is well known so that for each card feed cycle the energization of the CF cam clutch magnet 280 causes one revolution of the drive shaft 281. The shaft 281 carries the cams which close and open the related CF cam contacts.

Other CB or circuit breaker cam contacts are operated by connections to the main drive shaft 27.

*Operation of machine in connection with circuit diagram*

The initiation of card feed, the sequential card feeding operations and multi-line printing operations will, it is believed, be best understood by describing the operation of the machine in connection with the circuit diagram (Figs. 31*a*, etc.).

A prerequisite to initiation of card feed is that hopper contacts 270 (Fig. 31*a*) are closed and, referring to Fig. 3, this is effected by the depression of a button 271 by cards in the supply magazine 25. When all the cards have been fed out of the magazine the contacts will open and the machine will automatically stop.

Current is supplied by lines 920 and 921. With hopper contacts 270 closed, an obvious circuit to energize R1625 relay is closed and a stick circuit for said relay is provided by R1625*c* relay contacts and cam contacts CR9.

Initiation of card feed is effected by depression of the Start Key which closes contacts 274 to close a circuit from the line 920, wire 272, start key contacts 274, the pickup coil of the start relay R1636, to line 921. R1636 is the start key relay. It should be noted that in the circuit diagram all relays and magnets are connected to line 921 to complete the energizing circuit. R1636 relay closes its stick contacts R1636b and a stick circuit is provided back to line 920 through cam contacts CR6 to hold R1636 relay energized over and through part of the second machine cycle. Obviously, when CR6 contacts open during the second machine cycle, if the Start Key is not retained depressed, R1636 relay will deenergize and for this reason the start key is maintained depressed or redepressed until a card issues from the magazine.

At 200° of a cycle, while R1636 relay coil is energized, cam contacts CR86 close to complete a circuit from line 920, stop key contacts 277, normally closed card feed stop contacts R1470—1, closed carriage stop contacts R1471—1, CR86 cam contacts, start key R1636a relay contacts, R1638 relay coil and wire 918 to line 921. The hold circuit for relay R1638 is through the R1638b relay contacts and cam contacts CR7 which holds it energized until 235° of the next cycle. R1638 is the start relay.

R1638 relay closes R1638c relay contacts, completing a circuit at 245° from line side 920, cam contacts CR5, relay contacts R1673b closed by a carriage skip relay when machine is running, normally closed minor control relay contacts R1412—3, normally closed overflow start control relay contacts R1411—4, contacts R1638c, R1639P relay coil, and line 921. A hold circuit is maintained by cam contacts CR4, through R1639a relay contacts. CR4 holds R1639 relay energized until 210° of the following cycle. When R1639b contacts are closed, they complete a circuit from line 920, R1639b relay contacts now closed, wire 989, multi line interlock relay contacts R1500—7 now closed, CR87 cam contacts, picker clutch magnet 64, and wire 918 to line 921; this also energizes the pickup coil of the R1640 relay coil.

The R1640a relay contacts complete the holding circuit for R1640H relay coil through such contacts, wire 989, and both CF2 cam contacts and R1639b relay contacts back to line 920. The CF cam contacts take the arc at the breaking of the hold circuit instead of having it affect the R1639b relay contacts.

Energization of picker clutch magnet 64 at 250° when CR87 closes, causes the engagement of the picker clutch at about 285° of the first machine cycle, and the lowermost card is then advanced from the supply magazine 25 (Fig. 3) to the constantly rotating feed rolls 50, 51, and the card is fed by the latter to the Presensing Station P; and when this condition is obtained, a card lever 275 (Fig. 3) is rocked to close the Presensing Station card lever contacts 276 at 144° of the second machine cycle, or the first card feed cycle, but are kept closed due to the combined presence of a card in the P station.

At 285° of the first machine cycle, cam contacts CR88 close, completing a circuit from line 920, R1639b relay contacts, wire 989, R1630c relay contacts, CR88 cam contacts, clutch magnet 280, wire 918 and line 921. Energization of this magnet will cause the engagement of the conventional one-revolution clutch to initiate rotation of shaft 281 at 310° which operates the CF contacts, as previously described. The aforementioned energizing circuit for the clutch magnet 280 is for the first machine cycle. In subsequent card feed cycles, as will be explained, and upon the presence of cards at station P, the R1628 relay will be energized to close the R1628c relay contacts to impulse the clutch magnet 280.

After pre-test contacts 276 are closed at 144° of the second machine cycle (or first card feed cycle) CR8 cam contacts close to complete an obvious circuit to the R1628P relay coil. R1628a relay contacts then close to complete a holding circuit back to line 920 through the CF5 cam contacts. CF5 cam contacts extend the energization of the relay over and through the next or second card feed cycle. When R1628c relay contacts close during this second machine cycle and cam contacts CF2 close during this and succeeding machine cycles, a circuit is completed to energize clutch magnet 280.

When cam contacts CR88 close for the cam clutch magnet 280, a parallel circuit is completed to a card cycle control relay pickup coil R1641 through multiline start and interlock relay contacts R1485—4, R1500—11 and second reading card control contacts R1632f. A hold circuit includes line 920, contacts CR6, wire 919, relay contacts R1641b, relay R1641 hold coil and wire 918 to line 921. A number of contacts of relay R1641 and associated coil R1644 are in series with card cycle hubs (Fig. 31g) and the circuits to the plug hubs are completed through cam contacts CF29 and CF30 for energizing plus or minus accumulator controls or any other control panel function requiring a full card feed cycle impulse as noted hereinafter.

The start key (Fig. 31a) will be held down or depressed the second time to reenergize R1636 relay and the operation will be repeated to advance the card from the Presensing Station to the first Control Station and to feed the second or following card from the supply magazine into the feed rolls 50, 51 and thus to the Presensing Station.

Energization of the R1628 relay closes R1628d contacts which, it will be recalled, are closed only when a card is at the Presensing Station so as to complete at 165° a circuit during the second machine cycle or first card feed cycle from the line 920 through CR3 cam contacts (at the lower left corner, Fig. 31a), wire 988, R1628d relay contacts, R1640b interlock relay contacts now closed, R1500—8 MLR relay contacts now closed, to the gripper clutch magnet 153 and line 921. This clutch magnet, it will be recalled, causes the operation of the mechanism which closes the gripping devices to feed the first card from the Presensing Station to the Control Station, and other cards from station to station in the manner previously described. It also controls the card stops which are lowered to allow a card to advance, and raised to stop the card at the next station.

Closure of cam conacts CF22 (Fig. 31a) at 240° of the second machine cycle or first card feed cycle causes completion of a circuit from line 920 through cam contacts CF5 now closed, R1628a pre-test relay contacts now closed, CF22 cam contacts to the pickup winding of the R1630 relay. The latter will close the R1630a relay contacts to complete a stick circuit for the holding winding of the R1630 relay extending back through the R1630a relay contacts, R1625b hopper relay contacts, or CF4 cam contacts during the cycle in which the last card run out passes the Control Station. R1630 relay will thereupon open the R1630c relay contacts so that the impulse emitted by CR88 cam contacts to the CF cam clutch magnet 280 will be subsequently directed through the R1628c relay contacts for card feed cycles after the first. During the third machine cycle, or the second card feed cycle, cam contacts CF23, which are timed to close slightly earlier than CF22, will close and complete a circuit from the line 920 through CF4 cam contacts, R1630a relay contacts now closed, CF23 cam contacts to the pickup winding of the R1632 relay. The latter closes the R1632a stick contacts providing a stick circuit for the holding winding of the R1632 relay extending back through CF3 cam contacts, or the R1625a hopper relay contacts back to line 920. CF3 cam contacts control the deenergization of R1632 relay during the cycle in which the last card passes the Adding-Printing Station. R1632 relay closes R1632d contacts which in conjunction with R1628b relay contacts and R1625d relay contacts now closed provide an alternate holding circuit for the R1638 relay to keep R1638 energized when stick cam contacts CR7 for the R1638 relay open. This alternative circuit keeps the machine running until the hopper is empty, the stop key is depressed, or a card fails to feed to the Presensing Station.

It will be noted that the R1630 relay is energized as the card is about to enter the Control Station and that R1632 relay will later energize when the card is about to enter the Adding-Printing Station. Relays R1630 and R1632 also control relay contacts which supply current to the readout commutators as will be described in detail.

Under normal card feed conditions and so long as cards continue to feed through the Presensing Station, the card picker control clutch magnet 64, CF cam control clutch magnet 280 and gripper control clutch magnet 153 will also be reenergized each cycle under normal conditions so long as cards continue to feed through the machine.

However, failure to feed a card from the supply magazine to the Presensing Station to close the contacts 276 will stop card feeding operations. Whenever the presensing card lever contacts 276 are opened, due to the failure of a card to feed from the magazine, the stick circuit to the hold coil of the R1628 relay will be opened when test cam contacts CF5 open at about 159° of the card feed cycle in which there is a card feed failure. Deenergization of R1628 relay enables the R1628d contacts to open and, assuming that there are cards in the hopper which would cause the R1625f contacts which are in parallel therewith to be opened, the impulse circuit to the gripper clutch control magnet 153 will be opened and it will not receive the impulse usually transmitted by closure of the CR3 cam contacts. The result of this is that the clutch controlled by the magnet 153 will not be engaged and the card grippers will not be closed and cards present at the Control Station and the Adding-Printing Station will remain in such position and will not be advanced. Also, deenergization of the R1628 relay will cause the R1628b relay contacts to open and, assuming that the R1625d contacts are also open due to the presence of cards in the hopper, the holding circuit of the R1638 relay is deenergized upon opening of the CR7 contacts at about 235° of the cycle in which there is a card feed failure. R1638 relay becoming deenergized opens its R1638c contacts, preventing the energization of the auto start relay R1639 when cam contacts CR5 close. R1639b relay contacts thereupon open with the result that the impulse circuit to the R1640 relay and the picker clutch control magnet 64 is opened and furthermore opening of the R1628c relay contacts prevents the transmission of an impulse to the card feed cam clutch magnet 280. Since the clutch control magnets 153, 280, 64 for the three clutches will not be energized, all of the card feed operations will be terminated.

Summarizing, during each cycle of operation, test circuits function to determine whether a card has been properly fed by the picker blade and the feed rolls to the intermediate Presensing Station. The gripper clutch magnet 153 controls movement of the first card from the first reading position to the second reading position at the same time that the following card is moved from the Presensing Station to first reading station. During the following cycle, the first card is moved by the gripper clutch control from the second reading into the stacker, the second card from the first reading station to the second reading station, and the third card from the Presensing Station to the first reading station.

*Card analyzing or reading circuits*

Figure 31B:
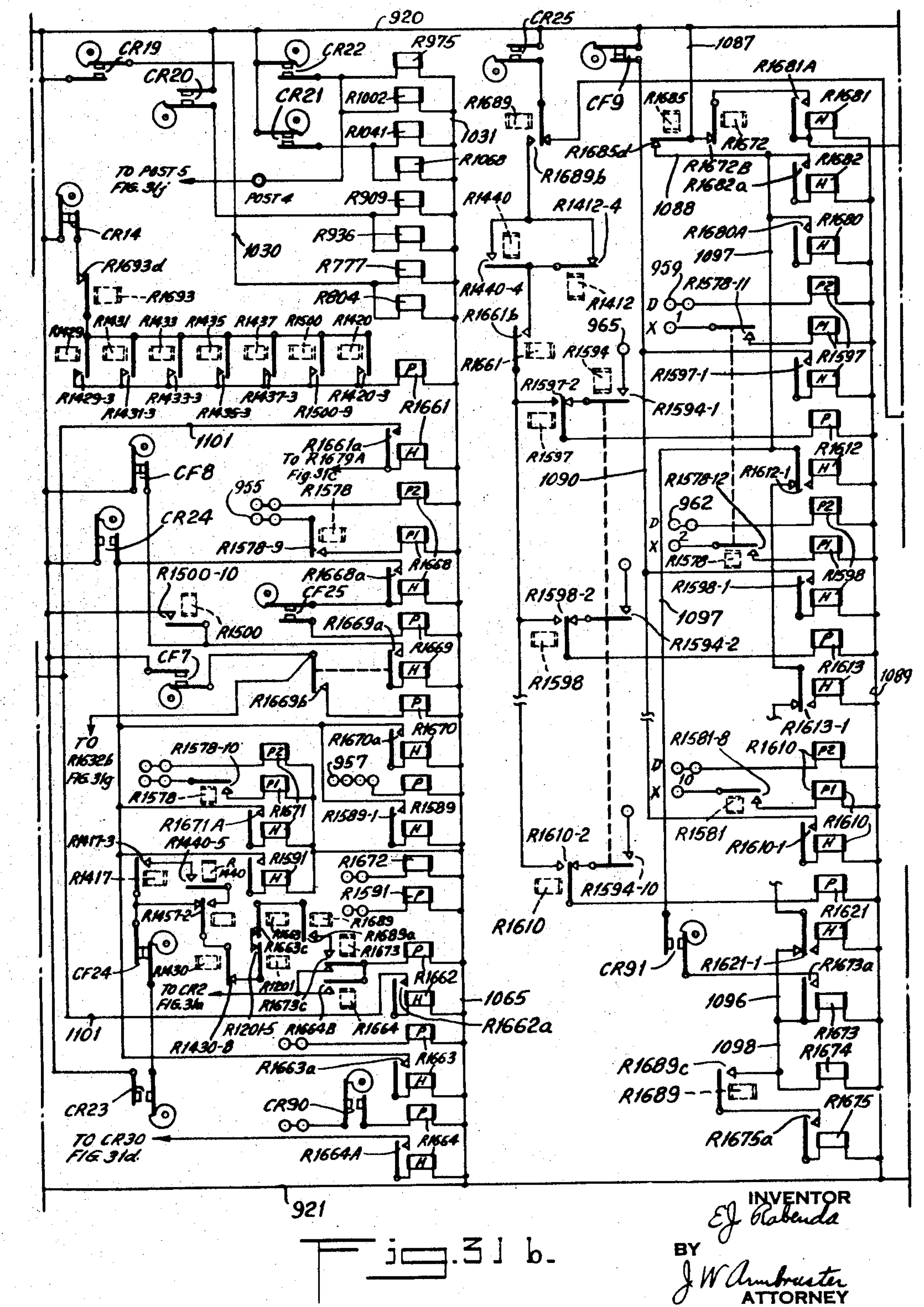
Figure 31C:
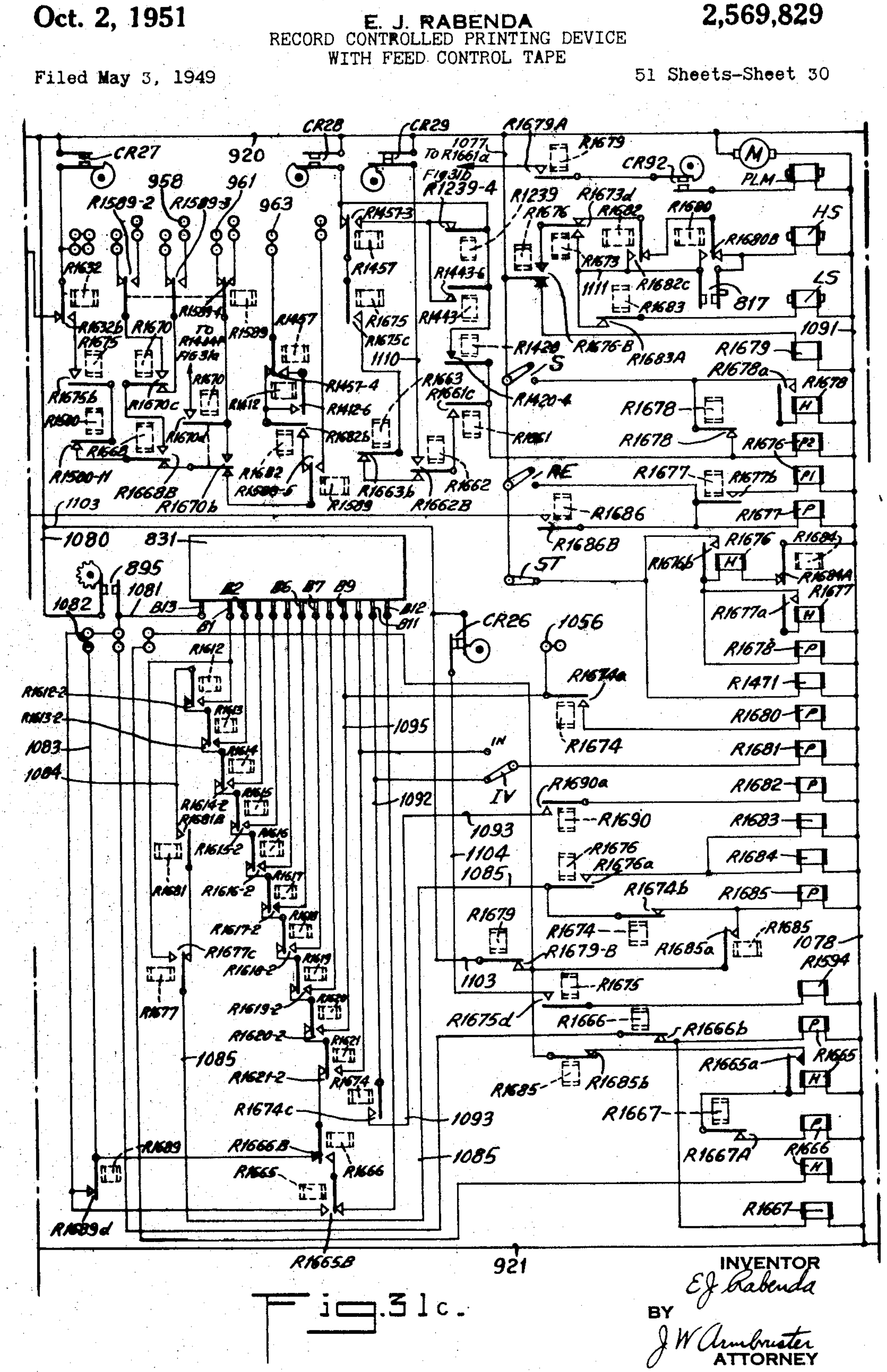
Figure 31D:
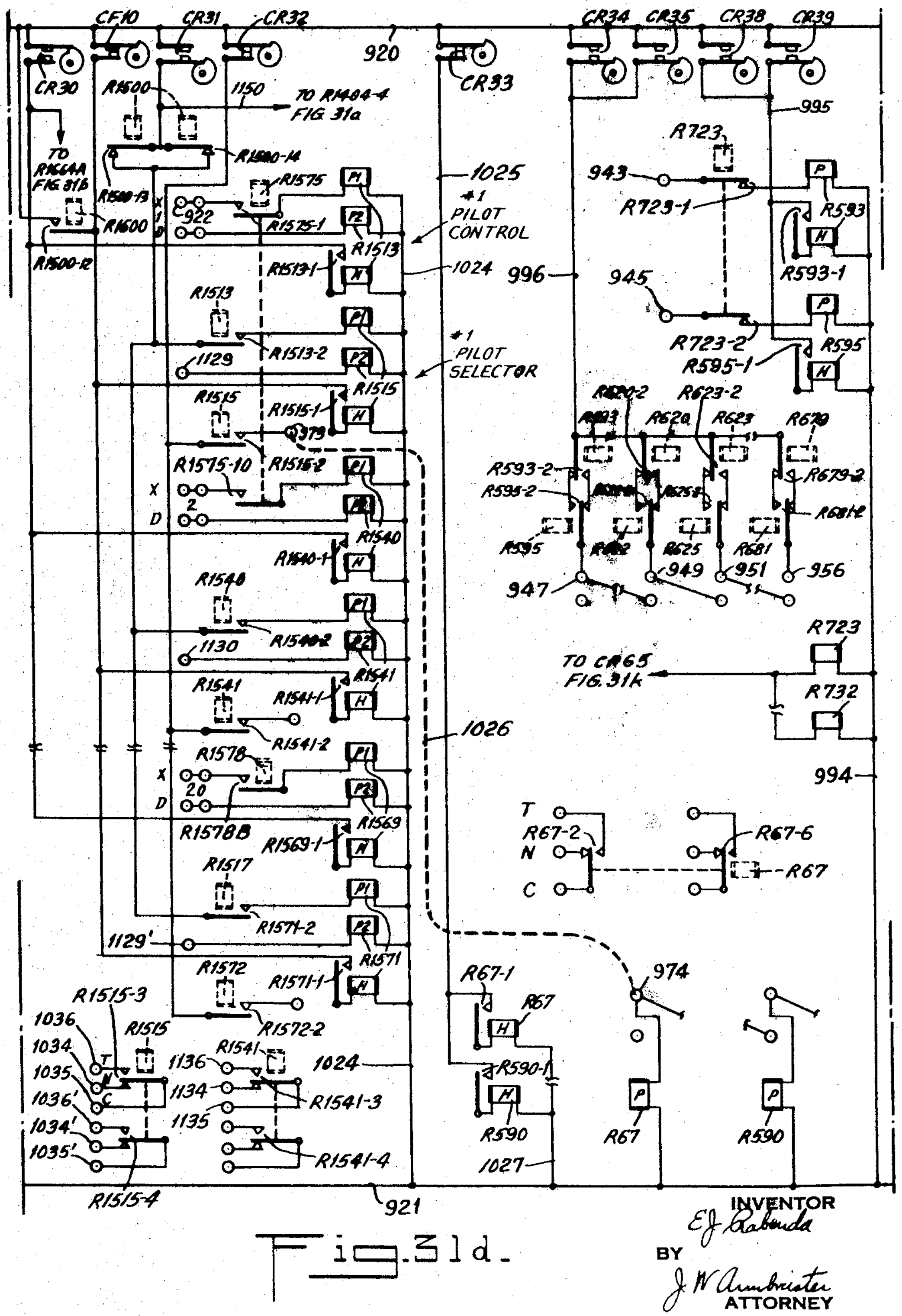
Figure 31E:
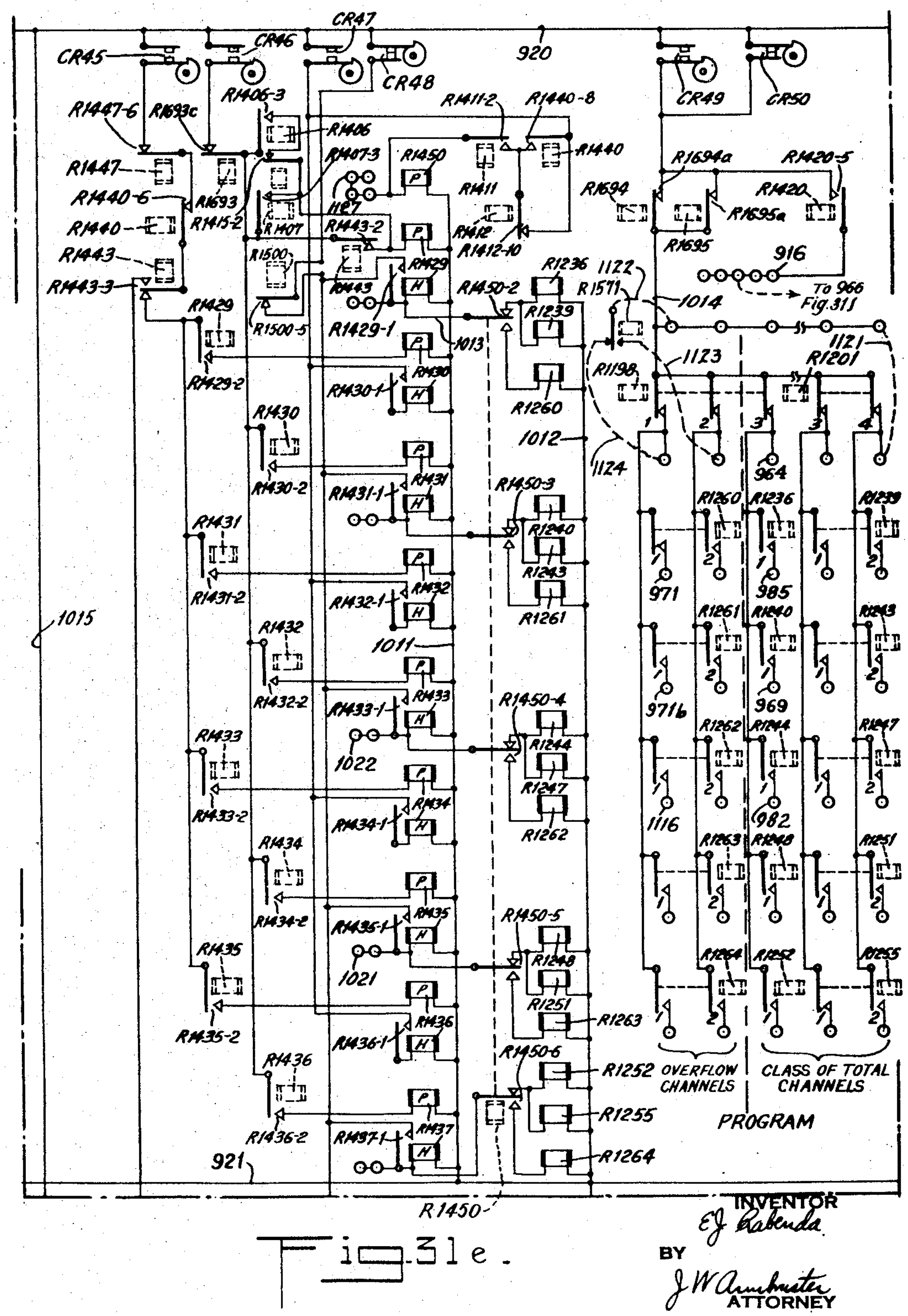
Figure 31E:
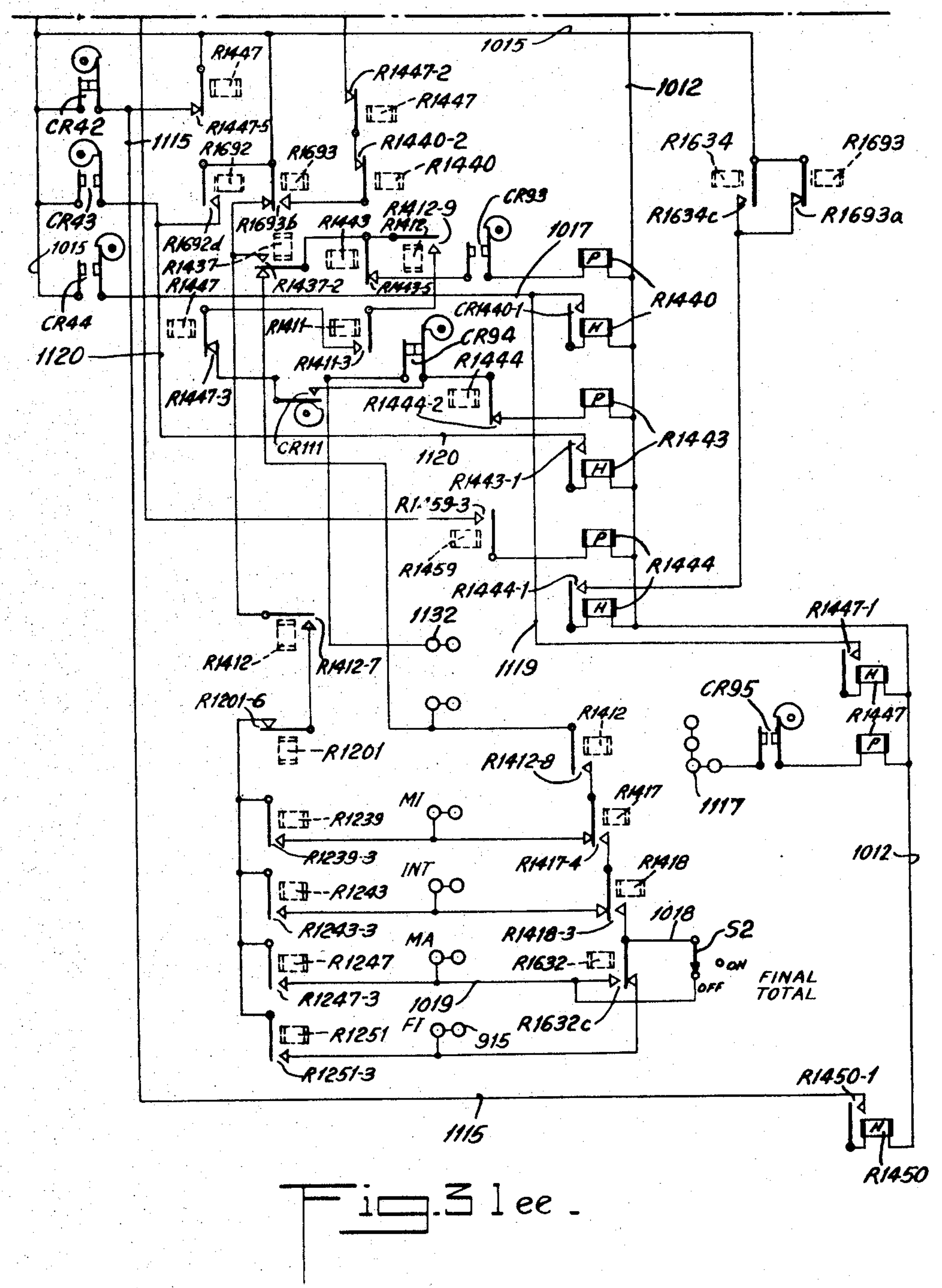
Figure 31F:
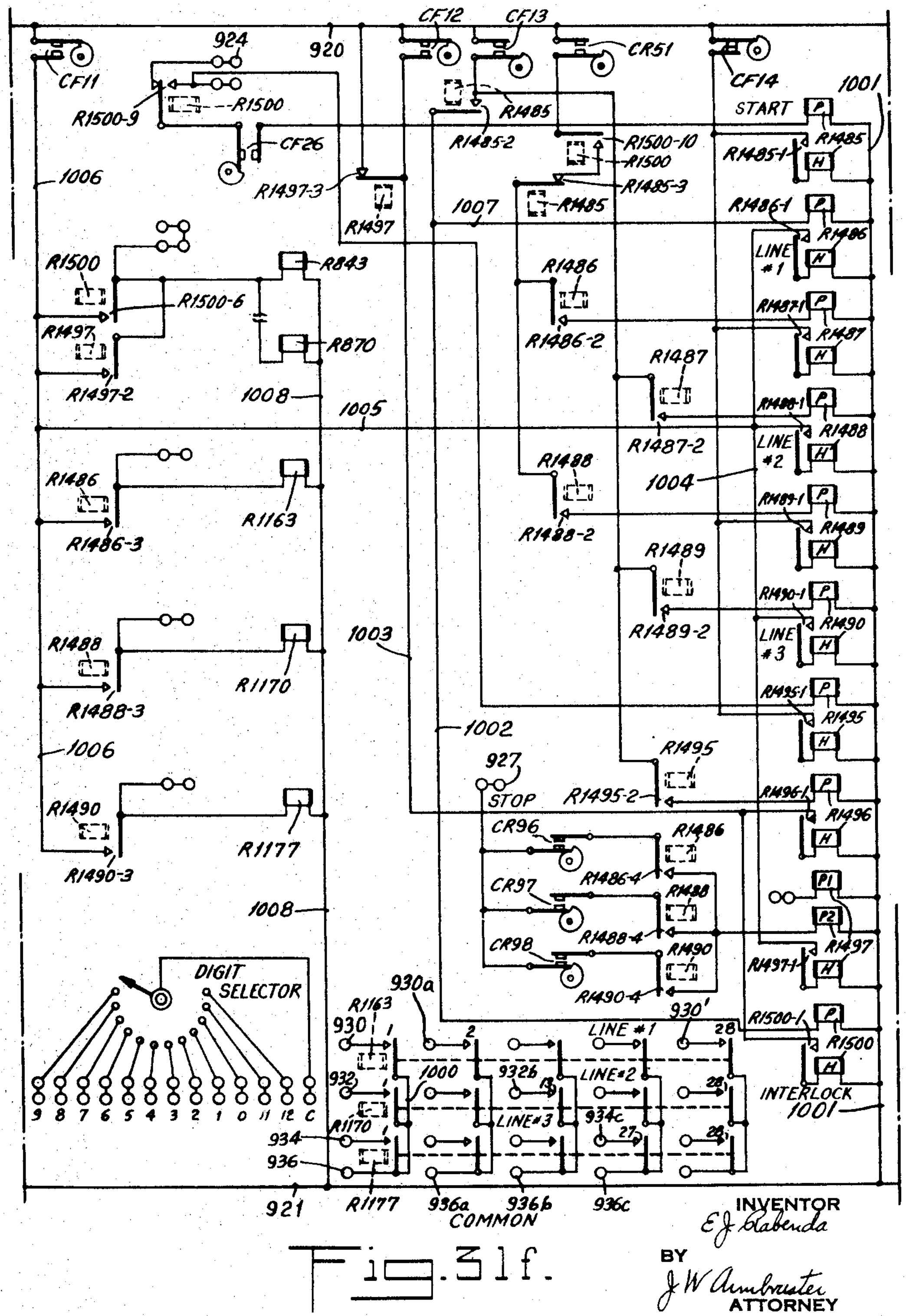
Figure 31G:
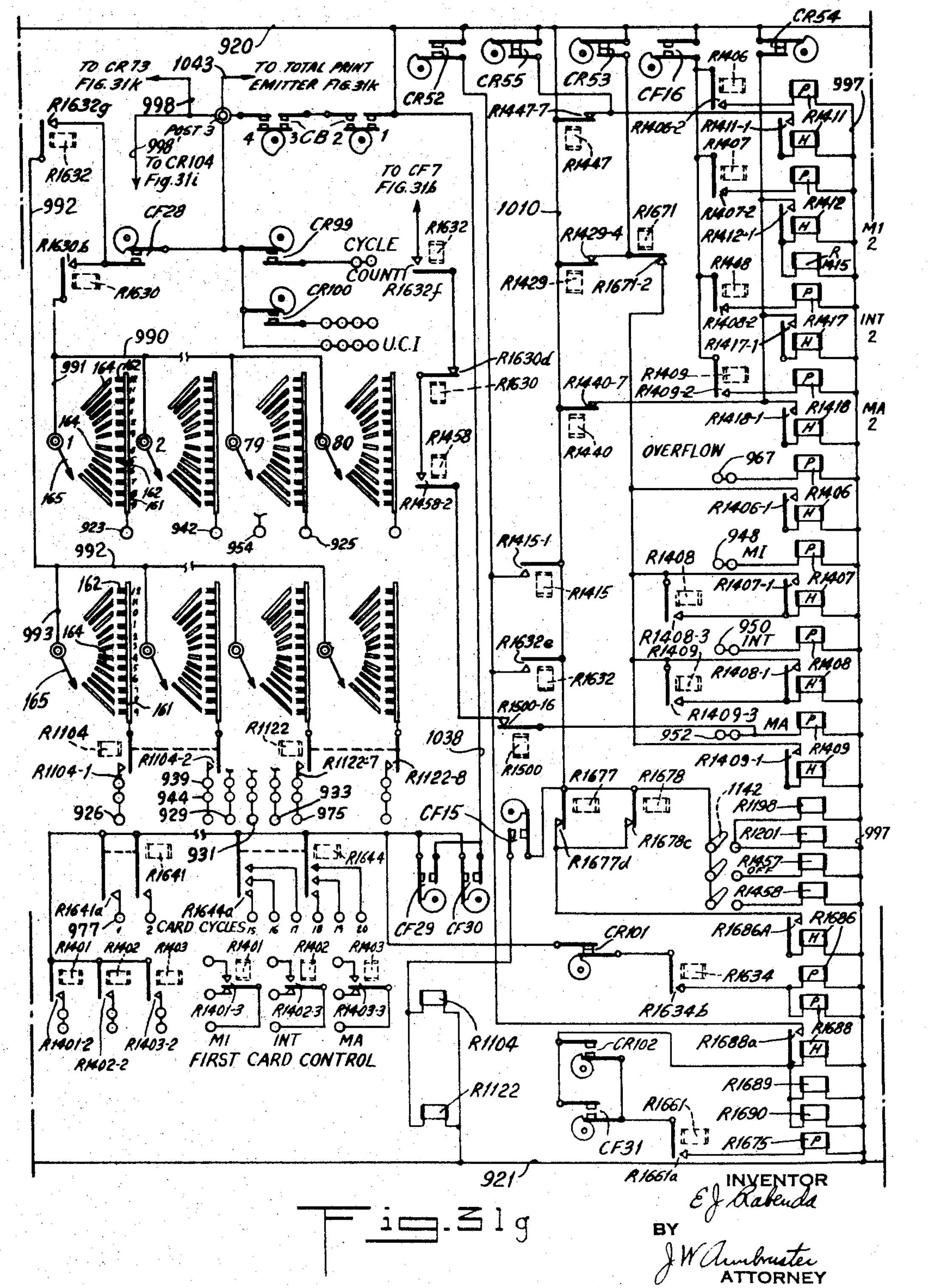
Figure 31H:
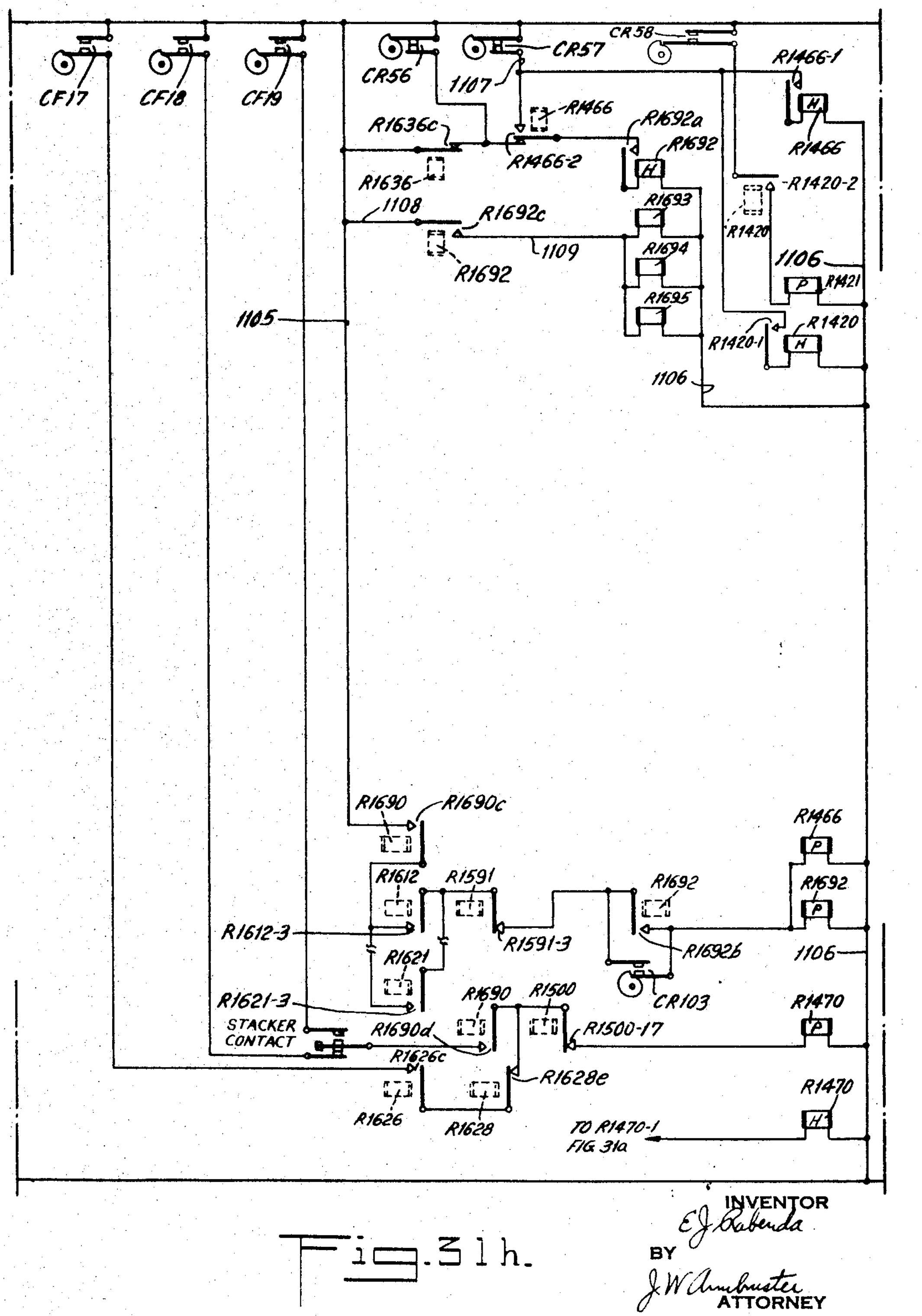

The circuits whereby the perforated cards may be analyzed at the first reading station and the second reading station are shown in Fig. 31g wherein it will be seen that for column 1 the arrangement of the sensing commutator is shown diagrammatically. Of course, this arrangement is duplicated for the 80 columns in each of the reading stations. The sensing circuit for the first reading station is from the line side 920, circuit breaker contacts CB1—4, CF28 cam contacts, first reading relay R1630b contacts which are closed during the analyzing time, thence to a wire 990. The wire 990 has a respective wire connection 991 to the brush 165 of the first column commutator. It will be recalled that the brush readout 165 makes successive contact with the contact points 164 and the circuit will be closed through the particular brush 162 which passes through the card perforation. Each plate 161 which carries the series of analyzing brushes 162 has a wire connection to a respective plug socket such as socket 923 in the first column. For the first reading station there is a series of eighty plug sockets including 923, 925, 942 and 954, etc., from which plug connections are made for control purposes.

The sensing circuit for the second reading station extends from the CF28 cam contacts, thence through the second reading R1632g relay contacts to a wire 992 which has one first wire 993 of multiple wire connections to the brush readout 165 representative of a series of sensing commutators for the second reading station. There is, likewise, a series of eighty plug sockets including sockets 926, 929, 931, 933, 944 and 975 for the second reading station from which plug connections are made to the desired controls or printing orders to effect printing of information corresponding to the perforated data.

The CB1—4 circuit breaker contacts are timed to close and open at such times as it will prevent the arcing at the break and make between the brush readout and the contact points 64 so as to prevent damage at this point of contact. The construction and operation of circuit breaker contacts, such as are employed herein, are well known.

*Print magnet energizing circuits for normal printing operations*

Figure 31I:
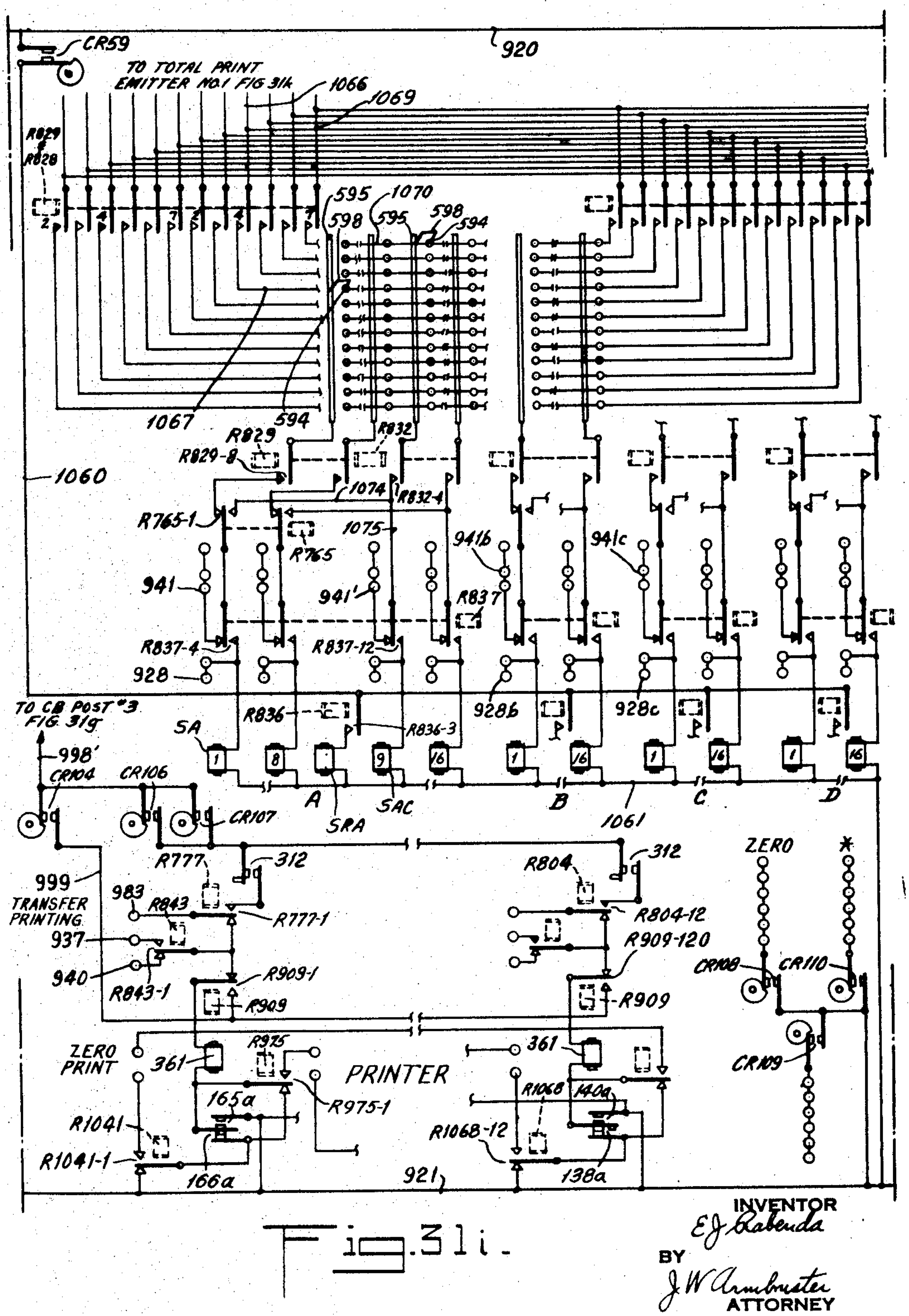

The energizing circuits for the printing control magnets 361 are shown in Fig. 31*i*. The machine is intended to have a capacity of 100 printing columns requiring a corresponding number of printing control magnets 361, although only two illustrative orders are noted in the drawings.

As will be described in detail later on, the machine is capable of being conditioned for multiple card field and storage unit reading and multiple line printing under control of a single heading card which is passed through the card feeding and analyzing mechanism. However, it is at times desirable to print in the normal fashion, that is, to merely print a single line under control of one or more perforated fields in a detail card. To accomplish this the desired plug sockets such as 939 (Fig. 31*g*) of the second reading station have plug connections made therefrom to plug sockets such as 940 (Fig. 31*i*) of the columns in which printing is to be effected. Therefore, according to the perforations in the columns analyzed, card reading impulses are directed to each of the plug sockets 940 through normally closed R843—1 MLR transfer relay contacts now in normal position, thence through R909—1N print control relay upper contacts now in normal position, to the print control magnet 361, the normally closed zero print control contacts 138*a*, code relay contacts R1041—1 and line 921. Zero print control by shifting of contacts 165*a*, 166*a* is of the kind set forth in Patent 2,438,071 (see Fig. 1*a* and contacts 165, 166 of the patent). The second alphabet print control impulse, which is a code pulse, is sent through magnet 361 and the shifted zero contact 165*a*. Hence, the print control magnet will receive impulses singly or in combination, according to the code in Fig. 15, depending upon whether numeral or alphabetical information is represented on the detail card analyzed at the second reading station.

When the data analyzed at the second reading station is numerical data, the N impulse to energize the print control magnet 361 to print the desired digit is effected by an energizing circuit from the line 920 (Fig. 31*g*) through circuit breakers CB, a wire 998 to cam contacts CR104 (Fig. 31*i*), wire 999, thence through the lower R909—1 to 120 relay contacts which are transferred at the time that CR104 cam contacts transmit an impulse. The N control R909 relay coil (Fig. 31*b*) is energized by an obvious circuit which extends from line 920 through cam contacts CR20, R909 relay coil to line 921.

*General explanation of the multiple line reading and multiple line printing*

A general explanation will now be given for an understanding of the operation of the machine wherein a plurality of fields of a record card, such as the heading card HC shown in Fig. 1, may be analyzed at the second reading station, the record fields A, B and C read in successive cycles of operation and control a single bank of print control magnets 361 or a plurality of such banks if so desired, to print the three lines of the address on a form as shown in Fig. 1*a*.

As will be subsequently described in detail, circuits are rendered effective under control of the heading card when so designated to condition the machine for this form of recording and also to determine the number of lines which are to be printed. In most cases two or three lines of printing would be desired from one heading card. However, there are conditions where a card is to be used as a control for printing only one line although other lines of data may be designated therein. In each case, however, the number of lines of printing selected coincides with the number of cycles of operation of the machine so as eliminate loss in time of machine operations.

The control for printing, as previously stated, is controlled from the second reading station and in the assumed example the heading card is perforated at fields A, B and C to represent (A) the name; (B) the street address; and (C) the town and State. Accordingly, there are multiple plug wire connections 929, 931 and 933 (Fig. 31*g*) from the plug sockets of the second reading station corresponding to the card columns of field A, field B and field C. These multiple plug connections terminate, respectively, at plug sockets 930, 932 and 934 (see Fig. 31*f*) which are designated as line 1, line 2 and line 3. These plug sockets related to the contacts of progressive selectors which are in the form of relays R1163, R1170 and R1177 and which are energized in succession to pick up the fields from the cards that are to be listed and in the order in which they are to be listed. The progressive selector R1163 for line 1 has each of its plug sockets 930—930′ connected to related contact points 1, 2, etc. so that upon the energization of the R1163 relay, for example, the card reading circuit connection is extended from a plug socket 930 through the R1163—1 relay contacts, for example, and a wire 1000 to one of a plurality of plug sockets 936 designated "Common." Thus, when R1163 selector relay is energized, the plug connections from the card reading station terminating at plug sockets 930 will be extended to the corresponding plug sockets 936. In the same manner, when the R1170 relay is energized, the "Street" plug connections terminating at the plug sockets 932 will be extended to Common plug sockets 936, and, in the same manner, plug sockets 934 are selectively and sequentially connected to the plug sockets 936.

From the series of plug sockets 936 there are multiple plug wire connections to a series of plug sockets 937 (Fig. 31*i*) designated as Transfer printing and connected to contacts of a relay R843, said contacts being in series with the print magnets 361.

As will be later described in detail, the R843 relay is energized to transfer its contacts so as to extend the circuit from each plug hub 937 through the respective contact of the R843 relay, thence from the respective normally closed contact of the R909 relay to the corresponding print magnet 361. The plug connections of three fields are shown coordinated with a single series of plug sockets 937 and in such manner as to utilize the same printing orders to print the name, street number, town and State beneath each other as usual.

*Conditioning of the machine for changing from single line printing to multiple line printing*

As shown in the example of Fig. 1, a detail card DC may pass through the machine so that its field of data may control the desired printing bank to print on a single line the desired data which is shown in the result record R (Fig. 1*a*) as an amount and other data which may be derived from the card. This printing is effected when the detail card is analyzed at the second reading station and at this time there is a following heading card HC at the first reading station and if so designated by a hole 2 at the 12 index point position of a selected column or the R index point position as it is otherwise known, will condition the machine for multiline listing under control of said heading card when it arrives at the second reading station.

It is preferable to have this control by the heading cards and according to the present embodiment the control hole 2 consists of a perforation at the 12 or R index point position in a selected card column of the card HC as is shown in Fig. 1. To accordingly condition the machine for multiline reading it is preferable to do this by a presensing at the first reading station so that when the heading card arrives at the second reading station, multiline reading and printing may be effected by successive cycles of machine operation while said card is held at the second station. Referring to Fig. 31*g* it will be seen that a plug socket 923, corresponding to the first column in which the MLR start designation 2 is perforated, has a plug connection to a plug socket 924 (Fig. 31*f*). Therefore, when the 12 or R index point position is sensed and a hole 2 is found in the heading card, an impulse circuit from the first station card analyzer is extended by plug connection to the plug socket 924, thence through the normally closed contacts of R1500—9 relay contacts, through the CF26 cam contacts, the pickup coil of the R1485 multiline start relay and a wire 1001 to the line 921. The CF26 cam contacts are timed to close between 168–183° at which time the R index point position is analyzed, R1485 relay coil being energized it closes the hold contacts R1485—1, thereby holding the R1485 relay energized through cam contacts CF14 and back to line 920. The CF14 cam contacts hold the R1485 relay energized until 340° of the cycle in which the master card is analyzed at the first reading station.

R1485 relay also closes the R1485—2 relay contacts, thereby extending a circuit from the line 920 through CF13 cam contacts which close at 312° before the R1485 relay coil is deenergized, thence through R1485—2 relay contacts, wire 1007, the pickup coil of R1486 relay coil, and wire 1001 to the line side 921. By a branch wire connection 1002 a circuit is extended from the R1485—2 relay contacts, through wire 1002, the pickup coil of the R1500 interlock relay to the line 921. A hold circuit for the H coil of the R1500 interlock relay is through the R1500—1 relay contacts, wire 1003, R1497—3 normally closed relay contacts, back to line 920. This hold circuit is held by R1479—3 contacts until the R1497 relay coil is energized which takes place after multiline reading and printing have been completed from the heading card. The purpose of the R1500 coil which is an interlock relay will be described later.

A hold circuit for the MLR, line 1, relay R1486 is effected through the R1486—1 contacts, wires 1004, 1005, 1006 and CF11 cam contacts back to line 920. The CF11 cam contacts hold the R1486 relay coil energized until 285° of the first multiline reading cycle.

It will be recalled that the R843 relay coil shown in Fig. 31*f* is to be energized so as to complete a circuit from the plug sockets 937 (Fig. 31*i*) which receive the plug connections to the print control magnets during multiline listing operation whether it comprises 1, 2 or 3 lines. Energization of the R1500 (Fig. 31*f*) relay coil closes the R1500—6 relay contacts so as to complete a circuit from the line side 920, through CF11 cam contacts, wire 1006, R1500—6 relay contacts, R843 relay coil and wire 1008 to the line 921. Because the R1500 interlock relay remains energized during multiline reading and printing operations, the R843 relay coil is picked up each cycle during the period of time that the CF11 cam contacts are closed, which is from 320° of a preceding cycle to 285° of the cycle in which a multiline reading and printing operation takes place. It will now be understood that the R843 relay coil is energized during the first MLR cycle in which line 1 is printed by the printing mechanism. This is done to condition the print unit to accept impulses through the transfer print hubs and suppress normal print entry. It remains to be shown how the R1163 line 1 progressive selector relay coil (see Fig. 31*f*) is energized so as to coordinate the plug sockets 930 corresponding to the columns in which the same is represented, or field A, with the print control magnets 361.

Energization of the R1486 relay coil closes the R1468—3 relay contacts, thereby completing a circuit from line 920, through CF11 cam contacts, wire 1006, R1486—3 relay contacts, R1163 relay coil and wire 1008 to line 921. Thus, all of the contacts controlled by the R1163 relay, as shown at bottom of Fig. 31*f*, are closed, thereby extending the circuit from the plug hubs 929 (Fig. 31*g*) from which plug connections are made to the plug hubs 930 (Fig. 31*f*) from which plug connections through common sockets 936 are made to the transfer print plug sockets 937 (Fig. 31*i*). The R1163 relay, therefore, remains energized in the same period of time that the R843, and R1486 relay coils are energized since all of them are maintained energized during the effective closed period of the CF11 cam contacts.

As will be evident later on, there is no suppression of card feeding in the cycle in which the heading card is analyzed at the first reading station, so that said card is transported, by means of the grippers in the card feeding unit, to the second reading station for controlling printing of the first line by the printing mechanism. Therefore, the heading card is seized by the grippers and fed to the second reading station between 195° and 315° for analysis by the sensing commutator units at the second reading station. During this second station reading cycle, impulses are transmitted to the print magnets according to the alphabetical and numerical information and printing takes place in the manner previously described.

It is also pointed out that during the first multiline cycle in which the heading card is analyzed at the first reading station, the card feed mechanism operates in the normal manner so as to feed the following card to the first reading station at the same time that the heading card is being fed to the second reading station. When the heading card has been fed to the second reading station it is aligned both vertically and horizontally to proper analyzing position and held there until the completion of the multiline reading operation. This is possible because circuits are effective during the first MLR cycle to prevent the card picker clutch magnet 64 (Fig. 31*a*) and the card gripper clutch magnet 153 from engaging until completion of the multiline reading and printing operations. It will be recalled that the R1500 interlock relay coil is energized during the multiline reading operations and accordingly the R1500—7 relay contacts and the R1500—8 relay contacts are both open, thereby preventing activation of the normal energizing circuit for the gripper clutch magnet 153 and the picker clutch magnet 64. Therefore, no further cards will be fed from the magazine and the heading card will remain at the second reading station until the completion of the multiline reading and printing operations.

However, for the cycle in which the heading card is analyzed at the first reading station, the clutch magnets 64 and 153 receive energizing impulses for engaging the respective clutches long before the R1500 relay coil is energized, so during this cycle of machine operation the following card is fed from the magazine to the first reading station and the heading card is fed from the first reading station to the second reading station.

However, for each cycle of operation, the CF cam clutch magnet 280 becomes energized in the normal manner by a circuit previously described, which is necessary because in the present machine the CF cams must operate to control cam contacts which are involved in the circuit for multiline reading and printing.

Attention is directed to the fact that in other forms of record controlled accounting machines the CF cams operate only during the time that a card is fed and that at other times such cam contacts remain at rest. However, in the present machine the operation of the CF cams also takes place in cycles where a card is not being fed, such as, for example, where the card remains at rest for multiline reading and printing operations.

Understanding now that the first line of the address or the name is printed under control of field A, there will now be described the circuits which operate so that the second line or the street address is printed under control of field B of the same heading card. This is accomplished by first deenergizing the R1163 progressive selector relay (Fig. 31*f*) at the termination of the first MLR reading cycle which occurs when CF11 cam contacts open at 285° of the cycle. At the 265° of the cycle during which printing of the first line of the address is effected, cam contacts CR51 close to complete a circuit from the line 920, through CR51 cam contacts, R1500—10 interlock contacts which are now closed, through the R1485—3 MLR start relay contacts which are now closed, through the R1486—2 line 1 relay contacts which are now closed, to the pickup coil of the R1487 line 2 advance relay, wire 1001 to line 921. The hold circuit for the R1487 H relay coil is through the R1487—1 relay contacts and cam contacts CF14 precisely as explained for the R1485 relay coil.

R1487 relay coil closes the R1487—2 relay contacts so that at 312° of the first multiline reading cycle a circuit is completed from line 920 through cam contacts CF13, through R1487—2 relay contacts to the pickup coil of the line 2 relay R1488, wire 1001 to line 921. The R1488 H coil is held through the R1488—1 contacts, wires 1004, 1005, 1006, and CF11 cam contacts until 285° of the second multiline reading cycle. R1488—3 relay contacts close to pick up, by an obvious circuit, the R1170 progressive selector relay and in the same manner as has been described for the R1163, R1486 relays, the R1488 and R1170 relays are held energized until 285° of the second multiline reading cycle. With the R1170 progressive selector relay now energized, there will be a circuit connection effected between the plug sockets 932 and 936, thereby transmitting impulses according to the perforations in card field B to the printing control magnets 361, thereby printing the second line of information on the record strip.

The printing mechanism of the present machine includes the usual platen around which is curved the record strip and furthermore includes line spacing devices for turning the platen so as to space the strip one line to separate the successive lines of printing. Accordingly, the second line of the address will be spaced from the first line as shown on the record sheet R in Fig. 1.

Since, during the second multiline reading cycle the interlock R1500 relay coil is energized, impulses cannot be transmitted to the gripper clutch magnet 153 (Fig. 31*a*) and the picker clutch magnet 64, and the heading card will still remain at the second reading station and a third multiline reading and printing cycle takes place exactly in the same manner as has been described for line 1 and line 2.

At the end of the second multiline reading cycle, the R1489 coil (Fig. 31*f*) becomes energized and it, in turn, picks up the R1490 relay coil which is held energized during the third multiline reading and printing cycle. The R1490 relay coil closes the R1490—3 contacts, thereby energizing the R1177 line 3 progressive selector relay. This progressive selector relay coordinates field C with the print magnets 361 so that the printing mechanism will print the third line of the address. This will complete the printing of the address from the heading card. As will be subsequently explained in detail, designations are preferably included in the heading card which function to determine the number of lines which are to be printed and assuming that three lines are to be printed from the same card as has been explained, the circuits are conditioned differently at the termination of multiline printing.

As is shown in Fig. 1, the perforation 3 which is to select and determine the number of lines of printing is preferably placed in the same column that the R hole 2 is located and, upon coordination of the heading card with the second reading station, the sensing commutator associated with such column will read out this column to determine whether there is a supplemental hole at the 3, 2 or 1 index point position. In the present example, assuming three-line printing, there is a perforation 3 at the 3 index point position so that in each multiline reading and printing cycle this column is analyzed and it is only during the third multiline reading cycle that a circuit is effective to terminate multiline reading and printing operations.

From the plug socket 926 (Fig. 31*g*) of the second reading station associated with the first column having this line number control, a plug connection is made (see Fig. 31*f*) which terminates at the Stop plug socket 927. The circuit from the plug socket 927 is completed during the third multiline reading cycle, through cam contacts CR98 which are timed to close when the three index point position is analyzed, thence through the R1490—4 relay contacts now closed, the P2 pickup coil of the R1497 relay and wire 1001 to the line 921. A hold circuit for the R1497 relay is completed through the R1497—1 hold contacts, wires 1005, 1006 and CF11 cam contacts back to line 920. R1497 relay opens the R1497—3 relay contacts to tend to disable the R1500 interlock relay, but the final deenergization of the R1500 relay is controlled by the CF12 cam contact so as to deenergize at 150° of the machine cycle.

Referring to Fig. 31*a*, the closure of the R1500—8 relay contacts enables the gripper clutch magnet 153 to be energized at the normal time 165° which will feed the card from the second reading station to the stacker drum, the card at the first reading station to the second reading station and the card at the presensing station to the first reading station.

Due to the fact that R1500—7 (Fig. 31*a*) relay contacts are now closed, an impulse will be directed in the normal manner to the picker clutch magnet 64 which will cause feeding of a card from the supply hopper to the presensing station. The type of ensuing operations will then be determined by the type of card which is analyzed. In the event that a second heading card follows, the control for multiline printing will be reinitiated and multiline reading will take place from said card according to the designations thereon. If the card following the heading card happens to be a detail card there will be a single line of listing under control of such card.

There is an attempt to deenergize the R843 relay (Fig. 31*f*) when the R1500—6 relay contacts open, but due to the continued closure of the R1497—2 relay contacts, the R843 relay is held energized until 285° of the third multiline printing cycle. This is necessary because of the fact that beyond 150° of this cycle, alphabetical information may be read from the card so that the coded alphabetical impulses may be properly transmitted to the printing control magnets 361.

*Selective control for determining the number of lines to be printed from a card*

It is preferable to have the heading card select the number of lines which are to be printed since, at this time, it may be desirable to print only the name, and in other instances only the name and street address. Accordingly, a perforation at the 1 index point position will terminate printing when a single line has been printed and a perforation at the 2 index point position will enable two lines of printing. The control for the selective operations is shown in Fig. 31*f* wherein it will be seen that there are two cam contacts CR96 and CR97 which close when a 1 index point position is analyzed and when the 2 index point position is analyzed, respectively. During printing of a single line, the R1486 relay coil is energized to close R1486—4 relay contacts upon the presence of a perforation in the 1 index point position, and the circuit is extended from the card sensing plug connection 927, through CR96 cam contacts, R1486—4 MLR line 1 relay contacts to the release relay R1497, wire 1001 and line 921. In the same manner, a perforation at the 2 index point position enables the CR97 cam contacts to transmit an impulse through the R1488—4 MLR line 2 relay contacts to the R1497 relay when two lines have been printed. The operations which follow termination of one or two line printing are the same as those which have been previously described, which are carried out at the termination of printing of three lines on the record sheet.

Summarizing, the additional selective control enables a single setup made by the operator, which constitutes the plug connection 927, to select differentially the number of printing cycles and to confine them to 1, 2 or 3, in accordance with the corresponding perforations in the same heading card which contains the address data to be printed line by line.

It is of less concern here that multiple line printing may be repeated by other electrical controls set forth in detail in the copending Beattie et al. application Serial No. 74,424, filed on February 3, 1949.

Pickup of the card cycle relays R1641 and R1644 (Fig. 31*a*) is suppressed during the first MLR cycle by the MLR start relay contacts R1485—4, and said relays in turn suppress the impulse through contacts R1641*a*–R1644*a*, etc. (Fig. 31*g*) normally used for accumulator plus or minus control. The card cycle relays are held ineffective for the following MLR cycles under control of interlock relay R1500—11 contacts (Fig. 31*a*).

*MLR printing*

Most of the address data is alphabetic and therefore consists of a combination of numeric and zone punchings on the card according to the code already noted. The circuit for reading the card includes, line 920 (Fig. 31*g*), circuit breakers CB1—4, cam contacts CF28, second reading contacts R16332*g* now closed, wire 992, the emitter and through the card holes to plug socket 929 in the name field via the brush isolation contacts R1104—2 closed by the timing of contacts CF15, a plug wire to socket 930 (Figs. 31*f*) progressive selector contacts R1163—1, wire 1000, common socket 936 and plug wire to transfer print socket 937 (Fig. 31*i*) through the normally open contact R843—1, the normally closed N relay point R909—1, print magnet 361, through the zero contact 166a, and normally closed OXRN relay contacts R1041—1 and line 921. This is for any numeric impulse and there is a parallel circuit from print magnet 361 through the normally open side of the zero print contact 165*a*. This point transfers during the numeric impulse time and the other related contacts close on the normally open side before breaking the closed side.

The timing for the print control contacts of relays R777, R909, R975 and R1041 (Fig. 31*i*) is taken care of by cam contacts CR19, CR20, CR21 and CR22, respectively, as shown in Fig. 31*b*.

The circuit through the print magnet causes the translator to unlatch the selector gear which turns the typewheel to proper position for printing. The zone impulse follows the same circuit as the numeric impulse through the print magnet and unlatches the print cam for the zone impulse received. This cams the typewheel forward causing printing of the character related to the code values sensed from punched holes in the card.

The second impulse circuit (zone impulse) through the print magnet is the same up to the zero print contact 165*a*, 166*a*. This contact was shifted when the first impulse (numeric) energized the print magnet. Therefore, the alphabet printing circuit is completed through the normally open side 140*a* of the zero print contact to line 921.

*Automatic group control*

In record controlled accounting machines in which the present invention is preferably embodied, it is desirable to initiate total taking, record feeding and other operations under control of the well known automatic group control means. Briefly, such means includes devices for analyzing the holes in corresponding card columns of successively fed cards, determining the presence of similar or dissimilar holes in the compared columns, and upon detecting a group number change, total taking operations are initiated. The arrangement for analyzing such holes and picking up comparing relays is well known and for that reason only sample circuits are noted which are understood to extend to minor, intermediate and major stages of control. Herein such controls are also used to initiate various stages of program operation.

As the cards are sensed and moved through the card feed stations, each card is compared with the card preceding it and also with the card following it and any disagreement is sensed and relay controls are set up for minor, intermediate and major controls.

As illustrated herein, the minor control is associated with the item number, the intermediate control with the class number and the major control with a customer's account number. A change in any of the three classes is normally used to stop card sensing and feeding and automatically start a program for printing accumulated totals. This operation under program control will be explained hereinafter.

To begin with, it is advisable to study an ordinary comparing circuit. Referring to Figs. 31*d* and 31*g*, it is seen that plug connections are made from a socket 942 (Fig. 31*g*) in the first card reading station and a socket 943 (Fig. 31*d*) in series with a minor control pickup coil R593. A similar set of connections is made from the plug socket 944 (Fig. 31*g*) of the second reading station to socket 945 (Fig. 31*d*) in series with relay coil R595. It is understood that both of these comparing pickup controls agree as to the columnar position analyzed on the card. In the case of the minor control governed by item number perforations, it will be in one of such columns of the item field. There is a pair of comparing control relays such as R593, R595 for each column of each of the comparing classes of control.

At the middle of Fig. 31*d*, it is seen that comparing relays R593 and R595 have related contacts R593—2 and R595—2 connected in a series and parallel arrangement so that energization of both coils together, breaks a circuit, and energization of either alone establishes a through circuit connection. A number of such contact arrangements may be coupled together by cross-plugging to comprise a class of group controls such as minor, intermediate and major. As shown, there is only a single sample set of contacts for each class of control with plug socket 947 representative of minor control, socket 949 representative of intermediate control and socket 951 representative of major control.

Turning now to consideration of a sample comparing circuit, much of this is similar to the card analyzing circuit already pointed out. The operation of the comparing circuit including the first reading station may be followed from line 920 (Fig. 31*g*) through the CB circuit breakers, cam contacts CF28, first reading relay contacts R1630*b*, wire 990 to one of the item number columns, then through the card analyzing commutator similar to the one shown in the first column position, socket 942 and a plug wire to socket 943 (Fig. 31*d*) through the pickup coil R593 and wire 994 to line 921. The second simultaneous comparing circuit is somewhat similar in going through the line 920 (Fig. 31*g*) circuit breakers CB, contacts CF28, second reading relay contacts R1632*g*, wire 992 to the card reading commutator of the second station and in the same item number column, to plug socket 944 and a plug wire to socket 945 (Fig. 31*d*) and then to pickup coil R595 and wire 994 to line 921.

A holding circuit is established for holding coils of both relays R593 and R595 through the relay contacts R593—1 and R595—1 picked up by the two comparing circuits already described. The holding circuit is through line 920 (Fig. 31*d*), cam contacts CR38 and CR39 closed together through most of the first half of an operating cycle and through wire 995, relay contacts R593—1, the holding coil H of relay R593 and wire 994 to line 921. A parallel holding connection is made through relay contacts R595—1 and coil R595H.

Assuming first that the two compared positions bear agreeing perforations, then the contacts R593—2 and R595—2 (Fig. 31*d*) are merely reversed in position simultaneously and the normally open circuit condition prevails and no group control impulse will be transmitted because both comparing relays are energized at the same time and there is no disagreement between the related data in the cards being compared and there is no comparing exit impulse.

However, should there be a disagreement in perforations, then one comparing relay is energized before the other and the contacts are shifted to provide a control impulse through the following connections; assuming that the relay R593 is operated first. The circuit includes line 920, cam contacts CR34 and CR35, wire 996, the right-hand relay contact R593—2, the right-hand relay contact R595—2, plug socket 947 and a plug wire to socket 948 (Fig. 31*g*), a minor control pickup coil R1407 and wire 997 to line 921.

Similar control pickups are made to intermediate relay R1408 and major control relay R1409 and the holding of such classes of group control and the effect they have on other functions in the machine is described next in connection with the Program Start Control section of the description.

*Program start control*

As already explained in the Automatic Group Control section, whenever a group change occurs, an impulse is emitted from the comparing unit and carried by plug wire to minor, intermediate or major plug sockets 948, 950 and 952, respectively (Fig. 31*g*) to call into operation singly, or in combination, program start control relays R1407, R1408 and R1409. They are available on the control panel for selective functions. There are three classes of program starting which may be initiated from the several comparing fields of the cards. In addition to the card comparing signals, the feed control tape TP has an overflow control perforation and sensing device which is adapted to initiate any program. This fourth class of total control is called the overflow program and has separate pluggable outlets available for selection of control. The overflow program control is described separately hereinafter as it may be used separately or in conjunction with other program operation.

The first three classes of total are designated Minor, Intermediate, Major and each has a separate plug socket for initiating the particular class of control. Any higher class of control will call into operation all minor classes of control.

The various classes of total control determine the start of the program operation and they also control stopping the program after the desired number of steps have been used according to the particular class of total initiated.

Assuming that the comparing devices sense a disagreement in the minor field, then an impulse is carried to plug socket 948 (Fig. 31*g*) and through minor-1 pickup coil R1407 and through wire 997 to line 921. The holding circuit for this first program start control is through line 920, cam contacts CR53 normally closed, heading control suppression contacts R1671—2, minor control contacts R1407—1, the holding coil R1407 and wire 997 to line 921. Other contacts of the minor-1 relay R1407 are used in the program operation and will be described hereinafter.

A transferal of the minor-1 program start controls to the minor-2 program control is accomplished by the closure of contacts R1407—2. This sets up a circuit including line 920, cam contacts CF16, relay contacts R1407—2, the minor-2 pickup coil R1412, wire 997 and line 921. A holding circuit is established through cam contacts CR54 and relay contacts R1412—1 to the holding coil of relay R1412. The cam contact CR54 is used for the purpose of governing the deenergization of the minor-2 relay R1412. A circuit is completed around contact CR54 through wire 1010 and the contacts R1440—7 of the program end relay which serves to shunt out the cam contacts until such time as the program is completed and the program end relay becomes energized to open R1440—7 and disable all three secondary relays. This operation is described hereinafter with reference to program operation.

The minor-2 relay R1412 is held energized all during the program operation and the contacts associated therewith are used for interlocking other machine functions. For example, the relay contacts R1412—3 (Fig. 31*a*) when opened serve to suppress the pickup of the auto start relay R1639 and the automatic start circuit as already explained in the description of the starting circuits. This control serves to suppress card feeding operations during program operation.

Referring again to Fig. 31*g*, it is noted that when comparing control is plugged to the intermediate program start socket 950, and a corresponding change is sensed, the intermediate-1 relay R1408 is picked up. A hold circuit is established similar to that of the minor-1 hold through the normally open intermediate relay contacts R1408—1 to the holding coil R1408 and through wire 997 to line 921. In addition to the circuit for the intermediate control, the simultaneous closure of contacts R1408—3 calls into operation the holding coil of the minor-1 relay R1407 which will in turn close its own contacts R1407—1 establishing its own holding circuit.

This same sort of step-down circuit forces all minor classes of program control to be energized when any higher class of total is initiated. Therefore, the minor control contacts can be used for interlocking and program starting for any class of total change. However, the program stop is under control of the higher class of total whenever such higher class of total calls into operation the minor control.

The intermediate-1 contacts R1408—2 completes a circuit to the intermediate-2 pickup coil R1417 and the circuit is completed through cam contacts CF16 and wire 997. This circuit is similar to the minor-2 pickup circuit as already described under the minor class of total control change. Along with the pickup of the intermediate-2 relay, the minor-2 pickup coil R1412 is also called into operation by the closure of contacts R1407—2.

When a comparing impulse is directed through plug socket 952, it is an indication that there is a change in the major group of classification and then major-1 relay R1409 is picked up. A hold circuit is established for said major relay through its contacts R1409—1 and is completed in a manner similar to the establishment of the minor and intermediate hold circuits. A parallel circuit is completed through the normally open major-1 contacts R1409—3 to the intermediate holding coil of relay R1408. Energization of the intermediate-1 hold coil closes its contacts R1408—1 and a hold circuit is established. The intermediate-1 relay energizes the minor-1 holding coil as previously described and therefore all three classes of total relays are energized when a major class of total change occurs. Then also the minor, intermediate and major control contacts R1407—2, R1408—2 and R1409—2 operate respectively to call into operation the secondary program control relays R1412, R1417 and R1418. These three program control relays have holding circuits and contacts used for program end stopping control as explained in the next section of the specification.

A Final program start control is a key operated final total class of control. Reference to Fig. 31*a* shows that when the machine stops by exhaustion of card supply, for manual stop, or any other reason, the key contacts F may be closed and then relays R1420, R1421 and R1636 are picked up. Coil R1420 is the pickup coil of the Final Total start control, coil R1421 is a final total interlock holding coil, and coil R1636 is a secondary pickup of the usual start key relay. The circuit for the final total pickup includes line 920, wire 272, key contacts F, normally closed interlock contacts R1421—1, first card relay contacts R1688*b*, cam contacts CR85, pickup coil R1420, wire 918 and line 921. The P2 coil of relay R1636 is also energized through wire 917.

A holding circuit is established (Fig. 31*h*) through line 920, cam contacts CR57, wire 1107, relay contacts R1420—1, the holding coil of the final total relay R1420 and wire 1106 to line 921. Other contacts R1420—2 call in the pickup coil of the interlock relay R1421 through cam contacts CR58. This interlock relay also shifts contacts R1421—1 (Fig. 31*a*) to hold the interlock holding circuit as long as the F key contacts are held closed.

The final total contacts R1420—5 (Fig. 31*e*) lead to plug sockets 916 for connection to a Read Out socket 966 (Fig. 31*l*) for manual total taking.

*Program operation*

The program unit (Figs. 31*e* and 31*ee*) is made up with plurality of program control relays and associated contacts operated successively to set up pluggable circuits for five steps of operation. The purpose of the unit is to provide a series of sets of contacts closed seriatim in series of five cycles so that one or more steps or sequences of control are available for such controls as successive classes of total print or successive read out of data from storage.

The program unit comprises sets of advancing relays R1429 to R1437 arranged in a vertical column down the center of Fig. 31*e* and pluggable emitting contacts shown at the right. It also includes stopping control contacts and program end relays shown in the lower section, Fig. 31*ee*.

Relays R1429 to R1437 when once started in operation by a minor group change or an overflow program start connection, continue to be picked up successively by cycle after cycle of machine operation until stopped selectively by shifted contacts of either of the minor-2, intermediate-2 or major-2 relays, R1412, R1417 or R1418, respectively. It is already noted in the last section of description that on any class of comparing group change, minor-1 relay contacts R1407—3 are closed, and here (Fig. 31*e*) they serve to start the program operation. When once started, relays R1429 to R1437 operate successively and then serve to call into play associated relays R1236, R1240, R1244, etc., the contacts for which are arranged in successive pluggable sets on the panel shown diagrammatically at the right of Fig. 31*e*.

The usual control exercised by the program unit is the control of successive accumulator total printing and the resetting of the related accumulators. However, the program unit may control various other functions such as address line printing out of storage.

The program start circuit includes line 920 (Fig. 31*e*), cam contacts CR46, stop interlock relay contacts R1693*c*, the minor-1 change contacts R1407—3, the step 1 control pickup coil R1429, wire 1011 and line 921. A holding circuit is established through cam contacts CR48, relay contacts R1429—1, the holding coil of relay R1429, wire 1011 and line 921. A circuit parallel to the step 1 holding circuit is directed through wire 1013, the normally closed overflow shift contact R1450—2, to the step 1 relay coils R1236 and R1239 and through wire 1012 to the other line 921.

Relays R1236 and R1239 control contacts such as R1236—1 and R1239—1 connected to plug sockets such as 985 in the "step 1" position on the program control panel. The step 1 impulse is completed to the control panel along a circuit including line 920, cam contacts CR49 and CR50 through stop interlock relay contacts R1694*a*, R1695*a*, wire 1014 and normally closed basic setup relay contacts R1198—3 and then through the contacts R1236—1, now closed, to the plug socket 985 and then by plug wire to whatever function is desired, usually the printing of a minor total from a certain accumulator order as noted later.

Assuming that only one step of total taking is required of the program unit, i. e., the operation is initiated by a minor class of total change, a program stop circuit is completed as follows: From line 920 the stop circuit impulse progresses through wire 1015, the normally closed stop interlock relay contacts R1693*b* through the minor-2 relay contacts R1412—7 now closed, then through the normally closed basic relay contacts R1201—6, the step 1 relay contacts R1239—3, the normally closed left side of the intermediate-2 contacts R1417—4, the minor-2 relay contacts R1412—8, closed on a second stage of the minor selecting cycle, and then through the normally closed step 5 control contacts R1437—2, closed program repeat contacts R1443—5, cam contacts CR93 closed from 170 to 182° and then through the program end pickup coil R1440 and wire 1011 to line 921. Relay R1440 then closes contacts R1440—1 in series with the holding coil to provide the holding circuit including line 920, cam contacts CR44, wire 1017, contacts R1440—1, the holding coil of relay R1440 and wire 1011 to line 921.

Relay R1440 controls contacts R1440—6 in series with the pickup circuits of the relays of all five steps and thereby breaks down the succession of energization of such relays.

When an intermediate class of total change is sensed, the program start operation is the same as with the minor class of change, the difference being that the stepping relays are allowed to advance further before being brought to a halt by energization of the program end relay R1440. The intermediate program advance circuits are completed from cam contacts CR45, through the normally closed overflow end relay contacts R1447—6, the normally closed program end relay contacts R1440—6, the normally closed program repeat contacts R1443—3, the step 1 control relay contacts R1429—2 now closed by a simultaneous minor control start, and then through the pickup coil of relay R1430 which is the step 2 advance control, and then through wire 1011 to line 921. A holding circuit is completed from cam contacts CR47 through the relay contacts R1430—1 now closed, the holding coil of relay R1430 and wire 1011 to the opposite side of the line.

The control for the second or intermediate step of program operation is completed by a circuit through cam contacts CR46, the stop interlock relay contacts R1693*c*, the step 2 advance relay contacts R1430—2, the pickup coil of the secondary step 2 relay R1431 and wire 1011 to the line. A holding circuit is established similar to the step 1 hold circuit through the normally open step 2 control relay contacts R1431—1. It includes cam contacts CR48, relay contacts R1431—1, the holding coil of relay R1431 and wire 1011 to the line. A parallel circuit is completed through the normally closed overflow switch contacts R1450—3 and the program step 2 relays R1240 and R1243 and through wire 1012 to the line. These step 2 relays R1240 and R1243 are seen to have contacts R1240—1, R1243—1, etc. connected with a second row of plug sockets such as socket 969 arranged one step below the step 1 sockets on the program plugboard. The step 2 impulse to the control panel is similar to that described under the step 1 or minor class of total change. The difference is that the time of closure of the related contacts R1240—1, etc. is later, and on the next program step (intermediate step) a circuit is completed from cam contacts CR49, CR50 through the stop interlock relay contacts R1694*a* and R1695*a* and basic relay contacts R1198—3, and through relay contacts R1240—1 for the second step now closed in series with the plug socket 969 so that secondary classes of functions may be initiated.

It may be noted in connection with the intermediate control that, up to the present point, the intermediate control relays do not play a part in selecting the second step of operation once it is initiated by the minor change control. It is only through the stopping control that the intermediate-2 control relay operates contacts R1417—4 to terminate the automatic sequence of program operation at the proper point.

The program stop circuit is completed by a circuit from line 920 (Fig. 31*e*) through wire 1015, normally closed interlock relay contacts R1693*b* (Fig. 31*ee*), relay contacts R1412—7, R1201—6 step 2 relay contacts R1243—3 now closed, then through the normally closed left side of the major-2 relay contacts R1418—3, through the right side of the intermediate-2 relay contacts R1417—4 now closed by the intermediate change (and incidentally, the shifting of which makes ineffective the step 1 stop control usually performed by R1239—3) and then through the minor-2 relay contacts R1412—8 also closed by the change, through normally closed contacts R1437—2 and R1443—5, cam contacts CR93, the pickup coil of the program end relay R1440 and wire 1011 to line 921. The program end holding circuit is the same as that described in connection with the minor program end.

When a major class of group change is sensed by the comparing unit, the program is started in the same fashion as described with minor and intermediate program starting. The circuits and program control for two steps of program operation are the same as described when considering the intermediate class of total program. The third program step is conditioned by an advance to the "step 3" circuit which is completed through cam contacts CR45 (Fig. 31*e*), relay contacts R1447—6, R1440—6 and R1443—3, step 2 control relay contacts R1431—2 and the step 3 advance control pickup coil R1432 and wire 1011 to the line. A holding circuit is established similar to the step 2 advance control by going through cam contacts CR47, relay contacts R1432—1 and the holding coil R1432.

The program step 3 control circuit is similar to the program step 2 and step 1 control circuit in that it goes through cam contacts CR46 and then differs in going through the step 3 advance relay contacts R1432—2 and the pickup coil of control relay R1433. A familiar form of hold circuit is then completed through cam contacts CR48 and relay contacts R1433—1 and the holding coil of relay R1433. A parallel circuit therewith is directed through normally closed overflow switch contacts R1450—4 and the program step 3 control relays R1244 and R1247. These last mentioned relays also control contacts associated with plugs on the control panel. The contacts are seen to be arranged in series with sockets in the step 3 row and comprise contacts such as contacts R1244—1 and R1247—1 which are closed in a third cycle of operation to provide connections from the cam contacts CR49 and CR50 along a path already followed.

The stop control for the major control after program step 3 is similar to the minor and intermediate program end circuits described hereinbefore, the only difference being that the major-2 control relay contacts R1418—3 (Fig. 31*ee*) are shifted to close on the right side so that the stopping control circuit includes the normally open contacts R1632*c* (closed by presence of cards) or switch S2 and wire 1018 (without final total control), and said circuit requires the closure of the step 3 contacts R1247—3 before the program end relay R1440 is picked up to open contacts R1440—6 and terminate the successive stepping of the step control relays.

The fourth and fifth steps of program control are allowed to proceed in the case of final totals which is attended by the opening of switch S2 (Fig. 31*ee*) and dependent upon either a plugged final total impulse through socket 915, or automatic shifting of second reading contacts R1632*c* to the normally closed position shown (by card exhaustion) coincident with the closure of step 4 contacts R1251—3.

The program end control relay R1440 has related contacts R1440—3 (Fig. 31*a*) in series with the automatic start relay R1639 and these contacts are operated to close before the closure of cam contacts CR5 so that the card feed unit is started as soon as programming is terminated in order to feed and analyze record cards on the following machine cycle. This operation of the program end relay contacts is the same for all classes of total control.

A number of examples are given hereinafter of the kind of control exercised by plugging to the various steps of the control panel (Fig. 31*e*) relating to the program unit. It is in these sections that the successive operations of relay contacts R1236—1, R1240—1 and R1244—1 are made clearer in the printing of successive totals and the printing of several lines of address data from storage.

If additional program contacts are needed for any of the steps, the corresponding step control relay such as step 4 relay R1435 may be plugged to the controls of any other step such as step 3 by a plug wire between a program couple socket 1021 to socket 1022. Then relays R1248 and R1251 are called in with relays R1244 and R1247.

On the left side of the program control panel, at the right on Fig. 31*e*, is a separate paired set of five pairs of overflow step contacts and plug sockets. They are controlled by overflow step relays R1260—1264 which operate much like the program step relays R1236, R1240, R1244, etc., and are called in seriatim by the same advance relays R1429, etc., but as initiated by feed control tape overflow controls as pointed out hereinafter.

*Pilot selectors*

Pilot selectors are provided to sense a special perforation in a card when the card is read at the first sensing station and then close contacts of said selectors while the card is being read at the second reading station. The purpose is to switch card reading impulses into accumulators or other receiving devices for one cycle of operation and then restore the switch to allow ordinary sensing operations to be carried on. For example, in the case of the leader card LC shown in Fig. 1, it is desired to read the first invoice number and page number off the leader card when it is at the second reading station and then when the second card (which is likely to be a heading card) appears at the same reading station, it is desired that the sensing devices have other connections from the same columns to accumulators or printing banks other than those associated with the invoice number and page number accumulators.

The leader card LC (Fig. 1) is seen to have a special perforation 1 in the X position of the 79th column and this is used to initiate pilot selection when the leader card is at the first reading station.

The circuit to initiate the pilot selector pickup may be followed starting at the left of Fig. 31*g*. The perforation in the card at the first reading station is sensed by the related card reading emitter 164, 165 and through the circuit breakers CB as already noted. A plug connection is made from the socket 925 of the 79th column and the plug wire is connected to socket 922 (Fig. 31*d*). The circuit continues through the relay contact R1575—1 closed at the X time, the pickup coil of relay R1513 and wire 1024 to line 921. The pickup coil closes contacts R1513—1 and a holding circuit is provided through line 920, cam contacts CR30, relay contacts R1513—1, the holding coil of relay R1513 and wire 1024 to line 921. A second pickup coil R1513 is provided as in other instances to be called into operation by a digit selector should an impulse other than an X impulse be designated to control the pilot selector.

Near the end of the special initial sensing cycle, the relay contacts R1513—2 are closed in series with the No. 1 pilot selector relay R1515 to pick up a circuit for shifting pilot transfer contacts. The circuit may be followed from line 920 through cam contacts CR31 closed from 295 to 310° of the cycle, through the normally closed MLR interlock relay contacts R1500—13 and R1500—14, then through relay contacts R1513—2, the pickup coil of relay R1515 and wire 1024 to line 921. A holding circuit is prepared for the No. 1 pilot selector by the closure of relay contacts R1515—1. The holding circuit includes line 920, cam contacts CF10 closed from 306° of one cycle to 286° of the next cycle, relay contacts R1515—1, the holding coil of relay R1515, wire 1024 to line 921.

At the lower left corner of Fig. 31*d*, it is seen that the No. 1 pilot selector relay R1515 controls two sets of transfer points. In the one set of points, the plug sockets 1034 and 1035 are connected to the normally closed set of the contacts and the other plug socket 1036 is wired to the normally open contact which is made effective by the transferal under control of the pilot relay.

Although the circuits for only one pilot selector are pointed out herein, it is understood that a plurality of such controls are provided, all working in a manner similar to that described in connection with the No. 1 pilot selector.

When two sets of contacts such as R1515—3 and R1515—4 are found insufficient for one pilot selection operation a co-selector may be coupled to work in conjunction with the pilot selector by connecting a plug wire from a socket made effective by a certain selector through another socket in series with a co-selector relay. An example of such a circuit is as follows: From line 920, the co-selector pickup circuit is established through cam contacts CR32, relay contacts R1515—2, socket 973, a plug wire 1026 to socket 974 and then through the pickup coil of the co-selector relay R67 and line 921. A holding circuit for the co-selector is established through line 920, cam contacts CR33, wire 1025, relay contacts R67—1, the holding coil R67, and wire 1027 to line 921.

Each co-selector relay has five sets of transfer contacts such as contacts R67—2 connected to plug sockets on the control panel for functional wiring along with, or distinctive from, the controls of the No. 1 pilot selector. Of course, this co-selector, as described, will work in conjunction with the pilot selector to which it is coupled and its contacts will operate in exactly the same manner as the pilot selector contacts and usually for the same purpose, i. e., the direction of impulses into the same accumulator, printer, etc.

During any multiple line reading operations, any pilot selector picked up to work in conjunction with the multiple line reading card will be sustained in operation throughout the multiple line reading operations by the closure of the normally open MLR interlock relay contacts R1500—12 arranged in shunt around the cam contacts CF10 which ordinarily open to break the holding circuit to the pilot selectors.

Any pilot selection operation initiated by the card at the first reading station simultaneous with the control of multiple line reading operation by a card at the second reading station will be suppressed until after the multiple line reading operations are completed. This is accomplished by a suspending circuit interruption caused by the opening of the normally closed MLR interlock relay contacts R1500—13 and R1500—14 in series with the cam contacts CR31 which ordinarily carry into immediate effect the secondary operation of the pickup of the pilot selector.

*Direct entry into an accumulator*

The direct entry style of operation is that of reading the numbers punched in the card directly into an accumulator without listing the numbers.

The second reading station (Fig. 31*g*) is available to read the record card and the sensing devices are provided with plug sockets to carry the impulses to the accumulator entry sockets.

The accumulator must be signaled to add the amount being read. Therefore, it is necessary to connect by plug wire from the card feed cycles plug socket 977 (Fig. 31*g*) to the accumulator control plus entry socket 978 (Fig. 31*l*). It is explained hereinbefore how the card feed cycles relay R1641 is picked up during starting and card sensing operations. Now it is used further as an indication that the accumulator is ready to receive a number without it being listed. A plug wire is also connected from socket 977 (Fig. 31*g*) to carry the card cycles impulse to the accumulator control plug socket 979 (Fig. 31*l*) which is titled "Direct Entry or Direct Reset."

The plus control circuit includes line 920 (Fig. 31*g*), wire 1038, cam contacts CF29 and CF30, card cycles relay contact R1641*a*, plug socket 977 and a plug wire to socket 978 (Fig. 31*l*), relay R371 which is the plus control relay and wire 1029 to line 921. A parallel circuit is completed by plug wire from socket 977 (Fig. 31*g*) to plug socket 979 (Fig. 31*l*) and the card cycles impulse is directed into the direct entry control relay R149 and then carried by wire 1029 to the line 921. These two relays R149 and R371 serve to effect connections making direct entry possible.

The normally open plus relay contacts R371—5 at the lower right-hand corner of Fig. 31*l* are closed to complete the accumulator circuit to add any impulse read from the card at the second reading station. In series therewith are the relay contacts R149—7 controlled by the direct entry relay for the purpose of carrying the card reading impulse directly to the accumulator adding magnet AM.

Relay R371 also controls contacts for calling into operation the list control relay R223 (Fig. 31*l*) and it does this by shifting contacts R371—1. The circuit for the list control relay includes line 920 (Fig. 31*l*), cam contacts CR70, wire 1028, relay contacts R371—1, list control relay R223 and wire 1029 to line 921.

At the bottom of Fig. 31*l*, it is seen that, in series with the adding magnet AM, are the normally open list control contacts R223—5, the normally open direct entry contacts R149—7 and the normally open plug contacts R371—5 and now all these points are closed to complete a circuit to add into the accumulator directly from the card at the second reading station as follows: From the line 920 (Fig. 31*g*), through the CB contacts, card control relay contacts R1632*g*, wire 992 to a particular sensing device at the second station including brush structure 165, commutator contacts 164 and sensing brush 162 to a common conductor 161 in series with brush isolation contacts R1122—7 now closed, plug socket 975 and a plug wire to socket 976 (Fig. 31*l*), then through the normally closed read out relay contacts R445—7, the normally open list control relay contacts R223—5, the normally open direct relay contacts R149—7, the normally open plus relay contacts R371—5, the adding magnet AM and line 921.

The circuit breaker contacts CB direct impulses through any perforations sensed in the card and these, in turn, start the accumulator wheels rotating until they are stopped by the mechanical knock-off at 0 reading time (150°). The accumulator is thereby adapted to register the numeral value equal to the value of the perforations in the card.

All accumulator orders in the normal condition are actually standing at the position "9." Therefore, when the accumulator receives an impulse, it will latch up the 10's carry contact 240 as it passes from the 9 position to the 0 position. Assuming that a 5 is to be added, the accumulator will latch the 10's contact 240 and turn through 0, 1, 2, 3 and stop at 4. A carry impulse will then be sent through the 10's contact, advancing the accumulator one more unit of rotation, thus changing the accumulated 4 to the proper 5 and all other accumulator positions are advanced from 9 to 0.

The carry control relay R638 (Fig. 31*k*) is energized by the closure of cam contacts CR61 at 295 to 315° in time to complete the circuits from the 9 and 10's accumulator carry contacts 241 and 240 (Fig. 31*l*) to direct impulses into the accumulator adding magnets AM. The contacts R638—4 of the carry control relay are seen to be in a series connection between the adding magnet AM and a carry control plug socket 981. The carry impulse is conducted by plug wire from the 9's contact of the highest order of the accumulator and transmitted to the adding magnet of the lowest order of the related accumulator group. This connection is established by plug wire between the CI plug socket 980 and the C socket 981 of the lowest order.

The complete carry circuit includes line 920 (Fig. 31*g*) through the CB contacts to post #3 and then by wire connection 998 to cam contacts CR76 (Fig. 31*k*), wire 1051 and through the latched up 10's contact 240 at the right (Fig. 31*l*), and through wire 1052 to normally open carry control contacts R638—2 of the next higher order and through that adding magnet AM to line 921. Parallel circuits are completed through other carry control relay points of relay R638 and closed 9's contacts 241 in other orders and the units adding circuit will be completed in those positions. There is also a parallel circuit through the 9's contact of the highest order and through wire 1053 and the normally open test couple relay contacts R1—1 to the plug socket 980 already mentioned. From socket 980, a plug wire is connected to socket 981 and an impulse is carried to any lower orders at "9" through the normally open carry control contacts R638—4, adding magnet AM and line 921.

In order to close the contacts R1—1 of the test couple relay, a circuit is established through the relay R1 at carry time by the following connections: Line 920 (Fig. 31*l*) through cam contacts CR72, wire 1055, relay R1 and wire 1029 to line 921.

*Type wheel control of accumulation*

The usual style of entry in an accumulator is through the printer so that there is assurance that the number printed is the same as the number added. This type wheel entry is performed by directing the type wheel "echo" impulse into the accumulator. Assuming that it is desired to accumulate the amount printed, the card perforation amount is read to the print unit which, in turn, governs the rotation of the type wheel. The type wheel, when it turns, closes contacts 312 (Figs. 9*a* and 31*i*) and emits an impulse which is entered into the accumulating magnet.

A number of plug wire connections must be made in order to condition the accumulator for control by the printer. Some of the connections already discussed under "Direct Entry" are the same and others of such connections are omitted. For example, the direct entry connection to plug socket 987 (Fig. 31*l*) is not made and therefore relay R149 is not picked up as was the case for direct entry. The plus entry control is effective by the plug wiring from socket 977 (Fig. 31*g*) to socket 978 (Fig. 31*l*) to pick up relay R371 the same as with the direct entry control. The plug wiring for accumulator entry, i. e., from socket 975 (Fig. 31*g*) to socket 976 (Fig. 31*l*) and the carry control connection from socket 980 to 981 (Fig. 31*l*) are also the same. The amount perforated in the card is to be listed or printed as well as entered into the accumulator. Therefore to complete the print circuit, it is necessary to connect the accumulator exit plug socket 984 to the "Accumulator Controlled Printing" socket 983 (Fig. 31*i*) in the print unit. From the connections shown at the lower right-hand corner of Fig. 31*l* it may be gathered that the connections for the accumulator entry controls are used for carrying the impulses to the printer and these same connections are also shifted and used to carry back the type wheel echo impulse into the accumulator add magnet on the second half of the machine cycle.

The card cycles control governs direction of an impulse through relay contacts R1641*a* (Fig. 31*g*). It is carried through plug socket 977 to plug socket 978 (Fig. 31*l*) to pick up the plus control relay R371. This relay R371 in turn energizes the list control relay R223. The circuits for both of said relays are the same as explained hereinbefore.

In this section of the description, it is assumed that a 5 is perforated in a card. This value is to be listed and accumulated. The 5 impulse is sensed at 67 to 75° in the second reading station by the same circuit, as described in "Direct Entry" control and is completed to the accumulator plug socket 976 (Fig. 31*l*) by a plug wire extending between socket 975 (Fig. 31*g*) and socket 976. From this point, the circuit is continued through the normally closed readout relay contacts R445—7, the normally open list control contacts R223—5, the normally closed direct entry contacts R149—7, socket 984 and a plug wire to socket 983 (Fig. 31*i*) through the normally closed type wheel contact relay R777—1 and then through the print magnet 361 as explained hereinbefore in connection with normal listing. This numeric impulse operates the printer unit and it, in turn, controls the type wheel to rotate towards a position to print a 5 at the printing time. The type wheel selector gear turns the type wheel and closes the type wheel contact 312 at a differential time completing the echo impulse circuit.

The cam contacts CR19 (Fig. 31*b*) are closed from 150 to 285° to control transmission of the echo impulse from the print unit to the accumulator. It does this by energizing the type wheel contact relay R777 in order to switch from control of the printer magnets to control of the accumulator magnets. The circuit for relay R777 is shown in Fig. 31*b* to include line 920, cam contacts CR19, wire 1030, type wheel contact relays R777 and R804, and wire 1031 to line 921.

The accumulator control circuit through the type wheel contact 312 (Fig. 31*i*), and the type wheel relay contacts is completed by the echo impulse circuit from the line 920 (Fig. 31*g*) through the circuit breakers CB to post #3 and through the wire 998 (Fig. 31*i*) to cam contacts CR106 and CR107 to the type wheel contact 312, the normally open type wheel relay contacts R777—1 to plug socket 983 and a plug wire to socket 984 (Fig. 31*l*), then through the normally closed direct entry contacts R149—7, the normally closed list control contacts R223—5 (now closed because this relay is deenergized at 150°), the normally open plus relay contacts R371—5, the accumulator add magnet AM and line 921.

The accumulator wheel is started in rotation by this impulse and is stopped by the mechanical knock-off at 300° (0 echo impulse time). The accumulator sets up carry circuits and completes all operations as explained in the direct entry portion of the specification.

*Total printing and reset*

When the machine is conditioned for total printing and resetting, the accumulated total is printed and the echo impulse is used for resetting the accumulator to a 0 balance. This form of restoration provides a further indication that the amount printed agrees with the amount accumulated.

If a 5 is added in the accumulator, the 5 impulse will print the total 5 and the echo impulse is used to stop the accumulator from turning (when resetting, this is a debit accumulated amount). Therefore, resetting the accumulator is accomplished by adding the complement of the amount which has been printed as a total (resetting by subtraction).

Total printing and resetting is under selective control of the program stepping relays and the circuit is completed by a plug wire from any step of program desired (Fig. 31*e*) to the accumulator read out and reset plug socket 986 (Fig. 31*l*). The program control circuit is explained hereinbefore in connection with the program unit and the circuit used here is the same up to the point of plugging at socket 985 (Fig. 31*e*). A connection is made from socket 985 to socket 986 (Fig. 31*l*). The aforementioned connection is provided to pick up a reset control relay R519 which is connected to the opposite side of the line by wire 1029. Arranged in parallel therewith is a read out control relay R445 also picked up by the same circuit.

The normally open reset relay contact R519—3 is closed to complete a circuit to energize a minus control relay R297 by a circuit including cam contacts CR69 (Fig. 31*k*), wire 1032, through the normally closed inversion relay contacts R75—1 (Fig. 31*l*) relay contacts R519—3, minus relay R297 and wire 1029 to line 921.

The normally open minus relay contacts R297—5 shown at the lower right corner (Fig. 31*l*) are then closed to complete a circuit to start the accumulator wheel turning at the "9" echo reading time, said circuit including line 920 (Fig. 31*g*) circuit breakers CB, post #3, wire 998 (Fig. 31*k*), cam contacts CR73 and CR74, closed at 155° which coincides with the "9" echo time (Fig. 32*c*), wire 1033 (Fig. 31*l*) and through shifted reset relay contacts R519—4, wire 1037, normally open minus relay contacts R297—5, accumulator magnet AM and line 921. Parallel circuits are completed to all other adding magnets of the related group through their respective minus relay contacts. Therefore, all the accumlator wheels of the related group start rotating at the 9 echo impulse time.

The normally open read out relay contacts R445—7 (Fig. 31*l*) are closed to complete a circuit through the accumulator emitter to the printer unit to control total printing. The circuit includes line 920 (Fig. 31*g*), the circuit breakers CB, post #3, wire 1043 carrying an impulse at the 5 time (67 to 75°) through the total print emitter (Fig. 31*k*) comprising the brush structure 1039, a contact point 1040 in the 5 position and wire 1041 (Fig. 31*l*), and then through the normally closed inversion relay contact R75—5, wire 1042 to the accumulator contact 1046, and then through the commutator brush structure 1044 to the common contact strip 1045 in series with the normally open read out contacts R445—7, thence through the normally open list control contact R223—5, the normally closed direct entry contact R149—7 to the socket 984 and by plug wire to socket 983 (Fig. 31*i*) and then through the normally closed contacts R777—1 contacts to the print magnet 361 and line 921 as already described. The 5 echo impulse is fed back into the accumulator stop magnet SM (Fig. 31*l*) from the accumulator exit socket 984 through the normally closed direct entry contacts R149—7 (Fig. 31*k*), the normally closed list control contacts R223—5, the normally closed plus relay contacts R371—5 to the accumulator stop magnet SM and line 921.

This echo impulse comes from contacts 312 (Fig. 31*i*) and through cam contacts CR106 and CR107 and circuit breakers CB, so that the circuit is completed through the stop magnet SM at the 5 echo impulse time. Therefore the accumulator wheel starts turning at the 9 echo impulse time and stops at the 5 time. Thus turning the accumulator from 5 and through 4 units of motion to put the wheel to 9, this 9 is inverted when printed to the complement and will be represented as an "0." This is a 0 balance condition.

When resetting an accumulator, a portion of which stands at 0 and another portion of which stands at significant figures, then the portion standing at 0 is also started turning at the 9 echo impulse time. Because in that operation, there is no echo impulse read back, the mechanical knock-off stops the accumulator wheel at the 0 echo impulse reading time, adding 9 to all such orders. All accumulator orders are therefore set to 9 or a 0 balance thereby completing the resetting of all accumulator wheels of the group. There is no carry when resetting the accumulator to a 0 balance.

*Accumulator resetting without printing*

At times, conditions arise where accumulators are required to accumulate and then reset without printing. For example, in the case of an accumulator used for page numbering, it is required on a control change between numbers of cards that the related accumulator or accumulators be reset.

An accumulator group is reset to 0 without printing by the addition of one plug connection from a program step socket to the accumulator control plug socket 987 (Fig. 31*l*) titled Direct Entry or Direct Reset. This connection is in addition to the Read Out and Reset plug connection between socket 985 (Fig. 31*e*) and 986 (Fig. 31*l*) as explained hereinbefore in connection with total printing and before accumulator resetting. The additional connection is from socket 985 (Fig. 31e) to socket 987 (Fig. 31l).

An impulse is directed throught the last mentioned connection from the program stepping device as explained hereinbefore. The direct entry relay R149 is thus picked up to control contacts in the accumulator. A parallel circuit is directed through plug socket 986 and the reset control relays R445 and R519 connected in parallel with each other and in series with the plugged connection.

Then the normally open direct entry relay contacts R149—2 (Fig. 31l) are closed in series with the inversion control relay R75 and the circuit is established to switch the connections leading out of the accumulator so that resetting may be effected without printing. The circuit for picking up the inversion relay may be followed along line 920 (Fig. 31k) through cam contacts CR64, wire 1049, the normally open direct entry contacts R149—2 (Fig. 31l), the normally open read out contacts R445 —2, the holding coil of the inversion relay R75 and wire 1029 to line 921. Then the inversion relay contact points R75—3 to 12 are shifted to transfer the accumulator commutator connections to the complement of the total print emitters so that the impulse read out of the accumulator is in the case of a total of 5, read out as a 4 impulse and all the other orders of the accumulator are receptive to "9" impulses.

In addition to the energization of the inversion relay R75, the circuit through cam contacts CR64 is also directed through the normally open reset relay contacts R519—2 to the plus control relay holding coil R371. This relay controls contacts such as R371—5 associated with the right-hand accumulator magnet AM and therefore any impulse received by the accumulator from its own emitter is added into the accumulator. Relay R371 also shifts contacts R371—1 in series with the list control relay R223 to energize the same.

In the case of an accumulator order standing at 5 and intended to be reset, the circuit is completed to the accumulator add magnet AM as follows: From line 920 (Fig. 31g), through the circuit breaker contacts CB effective at the "4" time (82 to 90°) from post #3 of the circuit breaker connections and through a wire 1043 to the total print emitter shaft (Fig. 31k) and from the brush structure 1039 of the emitter to the contact point 1040' designated as being in the 4 position, then through wire 1057 (Fig. 31l) through the normally open inversion contact R75—4, wire 1058, wire 1042 to the accumulator commutator 5 contact spot identified as 1046, the brush structure 1044 now standing at 5, common contact strip 1045, the normally open read out contact R445—7, the normally open list control contact R223—5, the normally open direct entry contact R149—7, the normally open plus contact R371—5, the accumulator magnet AM and line 921. Through the foregoing, the accumulator wheel is started to rotate at 4 time and is stopped by the mechanical knock-off at 0 time, thus adding 4 to the accumulated 5 to put the accumulator wheel in the 9 position, which is indicative of a 0 balance.

Assuming that a number of accumulating wheels were standing in a zero position, a sample circuit therethrough may be traced with reference to the second order of the accumulator shown in Fig. 31l. In this instance, the impulse created in the total print emitter (Fig. 31k) is the one which is created when the brush holder 1039 moves into contact with the "9" contact spot 1040. The circuit continues through wire 1059 to the transferred inversion relay contact R75—9 (Fig. 31l), and wire 1060 to brush holder 1044' and common contact strip 1045', normally open read out contacts R445—5, the normally open list control contacts R223—3, the normally open direct entry contacts R149—5, the normally open plus contacts R371—3, adding magnet AM and line 921. Thus, the accumulating wheels, other than those holding significant digits, are started in rotation at the 9 time. The rotating accumulator wheels are stopped at 0 time by a mechanical knock-off. This adds a 9 in all accumulator orders containing a 0 reading at the beginning of the resetting cycle. Therefore all such wheels are reset to 9 and represent a zero balance as to all the accumulator wheels of the same group.

*Storage controls*

In Fig. 31i, is shown a diagrammatic representation of the electrical control magnets and wiring associated with the four storage units A, B, C and D, the mechanical aspects of which have been set forth hereinbefore under the heading "Storage Mechanism." There it was noted that each unit comprises 16 control magnets and 16 settable commutators for adjustment to represent numerical and alphabetic data. When a unit is used to store numerical data, the entire set of 16 orders may be used for 16 denominations. However, in the case of alphabetic storage, the unit must be divided into two sections because alphabet data requires storage of zoning information as well as storage of the numeric part of the alphabet code. Therefore, in the case of alphabet storage, 8 orders of control magnets and related commutators are receptive of the digital portion of the alphabet code and, in the same unit, the 8 other orders are set up to receive settings according to the code values of zones 0, X and R of the alphabet data. The two sets of 8 each are interrelated so that the digital storing portion and the zone designation storing portion are tied together to receive readings from the same card column and are also connected by switching contacts so that, when control is exercised over the printer, the impulses read out from the storage unit from a certain order are directed into a single printer bank from the two related orders of the storage unit.

Examples of plugging and wiring are given herein in connection with two magnets SA and SAC for receiving in the storage unit A, the digital and zone portions respectively of one alphabet character. It is understood that similar circuits and connections may be made for either numeral storage alone or alphabet storage alone or both combined in any or all of the 4 storage units.

When a storage unit is plugged up to receive impulses, the related restoring magnet SRA is energized early in the series of cycles to initiate the mechanical movement of the restoring bail which restores or wipes out the old setting and conditions the unit to receive a new setting from the card which is to be read. Normally, the restoration of the storage unit is under control of the last program step used in the particular class of total, i. e., on a major set-up, the third step of program will be used for restoration. The circuit to initiate restoration in such a case will be completed by a plug wire from the program step 3 socket 982 (Fig. 31e) to the socket 970 (Fig. 31j) and then through the pickup coil of relay R836 and wire 1064 to line 921. Relay R836 then closes contacts R836—1 to establish a holding circuit through the line 920, cam contacts CF20, wire 1071, contacts R836—1, the holding coil of the storage read-in control relay R836, wire 1064 and line 921.

The closure of the normally open storage read-in contacts R836—3 (Fig. 31*i*) will complete a restoring circuit including line 920, cam contacts CR59 closed from 240 to 255°, and effective then on the last program cycle, wire 1060, relay contact R836—3, storage restoring magnet SRA and wire 1061 to line 921. The energization of magnet SRA starts the mechanical operation of wiping out the word setting by moving the storage sector and commutator back to the starting position and ready to receive a new setting according to the values of the perforations on the next card.

Relay R836 (Fig. 31*j*) also operates contacts R836—2 in series with the storage read-in relay R837 and the circuit includes line 920, cam contacts CF21 closed near the end of a cycle, wire 1072, relay contacts R836—2, relay R837 and wire 1064 to line 921. Relay R837 then establishes for itself a holding circuit by closure of contacts R837—1 in series with wire 1073 and cam contacts CR60 closed at the end of one cycle and the first half of the next cycle. The contacts of relay R837 are arranged in series with the control magnets (Fig. 31*i*) such as magnet SA and these storage read-in control contacts determine the direction of impulses into the control magnets in order to set the storage commutators of the storage devices.

In order to set the storage unit according to the perforations sensed in a card when it is at the second reading station, plug connections are established from a socket such as socket 929 (Fig. 31*g*) in a Name Field of the second reading station and the plug wire is also connected to socket 928 (Fig. 31*i*) in series with one of the storage unit A control magnets SA. The card sensing circuit is the same as those already described up to the point of the plug connection and from there it passes through the storage control magnet SA and wire 1061 to line 921.

In the case of alphabet storage, the same impulse reading connections from the second reading station are used to carry the zoning impulses over into the zone storage operation of storage unit A and there go through magnet SAC in order to effect utilization of the same circuit for both impulses. Some of the switching operations must occur during the card reading cycle and they are effected by shifting of the contacts R837—4 and contacts R765—1 by controls determined beforehand by plugging of the storage unit for alphabet control.

Figure 31J:
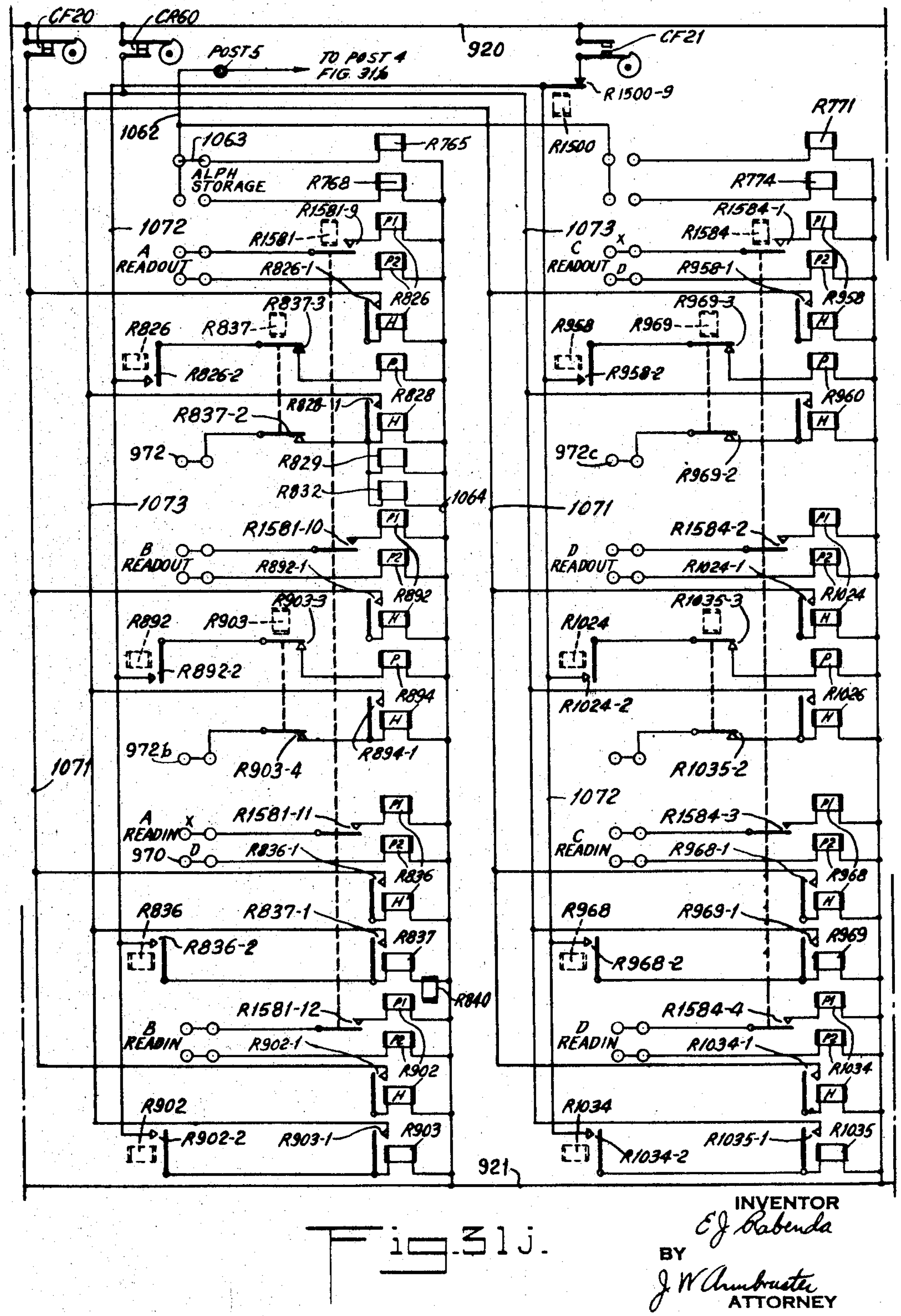
Figure 31K:
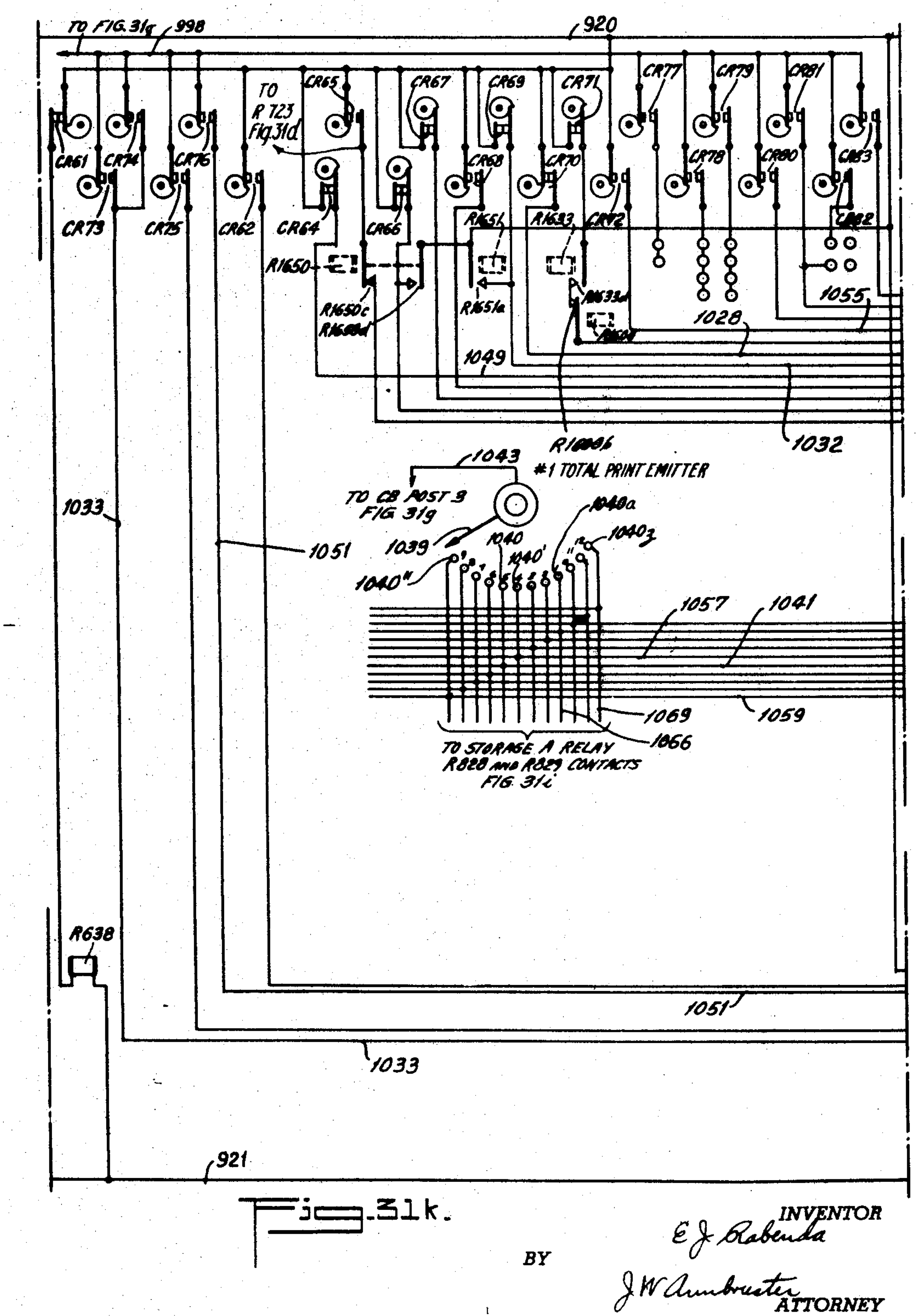
Figure 311:
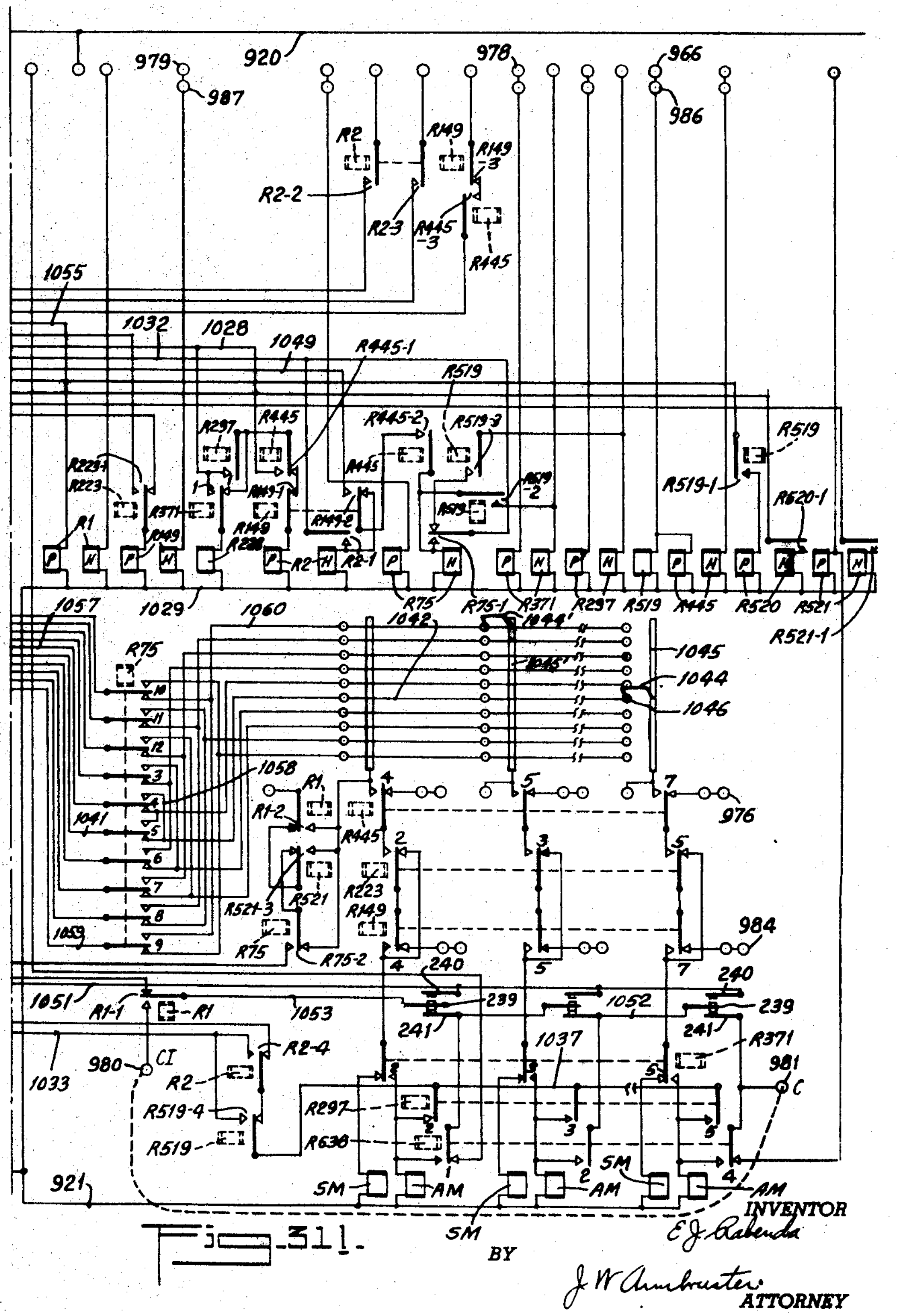

When it is determined that a unit is to be used for alphabet storage, a plug connection 1063 (Fig. 31*j*) is established to call into operation a relay R765 by means of a circuit including line 920 (Fig. 31*b*), the cam contacts CR22 closed between 135 and 180° for zoning control. These contacts are wired to post #4 and then connected to post #5 (Fig. 31*j*). The circuit continues through wire 1062, plug connection 1063, relay R765 and wire 1064 to line 921.

Closure of relay contacts R765—1 (Fig. 31*i*) serves to direct any card reading impulse at the 0, X or R time from the plug socket 928 through the normally open contacts R837—4, the normally open contacts R765—1, wires 1074 and 1075, the normally open read-in control contacts R837—12 and through the alphabet zone storage magnet SAC and wire 1061 to line 921. Therefore it is clear that the timing of the alphabetic storage transfer points is such that the numeric information is channeled into the one storage setup magnet SA and the related zoning operation of the same information is channeled into storage setup magnet SAC. For the representation of one letter of the alphabet, two commutators are set up in the storage unit, one to represent the numeric part of the alphabet code and the other to represent the zoning portion of the code representation.

The alphabet information set up in the storage unit will remain there until the cycle after the next restoring impulse is received. The setting may be read out as often as desired without resetting the unit. As ordinarily used, the name and address of a customer will be set up and read out to print the address as a heading repetitively for each of a succession of printed forms used for a given customer.

The read out control of the storage unit is normally under control of the overflow program devices, that is, it is usually called into operation when the feed control tape signals that the number of detail lines of print require more than one connected form and therefore the stored address data is to be read out to control printing on the top of the second and succeeding forms related to the same customer. This overflow program control is similar to that already described with relation to group change programming with minor, intermediate and major steps and will be explained more fully hereinafter under the heading Overflow Program. Of course, the function of reading out from storage may be initiated by any of the other program classes of control as well as the overflow control about to be considered. The circuit from overflow storage includes plug socket 971 (Fig. 31*e*) and a plug wire therefrom is connected to plug socket 972 (Fig. 31*j*). The circuit continues through the storage read out relays R828, R829 and R832 and through wire 1064 to line 921. A holding circuit is established by the closure of relay contacts R828—1 and the holding circuit includes line 920, cam contacts CR60, wire 1073, read out control contacts R828—1, relays R828, R829 and R832 and wire 1064 to line 921.

Relays R829 and R832 serve to operate contacts R829—8 (Fig. 31*i*) and R832—4 which are arranged in series between the print exit connections of the storage unit and the commutator devices of the unit. A plug wire connection is also established between the normal print socket 940 and the storage print exit socket 941 and this provides a path for a sample circuit illustrating the control of alphabet printing from stored data.

The print control circuit may be followed through line 920 (Fig. 31*g*), the circuit breaker contacts CB, post #3, a wire 1043 to the total print emitter (Fig. 31*k*) through the brush structure 1039 and the contact point 1040*a* in the "1" position (assuming that the character "A" has been set up in storage, then the numeric part is 1 and the zoning part is 12). Continuing with the numerical part of the circuit, it continues through wire 1066 (Fig. 31*i*), through the normally open storage read out contacts R829—4, wire 1067, the storage #1 contact point 594, through the storage contact wiper 598, the common conductor strip 595, the normally open storage read out contacts R829—8, the normally closed alphabet storage contacts R765—1, the normally closed storage read-in contacts R837—4 through plug socket 941 connected by plug wire to Normal Print socket 940 and then through the print control magnet 361 to line 921 in the usual way.

The companion zone impulse at the 12 time goes through the total print emitter (Fig. 31*k*) when the brush structure 1039 touches the 12 contact point 1040*z* and the circuit continues through wire 1069 (Fig. 31*i*), the normally open storage readout contacts R829—7, wire 1070, commutator point 594, wiper 598, the common contact 595, the normally open storage readout contacts R832—4, wire 1074, the normally open alphabetic storage contacts R765—1 now shifted because of operation between the 1 and 0 time, and continuing through the normally closed storage read-in contacts R837—4 to the storage print exit socket 941 and by the already noted plug connection to the print socket 940 and through the print control magnet 361. The same as for the numeric impulse, the combination of mechanical controls exercised by the print magnet as caused by the "1" and "12" impulses sent through the storage setup commutators, serves to control the printing of the letter "A" which is the same letter originally derived from the perforated card and set up in the storage unit by action of control magnets SA and SAC.

*Tape Control of Paper Feed*

In Figs. 1*a* and 28, it is illustrated that a feed control tape TP is moved in synchronism with the movement of the record strip R and bears feed control indicia in the form of perforations 1S—11S for determining the stopping positions of the record strip to receive lines of print. The mechanical aspects of the tape feed controls are described hereinbefore under the heading Tape Control of Sheet Feed. It is now proposed to set forth electrical controls exercised by the tabulator sensing devices over the clutching and declutching of the tape feed to advance the record and tape and also set forth the controls exercised by the electrical sensing devices cooperating with the tape to control the stopping positions of the record strip. Considered generally, the tabulator controls initiate strip feeding and the tape sensing controls govern the stopping positions. An exception is in the case of the overflow control perforations 9S and 11S which, when detected by movement of the tape, govern an advance of record feeding to a succeeding form on the record strip.

The electric controls about to be considered are simplified and presented merely in the form of sample circuits. For a more detailed description of the tape controls, reference may be made to the copending application of A. W. Mills et al., Serial No. 609,854, filed on August 9, 1945.

Most of the control magnets, relays and connections for the strip feeding devices are shown in Figs. 31*b* and 31*c* of the wiring diagram. In Fig. 31*c*, it is seen that the feed control motor M is in continuous operation by means of a circuit established across the main lines 920 and 921. Associated with drive connections from motor M are the two feed control clutches described hereinbefore, the one being controlled by the low speed magnet LS which is energized alone for line spacing and overflow skipping and the other clutch is called in by magnet LS in cooperation with the high speed interposer magnet HS which is energized to clutch other gearing to skip over a form end after the printing of a total. Most of the wiring controls are concerned with the operation of one or both of these clutch control magnets and stopping the platen and the pin feed tape drum to which the clutches are connected.

Also shown in Fig. 31*c*, is a diagrammatic showing of the pin feed drum 831 for holding the control tape in cooperation with a series of sensing brushes B1—B13 for contact through the feed control indicia in the tape.

The perforations in the tape cause the sensing brushes to signal the machine to stop the record strip or, in case of an overflow signal, to eject the record strip to a predetermined line of the next form.

There are 12 tape reading brushes B1—12 which sense, in different channels of the tape, the presence of feed control perforations. The first 10 brushes can be used to control the stopping of the strip at a given line after the strip movement has been initiated. Channel No. 11 is used to signal overflow conditions. Channel No. 12 is used for selective spacing, that is, the arrangement to vary the spacing of a form according to the perforations for each printing line of the form.

Channel No. 9 is of a dual-purpose variety and can be used to control for other functions by pluggable connections from a plug socket 1056 called the "Carriage Exit" plug socket to send an impulse therefrom in a variety of directions. This impulse is usually used to control the variable length overflow condition.

Channel No. 10 also at times departs from the use for ordinary stopping control. It is used when inverted forms are being handled with the heading portions at the bottoms of the forms and it signals the machine for control of ejection of a form with missing detail and missing heading cards.

The two forms of control exercised by the tabulator over the record feeding devices are provided by the group control mechanism and the X perforation sensing devices for determining the appearance of heading cards after detail cards or detail cards after heading cards. A perforation, such as perforation 4 (Fig. 1), placed in the X position of the heading card HC is used to distinguish heading cards from detail cards. As the cards are advanced in succession through the machine, sensing devices cooperate with the particular column in which heading card indicators such as perforation 4 are found to detect changes from heading to detail and detail to heading. This is sometimes referred to as X to no X and no X to X control. Because these sensing devices are usually used to initiate feeding, that is, to advance, for example, from a last heading line to a first detail line, they are called Skip Control impulses and are normally plugged to the Carriage Skip plug sockets which are associated with the first 10 channels of tape for controlling stopping the record strip.

Assuming that the record strip is formed with forms 10″ long and allowing 6 printing lines to an inch, then there are 60 stop positions available in all channels. Also assuming that the form is laid out to receive the first heading impression on line 4, then this becomes the first printing line of each form and a perforation such as 1*s* (Fig. 1*a*), is punched in channel No. 1 of the tape in the fourth stop position. The street and city lines for heading follow directly thereafter but require no feed perforations in the tape. One inch below the city line, the first item or detail line may be printed. This position is also called the first body line position. To control location of this printing line, a stop perforation is punched in channel No. 2 of the tape and in the fourteenth stop position.

Detail lines of print for items are listed to the fiftieth line reserving three lines beyond that for printing minor, intermediate and major totals if a group change occurs. At this position of the form in channel No. 11 of the tape and the stopping position 50, a feed control perforation 11s is punched for overflow indication. With such an arrangement, a 1" border is allowed at the bottom of the form.

Turning now to detection of the presence of heading cards at the first reading station, this is done by sensing all cards to determine whether they bear the X perforation such as perforation 4 in heading card HC (Fig. 1). In Fig. 31*g*, it is assumed that a plug socket 954 is connected to a card reading device 164, 165 in that column set aside for detection of heading card X perforations. When a heading card appears at the first reading station, the circuit is set up through the circuit breakers CB and the usual train of card reading connections to plug socket 954. From there a plug wire is connected to the X control plug socket 955 (Fig. 31*b*) and then passes through the normally open X relay contacts R1578—9 to the heading control first reading pickup coil R1668 and through wire 1065 to line 921. This X control relay contact R1578—9 is closed by controls energized by a circuit through line 920 (Fig. 31*a*), cam contacts CR10, wire 1068, relays R1575, R1578, R1581 and R1584, wire 1076 and line 921. This circuit energizes the X relays so that all normally open X control contacts are closed for "X," "R," and carriage skip impulses to pass through them.

A holding circuit for relay R1668 (Fig. 31*b*) is established from line 920 through cam contacts CR24, contacts R1668*a*, the holding coil of relay R1668, and wire 1065 to line 921. The contacts of relay R1668 are used to select the carriage skip control impulse and are described later.

With relay R1668 energized, a parallel circuit is established along with its holding coil through the cam contacts CF25 to the pickup coil of the heading control transfer relay R1669. The holding circuit for the transfer relay is established from line 920 through cam contacts CF8, contacts R1669*a* and the holding coil of the relay R1669, wire 1065 and line 921.

The transfer relay R1669 closes contacts R1669*b* in series with the heading control second reading relay R1670 which is energized at the time cam contacts CF7 close. Relay R1670, when energized, prepares a holding circuit which includes line 920, cam contacts CR24, relay contacts R1670*a*, the holding coil of relay R1670 and wire 1065 to line 921.

The contacts of the second reading relay R1670 are used to control skip impulses and the circuits will be described with the feed skip controls. These two heading control relays R1668 and R1670 control the paper feed advance to conform to the sequence relationship of heading and detail cards passing through the two card reading units.

The other skipping control is governed by the group control or group comparing circuits described hereinbefore. Upon disagreement as to group number of successive cards, a circuit is established from the group control devices to the paper feed control relays. The comparing exit impulse will be carried from any socket such as plug socket 956 (Fig. 31*d*) to socket 957 (Fig. 31*b*) and then directed through the pickup coil of the skip control relay R1589 and wire 1065 to line 921. A holding circuit is prepared for the error skip relay R1589 by the closure of contacts R1589—1 in series with cam contacts CR24, the holding coil of relay R1589 and wire 1065 connected to line 921. The purpose of contacts operated by relay R1589 is to shift the paper feed skip control impulses from the normal exit plug sockets (top of Fig. 31*c*) to the transfer plug sockets in order to change the stopping control from the usual heading to detail or detail to heading variety to the form involving total printing or skipping to indicate missing cards.

Taking as an example a situation wherein a detail card is found at the second reading station and a heading card of a different account number is found at the first reading station, this is the usual arrangement when conditions warrant the change from form to form of the record strip. The relationship of the cards is "detail to heading," i. e., no X to X with a coinciding group change. The purpose then is to prepare connections for advancing the strip to a first heading line and circuits are established to do this as noted with reference to the upper left-hand portion of Fig. 31*c*. There it is seen that a circuit will be completed through line 920, cam contacts CR27, the normally open heading control contacts R1632*b*, first card in relay contacts R1675*b*, MLR interlock contacts R1500—11, the normally open heading control first reading contacts R1668B, the normally closed heading control second reading relay contacts R1670*c*, the normally open error skip control contacts R1589—3 and then to the plug socket 958 which is a skip control exit. From socket 958, a plug wire connection is made with socket 959 (Fig. 31*b*), in order to pick up a relay R1597 which is connected through wire 1089 to the line 921. It is relays such as R1597 which are used to pick up the controls for selecting one or the other of the tape sensing brush circuits for governing the channel of the tape which is to control stopping of the paper feed. A series of such controls are shown arranged down along the right side of Fig. 31*b* and these successive devices are related to the 10 stop control brushes cooperating with the tape. The plug connection 959 already mentioned is made to the first of such 10 controls because it is desired to use channel No. 1 of the tape to control stopping of the record strip with the first heading receiving line in printing position.

A holding circuit is established for R1597 through cam contacts CF9, wire 1090, contacts R1597—1, the holding coil of relay R1597 and wire 1089 to line 921. Then a circuit is directed through the pickup coil of relay R1612 through line 920, cam contacts CR25, the normally open first card in contacts R1689*b*, then either of the minor-2 relay contacts R1412—4 or program end R1440—4 contacts, space control relay contacts R1661*b*, the normally open contacts R1597*a*, the pickup coil of relay R1612 and wire 1089 to line 921. A holding circuit for relay R1612 is established from line 920 through wire 1087, the skip end contacts R1685*d*, the normally open contacts R1612—1, the holding coil of relay R1612 and wire 1089 to line 921. Fig. 31*c* shows that relay R1612 controls contacts R1612—2 in series with the tape sensing brush B1 of the first tape channel and thus serves to connect the brush to feed stop controls in a manner pointed out hereinafter.

The condition assumed in the foregoing was that of a "detail to heading" change and now there will be taken up the conditions when the relationship is opposite to that, i. e., with a "heading to detail" change. Then a heading card is in the second reading station and a detail card (of the same group control number) is in the first reading station. Then the heading control relays will be conditioned to provide the following circuit: From line 920 (Fig. 31c), through cam contacts CR27, the successive controls R1632b, R1675b, R1500—11, and then through the normally closed heading control first reading contacts R1668B, the normally open heading control second reading contacts R1670b, the normally closed error skip contacts R1589—4 to the skip control exit plug socket 961. From socket 961, a plug wire connection is made to socket 962 (Fig. 31b) and there directed through the pickup coil of relay R1598 and through wire 1089 to line 921. This relay R1598 bears the same relationship to a transfer number 2 relay R1613 that the relay R1597 bears to relay R1612 as already mentioned. Relay R1613 is picked up and held in a manner already pointed out with relation to R1612 and it exercises control over contacts R1613—2 (Fig. 31c), in series with the second channel tape brush B2 for exercising stopping control. This control is used to advance the form from the last heading line to the first detail printing line of the form and, according to the example given, will advance the record strip to line No. 14 of the form that is controlled by a tape perforation in channel No. 2.

Whenever the number of detail cards exceeds the number of allotted line spaces in the body portion of a form, the tape feed controls sense this overflow condition and eject a filled form and move a new form into either the first heading line position or the first detail line position and then continue listing on and beyond the first detail line of the new form. However, before considering the overflow condition, it is believed best to explain first how the tape and record strip are moved and the tape sensing brushes sense the tape in order to initiate the controls exercised by the tape.

Ordinary line spacing of the record strip occurs before printing while, on the other hand, ejection of the record strip starts immediately after printing. Therefore, each of these two forms of operation will be described separately.

The circuit to initiate movement of the record strip for a single line space is completed from line 920 (Fig. 31c) through cam contacts CR28, the normally closed list contacts R1457—3, the first card in contacts R1675c, the space suppression contacts R1663b, the normally closed space or skip contacts R1662B, the common space control contacts R1661c, the pickup coil of relay R1676, and wire 1078 to line 921. A holding circuit is established through line 920, wire 1077, through the stop contacts ST, the normally open start relay contacts R1676b, the holding coil relay R1676, the normally closed stop No. 2 contacts R1684A, and wire 1078 to line 921. A parallel circuit also picks up the start interlock relay R1678.

Shifting of the start control relay contacts R1676B serves to deenergize the skip end control relay R1679 and at the same time complete a circuit through the clutch magnet LS, the circuit being through line 920, wire 1077, the normally open contacts R1676B, the normally open skip contacts R1673d, the normally closed stop 1 contacts R1683A, clutch magnet LS and wire 1091 to line 921. Energization of clutch magnet LS will cause the mechanism to engage and move the platen, record strip and record tape and at the same time operate the circuit breakers 895 of the tape unit. The tape unit circuit breaker controls the impulses for all tape control and stopping circuits.

After movement of a single line space, the stopping circuit is completed from line 920 (Fig. 31c), through wire 1080, circuit breaker 895, wire 1081, plug connection 1082, wire 1083 and then in series through all normally closed channel transfer relay contacts R1612 to R1621 inclusive, wire 1084, end of form contacts R1681B, carriage restore contacts R1677c, wire 1085, the normally open carriage start contacts R1676a, the two feed stop relays R1683 and R1684, wire 1078 and line 921.

Relay R1683 has contacts R1683A in series with the feed clutch magnet LS and when they are opened the magnet is deenergized to stop movement of the platen, record strip and control tape.

The other stop relay R1684 has contacts R1684A, normally closed, in series with the start relay R1676 so that when they are opened, the holding coil of the start relay is deenergized to break the feed start hold circuit.

Deenergization of the start relay R1676 also serves to permit the shifting of start control contacts R1676B back to the normal position to complete a circuit to the skip end control relay R1679 through wires 1077 and 1078.

Relay R1676 serves in another way through the opening of the feed start contacts R1676a in series with the stopping control relays R1683 and R1684 so that they are again deenergized to allow connections for circuits controlling further feed movement.

At this point, consideration of overflow conditions may be taken up as successive printing impressions and line space movements are made. The feeding controls advance the tape in step with the record strip so that near the end of a form, the overflow perforation such as 11s (Fig. 1a) may be sensed in channel No. 11 and will complete a circuit as follows: From line 920, through wire 1080, circuit breaker 895, wire 1081, common contact brush B13, contact roll 831 through the perforation in the tape at channel No. 11 to the cooperating tape sensing brush B11, wire 1092, the normally closed skip impulse contacts R1674c, wire 1093, the first card in contacts R1690a, the pickup coil of overflow relay R1682, wire 1078 and line 921.

A holding circuit will be completed to the overflow control relay by a circuit through line 920 (Fig. 31b), wire 1087, the normally closed skip end contacts R1685d, wire 1088, the normally open circuits R1682a, the holding coil of relay R1682 and wire 1089 to line 921.

The overflow control relay R1682 will close the contacts R1682b (top of Fig. 31c) to condition the feeding skip control exit socket 963 to control feed ejection from the last detail line of a form to the first detail line of the following form. This is assuming that heading print from storage is not conidered at the present point.

The feed skip control circuit may be followed at the top of Fig. 31c, through line 920, cam contacts CR27, relay contacts R1632b, R1675b, R1500—11, the normally closed heading control first reading contacts R1668B, the normally closed heading control second reading contacts R1670b, the normally closed error skip contacts R1589—5, the normally open overflow contacts R1682b, to the skip control overflow socket 963 which is connected by a plug wire to socket 962 (Fig. 31b) in turn connected to the pickup coil of relay R1598 and wire 1089 leading to line 921. Relay R1598 then sets up a holding circuit for itself and picks up relay R1613 which, it will be remembered, is related to the sensing brush in the second channel of the tape and therefore is selective of stopping control by brush B2 which senses a tape perforation related to the first body line position on a form.

It was already noted that channel No. 9 of the feed control tape may be devoted to controls other than the ordinary stopping control. This channel is pluggable and the impulse taken therefrom may be carried to the control panel for a number of functions. In some respects, it is similar to the operation of the overflow channel control No. 11 and when a circuit is completed through the tape sensing brush B9 (Fig. 31c), the impulse is carried through wire 1095 to the carriage exit plug socket 1056 and, at the same time, a parallel circuit is completed through the normally open skip impulse contacts R1674a to the pickup coil of the exit control relay R1680 which is connected by wire 1078 to line 921. A holding circuit for this relay is completed by connections through line 920 (Fig. 31b), wire 1087, normally closed skip end contacts R1685d, wire 1088, the normally open contacts R1680A and through the holding coil of relay R1680 and wire 1089 to line 921.

The use of the plug connection from channel No. 9 and the control exercised by the associated relay R1680 are discussed hereinafter with relation to special uses of the ninth channel for special overflow control.

It is already noted that related to each feed control channel are two relays for controlling skip stopping. For example, the first channel has relays R1597 and R1612, the second channel has relays R1598 and R1613, etc. It is also noted that the pickup and holding coils of relays R1597 and R1612 are picked up successively.

Relay R1612 not only makes the channel No. 1 tape brush B1 effective but it also operates to open the contacts R1612—1 (Fig. 31b), and thus break a series circuit through the skip impulse relays R1673 and R1674 usually energized by connections including line 920 (Fig. 31b), wire 1087, skip end contacts R1685d, transfer relay contacts R1612—1 to R1621—1 in series, wire 1096, relays R1673 and R1674, wire 1089 and line 921. Control over relays R1673 and R1674 is then shifted to cam contacts CR91 and the circuit includes line 920, wire 1087, skip end contacts R1685d, wire 1097, cam contacts CR91, contacts R1677a, relay R1673 and R1674, wire 1089 and line 921. A parallel hold circuit is directed through wires 1096 and 1098, first card in contacts R1689c and R1675a, and the holding coil of the carriage "first card in" relay R1675. In Fig. 31g, the pickup coil of relay R1675 is seen to be made effective by starting conditions and cam contacts CR52 and CR102.

The skip impulse contacts R1673d (Fig. 31c) are in series with both clutch control magnets and serve to distinguish between ejection and space control when a start impulse is received and thereby call in the clutch magnets HS and LS accordingly.

In order to condition the controls to start ejection immediately after printing, the skip impulse contacts R1673c (Fig. 31b) are closed in series with the pickup coil of relay R1662 and a circuit is directed therefrom including cam contacts CR2 (Fig. 31a) and wire 1100. Then the space or skip control relay R1662 (Fig. 31b), is held by the closure of related contacts R1662a and the remainder of the holding circuit includes line 920 (Fig. 31a), cam contacts CR13, wire 1101 (Fig. 31b), the normally open contacts R1662a, the holding coil of relay R1662 and wire 1065 to line 921.

Relay R1662 then shifts related contacts R1662B (Fig. 31c) to complete a circuit through one of the pickup coils of the carriage start relay R1676. The complete circuit includes line 920, cam contacts CR29, wire 1110, the normally open contacts R1662B, normally open space contacts R1661c, a pickup coil of relay R1676, wire 1078 and line 921. The carriage start holding circuit and the other circuits controlling the energization of the Skip End control are the same as described with reference to single line space circuits.

To eject a form by high speed ejection, the carriage start contacts R1676B (Fig. 31c) are shifted to close in series with interposer magnet HS. The ejection circuit is completed as follows: From line 920 through wire 1077, the normally open carriage start contacts R1676B, the normally closed skip impulse contacts R1673d, the normally closed overflow contacts R1682c, the normally closed carriage exit contacts R1680B, interposer magnet HS, and wire 1091 to line 921. Energization of the interposer magnet shifts the paper feed clutch drive to call in the high speed gearing and it also closes the interposer clutch control contact 817 which provides a branch circuit through wire 1111, the normally closed carriage stop contacts R1683A, clutch magnet LS, wire 1091 and line 921. Energization of the interposer magnet HS and clutch magnet LS causes the record form to be ejected at high speed along with rotation of the platen and movement of the control tape and operation of the carriage circuit breaker.

Energization of transfer No. 1 relay R1612 (Fig. 31b) will condition the feed unit to control stopping the record strip under control of the first tape sensing channel. The circuit to effect the stopping control will be established at the time the tape brush B1 (Fig. 31c) receives an impulse through a perforation in channel No. 1 of the tape. The stopping control circuit may be traced from line 920 (Fig. 31c), wire 1080, circuit breaker 895, wire 1081, the common brush B13, through the tape contact roll 831 and then through the perforation in channel No. 1 to the sensing brush B1. The circuit continues through the normally open transfer relay contacts R1612—2, wire 1084, end of form contacts R1681B, the normally closed carriage restore contacts R1677c, wire 1085, the normally open carriage start contacts R1676a, carriage stop relays R1683 and R1684, and wire 1078 to line 921. Opening of relay contacts R1683A deenergizes the feed clutch magnet LS. At the same time, a parallel circuit is established through skip impulse contacts R1674b and the skip end relay R1685. For the latter a holding circuit is completed by closure of contacts R1685a and a circuit is set up from line 920 (Fig. 31c) through wire 1103, the normally closed skip end contacts R1679B, the normally open contacts R1685*a*, relay R1685, wire 1078 and line 921.

Then relay R1685 opens the related contacts R1685*d* (Fig. 31*b*) in series with all the transfer relays and in this way deenergizes any or all of the transfer relays and the overflow and carriage exit control relays if they are energized. When deenergized, the transfer relays close contacts such as contacts R1612—1 in series with the skip impulse relays R1673, R1674 which are again energized as they are at all times except during ejection.

The carriage start relay holding circuit for relay R1676, the clutch magnet circuit and the skip end pickup circuit are the same as explained in connection with single line space circuits. The opening of the normally closed skip end contacts R1679B (Fig. 31*c*) will open the skip end holding circuit through relay R1685.

Assuming that the record strip and the tape are arranged as described hereinbefore, after the three lines of heading have been read, and the name, street and city printed, the heading to detail card sensing change will be signaled through the carriage skip control exit H—D (Fig. 31*c*) and from the associated plug socket 961, a circuit will be completed by plug wire to socket 962 (Fig. 31*b*) leading to the pickup coil R1598 of the second channel. The circuit for initiating record form advancement will be the same as that already considered with the exception that the pickup relay R1598 relates to the second channel and the transfer No. 2 relay R1613 also relates to the same channel and their contacts will select tape sensing circuits (Fig. 31*c*) similar to the channel No. 1 circuits but advanced one step beyond such circuits.

The stop circuit will also be the same except that now channel No. 2 is controlling and a perforation in the tape at the position of the first detail line, that is, at the fourteenth stop position will control termination of the record strip movement through the normally open contacts R1613—2.

As in the example previously explained, when detail cards have been listed filling all the allotted body space on a form and there are still more cards to be listed, the overflow operation will take place. The tape perforation in channel No. 11 in the fiftieth line space position will energize the overflow control relay R1682 (Fig. 31*c*) as already explained in the single line space description, and the related contacts R1682*b*, in series with the carriage skip exits, will direct an impulse to the plug socket 963 on the control panel as explained along with the overflow skip. This circuit will be completed by a plug wire to socket 962 (Fig. 31*b*) if it is desired to skip the heading area on an overflow condition and, from there on, the circuit to control ejection of the record strip will be the same as explained with the H—D ejection stopping the incoming form at the first detail line.

Overflow ejection takes place at low speed. Therefore, the feed clutch circuit will be completed from line 920 (Fig. 31*c*), through wire 1077, the normally open start contacts R1676B, the normally closed skip impulse contacts R1673*d*, the normally open overflow contacts R1682*c*, the normally closed stop contacts R1683A, clutch magnet LS and wire 1091 to line 921.

Whenever ejection is brought about from any initiating source, card feeding and sensing operations are suppressed until ejection is completed. This is controlled by opening the normally closed skip contacts R1673*b* (Fig. 31*a*) in series with the pickup circuit of the auto start relay R1639 as explained in the description of the starting and running circuits.

The three different ejection operations already explained have all been initiated from the carriage skip exit impulses (top of Fig. 31*c*) and are under further control of a minor-2 interlock contact R1412—4 (Fig. 31*b*) which suppresses from ejection until after a selected program has been completed. These normally closed contacts R1412—4 are wired in parallel with the normally open program end contacts R1440—4 which also suppress ejection operation until the program is completed. The operation of relays R1412, R1440 are explained hereinbefore in connection with the program start control and program operating circuits.

In some cases, record feeding operation should not be suppressed during program operation. In fact, there are times when the program operation should initiate the ejection. Therefore provisions are made for circuits to by-pass the suppressing effect of contacts R1412—4 and R1440—4 explained in the preceding paragraph. When such immediate skipping control is desired, plugging is established to an immediate skip socket such as socket 965 (Fig. 31*b*) the like of which is provided for each of the ten feed control channels of the feed control unit. By such plugging connections, skipping control impulses are directed to a relay such as transfer No. 1 relay R1612 to be picked up independently of the usual initiating control through relay R1597.

The ejection control impulse from a program step socket such as socket 964 (Fig. 31*e*) is transmitted by plug wire to the immediate skip socket 965 (Fig. 31*b*) and then through the normally open program interlock contacts R1594—1, the normally closed pickup No. 1 contacts R1597—2, relay R1612 pickup coil and wire 1089 to line 921. From this point on, the circuits conditioned by the energization of the transfer No. 1 relay R1612 for ejection operation are the same as those already described for skipping to the first heading line by using the carriage skip control exit start impulses.

The impulse received from the step of the program and completed by closure of cam contacts CR49 (Fig. 31*e*) at 330 to 338° will initiate the immediate carriage skip and the second breaking of cam contacts CR91 (Fig. 31*b*) at 335° will govern the time of deenergization of the skip impulse relays R1673 and R1674 and operation of the first card in relay R1675.

The normally open first card contacts R1675*d* (Fig. 31*c*) will open the circuit from cam contacts CR26 to break the normally effective circuit through wire 1104 to the program skip interlock relay R1594. Then relay R1594 effects controls by means of contacts such as R1594—1 (Fig. 31*b*) to suppress any repetitive immediate skip impulses to the various channel skip relays during ejection.

Whenever the program unit is used to control record sheet advance or ejection, the ejection control relays will set up program interlock and relay circuits so that any other program operations will be delayed until record sheet movement has been completed. The circuit for a program interlock will be completed from line 920 (Fig. 31*h*), through wire 1105, the normally open first card contacts R1690*c*, the normally open transfer No. 1 contacts R1612—3 or any other transfer contact, short skip contacts R1591—3, cam contacts CR103, stop auto start relay R1466 and stop interlock pickup coil R1692, and wire 1106 to line 921. Operation of relay R1692 causes closure of the normally open stop interlock contacts R1692*b* in shunt across the CR103 contacts, holding the pickup circuit through the relays R1466 and R1692 until the ejection operation is completed. A holding circuit is completed through line 920, cam contacts CR57 (Fig. 31*h*), wire 1107, the normally open stop auto start contacts R1466—1, the holding coil of relay R1466 and wire 1106 to line 921. A parallel holding circuit is established for relay R1692 through the normally open stop auto start contacts R1466—2, the normally open stop interlock contacts R1692*a*, the holding coil of relay R1692 and wire 1106 to line 921. The holding circuits govern through cam contacts CF57 the timing of deenergization of the relays R1466 and R1692.

The normally open stop interlock contacts R1692*c* (Fig. 31*h*) will complete a circuit from line 920 through wires 1105 and 1108, the normally open stop interlock contacts R1692*c*, wire 1109, stop interlock relays R1693, R1694 and R1695, and wire 1106 to line 921. The contacts of these three relays will control the interlocking operation of the various functions of the machine.

Operation of the normally closed stop interlock contacts R1693c (Fig. 31*e*) in the program advance control circuit will suppress program advancement so that the program selectors remain on the same step of control one machine cycle after record strip ejection is completed.

The normally open stop interlock contacts R1693*b* (Fig. 31*e*) when operated completes a shunt circuit around cam contacts CR48 to hold the step control relays R1429, R1431, etc. until one machine cycle past that in which record strip ejection is completed.

The normally closed stop interlock contacts R1694*a* and R1695*a* (Fig. 31*e*) are provided to suppress all program stepping impulses until after record strip ejection is completed.

*Overflow program start*

It is pointed out hereinbefore how the three different classes of group change totals initiate program starting. There is a fourth control for a similar purpose and that is the overflow program start which is comparable to the class of total starts, minor, intermediate and major. This fourth class of start control has individual start and stop circuits but uses the program stepping controls described with reference to group change initiation. In other words, program starting may be governed by the feed control tape as well as by comparison of record cards. This fourth form of program control will normally be used for overflow operations, i. e., when too many details are presented for one form length and a program of printing heading lines and/or total lines must be carried on before resumption of detailing on a new form, and it has two separate program channels which are called into operation by the overflow start circuits.

The normally open overflow start circuit (Fig. 31*c*) will be completed through the cam contacts CR27 and their connections leading to the "overflow" carriage skip control plug socket 963 as described hereinbefore. A plug wire is connected from socket 963 to an overflow program start socket 967 (Fig. 31*g*) and an impulse is directed through the pickup coil of the overflow start-1 relay R1406, and wire 997 to line 921. A holding circuit is established by the closure of related contacts R1406—1 and includes line 920, cam contacts CR53, heading control suppression contacts R1671—2 normally closed, the normally open contacts R1406—1, the holding coil of relay R1406, and wire 997 to line 921.

An overflow start-2 relay R1411 (Fig. 31*g*) is picked up by closure of contacts operated by the overflow start-1 relay. The circuit includes line 920, cam contacts CF16, the normally open overflow start-1 contacts R1406—2, the overflow start-2 pickup coil R1411 and wire 997 to line 921. A holding circuit is set up through line 920, cam contacts CR55, the normally open contacts R1411—1, the holding coil of relay R1411, wire 997 and line 921.

There is a circuit connection arranged in shunt around the cam contacts CR55 and it includes wire 1010 and the normally closed overflow end relay contacts R1447—7. These connections complete the holding circuit through the overflow start-2 relay throughout all overflow program steps of operation until the last at which time the opening of the contacts R1447—7 will allow the overflow start-2 relay R1411 to become deenergized by the action of the cam contacts CR55.

The overflow control relays R1406 and R1411 are seen to have related contacts shown in the upper part of Fig. 31*e* where they cooperate with the contacts for other classes of total initiation of program and serve to control program starting in somewhat the same manner as that previously pointed out.

When the machine is set up with the record strip controlled by tape perforations located as explained hereinbefore, the overflow impulse will be called in at the fiftieth line of the form and can be used to eject the form and move the succeeding form into position to continue detail listing. Furthermore, by using an overflow skip control impulse to call in the overflow program start as just explained, it is then possible by further plugging from the various program steps to call in various functions according to a predetermined overflow program to record sequentially out of storage as in the case of an address repeat or read sequentially out of accumulators as in the case of successive total recording or recording of invoice, page and account numbers.

*Overflow program*

Overflow program operation is similar in many respects to the kind of control called in by the operation of minor, intermediate and major changes noted hereinbefore. At the top of Fig. 31*e*, it will be noted that the same program control and advance relays R1429, R1430, etc. are used as a common stepping means and merely switched to control over different overflow program channels.

The normally open overflow start-1 relay contacts R1406—3 (Fig. 31*e*) when closed serve to complete a program start circuit as follows: From line 920 through cam contacts CR46, stop interlock contacts R1693*c*, the normally open start-1 contacts R1406—3, normally closed minor-2 relay contacts R1415—2, the step control pickup coil of relay R1429 and wire 1011 to line 921. When the step control relay R1429 is called in and held, the further operation of program control relays and circuits through R1430, etc., are the same as those described hereinbefore in connection with group change selection of program.

The normally open overflow start-1 relay contacts R1411—2 when closed complete a circuit to shift the channels of operation from the class of total channels to the overflow channels. Such shifting is under control of relay R1450, the selection of which is about to be made. A circuit is closed through line 920, cam contacts CR47, the normally closed minor-2 contacts R1412—10, the normally open overflow start-2 contacts R1411—2, the overflow program transfer relay R1450 pickup coil, wire 1011 and line 921.

Near the bottom of Fig. 31*ee*, it is seen that the holding coil of relay R1450 is picked up by the closure of related contacts R1450—1. The holding circuit is completed through line 920, cam contacts CR42, wire 1115, the normally open transfer contacts R1450—1, the holding coil of relay R1450, and wire 1012 to line 921. A shunt circuit around cam contacts CR42 is made by wire 1015 and the normally closed overflow end relay contacts R1447—5 which only open at the end of overflow program control and then allow the deenergization of the overflow program transfer to be under control of cam contacts CR42.

An example of the kind of transfer effected by the overflow control may be traced through the overflow step 1 relay R1260 which is picked up early in the overflow program by the transfer of contacts R1450—2 arranged in series between the step 1 control relay R1429 and the overflow step 1 relay R1260 connected to the other line 921 through wire 1012. Then the relay R1260 shifts the related contact points R1260—1 and R1260—2 in the first step of the program channels and a circuit is set up to call in the first step of any selected program by the following connections:

The first step circuit includes line 920, cam contacts CR49 and CR50, the normally closed stop interlock contacts R1694*a* and R1695*a*, wire 1014, basic relay contacts R1198—1, the normally open overflow step 1 relay contacts R1260—1 to plug socket 971 which may be connected by plug wire to call in various machine functions such as storage readout control by plugging to socket 972 (Fig. 31*j*). The overflow program advances step by step and operates exactly as for regular program stepping and the circuits are the same as described hereinbefore under the heading Program Operation.

In order to automatically stop the overflow program at a desired step, a plug wire is used to connect the last selected step of the overflow program by a circuit such as one from socket 1116 (Fig. 31*e*) to an "Overflow End" socket 1117. This plug connection will complete a circuit through the overflow step controls to the cam contacts CR95 and then through the pickup coil of the overflow end relay R1447 and wire 1012 to line 921. A holding circuit is completed comprising line 920, cam contacts CR44, wire 1017, wire 1119, the normally open overflow end contacts R1447—1, the holding coil of relay R1447 and wire 1012 to line 921.

If a class of total control change and the overflow program start occur simultaneously, i. e., a group change and sensing of a tape overflow perforation come together, the class of total program will be ordinarily started first and completed before being followed by the overflow program. The normally closed minor-2 relay contacts R1412—10 shown near the top of Fig. 31*e* are opened in series with the overflow initiating parts to suppress energization of the overflow program transfer relay R1450. Therefore the class of total program will take precedence.

The class of total regular program stop circuit is completed and a parallel circuit is set up to re-initiate the program start by impulsing the program repeat relay R1443 (Fig. 31*ee*) to call in overflow program control.

At the end of the regular program steps, a circuit parallel to the end circuit can be traced having many connections in common with the end circuit traced hereinbefore through such parts as shown in the lower portion of Fig. 31*ee* including contacts R1412—8, R1437—2, etc. to the program end relay R1440. The same connections branch through the normally open minor-2 relay contacts R1412—9, the normally open overflow start-2 contacts R1411—3, the normally closed overflow end contacts R1447—3, cam contacts CR111, interlock contacts R1444—2, the pickup coil of the program repeat relay R1443 and wire 1012 to line 921. A holding circuit is established through line 920, wire 1015, cam contacts CR43, wire 1120, the normally open program repeat contacts R1443—1, the holding coil of relay R1443 and through wire 1012 to line 921.

Then the normally open program repeat contacts R1443—2 shown near the top of Fig. 31*e* will start the program controls a second time by completing the circuit through line 920, cam contacts CR46, stop interlock contacts R1693*c*, the normally open program repeat contacts R1443—2, the step 1 control relay R1429 and through wire 1011 to line 921. Then the program stepping control relays operate in succession in the same manner as described hereinbefore. In the case of repeated program control, there is in fact ten program steps provided when it is realized that five steps of class of total program stepping may be followed by five steps of overflow program stepping.

On the second time through the program stepping process, stepping is understood to operate through the overflow program channels, and the overflow program transfer relay will be energized by closure of the normally open program end relay contacts R1440—8 (Fig. 31*e*) in series with the pickup coil of relay R1450. The circuit is from line 920 through cam contacts CR47 to the normally open program end contacts R1440—8, the normally open overflow start-2 contacts R1411—2, the pickup coil of relay R1450 and wire 1011 to line 921.

The overflow program circuits are the same as those explained in connection with overflow program control from the overflow carriage skit exit. As an example, a plug connection may be made from socket 971 (Fig. 31*e*) to socket 972 (Fig. 31*j*) and there it will pick up the storage readout relays R828, R829, and R832 through the normally closed contacts R837—2 and wire 1064 to line 921. These relays R828, etc. have contacts such as R829—8 (Fig. 31*i*) and contacts R832—4 in series with commutator points of the storage unit A and upon closure permit readout from storage under program control.

When a major control class of total occurs simultaneously with an overflow program start, the regular program stepping will be completed and the overflow program suppressed by plugging from the last or major step of the regular program channel to the overflow end plug socket 1117 (Fig. 31ee).

An overflow program operations will suppress the reading and feeding operation of the card feed unit by the opening of the normally closed overflow start-1 relay contacts 1411—4 (Fig. 31a) arranged in series with the auto start relay pickup coil R1639 which is arranged in the running circuit. The normally open overflow end relay contacts R1447—4 complete the auto start pickup circuit directly after the program is finished so that on the following machine cycle, the card feed unit will operate.

*Overflow with maximum detail listing*

Although it is a desirable feature to provide room at the end of each form for recording of totals related to items on the same form (form R1, Fig. 1a), it is a waste of record material because of the number of instances where a group change does not coincide with the overflow position. In the previous sections of this description, it is assumed that the 11s perforation of the eleventh tape channel is controlling for overflow control and it is positioned to be sensed when there remains about five lines of space on a form so that should a group change coincide therewith, programming of total printing occurs and takes precedence over programming of heading reading out of storage which follows thereafter.

Now is is proposed to shift the location of the 11s perforation (Fig. 1c) and position it on the tape to coincide with the end of a form. And it is proposed further to use the ninth channel of the tape also for overflow control by the provision of a perforation 9s (Fig. 1a) at the form line position usually occupied by 11s. The reason for these changes and the provision of a dual overflow control is to save record material and gain print capacity by allowing listing to proceed to the bottom of a form and at the same time retain the advantages of putting totals on the last few lines of a form. In this modification, the perforation 9s is usually ineffective for overflow control and comes into play only when there is a coinciding group change (i. e., the old advantage of item and total association is retained). Usually on an overflow condition, items are listed to the very end where perforation 11s is sensed to call in the program start connections for heading repeat out of storage (i. e., the new advantage of maximum detail listing is gained without loss of the old advantage). Should a group change occur in the end space interval between 9s and 11s, then there is not room to put all the totals at the bottom and instead there is effected a reversal of the usual order of program procedure (class of total first, and overflow program of reading from storage next) and instead the overflow program controls take precedence to record the heading out of storage at the top of a second form (see R2b, Fig. 1a) before the class of total program controls successive printing of the totals on the second form.

Therefore the dual overflow controls about to be considered have the double purpose of permitting totals to be recorded where there is room but using all form space in the absence of end totals. In order to do this, a preliminary overflow control is set up through 9s and a final overflow control is called in by 11s. As a result there is provided a preparatory overflow control which is effective only when a group change occurs during listing in that area between the two overflow positions 9s and 11s. Should a group change occurbefore the first overflow position 9s is reached, then a #1 pilot selector is called in by the change to break a program transfer circuit which otherwise 9s picks up in readiness for programming by the overflow channels. The same #1 pilot selector has contacts between the 11s overflow and pilot selector #2 which in turn disables a program repeat. Therefore, when selector #1 breaks the preliminary overflow control on an early group change, it also enables the arrangement for a program repeat through 11s.

At the time of a group change (assuming it to be a major change) the last detail card of one group will be at the second sensing station while the first heading card of the incoming group will be at the first sensing station and will signify a D-H change (otherwise known as no X to X control). Such a detail to heading change will set up connections to send an impulse to the carriage skip #1 controls to cause ejection to the first heading line. In so moving, the tape is carried along with the 11s perforation passing the B11 brush to call in overflow program control.

Figure 1C:
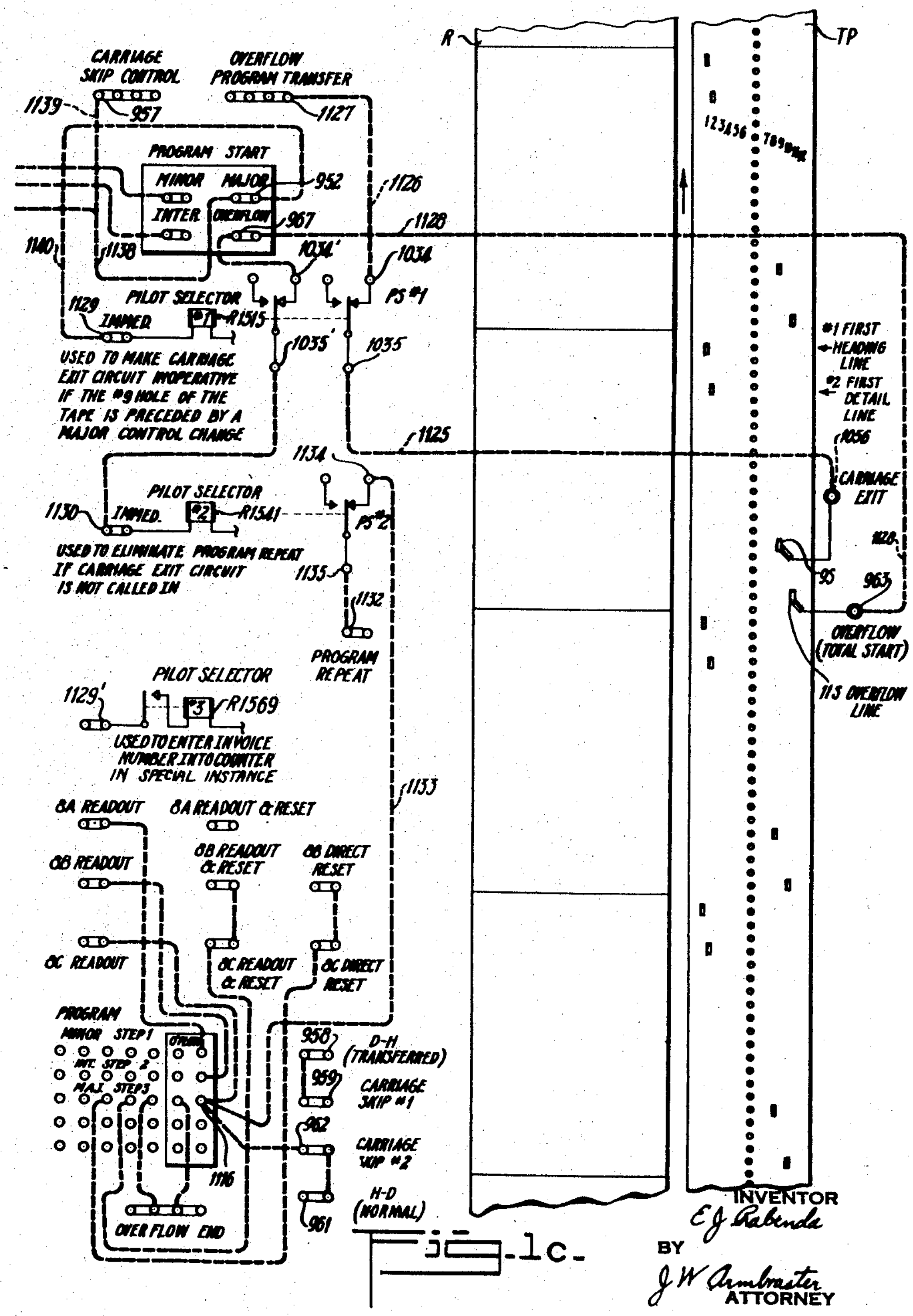

A more detailed description of the foregoing may be given with reference to the diagrammatic showing in Fig. 1c having identifications thereon of the plug sockets shown in the wiring diagram, mainly in Figs. 31b, 31c, 31e and 31ee, and the controls of which are set forth in detail hereinbefore.

When the ninth channel brush of the tape sensing unit makes contacts through the perforation 9s (Fig. 1c), a circuit is completed to provide an impulse at the socket 1056. Also shown in Fig. 31c, this socket 1056 (Fig. 1c) is connected by a plug wire 1125 to the common socket 1035 (also shown in Fig. 31d) of the normally closed pilot selector #1 contacts. To the other socket 1034 (Fig. 1c) is connected a wire 1126 running to the overflow program transfer socket 1127 (also shown in Fig. 31e) leading to the program transfer pickup relay R1450 which was noted as the switching device for changing from class of total program to overflow program. These connections through the pilot selector remain undisturbed in the absence of a group change and prepare the program devices for a reversal of the usual procedure of programming for total printing before programming for overflow control of reading out of storage. If a major group change occurs before the first overflow perforation 9s is sensed, then the pilot selector breaks the program transfer circuit and permits the usual order of procedure to follow in printing totals first. In other words, there are two conditions attending this modification to provide the maximum number of lines for detail printing.

(1) If a major control change occurs previous to the sensing of the overflow perforation 9s in the tape, it is an indication that there is ample space remaining on the form to print all three classes of totals. For this reason, the connections from the ninth tape sensing brush is then made ineffective by opening the pilot selector No. 1 contacts and preventing energization of relay R1540 through the plug wires 1125 and 1126 as already mentioned.

(2) However, if a major control change occurs after the overflow perforation 9s is sensed in the carriage tape, then connections are set up which will provide an overflow skip to the next form although the last line of the form has not been reached. This will permit printing of the repeat address at the top of the following form before recording totals on it.

The modified form of connections now being explained serves the purpose of eliminating waste space which is otherwise allocated at the bottom of each form to provide for possible total printing, and it also eliminates the possibility of splitting a series of total impressions between two forms.

Returning now to consideration of the circuit to socket 1127 (Fig. 1*c*), it is noted that whenever a preliminary overflow is sensed the overflow program transfer relay R1450 is energized to transfer related contacts (Fig. 31*e*) and provide a means for using the overflow stepping control relays R1260, R1261, etc. when and if the program is initiated by a control change. The overflow step relays call in controls from the various overflow steps of the overflow channels after a control change has occurred.

Assuming that a major group change has taken place, the last detail card of one group will be at sensing station No. 2 and the first heading card of the following group will be at sensing station No. 1. Consequently the D-H socket 958 (Fig. 31*c*) of the skip control exits will be conditioned to emit an impulse which may be carried by plug wire to skip No. 1 control socket 959 (Fig. 31*b*) leading to relays R1597 and R1612, the use of which is for selecting the first channel of the tape sensing means to select stopping control as outlined hereinbefore. This part of the plugging is also shown diagrammatically at the bottom of Fig. 1*c*. The control effected thereby will stop the incoming record form with the first heading line at the print receiving position.

Upon the completion of the skipping movement from the end of one form to the top of the following form, the overflow channels of the program device will operate successively to call in a sequence of readings from the storage units and accumulators to control the printing of a name first with the invoice number and secondly the street identification with a page number and thirdly a city and state name with the customer's account number.

On the third step of the overflow program operation, it is necessary to again call into operation the record feeding means to advance the form to the first body line so that it is receptive to the printing of totals. In order to do this, the step 3 plug sockets 1116 (Figs. 1*c* and 31*e*) are connected to the socket 962 (Figs. 1*c* and 31*b*) which is controlling over relays R1598 and R1613 which are provided for skip No. 2 operation, i. e., to select the second tape channel for selecting the first body line.

On the third step of the overflow program operation, it is also necessary to initiate a program repeat control in order that the program devices will go back to step No. 1 so that the minor, intermediate and major totals may be recorded in the usual sequence. For this purpose, the plug socket 1116 (Figs. 1*c* and 31*e*) is connected by a wire 1133 (Fig. 1*c*) to the program repeat socket 1132 through the normally closed contacts of a pilot selector No. 2 which provides connections to the repeat control relay R1443 (Fig. 31*ee*). The last mentioned circuit is eliminated at times by the operation of pilot selector No. 2, but that is only when the first overflow control from perforation 9*s* is ineffective as pointed out hereinafter.

It is already noted that pilot selector No. 1 plays a part in overflow control by the use of its normally closed contacts in the first overflow control circuit. In Fig. 1*c*, it is seen that by means of a plug wire 1140 between the major program start socket 952 and the socket 1129 of the No. 1 selector relay R1515, the No. 1 selector is energized by a group change impulse coming from the major comparing exit. This control is used for two purposes, the first of which is to eliminate the effect of the first overflow control through perforation 9*s* which is to be used to initiate an overflow program transfer only if the overflow is not preceded by a group change; and the second of which is to control the regular overflow impulse through the perforation 11*s* which passes through a second set of contacts of the No. 1 selector in going to pick up the No. 2 selector. Pilot selector No. 2 is first energized by an impulse through the second overflow control perforation 11*s* to eliminate the initiation of a program repeat operation when ordinary overflow conditions are presented, i. e., the overflow No. 1 perforation 9*s* passes on the tape and no group change occurs up to the time that perforation 11*s* is sensed. This is an indication that a number of detail cards remain to be considered along with the same account and therefore ordinary overflow programming is to be called into operation for address printing out of storage without being followed by total printing. The circuit connections for elimination of program repeating are seen on Fig. 1*c* to include the plug wire 1128 from socket 963 (Figs. 1*c* and 31*c*) to overflow program start socket 967 (Figs. 1*c* and 31*g*) and then by a plug wire to socket 1034' (Fig. 31*d*) of the normally closed contacts of pilot selector No. 1 and then from related plug socket 1035' to socket 1130 which is in series with the pickup coil of the pilot selector No. 2 relay R1541. In this way, overflow elimination of program repeat is made dependent on operation of pilot selector No. 1 which, it will be remembered, in turn is made dependent upon occurrence of the major group change.

Other record feeding controls are called into operation upon the occurrence of a major group change. This is done to provide for skipping from one form to another by a major change which is indicative of a change to another customer heading and account number. The plug connections are shown schematically in Fig. 1*c* and include wires 1138 and 1139 extending from the major program start socket 952 to socket 957 in series with relay R1589 (Fig. 31*b*), the controls of which are shown at the top of Fig. 31*c*. By making the skip control connections effective, it is possible to use the D-H sockets such as socket 958 and connect by a plug wire to the carriage skip No. 1 relay socket 959 (Fig. 31*b*) which controls the operation of relays R1597 and R1612 to control stopping at the first heading line. These connections are also shown diagrammatically in Fig. 1*c*.

It is already noted that the skip No. 2 socket 962 (Figs. 1*c* and 31*b*) is connected to the third step of program control in order to call the stop control relays R1598 and R1613 into operation. This control is effected further by plugging from the H-D skip control socket 961 (Fig. 31*c*) to emit an impulse for record strip stopping control under certain conditions. In the case of the normal indication of the invoice number, page number and customer account number read from accumulators simultaneously with the reading of the customer's name, address, city and State from a heading card, the H-D socket emits an impulse at the end of the MLR control. This plug connection will cause the record strip to be stopped with the first detail line at the beginning of the body section of a form at the printing line.

In the case of printing on a form which is a continuation of a previous form, then the address will be read out of the storage units and the storage accumulators will also be read sequentially by the overflow program devices to print the invoice number, page number and customer account number. On the third step of the overflow program, the skip No. 2 socket 962 is impulsed to stop the form at the first detail line.

It will be noted that, for the purpose of illustration, the section concerning overflow control with maximum listing is conditioned for listing operations and no provisions are made for missing heading or detail cards.

When the No. 1 and No. 2 Pilot selectors are used for overflow control as explained in this section, then the ordinary pilot selection control from the leader card LC (Fig. 1) may be directed into the third Pilot selector (Fig. 1c) and relay R1569 is then used for number entry control.

*Basic program control*

In Fig. 31e it is noted that in series with each of a set of program stepping contacts R1236—1, R1240—1, etc., is a pair of normally closed contacts such as R1198—3. There are a number of such contacts, two for the overflow program channels, and several for the class of total channels. They are provided so that selection may be made of manual rather than plugged programs. In other words, by the selective opening of contacts R1198—1 to R1201—4 a choice may be made of the style of program desired from a variety of styles.

The relays R1198, R1201 (Fig. 31g) controlling such selection are called into action by a switch 1142 arranged in series therewith between wires 1010 and 997.

*Complete overflow sheet headings—three lines of address print from storage*

Under the heading Storage Controls it is explained hereinbefore how a step of program selection calls in relays R828, R829, R832 (Fig. 31j) to connect a pair of storage commutators 594, 595, 598 (Fig. 31i) for controlling a line of alphabet printing from storage. Now it is proposed to explain that three lines of alphabet data such as an address, can be stored and read out on an overflow condition and printed as a complete address or heading on related forms following the first form of an account.

The first card of each group is the heading card HC (Fig. 1) which has the R and 3 perforations in the first column for controlling multiple line reading start and stop operations as already noted. In that fashion the three lines of address data are read off the card at the second reading station and printed on a form such as form R3a (Fig. 1a).

Simultaneous with the reading and printing of the three fields of heading card data through the MLR progressive selectors, the same data is directed seriatim into the storage entry sockets of the storage devices A, B and C. The plug connections from the card to the progressive selectors are from 929, 931 and 933 (Fig. 31g) to 930a, 932b and 934c, respectively (Fig. 31f). The plug connections from the selectors to the storage units are from 936a, 936b and 936c (Fig. 31f) to 928, 928b and 928c, respectively (Fig. 31i). This address data is retained in the three storage units until required for repeat printing as on form R3b (Fig. 1a) after an overflow occurs.

Listing of the detail cards on form R3a continues to the bottom of the form. When the last detail line is printed, type sensing brush B11 detects the overflow control perforation 11s and a circuit is initiated to start an overflow program to provide for reprinting the heading or address from the storage units.

The tape overflow control impulse is directed to the program overflow start and is also transmitted to the carriage skip #1 socket to stop strip feeding with the first heading line at the print receiving position. The program start plug connection is from socket 963 (Fig. 31c) to socket 967 (Fig. 31g). The skip plug connection is from socket 963 (Fig. 31c) to socket 959 (Fig. 31b). The latter serves to call in relays R1597 and R1612 to select tape brush B1 and read tape perforation 1s which coincides with the first heading line where form R3b (Fig. 1a) is stopped to receive the first heading line.

On the first step of the overflow program the storage unit A is impulsed to read out and print the customer's name on the first heading line of form R3b. The plug connection is from socket 971 (Fig. 31e) to socket 972 (Fig. 31j) in order to pick up relay R828, R829, etc. for shifting the storage readout contacts R829—8, etc. The print connection is from socket 941 to 940. Similar connections are made from steps 2 and 3 sockets 971b (Fig. 31e) and 1116 to 972b and 972c, respectively (Fig. 31j). In Fig. 31i parallel print connections are made between 941 and 941b and 941c. In this way the second program step is productive of printing of the street identification out of B and on the second heading line. The third program step calls in control of printing of the city and state out of C and placed on the third heading line.

On the third step of the overflow program, the record feeding devices are restarted and the skip #2 tape brush selector relays are picked up to stop movement of a form such as form R3b (Fig. 1a) with the first body line at the printing position. The plug connection is from socket 1116 (Fig. 31e) to socket 962 (Fig. 31b) for calling in relays R1598 and R1613, the latter making tape brush B2 (Fig. 31c) effective for stopping control.

When all items have been listed on form R3b (Fig. 1a) a group change occurs and then the total is either printed directly under the items or the strip is automatically advanced to a predetermined total position as governed by a tape perforation such as perforation Ts in controlling the location of the minor total on form R4. In the example given no provisions are made for missing heading or detail cards, and for such control additional plugging would be required.

*Accumulators used as storage counters*

In Fig. 1 it is noted that the storage accumulators for receiving the invoice and page numbers are advanced by the addition of unity and used as counters.

The entry of the first invoice number into counter 8A is from the leader card LC and it is through pilot selector contacts which cut off card control after the first cycle of the first group. Thereafter the invoice number is printed with the first line of each heading name and also impulsed to increase by one on every major group change as directed from a similar entry in the page number counter 8B and pilot contacts closed after the first cycle. Resetting of the counter may be accomplished on the final total cycle.

The page number counter 8B is advanced by one unit each time a heading card is listed through the MLR devices. By plugging to a cycle count hub at the second stage of the MLR, a first unit advance is assured for each account. It is also plugged to the first stage of overflow program to add a unit for each overflow condition and thus distinguish by page number between successive forms of one account. The page number is printed with the second line of each heading record and also with the second line read from storage on an overflow program. Resetting is carried on as an incident to each major group change.

The entry of the customer account number into accumulator 8C is from a field of each heading card. It is entered on the third cycle of the MLR cycles through progressive selector contacts. The account number is printed on the third MLR cycle as it is stored, and it is also printed on the third program cycle of every overflow program. Accumulator 8C is reset upon each major class of program step attending major group changes.

*Miscellaneous controls*

Distributed throughout the wiring controls are a number of relays and switches of minor concern and of interest only because of the presence of related contacts in some circuits already traced. A brief explanation of the purpose of these controls is believed sufficient.

The alteration switch AS (Fig. 31*a*) is provided for controlling the pickup coil of a coselector. Then the shiftable contacts of the plugged coselector are connected to alter or change the functioning of selected features, such as, changing from List control to Tabulate, change of class of group control, etc. The change is effected by the rather late closure of cam contacts CR2.

The first card control relays R1401—R1403 (Fig. 31*a*) are used to control the circuits necessary for group indicating, i. e., to store and print a number as an incident to a first cycle of a new group. The related contacts are connected to control accumulators or storage devices to receive data from the first card of a group following a change in group control classification. Such data is used, for example, to identify customer account numbers, etc., for sheet overflow repetition of heading print.

The "after heading" control relay R1404 is provided to effect controls when the last heading card passes the second reading station. Then all the first card control relays R1401, etc. are energized in preparation for group indication control.

It will be noted that, in series with the pickup coils R1401—R1403 of the first card controls, are the normally closed heading control relay contacts R1669*c* which are opened whenever a heading card approaches the second reading station Therefore, although a change in classification occurs, the first card control relays are not energized until the latter part of the last heading control cycle when the contacts of relay R1403 in series therewith are shifted.

The common space control relay R1661 (Fig. 31*b*) operates whenever printing is to take place during listing or total printing cycles. It is called into operation through contacts controlled by the program stepping relays. The primary purpose of the common space relay R1661 is to close the contacts R1661*c* (Fig. 31*c*) in series with start relay R1676 to make effective the spacing circuits for calling into operation the carriage start controls.

The heading control suppression relay R1671 (Fig. 31*b*) is used in those instances when it is unnecessary to control between the heading card and the detail cards. It is picked up when a heading card is detected at the second reading station. The contacts of relay R1671 (Fig. 31*g*) are opened to break the holding circuit to the minor, intermediate and major control relays R1407—8—9 thereby suppressing group control whenever necessary.

The form skip relay R1672 (Fig. 31*b*) is called into operation when it is necessary to skip over more record strip area than the distance from form to form. It is called into operation by plugging to the D-H sockets (Fig. 31*c*) as an indication of missing cards. In recording on combinations of voucher and check strip associations, it is possible that at times it is required to skip over more than one form length due to the detail cards of one group being missing and also the heading cards of a following group being missing. In this instance, the inverted form switch IV (Fig. 31*c*) is set to the position In and then under control of a perforation in the 9th channel of the tape, a signal is received indicating that the first form has been skipped whereupon the end of form relay R1681 is called into operation to close contacts R1681B to condition the tape control circuits for operation.

The short skip control relay R1591 (Fig. 31*b*) is used to save printing time. Normally whenever a skip occurs, the machine stops printing until such time as the record strip is properly positioned. In all instances, where it is known that the skip distance is going to be two inches or less, it is desirable to avoid interlocking the machine in order to save time. The contacts of the short skip relay are used to open all the circuits which would otherwise cause interlocking. The short skip relay is called into operation by the same impulse which initiates skipping. The extra space control relay R1664 (Fig. 31*b*) is provided to obtain an extra space after printing. It is often desirable during listing and total printing operations to separate the lines of print. This is done by relay R1664 calling into operation relay R1662 which, in turn, controls contacts (Fig. 31*c*) in series with the carriage start controls.

Space suppression relay R1663 makes it possible to print several items on one line while listing from several cards. Normally each card listed causes a spacing operation between printing operations. However, by selectively calling in the space suppression relay, many items can be printed on one horizontal line.

The space and the skip control relay R1662 (Fig. 31*b*) is provided for a double purpose. Its contacts are in series with the carriage start controls and provide a circuit for initiating paper movement after printing. It is also impulsed to gain extra spacing when so desired and controlled by the extra space relay R1664 already mentioned. All skipping is controlled after printing in order to provide the maximum amount of time for record sheet movement.

The double space control relays R1665—6—7 (Fig. 31*c*) are provided to increase the spacing between item printing. Normally, when single spacing, a circuit is completed through the tape control circuit breaker to the carriage stop relays R1683 and R1684. When double spacing, the circuit breaker must first impulse the relays R1665 and R1667, setting up a holding circuit for relay R1665. When the first circuit breaker impulse is completed, the relay R1667 is deenergized and permits the double space relay R1666 to be energized at a time between circuit breaker impulses. Then relay R1666 establishes a holding circuit. When the circuit breaker closes for the second time a circuit is then directed through the normally open contacts R1666B to the stop control relays R1683 and R1684.

The zero control relays R723, etc. (Fig. 31*d*) are energized through cam contacts CR55 (Fig. 31*k*) in order to suppress control from zero perforations appearing in the record cards. The contacts of the zero control relays are in series with the comparing pickup relays R593, etc. (Fig. 31*d*) and useful in allowing maximum time for deenergizing the holding coils of these comparing control relays.

The basic set up relays R1198 and R1201 (Fig. 31*g*) are called into operation by switch operation when a flexible program is desired. Normally the program controls through the basic relay contacts R1198—1 (Fig. 31*e*), is inflexible in that either one, two or three cycles are taken in order whenever minor, intermediate or major group changes occur. However, along with any special plugging, spacing control must be plugged whenever extra after spacing control is required.

The list control relay R1457 (Fig. 31*g*) when energized (switch to Off) permits cards to pass through the sensing stations without controlling the printer. The machine is conditioned normally to list each card passing through the card feed devices.

The auto run out relay R1458 (Fig. 31*g*) is provided to establish control for advancing a last card all the way through all the sensing stations. Normally, when the last card feeds from the hopper, the card feed will stop in order to permit the machine operator to refill the magazine. There are instances where small batches of cards are to be run through the machine for group totals. Then relay R1458 is called in by its switch to close contacts R1458—1 (Fig. 31*a*) in series with start relay R1638 to keep the feed going and also close contacts R1458—2 (Fig. 31*g*) in series with the major control pickup coil R1409 for an automatic total at the end.

The last card tape restore relay R1686 is used to control tape movement to the home position after the last card controls printing. When using the tape TP for control of form printing, provision is made so that as the last form is printed by an end card, the tape is advanced to the first printing line of a new form. In this way, the record feeding devices are prepared for control by a new batch of cards on additional forms. Relay 1686 has contacts R1686B (Fig. 31*c*) in series with the tape restoring relay R1677.

The "first card in" relays R1688, R1689, R1690 (Fig. 31*g*) change circuits effective during the initial course of the first card from the hopper to the second reading station to automatically cause the accumulators to reset, to suppress printing, adding and record feeding. After the first card is advanced, the contacts of these relays make connections for normal machine operation.

The "carriage first card in" relay R1675 (Fig. 31*g*) is used to prevent record spacing immediately following a skipping operation. It is dependent on relay R1661 which in turn is dependent on steps of printing cycles (Fig. 31*b*). Thus relay R1675 is energized only after an item has been printed following skipping, in order to provide for normal line spacing thereafter.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine controlled by records containing data indicia relating to one line of print and other records containing data indicia relating to multiple lines of print, said multiple line records containing the data in a plurality of fields and a special perforation denoting the multiple line nature of the record and a second special numeral perforation denoting the number of lines controlled thereby, means for sensing said records, means under control of said sensing means for printing a record of the data of said records, storage devices, means under control of the first-mentioned special perforation for detecting the appearance of a multiple line record at said sensing means, means under control of said detecting means and said second-mentioned special perforation for controlling said sensing means for sensing said record cyclically a plurality of times in connection with said several fields, and means under control of said sensing and detecting means and said cyclic control means for controlling said printing means and said storage devices to receive data successively relating to different lines.

2. In a machine controlled by item records containing data indicia relating to one line of print and other heading records containing data indicia relating to multiple address lines of print, each heading record containing a distinguishing perforation and a numerical perforation representing the number of lines of address data thereon, means for sensing said records, means under control of said sensing means for printing a record of the data on said records, storage devices, means for sensing said distinguishing perforation to detect a heading record at said sensing means, means under control of said special numerical perforation in each heading card for retaining said heading at said sensing means for a number of cycles selected by the numerical value of said perforations, and means under control of said detecting and retaining means for controlling said printing means and said storage devices to be operated successively by said sensing means to receive data relating to different address lines.

3. In an accounting machine with a plurality of printing, accumulating and total taking devices and having in combination a program device therefor comprising a plurality of pairs of relays, each pair including an advance relay and a step control relay, and progressive controls between said pairs of relays including contacts of an advance relay for picking up a related step relay and contacts of a step relay for picking up the advance relay of the next pair of relays, means for initiating operation of the first advance relay, means for selectively stopping program stepping by disconnecting the step relay of a certain pair, and successive sets of contacts closed successively by said step relays to effect cycles of programming.

4. The machine set forth in claim 3 wherein printing is effected on a record sheet, means for feeding said sheet, means for detecting an overflow print condition on said sheet, and means under control of said detecting means for operating said initiating means.

5. The machine set forth in claim 3 wherein control is effected by records divided into groups, group control devices for determining when record groups change, and means under control of said group control devices on occurrence of a change for operating said initiating means.

6. The machine set forth in claim 3 wherein the initiating means is of a dual nature responsive to control by group control devices and overflow condition detecting devices, means for feeding a record sheet upon which printing is effected, means for detecting an overflow print condition on said sheet, means under control of said detecting means for operating said initiating means, a plurality of record cards divided into groups for controlling said printing means, group control devices for determining when card groups change, means under control of said group control devices for operating said initiating means, said successive sets of contacts being divided into two groups, the one group relating to program devices for overflow control and the other set relating to group control and the class of total changes, whereby it is possible to effect cycles of overflow and class of total programs relating to the dual controls through the use of common advance and step relays.

7. In a machine controlled by records with alphabetic data in a plurality of orders represented by combined numeral and alphabet zone perforations, a plurality of means for sensing said perforations, each of said sensing means being common to related numeral and alphabet perforations of an order, an alphabetic storage unit comprising related pairs of differentially adjustable commutator sectors, means under control of a common one of said sensing means for setting differentially a pair of said sectors, one to represent the numerical part of an alphabet character and the other to represent the zone portion of the alphabet character, an alphabet printer, means for directing a pair of numeral and zone impulses through set sectors, and electrical adjusting devices under control of said pair of impulses for controlling said alphabet printer to print a single character corresponding to the stored data of the record.

8. In an accounting machine, a plurality of storage devices, means for entering alphabetical and numerical data in said devices, means under control of said devices for printing successively a record of the data therein, means for resetting said storage devices, a program device for governing said printing means to record from certain devices on selected cycles, said program device including a plurality of pairs of advance and step control relays, and progressive controls between said pairs including contacts of an advance relay for picking up a related step relay and contacts of a step relay for picking up the advance relay of the next pair of relays, means for initiating operation of the first advance relay, means for selectively stopping program stepping by disconnecting the step relay of a certain pair, and sets of contacts between said storage devices and said printing devices and closed successively by said step relays to effect printing seriatim from the storage devices in a selected order.

9. A machine of the kind set forth in claim 8 wherein control is exercised by a single heading card bearing a plurality of fields of data, static sensing devices, means for retaining said card at said sensing devices for a number of cycles depending upon a number of fields thereon, and means for entering the data from different fields into different storage devices.

10. A machine of the kind set forth in claim 8 wherein said plural storage devices have a common readout device with separate connections thereto, and means under control of said program devices for operating separate sets of contacts between said common readout means and said storage devices for controlling printing successively by said storage devices.

11. A machine of the kind set forth in claim 8 wherein said entering means is controlled by records arranged in groups by account numbers and a leader card with a first invoice number, group control devices for detecting changes in account numbers, said storage devices including alphabet storing means and numeric counters for receiving invoice numbers, page numbers and account numbers, means for advancing the invoice counter means upon each change of account groups, means for advancing said page counter means for each record portion, means for resetting said account number counter upon each group change, and means under control of said program sets of contacts for connecting to said printing means, said numerical counters to effect recording of stored numbers along with seriatim printing control from the alphabet storage means.

12. In a machine for recording on a continuous strip divided into forms under control of records divided into groups with name, address and item indicia on cards in each group, means for sensing said indicia, means under control of said sensing means for printing name, address and item data on a form of said strip, means for line spacing and long feeding said strip, means for detecting an overflow condition presented when items exceed in number the lines for items on a form, means under control of said sensing means for storing the name and address portions of data of a group, and means under control of said overflow detecting and storing means for controlling said printing means to repeat the printing of the name and address of one group on successive forms when the items of said one group overflow onto more than one form.

13. A machine of the kind set forth in claim 12 wherein program devices are provided with means for closing separate sets of contacts seriatim by successive cycles of the machine, said sets of contacts being selectively connected between said storing means and said printing means to control the recording of the name and address lines in a predetermined order.

14. In a machine controlled by records, said records being divided into groups, each group containing a heading record with a plurality of fields of address indicia, a distinguishing indicium and a special numerical indicium denoting the number of address fields, each group also containing item records with common account number indicia, a plurality of sensing stations, means for advancing said records one by one through said stations successively, means at the first of said stations for detecting said special indicia and the appearance of a heading record and the number of fields thereon, means under control of said second sensing station for printing the data sensed on the records, storage devices for holding the different lines of address data, multiple line reading devices including means under control of said detecting devices for holding a heading record in position to be analyzed successively according to the value of said special number indicium thereon and means for controlling said printing means and said storage devices to receive successively the data from separate fields on said heading record, group control devices for detecting changes in account numbers on successive records, a program device with means for successively closing different sets of contacts relating to different program steps, means under control of said group control devices for initiating operation of said program devices, said sets of program contacts being connected between said storage devices and the printing means to control successive recording of lines of address from storage.

15. A machine of the kind set forth in claim 14 wherein recording is effected on a record strip divided into forms, means for detecting the approach of the end of a form denoting an overflow condition, and means under control of said overflow detecting means for initiating operation of said program devices, whereby recording of the address of the same account is repeated from storage on each related record form after the first.

16. In a machine for printing on a continuous strip divided into forms, means for entering item and heading data, means under control of said entering means for printing item and heading lines on said strip, means for line spacing said strip and feeding it from form to form, first and second overflow detecting means which are coordinated with the advance of said strip and operated to define an end area on each form, means for accumulating said items, total taking devices therefor, and means operating in conjunction with said first and second overflow detecting means for selectively operating said total taking devices to print a total either at the end of one form or after printing the heading at the top of the following form.

17. The combination set forth in claim 16 wherein means is provided for ordinarily controlling the total taking devices to take precedence over the heading print devices, and means under control of said first and second overflow detecting means for controlling said precedent controlling means so that a reversal is effected to cause the heading printing to occur before the total printing at the top of a new form when the total taking condition occurs in the area defined by said detecting means.

18. In a record controlled machine for printing on a continuous record strip divided into forms, said control records being divided into groups with leading address records and following item records, means for sensing data on said records, means under control of said sensing means for printing on said strip, means for line spacing said strip and feeding it from form to form, first and second overflow detecting means which are coordinated with the advance of said strip and operated to define an end area on each form, means under control of said sensing means for accumulating separate classified item amounts of a group of records, total taking devices therefor, classified group control devices for controlling the printing means by said separate accumulating means to print classified totals, and means operating in conjunction with said first and second overflow detecting means and said group control devices for printing said classified totals at the end of one form when the group change occurs before the first overflow point is reached, and printing said classified totals near the top of a following form after address printing when the group change occurs after the first overflow point is reached.

19. The combination set forth in claim 18 with program devices having dual control of determining the order of printing of address portions and classified totals, means under control of said sensing means for storing the address portions, means under control of said program devices and connected between said storing means and said printing means for recording the address portions repetitively and in succession at the tops of succeeding forms as long as overflow conditions are indicated by said overflow detecting means, and means under control of said program devices and connected between said classified total taking devices and said printing means for recording classified totals at the top of a second form in succession when diverted from recording said totals in succession at the bottom of the preceding form by the control of said overflow detecting means.

20. The combination set forth in claim 19 with means cooperating with said program devices for causing the classified total portion thereof ordinarily to take precedence over the overflow controlling address storage program portion thereof, and means under control of said first and second overflow detecting means when a group change occurs in said end area for controlling said precedence causing means to reverse the usual order and record address portions before classified total recording at the top of said following form.

21. The combination set forth in claim 18 with means under control of said second overflow detecting means for determining whether items are to be listed at the top of a second form or classified totals printed thereon according to the absence or presence of a group change occurrence while printing is taking place on a first form in the end area defined by the two overflow detecting means.

22. The combination set forth in claim 18 wherein said spacing and feeding means includes a perforated feed control tape with two overflow control perforations, and sensing means therefor to control the operation of said first and second overflow detecting means under control of said tape, said tape being advanced in synchronism with the feeding operation of the record strip.

23. The combination set forth in claim 18 with program devices for determining the order in which address portions are effective, storage devices operated under control of said sensing means for storing the address portions, and means cooperating with said program devices and connected between said storage devices and said printing means for controlling the recording of address lines successively at the top of a second form upon detection of an overflow condition by said overflow detecting means.

24. The combination set forth in claim 18 with program devices for governing the order in which classified totals are printed, means under control of said program devices and connected between said classified total taking devices and said printing means for recording classified totals successively at the end of one form or at the beginning of the following form as determined by said group control devices and said overflow detecting means.

25. The combination set forth in claim 18 with storage means, means cooperating with said sensing means for diverting different address portions into different parts of said storage means, and means under control of said overflow detecting means for effecting a connection between said storage means and said printing means to repeat the recording of an address at the top of a second form when an overflow condition is detected with respect to a preceding form.

26. The combination set forth in claim 18 wherein the address record contains a complete address appearing thereon in a plurality of fields, address storage means for the different portions of an address, multiple line reading devices with successively operated connections, means for connecting said multiple line reading device between said sensing and said storage devices in order to enter the different address portions of said single address record into different storage devices, and means under control of said overflow detecting means for connecting said storage devices to said printing means for repeating address recording at the top of the following forms when overflow conditions attend recording on preceding forms.

27. In a record controlled machine for printing on a continuous strip divided into forms, said control records being divided into groups with single leading heading records and following item records, said heading records bearing a plurality of fields of different heading data, means for sensing data on said records, means under control of said sensing means for printing on said strip, means for line spacing said strip and feeding it from form to form, an overflow detecting means which is coordinated with the advance of said strip and operated to define an end point on each form, heading storage means for the different portions of a heading, multiple line reading devices with successively operated connections, means for connecting said multiple line reading device between said sensing and said storage devices in order to enter the different heading portions of said single heading record into different storage devices, and means under control of said overflow detecting means for connecting said storage devices to said printing means for repeating heading recording at the top of the following forms when overflow conditions attend recording on preceding forms.

28. In a machine of the class described, the combination of a plurality of accumulating devices, means for entering item amounts into said devices, printing devices for printing said items and totals accumulated in said accumulating devices, total taking devices for taking totals of items accumulated in said accumulating devices, resetting devices for resetting said accumulating devices, a program device including a plurality of stepping relays so interconnected that the first relay picks up the second on one cycle, and the second picks up the third on the next cycle, etc., for several cycles, means for automatically initiating operation of said first relay of said program device, electrical selection instrumentalities for each of said accumulating, printing, total taking and resetting devices, electrical circuit connections under control of the different relays of said program device and successively closed thereby for automatically energizing preselected combinations of said instrumentalities for calling into operation any of said devices in any of the cycles of operation of the program device, and means for operating the selected devices.

29. In a machine controlled by the records arranged in groups according to group number indicia thereon, said records also bearing amount indicia, means for sensing the indicia on said records, accumulating devices, printing devices, means under control of said sensing means for operating said accumulating and printing devices, group control devices under control of said sensing means for detecting the appearance of the end of one record group and the beginning of the following group, total taking control devices, resetting control devices, a program device including a plurality of stepping relays so interconnected that the first relay picks up the second on one cycle, and the second picks up the third on the next cycle, etc., for a plurality of cycles, means for initiating operation of said first relay of said program device under control of said group control devices whenever a group change is detected, program contacts closed cyclically in steps by said program relays, said program contacts having pluggably associated therewith selection instrumentalities for any of said accumulating, printing, total taking and resetting devices in each cycle step, means under control of said program relays and successively varied by the closure of said program contacts for automatically operating predetermined combinations of said instrumentalities for selecting any of the accumulating, printing, total taking and resetting devices in any of the cycles of operation of the program device, and means for operating the selected devices.

30. A machine of the kind set forth in claim 29 wherein the group control devices are divided into classified sections according to minor, intermediate, and major classes of record data, said program devices also exercising classified control under control of said group control devices, means under control of said group control devices to extend the program control to one, two, or three steps by limiting the action of said stepping relays to one, two or three activated relays, according to minor, intermediate or major changes, respectively, to select one of several sequences of control cycles in which any of the accumulating, printing, total taking and resetting devices are automatically called into operation by closure of said program contacts in any of the program cycles according to the class of the group change.

31. A machine of the kind set forth in claim 29 and 30 in combination with means for stopping the machine on the occurrence of a group change, key operated means for selecting progressive and final totals, classified total taking control devices operated by said keys, and means under control of said key selected devices for extending the program control to fourth and fifth steps and selecting related sequences of control operation cycles in which any of the accumulating, printing, total taking and resetting devices are automatically called into operation by closure of said program contacts in any of the extended program cycles.

32. In an accounting machine controlled by groups of records, said records bearing indicia representative of item data and group identifying data, means for sensing said indicia, accumulating devices, means under control of said sensing means for operating said accumulating devices to accumulate the amounts of different item groups, group control devices under control of said sensing means for detecting changes in card groups, machine control devices for controlling the functions of said machine, a set of progressively activated program stepping relays, means for connecting said relays to be progressively activated, sets of contacts under control of said relays to be closed seriatim, separate sets of pluggable program terminals for said sets of contacts, means under control of said group control devices for causing initial energization of the first of said stepping relays, means including selectively plugged connections between said machine control devices and said separate terminals for selecting predetermined machine function control devices in a predetermined order, means for operating the selected function control devices, and means under control of said group control devices for deenergizing a predetermined one of said stepping relays to terminate program operation after a predetermined number of machine control cycles.

33. The invention set forth in claim 32, in combination with devices for resetting said accumulating devices, and means under control of said program stepping relays for initiating operation of said resetting devices in any predetermined cycle selected by connection of said resetting devices to a particular set of said program terminals.

34. The invention set forth in claim 32, in combination with amount reading devices cooperating with said accumulating devices, total taking devices for controlling operation of said amount reading devices, printing devices, means under control of said total taking devices for operating said printing devices to record a total, and means under control of said program stepping relays for initiating operation of said reading and total taking devices in any predetermined cycle selected by the connection of said total taking devices to a particular set of said program terminals.

35. The invention set forth in claim 32 in combination with coupling means comprising connections between the different stepping relays in order to close more than one set of contacts in one cycle, whereby selected machine functions may be called into operation earlier or later than in a predetermined order.

36. The invention set forth in claim 32 in combination with additional controls called in by termination of program operation to reinitiate energization of the first of said stepping relays, whereby program operations are repeated.

37. The invention set forth in claim 32 in combination with devices for storing said group identifying data, means for printing on a continuous strip divided into forms, means for line spacing and ejecting said strip from form to form, an overflow detecting means which is coordinated with the advance of said strip and operated to define an end point on each form, and means under control of said overflow detecting means and a selected program terminal for connecting said storing devices to said printing means for recording said group identifying data near the top of a new form on a predetermined program operation.

38. The invention set forth in claim 32 in combination with means for printing on a continuous strip divided into forms, means for line spacing and ejecting said strip from form to form, and means under control of a selected program terminal for operating said strip ejecting means to advance the strip to bring a new form to the printing position after a predetermined program operation.

EDWARD J. RABENDA.

REFERENCES CITED

The following references are of record in the file of this patent:

UNITED STATES PATENTS

| Number | Name | Date |
| --- | --- | --- |
| 1,954,041 | Daly | Apr. 10, 1934 |
| 2,066,029 | Carrol | Dec. 29, 1936 |
| 2,426,049 | Rabenda | Aug. 19, 1947 |
| 2,438,071 | Page | Mar. 16, 1948 |